(12) United States Patent
Ono et al.

(10) Patent No.: US 9,209,615 B2
(45) Date of Patent: Dec. 8, 2015

(54) ELECTRIC WIRE WITH TERMINAL AND CONNECTOR

(75) Inventors: Junichi Ono, Yokkaichi (JP); Eiji Saijo, Yokkaichi (JP); Hiroki Hirai, Yokkaichi (JP); Takuji Otsuka, Yokkaichi (JP); Hiroki Shimoda, Yokkaichi (JP); Hajime Kawase, Yokkaichi (JP); Takuya Inoue, Yokkaichi (JP); Masaaki Tabata, Yokkaichi (JP); Takehiro Nakata, Yokkaichi (JP); Satoshi Morikawa, Yokkaichi (JP); Mikiko Kosaka, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 215 days.

(21) Appl. No.: 13/813,392

(22) PCT Filed: Aug. 3, 2011

(86) PCT No.: PCT/JP2011/067777
§ 371 (c)(1),
(2), (4) Date: Jan. 30, 2013

(87) PCT Pub. No.: WO2012/018049
PCT Pub. Date: Feb. 9, 2012

(65) Prior Publication Data
US 2013/0126234 A1   May 23, 2013

(30) Foreign Application Priority Data

| Aug. 6, 2010 | (JP) | 2010-177645 |
| Sep. 8, 2010 | (JP) | 2010-201287 |
| Sep. 8, 2010 | (JP) | 2010-201288 |
| Sep. 8, 2010 | (JP) | 2010-201289 |
| Sep. 8, 2010 | (JP) | 2010-201291 |
| Sep. 8, 2010 | (JP) | 2010-201337 |
| Sep. 8, 2010 | (JP) | 2010-201338 |
| Nov. 5, 2010 | (JP) | 2010-248998 |

(51) Int. Cl.
*H02G 15/08* (2006.01)
*H01R 4/70* (2006.01)
(Continued)

(52) U.S. Cl.
CPC ........... *H02G 15/08* (2013.01); *H01R 4/70* (2013.01); *H02G 15/046* (2013.01); *H01R 4/185* (2013.01); *H01R 4/62* (2013.01)

(58) Field of Classification Search
CPC ............ H01R 4/70; H01R 4/185; H01R 4/62; H02G 15/046; H02G 15/08
USPC ....... 174/75 R, 74–84 C, 137 A; 439/522, 521, 439/519
See application file for complete search history.

(56) References Cited

U.S. PATENT DOCUMENTS

| 2009/0042444 A1* | 2/2009 | Shimizu ............... H05K 5/0091 439/620.21 |
| 2009/0186507 A1* | 7/2009 | Watanabe ............... H01R 4/185 439/282 |
| 2010/0105257 A1* | 4/2010 | Kumakura ............. H01R 4/185 439/877 |

FOREIGN PATENT DOCUMENTS

| JP | A-2000-285983 | 10/2000 |
| JP | A-2002-25647 | 1/2002 |

(Continued)

OTHER PUBLICATIONS

International Search Report dated Aug. 30, 2011 issued in International Patent Application No. PCT/JP2011/067777; Dated Aug. 30, 2011.

(Continued)

*Primary Examiner* — Timothy Thompson
*Assistant Examiner* — Paul McGee, III
(74) *Attorney, Agent, or Firm* — Oliff PLC

(57) ABSTRACT

An electric wire with terminal includes an electric wire covering an outer periphery of a core wire with an insulating coating and a female terminal. The female terminal includes: a wire barrel having a bottom plate on which the core wire is placed and crimped onto the core wire; a groove portion extending from the bottom plate in a direction in which the core wire extends and whose surface on the side where the core wire is placed is bent into a concave shape. The groove portion has a water blocking wall molded by synthetic resin. The water blocking wall is provided to fill the inside of the groove portion. A region extending from the water blocking wall to the end of the insulating coating is covered with a water blocking coating, and the inner surface of the water blocking coating is in close contact with the water blocking wall.

9 Claims, 91 Drawing Sheets

(51) Int. Cl.
*H02G 15/04* (2006.01)
*H01R 4/18* (2006.01)
*H01R 4/62* (2006.01)

(56) References Cited

FOREIGN PATENT DOCUMENTS

| JP | 2004111058 A | * | 4/2004 |
| JP | A-2008-176970 | | 7/2008 |
| JP | A-2009-230998 | | 10/2009 |

OTHER PUBLICATIONS

Written Opinion of the International Searching Authority issued in International Patent Application No. PCT/JP2011/067777; Dated Aug. 22, 2011 (with translation).

Japanese Office Action issued in Japanese Patent Application No. 2010-248998 on Oct. 14, 2014 (with translation).

* cited by examiner

ELECTRIC WIRE WITH TERMINAL AND CONNECTOR

TECHNICAL FIELD

The present invention relates to an electric wire with terminal and a connector.

BACKGROUND ART

As a conventional electric wire with terminal, one disclosed in Patent Document 1 is known. This electric wire with terminal includes: an electric wire covering the outer periphery of a core wire with an insulating coating; and a terminal connected to an exposed portion of the core wire not covered with the insulating coating. The terminal has a flat plate-shaped board portion on which the core wire is placed and a wire barrel that projects from the board portion and is crimped onto the core wire.

A region extending from the board portion to the end of the insulating coating is covered with a heat-shrinkable tube. One of the ends of the heat-shrinkable tube covers the core wire onto which the wire barrel is crimped and the other end is in close contact with the insulating coating.

Patent Document

Patent Document 1: JP 2000-285983 A

However, in the case of the above-described structure, the board portion has a flat plate shape, and therefore there is a fear that a gap is left between the one of the ends of the heat-shrinkable tube and the board portion. This may cause a fear that water enters the inside of the heat-shrinkable tube through the gap and then comes into contact with the core wire and the wire barrel. This may further causes a problem such as oxidation of the surface of the core wire or the wire barrel occurs.

Therefore, there is a need in the art to provide an electric wire with terminal excellent in waterproofness.

SUMMARY

The present invention is directed to an electric wire with terminal including: an electric wire covering an outer periphery of a core wire with an insulating coating; and a terminal connected to the electric wire. The terminal has a wire barrel that has a bottom plate on which the core wire exposed beyond an end of the insulating coating is placed and that is crimped onto the core wire and an extending portion extending from the bottom plate. In addition, the extending portion is provided with a water blocking wall molded by a synthetic resin, and the core wire is covered with a tubular water blocking coating that extends from the end of the water blocking wall to the end of the insulating coating and is in close contact with an outer surface of the water blocking wall.

According to the present invention, the outer surface of the water blocking wall provided in the extending portion is in close contact with the inner surface of the water blocking coating. This makes it possible to inhibit the entry of water from between the water blocking wall and the water blocking coating. As a result, adhesion of water to the core wire and the wire barrel can be inhibited by the water blocking coating extending from the water blocking wall to the end of the insulating coating to cover the core wire. As a result, according to the present invention, it is possible to improve the waterproofness of the electric wire with terminal.

EXPLANATION OF SYMBOLS

Figure 1:
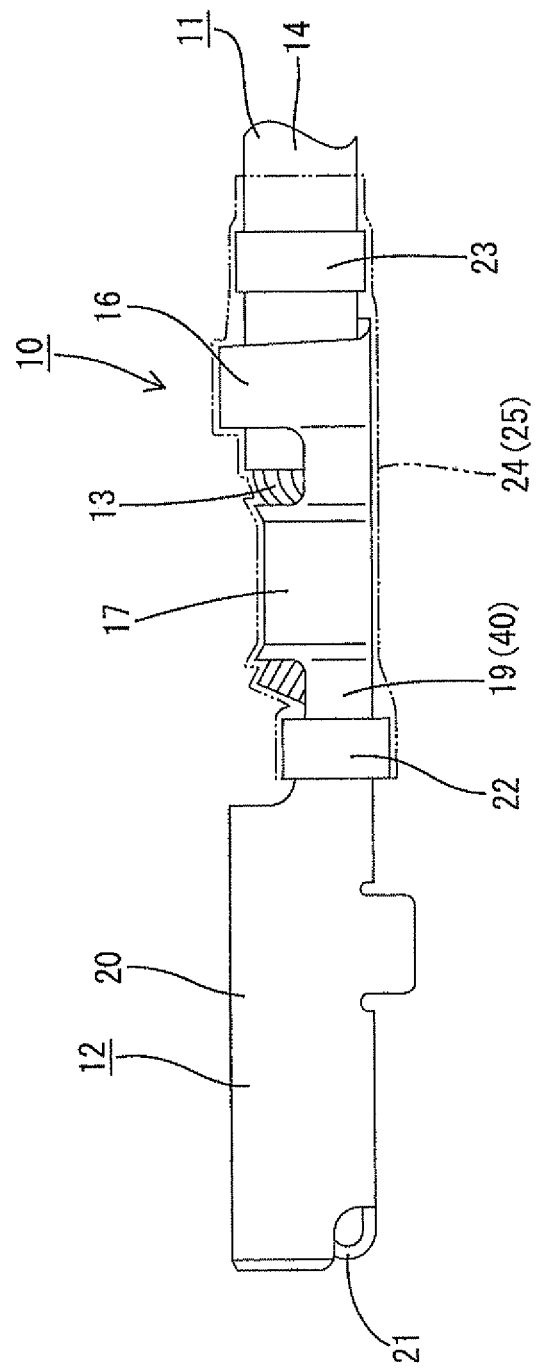
FIG. 1 is a side view of an electric wire with terminal according to an embodiment 1-1 of the present invention.
Figure 2:
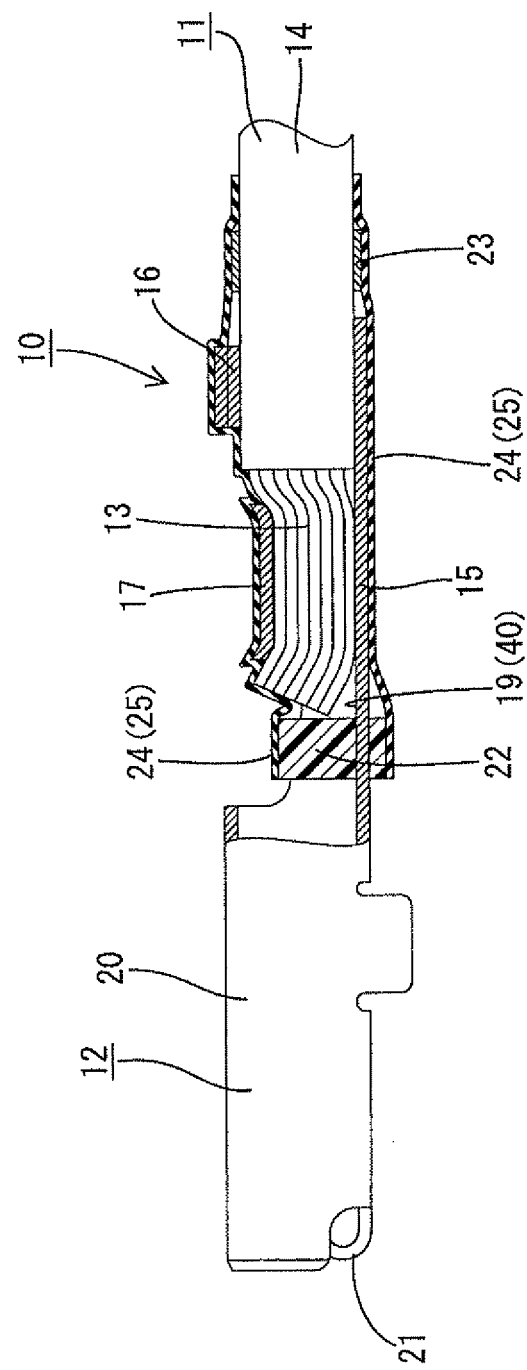
FIG. 2 is a cutaway view of a main part of the electric wire with terminal.
Figure 3:
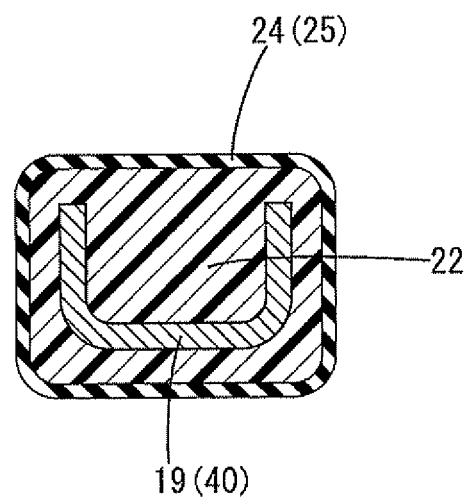
FIG. 3 is an enlarged sectional view of a main part of a groove portion.

10: Electric wire with terminal
11: Electric wire
12: Female terminal (Terminal)
13: Core wire
14: Insulating coating
15: Bottom plate
17: Wire barrel
19: Groove portion
22, 52: Water blocking wall
23: Resin ring
24: Heat-shrinkable tube
25: Water blocking coating
26: Carrier
27: Terminal strip
40, 51: Extending portion
41: Chain-terminal
50: Male terminal (Terminal)
70: Elastic body
80: Water blocking tape
210, 230, 240: Electric wire with terminal
211: Electric wire
212: Female terminal (Terminal)
213: Core wire
214: Insulating coating
217: Wire barrel
219: Bridging portion
219A: Bottom plate
219B: Side plate
220: Connecting portion
222, 241: Water blocking wall
223: Resin ring
224: Heat-shrinkable tube (Water blocking coating)
225, 231: Continuously-provided portion
225C: Inclined surface (Guiding surface)
3A: Electric wire with terminal
310: Electric wire
311: Core wire
312: Insulating coating
320: Female terminal (Terminal)
321: Tubular connecting portion (Connecting portion)
324: Bridging portion
326: Wire barrel
330: Water blocking wall
332: Abutment plate (Abutment portion)
334: Connecting portion
335: Surrounding wall
336: Thin film (Abutment potion)
338: Protrusion (Abutment portion)
410: Electric wire with terminal
411: Electric wire
412: Female terminal (Terminal)
413: Core wire
414: Insulating coating
415: Bottom plate
417: Wire barrel
419: Extending portion
419A: Projection
419B: Aperture
419C: End surface (of extending portion)
419D: End (of extending portion)
419F: Depression
422: Water blocking wall
423: Resin ring
424: Heat-shrinkable tube
425: Water blocking coating
427: Terminal strip
X, Y, Z: Corrosion path
510: Electric wire with terminal
511: Electric wire
512: Female terminal (Terminal)
513: Core wire
514: Insulating coating
517: Wire barrel
519, 551: Bridging portion
520: Connecting portion
522: Water blocking wall
523: Resin ring
524: Heat-shrinkable tube (Water blocking coating)
530: Boundary surface
536, 563: Inner boundary surface (Boundary surface on the side where the core wire is placed)
537, 561: Outer boundary surface (Boundary surface on the side opposite to the inner boundary surface)
540, 550, 560, 570: Irregularities
541, 562: Groove
541A: Inner groove (Groove provided in a surface on the side where the core wire is placed)
541B: Outer groove (Groove provided in a surface on the side opposite to the surface in which the inner groove is provided)
610: Electric wire with terminal
611: Electric wire
612: Female terminal (Terminal)
613: Core wire
614: Insulating coating
615: Bottom plate
617: Wire barrel
619: Extending portion
622: Water blocking wall
623: Resin ring
624: Heat-shrinkable tube
625: Water blocking coating
626: Carrier
627: Terminal strip
629: Large-diameter portion
630: Connector
631: Connector housing
632: Cavity
633: Front-stopper wall
634: Through hole
639A, 639B: Small-diameter portion
640: Male connector (Mating connector)
641: Connector housing
642: Male terminal
701, 701A, 701B: Electric wire with terminal
702: Electric wire
721: Core wire
722: Insulating layer
703, 703A: Terminal
731: Bottom plate
732: Wire barrel
733: Tip portion
734: Insulation barrel
735: Groove
736: Blank space
737: Recess
738: Projecting portion
739: Guiding portion
704: Water blocking wall

705: Water blocking coating (Heat-shrinkable tube)

BEST MODE FOR CARRYING OUT THE INVENTION

<Embodiment 1-1>

An electric wire with terminal 10 according to an embodiment 1-1 of the present invention will be described with reference to FIGS. 1 to 5. The electric wire with terminal 10 according to this embodiment is obtained by connecting a female terminal 12 (corresponding to a terminal) to the end of an electric wire 11.

(Electric Wire 11)

The electric wire 11 includes one core wire 13 obtained by twisting a plurality of thin metallic wires and an insulating coating 14 made of a synthetic resin and covering an outer periphery of the core wire 13. The core wire 13 is made of any metal, such as copper, a copper alloy, aluminum, or an aluminum alloy, as appropriate. In this embodiment, aluminum or an aluminum alloy is used. The insulating coating 14 is stripped off at the end of the electric wire 11 to expose the core wire 13. It is to be noted that the core wire 13 may be a single core wire.

(Female Terminal 12)

The female terminal 12 is formed by pressing a metallic plate material into a predetermined shape. As a metal constituting the female terminal 12, any metal, such as copper or a copper alloy, may be used as appropriate. Further, the metallic plate material has a plated layer (not shown) provided on the surface thereof. As a metal constituting the plated layer, any metal such as tin or nickel may be used as appropriate. In this embodiment, a tin plated layer is provided on the surface made of copper or a copper alloy. It is to be noted that the metallic plate material may have a structure in which a plated layer is not provided on the surface thereof.

The female terminal 12 includes a bottom plate 15 on which the insulating coating 14 of the electric wire 11 and the core wire 13 are placed. The bottom plate 15 has a pair of insulation barrels 16 projecting from the side edges thereof. The insulation barrels 16 are crimped onto the insulating coating 14 to externally hold the insulating coating 14 in a state where the insulating coating 14 of the electric wire 11 and the core wire 13 are placed on the bottom plate 15.

The bottom plate 15 has a pair of wire barrels 17 projecting from the side edges thereof at positions closer to the end of the core wire 13 than the insulation barrels 16. The wire barrels 17 are crimped onto the core wire 13 to externally hold the core wire 13 in a state where the insulating coating 14 of the electric wire 11 and the core wire 13 are placed on the bottom plate 15.

Figure 4:
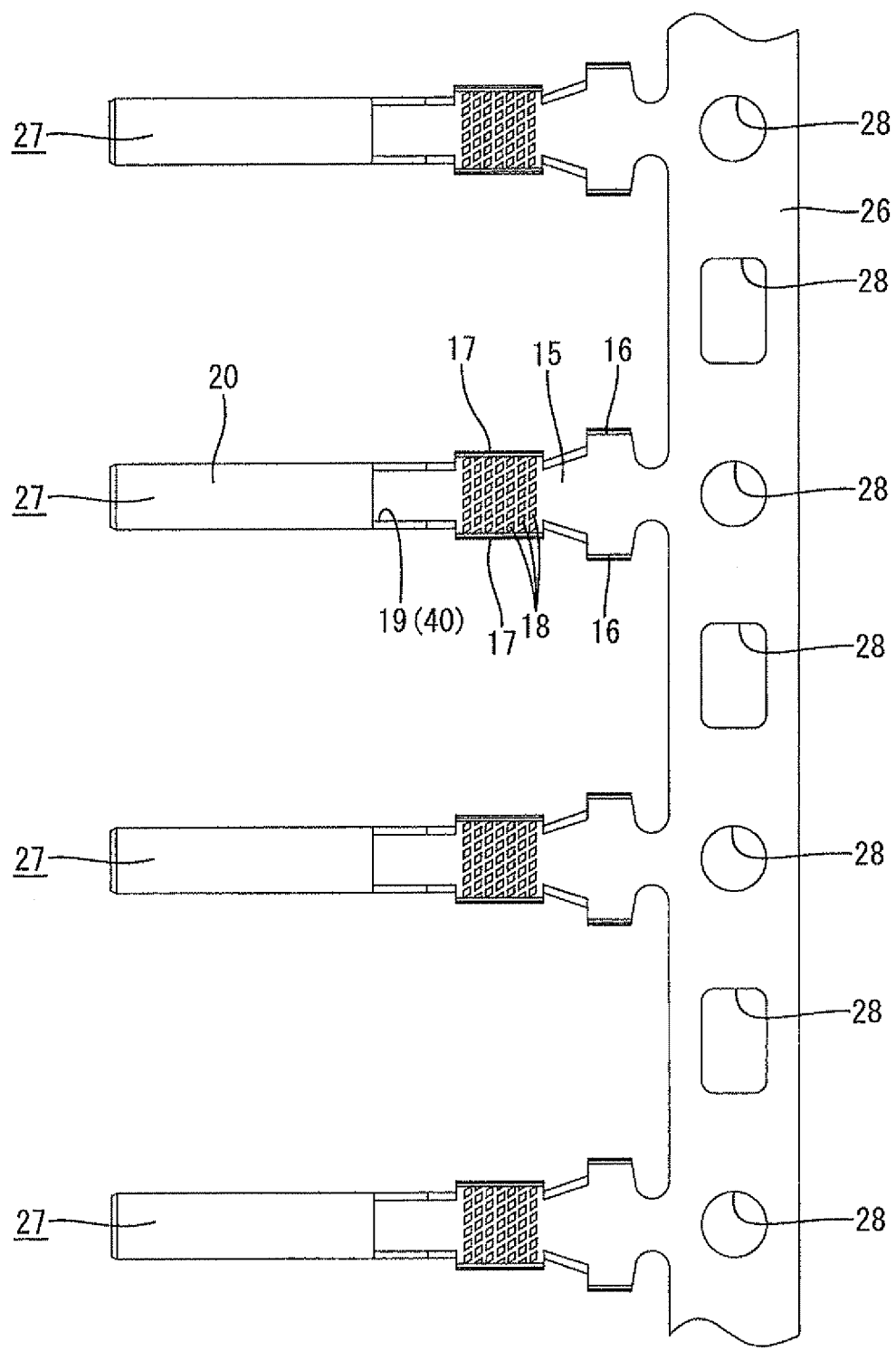
FIG. 4 is a plan view showing a state where a bending step is completed.

As shown in FIG. 4, part of the bottom plate 15 located between the wire barrels 17 and the wire barrels 17 have a plurality of recesses 18 formed in their surfaces on the side where the core wire 13 is placed. Each of the recesses is almost quadrangular and more specifically almost parallelogrammatic. Each of the recesses 18 has a pair of first sides substantially orthogonal to a direction in which the core wire 13 extends (i.e., a right-left direction in FIG. 4) and a pair of second sides intersecting with the direction in which the core wire 13 extends at an angle smaller than 90°. The recesses 18 are arranged such that the first sides of the adjacent recesses 18 are in alignment with each other and the second sides of the adjacent recesses 18 are also in alignment with each other. Therefore, a die (not shown) for use in forming the recesses 18 by pressing can be produced by forming a plurality of grooves, which makes it possible to reduce production cost.

The first sides of the recesses 18 adjacent to each other in the direction in which the core wire 13 extends overlap one another in the direction in which the core wire 13 extends, which makes it possible to improve the strength of fixation of the wire barrels 17 to the core wire 13. Further, the rims of openings of the recesses 18 are in sliding contact with the surface of the core wire 13. Therefore, the area of contact between the rims of openings of the recesses 18 and the core wire 13 is increased, which as a result makes it possible to reduce the value of electrical resistance between the female terminal 12 and the core wire 13.

An extending portion 40 is provided so as to further extend from the bottom plate 15 in the direction in which the core wire 13 extends. The extending portion 40 is provided as a groove portion 19 whose surface connected to the surface of the bottom plate 15 on which the core wire 13 is placed has a concave shape. The groove portion 19 has a substantially U-shaped cross-section, and therefore its upper end is open. It is to be noted that the groove portion 19 may have any cross-sectional shape, such as a semicircular shape, as appropriate.

A tubular connecting portion 20 is provided so as to further extend from the groove portion 19 in the direction in which the core wire 13 extends. The tubular connecting portion 20 has a tubular shape and is configured to connect to a mating terminal not shown. An elastic contact piece 21 is provided in the tubular connecting portion 20. The elastic contact piece 21 is to be brought into elastic contact with a mating terminal.

(Water Blocking Wall 22)

The groove portion 19 is provided with a water blocking wall 22 formed by molding a synthetic resin material. As the synthetic resin material constituting the water blocking wall 22, any synthetic resin material, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

The water blocking wall 22 is provided so as to fill the inside of the groove portion 19. Further, the water blocking wall 22 is provided so as to surround the entire outer periphery of the groove portion 19. In this embodiment, the water blocking wall 22 has a substantially quadrangular cross-section with rounded corners.

(Resin Ring 23)

A resin ring 23 made of a synthetic resin is fitted onto the end of the electric wire 11. More specifically, the resin ring 23 having a circular cross-section is fitted onto the end of the insulating coating 14 at a position behind a portion where the insulation barrels 16 are crimped (i.e., at a position on the opposite side of the insulation barrels 16 from the exposed core wire 13). The inner diameter of the resin ring 23 is set to be substantially the same as the outer diameter of the insulating coating 14. This makes it possible to easily fit the resin ring 23 onto the end of the electric wire 11. It is to be noted that the term "substantially the same" includes a case where the inner diameter of the resin ring 23 is the same as the outer diameter of the insulating coating 14, a case where the inner diameter of the resin ring 23 is slightly larger than the outer diameter of the insulating coating 14, and a case where the inner diameter of the resin ring 23 is slightly smaller than the outer diameter of the insulating coating 14.

As the synthetic resin material constituting the resin ring 23, any synthetic resin material, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

(Water Blocking Coating 25)

A tubular water blocking coating 25 extending from the water blocking wall 22 to the end of the insulating coating 14 is provided to cover the core wire 13. More specifically, the water blocking coating 25 made of a synthetic resin material covers a region extending from part of the groove portion 19 where the water blocking wall 22 is provided to the end of the insulating coating 14 beyond the resin ring 23 through the core wire 13, the wire barrels 17, the insulation barrels 16, and the resin ring 23 fitted onto the insulating coating 14. In this embodiment, the water blocking coating 25 is composed of a heat-shrinkable tube 24. In this embodiment, the heat-shrinkable tube 24 has an adhesive or pressure-sensitive adhesive layer (not shown) provided on the inner surface thereof. The adhesive or pressure-sensitive adhesive layer is designed to develop adhesiveness or tackiness by thermal softening or melting. It is to be noted that the heat-shrinkable tube 24 may have a structure in which an adhesive or pressure-sensitive adhesive layer is not provided on the inner surface thereof. The length of the heat-shrinkable tube 24 is set longer than that of a region extending from the water blocking wall 22 to the resin ring 23.

In a state where the heat-shrinkable tube 24 is thermally shrunk, the inner surface of the heat-shrinkable tube 24 is in close contact with the entire outer periphery of the water blocking wall 22 without any gap and is also in close contact with the entire outer periphery of the resin ring 23 without any gap.

The synthetic resin material constituting the water blocking wall 22 may be one that develops adhesiveness by thermal softening or melting. In this case, the inner surface of the heat-shrinkable tube 24 can be adhered to the water blocking wall 22 by softening or melting the water blocking wall 22 at the same time as the step of heating the heat-shrinkable tube 24.

The synthetic resin material constituting the resin ring 23 may be one that develops adhesiveness by thermal softening or melting. In this case, the inner surface of the heat-shrinkable tube 24 can be adhered to the resin ring 23 by softening or melting the resin ring 23 at the same time as the step of heating the heat-shrinkable tube 24. Further, by forming the resin ring 23 using such a synthetic resin as described above, it is possible to adhere the resin ring 23 to the outer periphery of the insulating coating 14.

(Production Process)

Hereinbelow, one example of a production process of the electric wire with terminal 10 according to this embodiment will be described. First, a metallic plate material is subjected to a punching step to form a strip-shaped carrier 26 and a plurality of terminal strips 27 connected to the side edge of the carrier 26. The carrier 26 has feed holes 28 arranged at substantially regular intervals along the longitudinal direction thereof. The feed holes 28 are configured to be engaged with feed claws (not shown) of a processing machine.

The terminal strips 27 connected to the carrier 26 are arranged at substantially regular intervals along the longitudinal direction of the carrier 26. Each of the terminal strips 27 includes a bottom plate 15 on which an insulating coating 14 of an electric wire 11 and a core wire 13 are to be placed, insulation barrels 16 that project from the bottom plate 15 and are to be crimped onto the insulating coating 14, wire barrels 17 that project from the bottom plate 15 and are to be crimped onto the core wire 13, and an extending portion 40 extending from the bottom plate 15.

In the punching step, a plurality of recesses 18 may be formed in the surfaces of the wire barrels 17 on the side where the core wire 13 is to be placed. Alternatively, the recesses 18 may be formed in a step other than the punching step.

The metallic plate material that has been subjected to the punching step is then subjected to a bending step. By performing the bending step, a groove portion 19 corresponding to the extending portion 40 is formed. The groove portion 19 extends in a direction in which the core wire 13 extends in a state where the core wire 13 is placed on the bottom plate 15 and has a concave-shaped surface on the side where the core wire 13 is to be placed. Further, a tubular connecting portion 20 is formed. The tubular connecting portion 20 extends from the groove portion 19 in a direction corresponding to the direction in which the core wire 13 extends (see FIG. 4).

Then, a synthetic resin is molded in the groove portion 19 of each of the terminal strips 27 while the terminal strips 27 are fed one after another by engaging the feed holes formed in the carrier 26 with the feed claws. More specifically, first, part of the groove portion 19 where a water blocking wall 22 should be formed is sandwiched between a pair of dies (not shown) in a vertical direction. Then, a synthetic resin in a molten state is injected into a cavity formed by the dies. After the synthetic resin is solidified in the dies, the pair of dies is opened to separate the terminal strip 27 provided with the water blocking wall 22 from the dies. The above step is continuously performed on the terminal strips connected to the carrier 26 at substantially regular intervals (see FIG. 5). This makes it possible to form a chain-terminal 41.

On the other hand, the insulating coating 14 of the electric wire 11 is stripped off to expose the core wire 13. Then, a resin ring 23 is fitted onto the end of the insulating coating 14. The resin ring 23 is fitted onto part of the insulating coating 14 different from part of the insulating coating 14 onto which the insulation barrels 16 are to be crimped (i.e., onto part of the insulating coating 14 located on the side opposite to the core wire 13).

Then, a crimping step is performed on each of the terminal strips 27. More specifically, the exposed core wire 13 of the electric wire 11 and the insulating coating 14 are placed on the bottom plate 15 of each of the terminal strips 27. Then, the insulation barrels 16 and the wire barrels 17 are bent using dies (not shown) to externally hold the insulating coating 14 and the core wire 13, respectively. This makes it possible to crimp the insulation barrels 16 onto the insulating coating 14 and to crimp the wire barrels 17 onto the core wire 13.

In this embodiment, a cutting step to cut each of the terminal strips 27 from the carrier 26 is performed at the same time as the above-described crimping step. This makes it possible to cut each of the terminal strips 27 from the carrier 26 as a female terminal 12 and to provide an electric wire with terminal 10 in which the female terminal 12 is connected to the electric wire 11.

Then, a covering step is performed. More specifically, a heat-shrinkable tube 24 is passed through from the electric wire 11 side or the female terminal 12 side such that the heat-shrinkable tube 24 covers a region extending from the water blocking wall 22 to the insulating coating 14 beyond the resin ring 23. The heat shrinkable tube 24 can be relatively easily passed through from the female terminal 12 side by setting the inner diameter of the heat-shrinkable tube 24 before heating larger than the outer shape of the tubular connecting portion 20. When the heat-shrinkable tube 24 is passed through from the electric wire 11 side, the electric wire 11 may be passed through the heat-shrinkable tube 24 in advance before the crimping step is performed.

After the heat-shrinkable tube 24 is passed through, the heat-shrinkable tube 24 is shrunk by performing a heating step using a heating device not shown. This makes it possible to bring the inner surface of the heat-shrinkable tube 24 into close contact with the outer surface of the water blocking wall 22 and the outer surface of the resin ring 23 without any gap. It is to be noted that the heat-shrinkable tube 24 is also in close contact with the end of the insulating coating 14 at a position behind the resin ring 23. In such a way as described above, the electric wire with terminal 10 is completed.

It is to be noted that in the above-described heating step, in a state where the tubular connecting portion 20 is placed upward, the synthetic resin constituting the water blocking wall 22 can be inhibited from flowing into the tubular connecting portion 20 even when the water blocking wall 22 is melted in the heating step. This makes it possible to improve the reliability of electrical connection with a mating terminal in the tubular connecting portion 20.

(Functions and Effects)

Hereinbelow, the functions and effects of this embodiment will be described. According to this embodiment, the extending portion 40 extending from the bottom plate 15 having the wire barrels 17 is provided with the water blocking wall 22. In this embodiment, the extending portion 40 is provided as the groove portion 19, and the water blocking wall 22 is provided so as to fill the inside of the groove portion 19. This makes it possible to inhibit the entry of water through the groove portion 19 to inhibit the adhesion of water to the core wire 13 and the wire barrels 17. Further, the entire outer periphery of the water blocking wall 22 is in close contact with the inner surface of the heat-shrinkable tube 24 without any gap, which makes it possible to inhibit the entry of water from between the water blocking wall 22 and the heat-shrinkable tube 24. Therefore, the region extending from part of the groove portion 19 where the water blocking wall 22 is provided to the insulating coating 14 beyond the resin ring 23 through the wire barrels 17, the insulation barrels 16, the resin ring 23 fitted onto the insulating coating 14 is made waterproof by the heat-shrinkable tube 24, which makes it possible to reliably inhibit the adhesion of water to the core wire 13 and the wire barrels 17.

Further, according to this embodiment, the resin ring 23 is fitted onto the end of the insulating coating 14 such that the inner surface of the resin ring 23 is in close contact with the outer surface of the insulating coating 14 without any gap. Further, the inner surface of the heat-shrinkable tube 24 is in close contact with the entire periphery of the resin ring 23 without any gap. This makes it possible to reliably inhibit the entry of water from the end side of the insulating coating 14 and therefore to more reliably inhibit the adhesion of water to the core wire 13 and the wire barrels 17.

When the metal constituting the core wire 13 and the metal constituting the female terminal 12 are different from each other, there is a fear that when water adheres to both the core wire 13 and the wire barrels 17, electrolytic corrosion occurs in the core wire 13 or the wire barrels 17. According to this embodiment, the core wire 13 and the wire barrels 17 are reliably made waterproof by the heat-shrinkable tube 24, which makes it possible to inhibit the core wire 13 or the wire barrels 17 from being dissolved by electrolytic corrosion.

This is effective particularly when the core wire 13 is made of aluminum or an aluminum alloy and the female terminal 12 has a tin plated layer on its surface made of copper or a copper alloy as in the case of this embodiment, because there is a fear that the core wire 13 made of aluminum or an aluminum alloy having a relatively high ionization tendency is dissolved by electrolytic corrosion. It is to be noted that aluminum or an aluminum alloy has a relatively low specific gravity, which makes it possible to reduce the weight of the electric wire 11.

Further, according to the present invention, the water blocking coating 25 is composed of the heat-shrinkable tube 24. The inner diameter of the heat-shrinkable tube 24 before heating is relatively large, which makes it easy for the heat-shrinkable tube 24 to externally surround the above-described region. Then, by thermally shrinking the heat-shrinkable tube 24, the inner surface of the heat-shrinkable tube 24 can be brought into close contact with the water blocking wall 22 and the end of the insulating coating 14 without any gap. As described above, the use of the heat-shrinkable tube 24 as the water blocking coating 25 makes it possible to improve the work efficiency of the step of externally surrounding the region extending from the water blocking wall 22 to the end of the insulating coating 14 with the heat-shrinkable tube 24.

Further, the heat-shrinkable tube 24 has an adhesive or pressure-sensitive adhesive layer provided on the inner surface thereof, and therefore by performing the heating step to shrink the heat-shrinkable tube 24, the inner surface of the heat-shrinkable tube 24 can be reliably brought into close contact with the water blocking wall 22 without any gap and the heat-shrinkable tube 24 can be reliably brought into close contact with the end of the insulating coating 14 without any gap.

As described above, the use of the heat-shrinkable tube 24 having an adhesive or pressure-sensitive adhesive layer provided on the inner surface thereof as the water blocking coating 25 makes it possible to improve the work efficiency of the step of externally surrounding the region extending from the water blocking wall 22 to the end of the insulating coating 14 with the heat-shrinkable tube 24 as well as to improve adhesion between the heat-shrinkable tube 24 and the water blocking wall 22 and adhesion between the heat-shrinkable tube 24 and the end of the insulating coating 14.

In general, when a synthetic resin is injection-molded to obtain molded articles, higher efficiency is achieved by continuously performing injection molding at regular intervals than by performing injection molding at irregular intervals. This is because die temperature conditions and synthetic resin injection conditions can be made stable by continuously performing a series of steps, that is, the step of injecting a synthetic resin in a molten state into a die, the step of solidifying the resin, and the step of separating a molded article from the die. According to this embodiment, the water blocking wall 22 is formed by continuously performing the molding step on the terminal strips 27 connected to the carrier 26. As a result, the work efficiency of the molding step can be improved.

According to this embodiment, the water blocking wall 22 is formed in the molding step. That is, according to this embodiment, the formation of the water blocking wall 22 and the formation of the chain-terminal 91 are completed at the same time. The subsequent steps, that is, the crimping step, the cutting step, and the covering step are common steps, and therefore the electric wire with terminal 10 can be produced without any special steps. As a result, it is possible to make the core wire 13 and the wire barrels 17 waterproof while suppressing an increase in production cost.

Further, according to this embodiment, the cutting step is performed at the same time as the crimping step. This makes it possible to improve work efficiency as compared to a case where the cutting step and the crimping step are separately performed.

<Embodiment 1-2>

Figure 6:
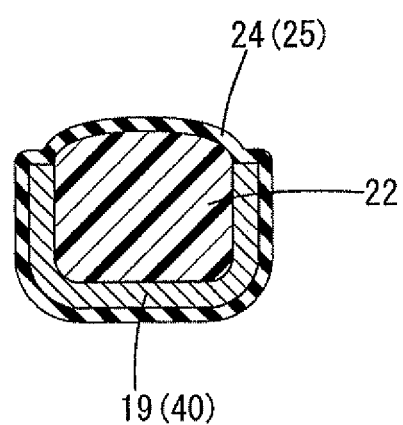
FIG. 6 is an enlarged sectional view of a main part of a groove portion of an electric wire with terminal according to an embodiment 1-2 of the present invention.

Hereinbelow, an embodiment 1-2 according to the present invention will be described with reference to FIG. 6. In this embodiment, the water blocking wall 22 is provided so as to fill the inside of the groove portion 19, but the outer periphery of the groove portion 19 is not covered with the water blocking wall 22. Further, the water blocking wall 22 is provided so as to bulge out over the upper edges of sides of the groove portion 19. The inner surface of the heat-shrinkable tube 24 is in close contact with the water blocking wall 22 without any gap and is also in close contact with the outer periphery of the groove portion 19 without any gap. The structure of this embodiment is substantially the same as that of the embodiment 1-1 except for the above-described point, and the same members as the embodiment 1-1 are denoted by the same reference numerals and a description thereof will not be repeated.

According to this embodiment, the water blocking wall 22 is provided so as to fill the inside of the groove portion 19, which makes it possible to inhibit the entry of water through the groove portion 19 to inhibit the adhesion of water to the core wire 13 and the wire barrels 17. Further, the inner surface of the heat-shrinkable tube 24 is in close contact with the water blocking wall 22 without any gap and is also in close contact with the outer periphery of the groove portion 19 without any gap, which makes it possible to inhibit the entry of water through a gap between the heat-shrinkable tube 24 and the groove portion 19 and a gap between the heat-shrinkable tube 24 and the water blocking wall 22.

Further, according to this embodiment, it is possible to reduce the amount of the synthetic resin constituting the water blocking wall 22 and therefore to reduce production cost.

<Embodiment 1-3>

Figure 7:
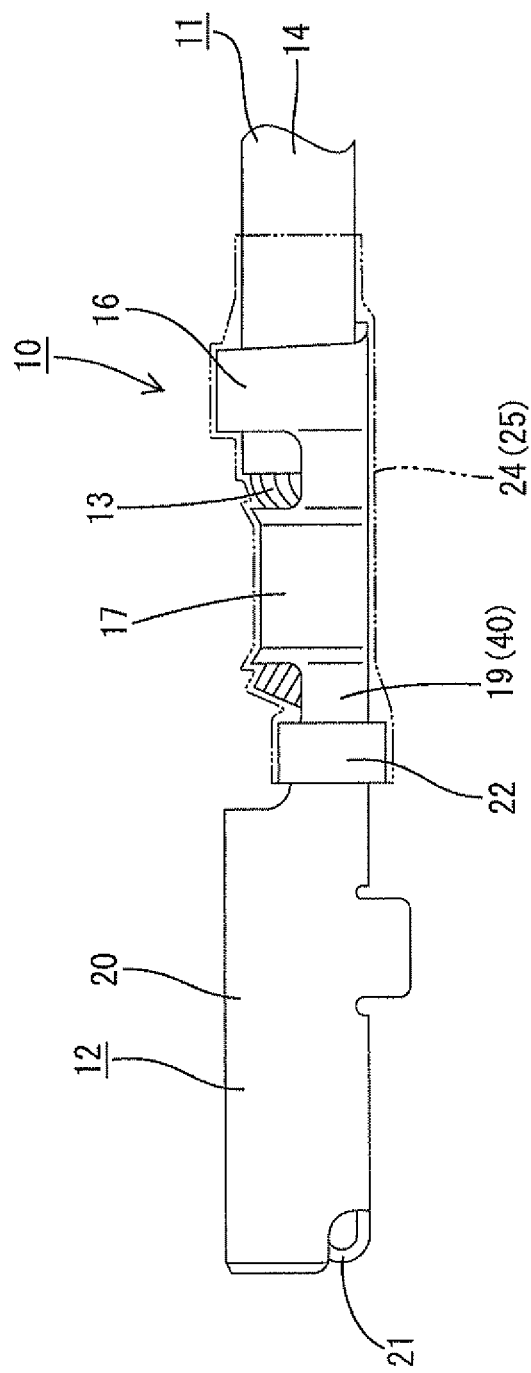
FIG. 7 is a side view of an electric wire with terminal according to an embodiment 1-3 of the present invention.

Hereinbelow, an embodiment 1-3 according to the present invention will be described with reference to FIG. 7. In this embodiment, the resin ring 23 is omitted. The heat-shrinkable tube 24 covers a region extending from part of the groove portion 19 where the water blocking wall 22 is provided to the end of the insulating coating 14 through the wire barrels 17 and the insulation barrels 16. The inner surface of the heat-shrinkable tube 24 is in close contact with the outer surface of the insulating coating 14. The structure of this embodiment is substantially the same as that of the embodiment 1-1 except for the above-described point, and the same members as the embodiment 1-1 are denoted by the same reference numerals and a description thereof will not be repeated.

According to this embodiment, the region extending from part of the groove portion 19 where the water blocking wall 22 is provided to the end of the insulating coating 14 through the wire barrels 17 and the insulation barrels 16 is made waterproof by the heat-shrinkable tube 24. This makes it possible to inhibit the adhesion of water to the core wire 13 and the wire barrels 17.

Further, according to this embodiment, the resin ring 23 is unnecessary, which makes it possible to reduce the number of parts. In addition, the step of fitting the resin ring 23 onto the end of the electric wire 11 is unnecessary, which makes it possible to reduce the number of processes for production.

Further, when the heat-shrinkable tube 24 having an adhesive layer provided on the inner periphery thereof is used, the adhesive layer is fusion-bonded during thermal shrinkage, which makes it possible to further inhibit the entry of water through a gap between the heat-shrinkable tube 24 and the insulating coating 14 and a gap between the heat-shrinkable tube 24 and the water blocking wall 22.

<Embodiment 1-4>

In this embodiment, an elastic tube having rubber elasticity is used as the water blocking coating 25. The inner diameter of the elastic tube under natural conditions is set smaller than the outer diameter of the water blocking wall 22 and the outer diameter of the insulating coating 14. The structure of this embodiment is substantially the same as that of the embodiment 1-3 except for the above-described point, and the same members as the embodiment 1-3 are denoted by the same reference numerals and a description thereof will not be repeated.

In the step of covering the female terminal 12 with the elastic tube, first, the electric wire with terminal 10 is passed through the elastic tube from the electric wire 11 side or from the female terminal 12 side in a state where the elastic tube is expanded in its radial direction such that the elastic tube covers a region extending from the water blocking wall 22 to the insulating coating 14 beyond the resin ring 23. Then, the elastic tube is allowed to recover its original shape. As a result, the inner surface of the elastic tube is brought into close contact with the region extending from the water blocking wall 22 to the end of the insulating coating 14. According to this embodiment, the entry of water through the boundary between the elastic tube and the water blocking wall 22 and the boundary between the elastic tube and the insulating coating 14 can be inhibited by performing such a simple step that the elastic tube is placed in a predetermined position and is then allowed to recover its original shape. Therefore, the heating step required when the heat-shrinkable tube 24 is used as the water blocking coating 25 is unnecessary, which makes it possible to reduce production cost.

<Embodiment 1-5>

Figure 8:
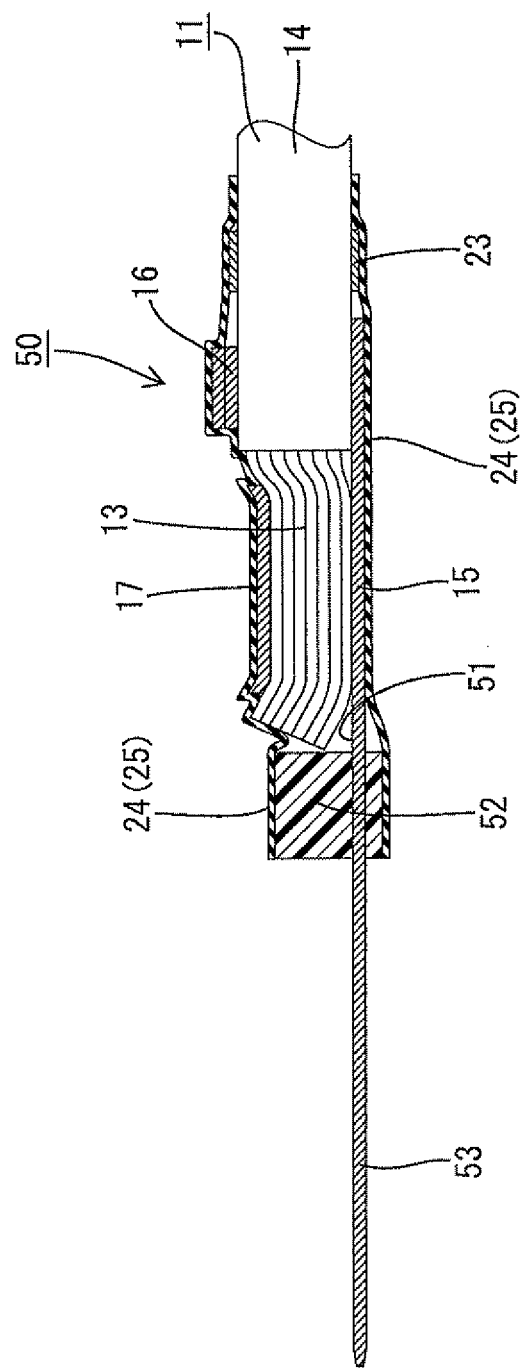
FIG. 8 is a sectional side view of an electric wire with terminal according to an embodiment 1-5 of the present invention.
Figure 9:
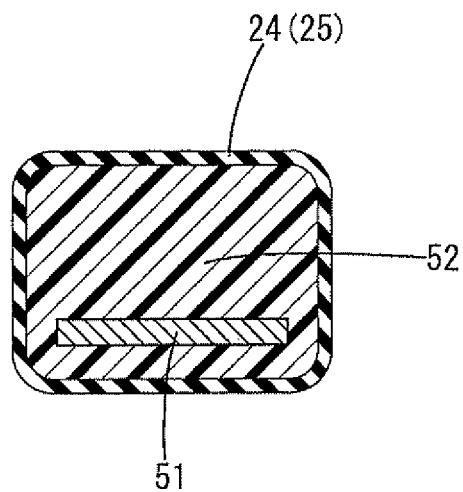
FIG. 9 is an enlarged sectional view of a main part of an extending portion provided with a water blocking wall.

Hereinbelow, an embodiment 1-5 according to the present invention will be described with reference to FIGS. 8 and 9. In this embodiment, the terminal is a male terminal 50. In this embodiment, an extending portion 51 extending from the bottom plate 15 has a flat plate shape. A water blocking wall 52 is configured to cover the entire periphery of the extending portion 51. The water blocking wall 52 has a quadrangular cross-section with rounded corners. A male tab 53 extends from the extending portion 51 in a direction in which the core wire 13 extends. This male tab 53 is to be electrically connected to a mating terminal not shown.

The structure of this embodiment is substantially the same as that of the embodiment 1-1 except for the above-described point, and the same members as the embodiment 1-1 are denoted by the same reference numerals and a description thereof will not be repeated.

According to this embodiment, even when the extending portion 51 extending from the bottom plate 15 has a flat plate shape, the entry of water from between the water blocking coating 25 and the extending portion 51 can be inhibited because the outer surface of the water blocking wall 52 and the inner surface of the water blocking coating 25 are in close contact with each other. As a result, it is possible to make the core wire 13 and the wire barrels 17 waterproof.

<Embodiment 1-6>

Figure 10:
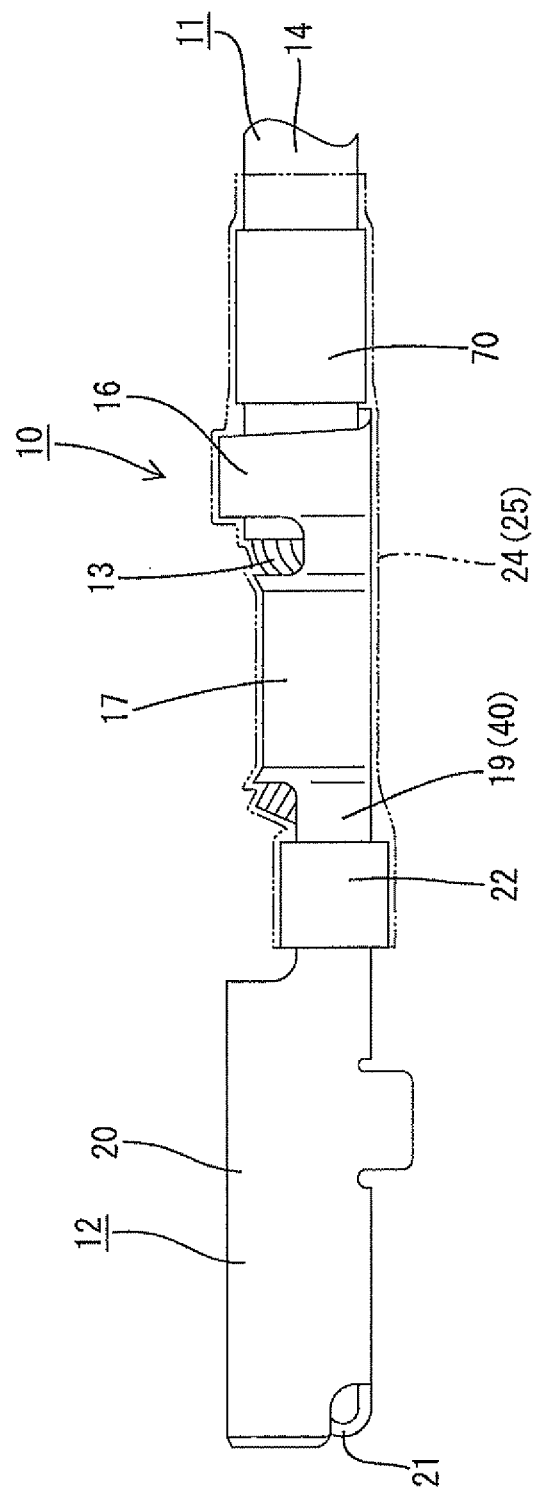
FIG. 10 is a side view of an electric wire with terminal according to an embodiment 1-6 of the present invention.
Figure 11:
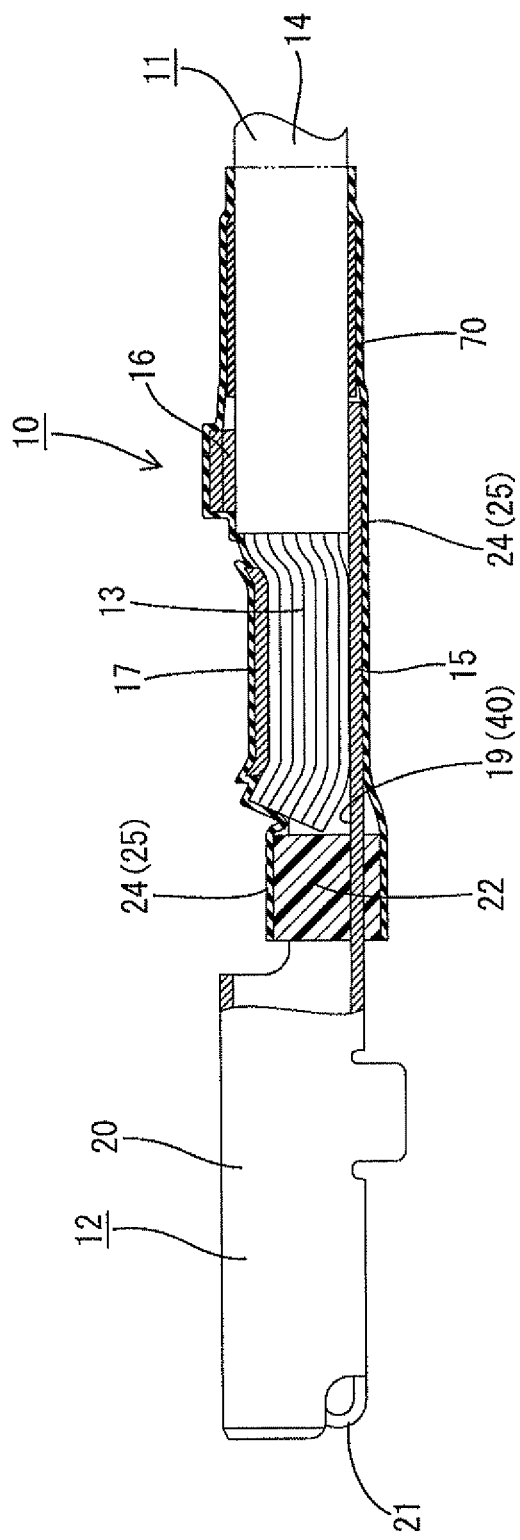
FIG. 11 is a cutaway view of a main part of the electric wire with terminal.

Hereinbelow, an embodiment 1-6 according to the present invention will be described with reference to FIGS. 10 and 11. In this embodiment, a tubular elastic body 70 made of rubber is fitted onto the end of the insulating coating 14. The inner surface of the elastic body 70 is in close contact with the outer surface of the insulating coating 14. In addition, the outer surface of the elastic body 70 is in close contact with the inner surface of the water blocking coating 25.

The elastic body 70 can be made of any rubber, such as NBR or silicone rubber, as appropriate. The elastic body 70 may be a rubber tube obtained by cutting a long rubber tube to a predetermined length. Alternatively, the elastic tube 70 may be a so-called rubber plug formed by injecting rubber in a molten state into a die not shown. The rubber plug may have a lip projecting from the outer surface thereof along a circumferential direction.

The structure of this embodiment is substantially the same as that of the embodiment 1-1 except for the above-described point, and the same members as the embodiment 1-1 are denoted by the same reference numerals and a description thereof will not be repeated.

According to this embodiment, it is possible to inhibit the entry of water from between the water blocking coating 25 and the end of the insulating coating 14. As a result, it is possible to improve the waterproofness of the core wire 13 and the wire barrels 17.

It is to be noted that in this embodiment, the elastic body 70 is configured to be covered with the water blocking coating 25 and located inside the water blocking coating 25, but the structure of the elastic body 70 is not limited thereto. For example, the elastic body 70 may be configured such that the end thereof located on the side opposite to the insulation barrels 16 (i.e., the right-side end in FIG. 10) may be exposed on the outside of the end of the water blocking coating 25.

<Embodiment 1-7>

Figure 12:
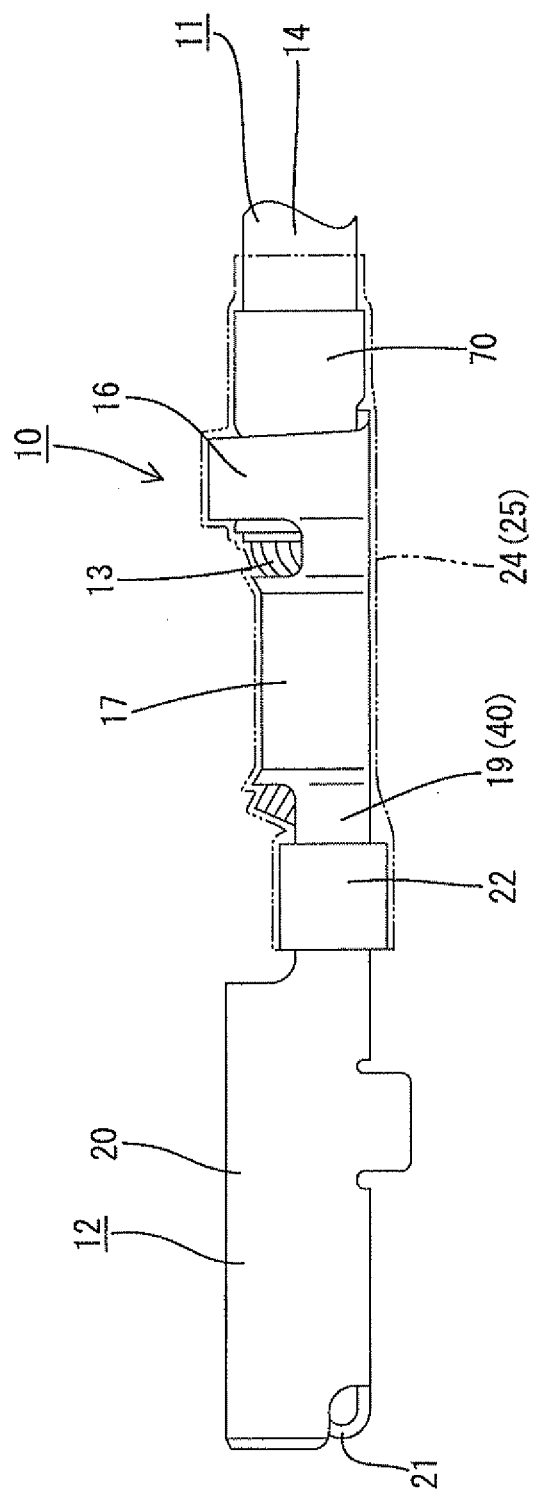
FIG. 12 is a side view of an electric wire with terminal according to an embodiment 1-7 of the present invention.

Hereinbelow, an embodiment 1-7 according to the present invention will be described with reference to FIG. 12. In this embodiment, the insulation barrels 16 are wrapped around the outside of the elastic body 70 located in the end of the insulating coating 14 to crimp the insulation barrels 16 onto the elastic body 70. The structure of this embodiment is substantially the same as that of the embodiment 1-6 except for the above-described point, and the same members as the embodiment 1-6 are denoted by the same reference numerals and a description thereof will not be repeated.

According to this embodiment, the insulation barrels 16 are crimped onto the elastic body 70, which makes it possible to improve adhesion between the inner surface of the elastic body 70 and the outer surface of the insulating coating 14. In addition, it is also possible to inhibit the elastic body 70 from being displaced. This makes it possible to reliably inhibit the entry of water from between the water blocking coating 25 and the insulating coating 14.

It is to be noted that in this embodiment, the elastic body 70 is configured to be covered with the water blocking coating 25 and located inside the water blocking coating 25, but the structure of the elastic body 70 is not limited thereto. For example, the elastic body 70 may be configured such that the end thereof located on the side opposite to the insulation barrels 16 (i.e., the right-side end in FIG. 12) may be exposed on the outside of the end of the water blocking coating 25.

<Embodiment 1-8>

Figure 13:
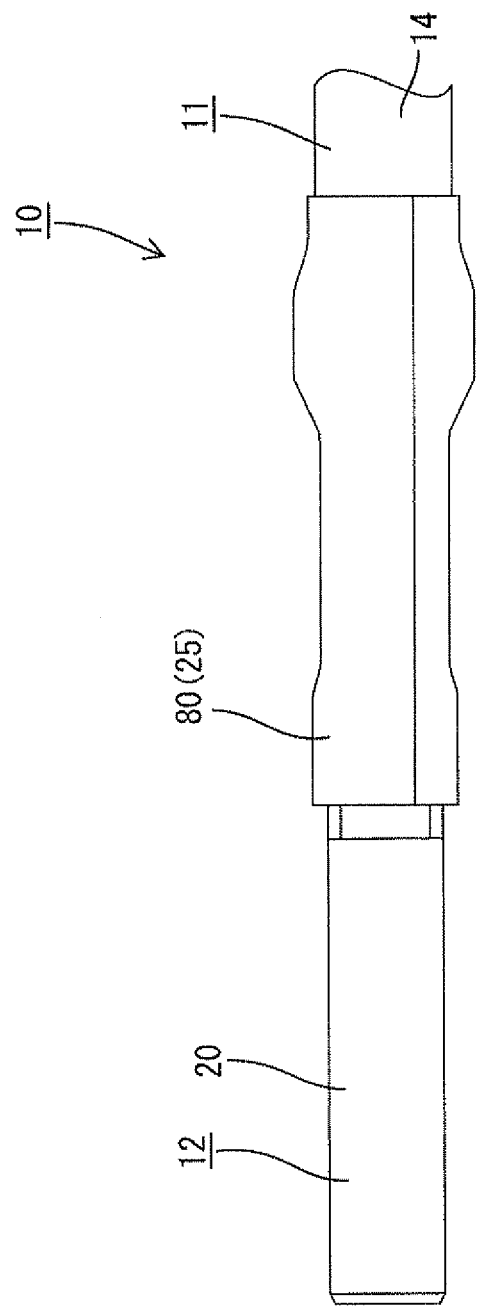
FIG. 13 is a plan view of an electric wire with terminal according to an embodiment 1-8 of the present invention.
Figure 14:
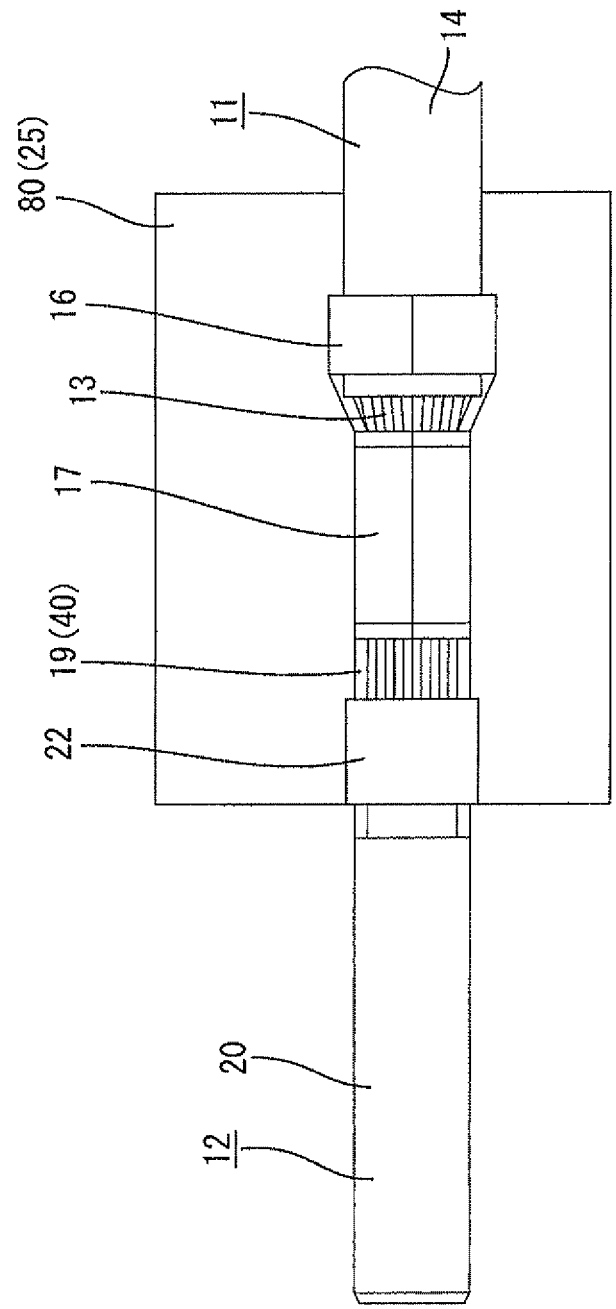
FIG. 14 is a plan view showing a state before wrapping a water blocking tape.

Hereinbelow, an embodiment 1-8 according to the present invention will be described with reference to FIGS. 13 and 14. In this embodiment, the water blocking coating 25 is configured to have a tubular shape as a whole by wrapping a sheet-shaped water blocking tape 80 around a region extending from the water blocking wall 22 to the end of the insulating coating 14. As the water blocking tape 80, a pressure-sensitive adhesive tape having a pressure-sensitive adhesive layer (not shown) or an adhesive tape having an adhesive layer (not shown) may be used. The water blocking tape 80 is wrapped with its adhesive layer or pressure-sensitive adhesive layer facing inward. Alternatively, the water blocking tape 80 may be a well-known self-fusing tape.

The structure of this embodiment is substantially the same as that of the embodiment 1-3 except for the above-described point, and the same members as the embodiment 1-3 are denoted by the same reference numerals and a description thereof will not be repeated.

According to this embodiment, the core wire 13 and the wire barrels 17 can be made waterproof by simply wrapping the sheet-shaped water blocking tape 80.

<Other Embodiment>

The present invention is not limited to the embodiments described above with reference to the drawings, and for example, the following embodiments are also included in the technical scope of the present invention.

(1) The terminal may have any shape as appropriate. For example, the terminal may be a so-called LA terminal in which a disk-shaped connecting portion having a through hole is provided so as to connect to the extending portion 40.

(2) In the embodiment 1-1, the water blocking wall 22 has a substantially quadrangular cross-section. However, the cross-sectional shape of the water blocking wall 22 is not limited thereto. The water blocking wall 22 may have any cross-sectional shape, such as a circular shape, an elliptical shape, an oval shape, or a polygonal shape (e.g., a triangular shape), as appropriate.

(3) In the above embodiments, the step of forming the water blocking wall 22 is performed before the step of crimping the wire barrels 17 onto the core wire 13 is performed. However, the order in which these steps are performed is not limited thereto. For example, the step of forming the water blocking wall 22 may be performed after the step of crimping the wire barrels 17 onto the core wire 13 is performed.

(4) In the above embodiments, the core wire 13 is made of aluminum or an aluminum alloy. However, the material of the core wire 13 is not limited thereto, and the core wire 13 may be made of any metal as appropriate. For example, the core wire 13 may be made of copper or a copper alloy. Further, in the above embodiments, the terminal is made of copper or a copper alloy and has a tin plated layer on the surface thereof. However, the material of the terminal is not limited thereto, and the terminal may be made of any metal as appropriate.

(5) In the above embodiments, the crimping step and the cutting step are performed at the same time. However, the order in which these steps are performed is not limited thereto. For example, the cutting step may be performed after the crimping step is performed.

(6) In the above embodiments, the terminal has the insulation barrels 16. However, the insulation barrels 16 may be omitted.

(7) The water blocking coating 25 may be, configured to cover a region extending from part of the groove portion 19 where the water blocking wall 22 is provided to the part where the resin ring 23 fitted on, through the wire barrels 17 and the insulation barrels 16.

(8) In the above embodiments, the resin ring 23 has an annular shape. However, the shape of the resin ring 23 is not limited thereto. For example, the resin ring 23 may have a slit to have a substantially C-shaped cross-section. This makes it easy to expand the resin ring 23 in its radial direction. Therefore, for example, the resin ring 23 can be fitted onto the electric wire 11 by expanding the resin ring 23 in its radial direction after the terminal is crimped onto the electric wire 11.

Means for Solving the Problem

The technique disclosed in this description relates to an electric wire with terminal including: an electric wire obtained by covering an outer periphery of a core wire with an insulating coating; and a terminal connected to the electric wire. The terminal has a wire barrel that has a bottom plate on which the core wire exposed beyond an end of the insulating coating is placed and that is crimped onto the core wire and an extending portion extending from the bottom plate. The extending portion is provided with a water blocking wall formed by molding a synthetic resin material, and the core wire is covered with a tubular water blocking coating that is in close contact with an outer surface of the water blocking wall and extends from the water blocking wall to the end of the insulating coating.

Further, the technique disclosed in this description relates to a terminal to be connected to an electric wire obtained by covering an outer periphery of a core wire with an insulating coating, the terminal including: a wire barrel that has a bottom plate on which the core wire exposed beyond an end of the insulating coating is to be placed and that is to be crimped onto the core wire; and an extending portion extending from the bottom plate. The extending portion is provided with a water blocking wall formed by molding a synthetic resin. In a state where the wire barrel is crimped onto the core wire, the core wire is covered with a tubular water blocking coating that extends from the water blocking wall to the end of the insulating coating and that has an inner surface in close contact with an outer surface of the water blocking wall.

Further, the technique disclosed in this description relates to a chain-terminal including: a strip-shaped carrier; and a plurality of terminal strips connected to a side edge of the carrier. Each of the terminal strips is to be cut from the carrier and connected to an exposed portion of a core wire of an electric wire obtained by covering an outer periphery of the core wire with an insulating coating, and has a wire barrel that has a bottom plate on which the core wire exposed beyond an end of the insulating coating is to be placed and that is to be crimped onto the core wire and an extending portion extending from the bottom plate. In addition, the extending portion is provided with a water blocking wall formed by molding a synthetic resin. In a state where the wire barrel is crimped onto the core wire, the core wire is covered with a tubular water blocking coating that extends from the water blocking wall to the end of the insulating coating and that has an inner surface in close contact with an outer surface of the water blocking wall.

According to the technique disclosed in this description, the outer surface of the water blocking wall provided in the extending portion is configured to come into close contact with the inner surface of the water blocking coating. This makes it possible to inhibit the entry of water from between the water blocking wall and the water blocking coating. As a result, adhesion of water to the core wire and the wire barrel can be inhibited by the water blocking coating extending from the water blocking wall to the end of the insulating coating to cover the core wire.

Preferred embodiments of the technique disclosed in this description are as follows.

It is preferred that the water blocking wall is provided so as to surround the entire outer periphery of the extending portion.

According to this embodiment, the water blocking wall can come into close contact with the entire inner periphery of the water blocking coating, which makes it possible to further improve waterproofness.

It is also preferred that the extending portion is provided as a groove portion whose surface connected to the surface of the bottom plate on which the core wire is placed has a concave shape and that the water blocking wall is provided so as to fill the inside of the groove portion.

According to this embodiment, since the water blocking wall is provided so as to fill the inside of the grove portion, adhesion of water to the core wire placed on the bottom plate can be reliably inhibited.

It is also preferred that the water blocking coating has an adhesive or pressure-sensitive adhesive layer provided on the inner periphery thereof.

According to this embodiment, the inner periphery of the water blocking coating and the outer periphery of the water blocking wall can reliably come into close contact with each other.

It is also preferred that the water blocking coating is a heat-shrinkable tube.

According to this embodiment, the inner diameter of the heat-shrinkable tube before heating is relatively large, and therefore the heat-shrinkable tube can be easily fitted onto a region extending from the water blocking wall to the end of the insulating coating. Then, by thermally shrinking the heat-shrinkable tube, the inner surface of the heat-shrinkable tube can be brought into close contact with the outer surface of the water blocking wall. Therefore, the use of the heat-shrinkable tube as the water blocking coating makes it possible to improve the work efficiency of the step of fitting the heat-shrinkable tube onto a region extending from the water blocking wall to the end of the insulating coating.

It is also preferred that the water blocking coating is an elastic tube having rubber elasticity.

According to this embodiment, a region extending from the water blocking wall to the end of the insulating coating is externally surrounded with the elastic tube expanded in its radial direction, and then the elastic tube is allowed to recover its original shape. As a result, the inner surface of the elastic tube comes into close contact with the outer surface of the water blocking wall. According to this embodiment, the region extending from the water blocking wall to the end of the insulating coating can be covered with the elastic tube by such a simple process.

It is also preferred that the inner periphery of the water blocking coating is in close contact with the outer periphery of the insulating coating.

According to this embodiment, it is possible to inhibit the entry of water from between the water blocking coating and the outer surface of the insulating coating and therefore to reliably inhibit the adhesion of water to the core wire and the wire barrel.

It is also preferred that a resin ring is fitted onto the end of the insulating coating and that the inner periphery of the resin ring is in close contact with the outer periphery of the insulating coating and the outer periphery of the resin ring is in close contact with the inner periphery of the water blocking coating.

According to this embodiment, a gap between the end of the insulating coating and the water blocking coating is reliably sealed with the resin ring. This makes it possible to reliably inhibit the adhesion of water to the core wire and the wire barrel.

It is also preferred that a tubular elastic body made of rubber is fitted onto the end of the insulating coating and that the inner periphery of the elastic body is in close contact with the outer periphery of the insulating coating and the outer periphery of the elastic body is in close contact with the inner periphery of the water blocking coating.

According to this embodiment, a gap between the end of the insulating coating and the water blocking coating is reliably sealed with the elastic body. This makes it possible to inhibit the adhesion of water to the core wire and the wire barrel. In addition, the elastic body can be brought into close contact with the end of the insulating coating by a simple method in which the end of the insulating coating is externally surrounded with the elastic body expanded in its radial direction and then the elastic body is allowed to recover its original shape.

When a metal constituting the core wire and a metal constituting the terminal are different from each other, there is a fear that when water adheres to both the core wire and the wire barrel, electrolytic corrosion occurs in the core wire or the wire barrel. However, according to the above embodiments, the core wire and the wire barrel are reliably made waterproof by the water blocking material, which makes it possible to inhibit the core wire or the wire barrel from being dissolved by electrolytic corrosion. Therefore, the above embodiments are particularly effective when a metal constituting the core wire and a metal constituting the terminal are different from each other.

The above embodiments are particularly effective when the core wire is made of aluminum or an aluminum alloy. More specifically, aluminum or an aluminum alloy has a relatively low specific gravity, which makes it possible to reduce the weight of the electric wire. On the other hand, aluminum or an aluminum alloy has a relatively high ionization tendency, and is therefore easily dissolved when electrolytic corrosion occurs. However, according to the above embodiments, the core wire and the wire barrel are reliably made waterproof by the water blocking material. Therefore, the above embodiments are particularly effective when the core wire is made of aluminum or an aluminum alloy.

Further, the technique disclosed in this description relates to a method of producing an electric wire with terminal including an electric wire obtained by covering an outer periphery of a core wire with an insulating coating and a terminal connected to the electric wire, the method including the steps of: punching a metallic plate into a predetermined shape to form a strip-shaped carrier and a plurality of terminal strips connected to a side edge of the carrier, each of the terminal strips including a wire barrel that has a bottom plate on which the core wire exposed beyond an end of the insulating coating is to be placed and that is to be crimped onto the core wire and an extending portion extending from the bottom plate; molding a synthetic resin material in the extending portion to form a water blocking wall; crimping the wire barrel onto an exposed portion of the core wire that is not covered with the insulating coating and that is placed on the bottom plate; cutting each of the terminal strips from the carrier to provide the terminal; and covering the core wire with a tubular water blocking coating extending from the water blocking wall to the end of the insulating coating such that an inner periphery of the water blocking coating comes into close contact with an outer surface of the water blocking wall.

In general, when a synthetic resin is injection-molded to obtain molded articles, higher efficiency is achieved by continuously performing injection molding at regular intervals than by performing injection molding at irregular intervals. This is because die temperature conditions and synthetic resin injection conditions can be made stable by continuously performing a series of steps, that is, the step of injecting a synthetic resin in a molten state into a die, the step of solidifying the resin, and the step of separating a molded article from the die. According to the above-described production method, formation of the water blocking wall is performed by continuously performing the molding step on the terminal strips connected to the carrier. As a result, the work efficiency of the molding step can be improved.

Further, according to the technique disclosed in this description, the water blocking wall is formed in the molding step. Because the subsequent steps, that is, the crimping step, the cutting step, and the covering step are steps commonly performed to produce an electric wire with terminal, the electric wire with terminal can be produced without any special steps. As a result, it is possible to make the core wire and the wire barrel waterproof while suppressing an increase in production cost.

Preferred embodiments of the technique disclosed in this description are as follows.

It is preferred that the step of bending the extending portion to form a groove portion whose surface on the side where the core wire is to be placed has a concave shape is performed and that the inside of the groove portion is filled with the synthetic resin material in the molding step.

According to this embodiment, since the water blocking wall is provided so as to fill the inside of the grove portion, adhesion of water to the core wire placed on the bottom plate can be reliably inhibited.

It is also preferred that the cutting step is performed at the same time as the crimping step.

According to this embodiment, it is possible to improve work efficiency as compared to a case where the cutting step and the crimping step are separately performed.

(Effects)

According to the technique disclosed in this description, it is possible to improve the waterproofness of the terminal and the electric wire with terminal.

<Embodiment 2-1>

As a conventional electric wire with terminal, one disclosed in JP 2000-285983 A is known. This electric wire with terminal includes an electric wire obtained by covering the outer periphery of a core wire with an insulating coating and a terminal connected to an exposed portion of the core wire not covered with the insulating coating. The terminal has a flat plate-shaped board portion on which the core wire is placed and a wire barrel that projects from the board portion and is crimped onto the core wire.

A region extending from the board portion to the end of the insulating coating is covered with a heat-shrinkable tube. One of the ends of the heat-shrinkable tube covers the core wire onto which the wire barrel is crimped and the other end is in close contact with the insulating coating.

However, in the case of the above-described structure, the board portion has a flat plate shape, and therefore there is a fear that a gap is left between the one of the ends of the heat-shrinkable tube and the board portion. This causes a fear that water enters the inside of the heat-shrinkable tube through the gap and then comes into contact with the core wire and the wire barrel. This further causes a fear that a problem such as oxidation of the surface of the core wire or the wire barrel occurs.

Under the above circumstances, the technique disclosed in this description has been completed to provide a terminal and an electric wire with terminal excellent in waterproofness.

An embodiment 2-1 according to the present invention will be described with reference to FIGS. 15 to 21.

An electric wire with terminal 210 according to this embodiment includes an electric wire 211 and a female terminal 212 (corresponding to a terminal) connected to the end of the electric wire 211.

(Electric Wire 211)

Figure 17:
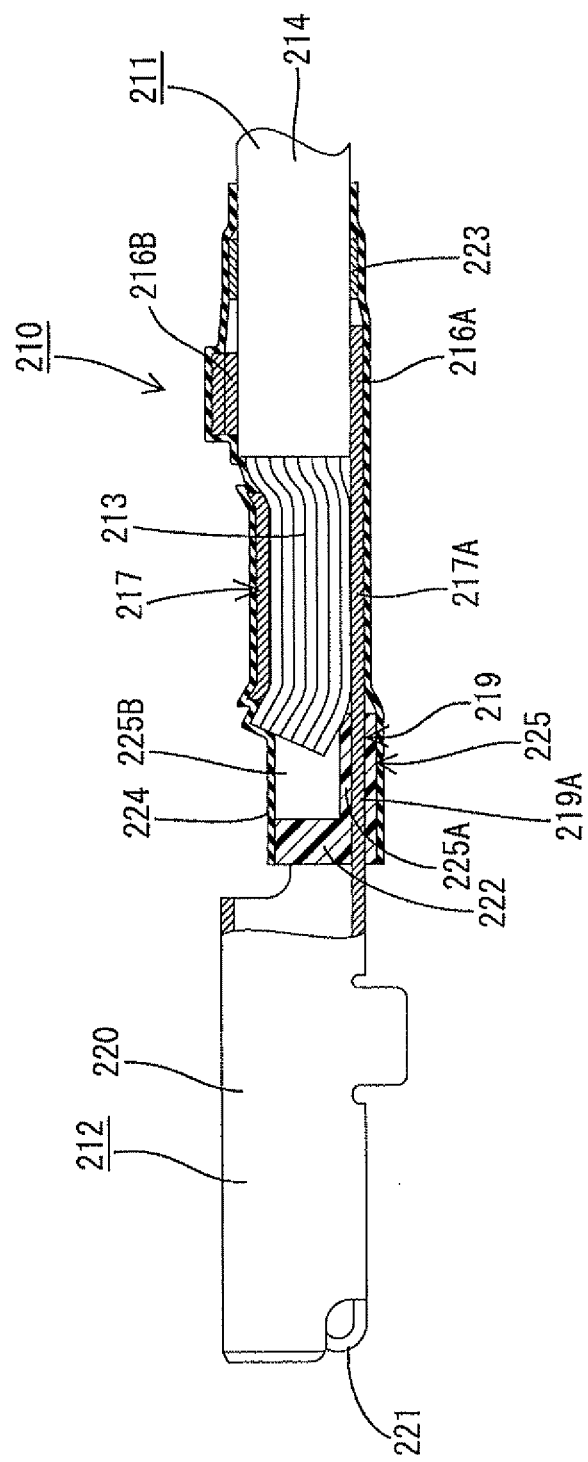
FIG. 17 is a cutaway sectional view of a main part of the electric wire with terminal.

The electric wire 211 includes a core wire 213 obtained by twisting a plurality of thin metallic wires and an insulating coating 214 made of a synthetic resin and covering the outer periphery of the core wire 213. The core wire 213 is made of any metal, such as copper, a copper alloy, aluminum, or an aluminum alloy, as appropriate. In this embodiment, aluminum or an aluminum alloy is used. As shown in FIG. 17, the insulating coating 214 is stripped off at the end of the electric wire 211 to expose the core wire 213. It is to be noted that the core wire 213 may be a single core wire.

(Female Terminal 212)

Figure 15:
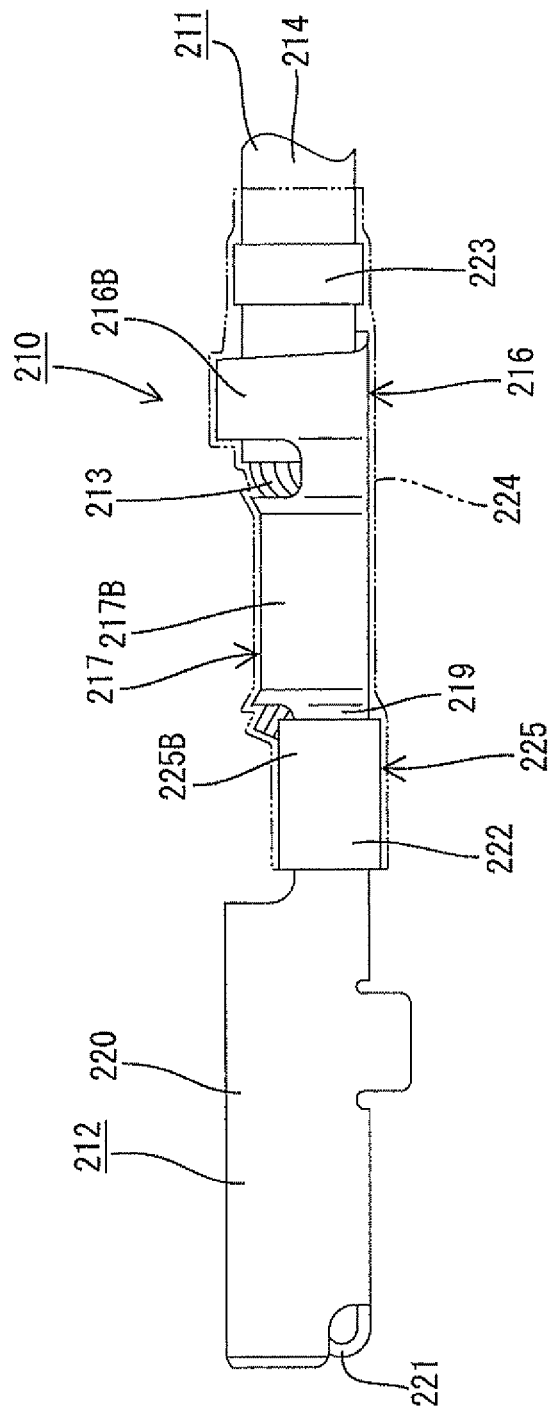
FIG. 15 is a side view of an electric wire with terminal according to an embodiment 2-1 of the present invention.

As shown in FIG. 15, the female terminal 212 is configured to have a rectangular tubular connecting portion 220, a wire barrel 217 provided behind the connecting portion 220 so as to connect to the connecting portion 220 through a bridging portion 219, and an insulation barrel 216 located behind the wire barrel 217.

The female terminal 212 is formed by pressing a metallic plate material into a predetermined shape.

In the connecting portion 220, an elastic contact piece 221 elastically connectable to a male terminal (not shown) is provided. The male terminal is to be inserted into the connecting portion 220 from the front side of the connecting portion 220.

The wire barrel 217 includes a first bottom plate 217A on which the exposed core wire 213 of the electric wire 211 is placed and a pair of wire barrel pieces 217B and 217B that extends upward from both the side edges of the first bottom plate 217A so as to be opposed to each other. As shown in FIG. 17, the wire barrel 217 is crimped onto the core wire 213 by compressing the core wire 213 between both the wire barrels 217B and 217B and the first bottom plate 217A in a state where the core wire 213 of the electric wire 211 is placed on the first bottom plate 217A.

Figure 20:
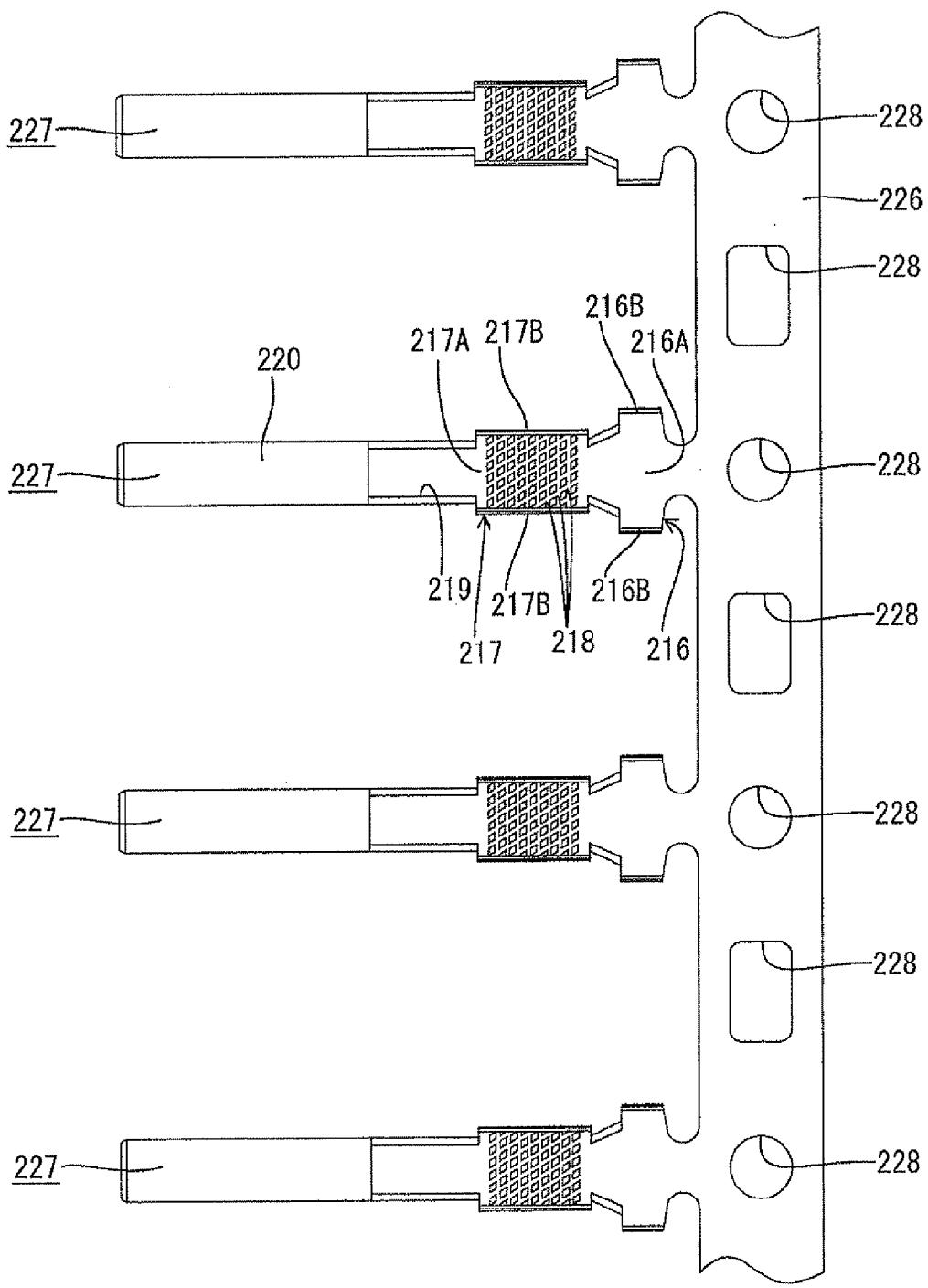
FIG. 20 is a plan view showing a state where a bending step is completed.

As shown in FIG. 20, the wire barrel 217 has a plurality of recesses 218 formed in the crimping surface thereof, i.e., in the surface thereof that is brought into contact with the core wire 213 by crimping both the wire barrel pieces 217B and 217B onto the core wire 213. Each of the recesses 218 is almost quadrangular and more specifically almost parallelogrammatic. A pair of the recesses 218 adjacent to each other in a direction in which the core wire 213 extends (in a longitudinal direction) is arranged in a manner such that the recesses 218 overlap one another in the longitudinal direction, and therefore the entire wire barrel 217 can be crimped onto the core wire 213 in a direction orthogonal to the direction in which the core wire 213 extends (in a width direction). This makes it possible to improve the strength of fixation of the wire barrel 217 to the core wire 213.

Further, the rims of openings of the recesses 218 are brought into sliding contact with the surface of the core wire 213 by crimping, and therefore break an insulating oxide coating or the like formed on the surface of the core wire 213 and come into contact with the core wire 213. Therefore, the area of contact between the rims of openings of the recesses 218 and the core wire 213 is increased, which as a result makes it possible to reduce the value of electrical resistance between the female terminal 212 and the core wire 213.

The insulation barrel 216 includes: a second bottom plate 216A which extends backward from the first bottom plate 217A of the wire barrel 217 and on which the insulating coating 214 of the electric wire 211 is placed; and a pair of insulation barrel pieces 216E and 216B that extends upward from both the side edges of the second bottom plate 216A so as to be opposed to each other.

As shown in FIG. 17, this insulation barrel 216 is configured to be crimped onto the insulating coating 214 in a so-called overlapping manner such that the insulating coating 214 is externally held by the insulation barrel 216 in a state where the insulating coating 214 of the electric wire 211 is placed on the second bottom plate 216A.

As a metal constituting the female terminal 212, any metal, such as copper or a copper alloy, may be used as appropriate. Further, the metallic plate material has a plated layer (not shown) provided on the surface thereof. As a metal constituting the plated layer, any metal such as tin or nickel may be used as appropriate. In this embodiment, a tin plated layer is provided on the surface made of copper or a copper alloy. It is to be noted that the metallic plate material may have a structure in which a plated layer is not provided on the surface thereof.

(Bridging Portion 219)

Figure 18:
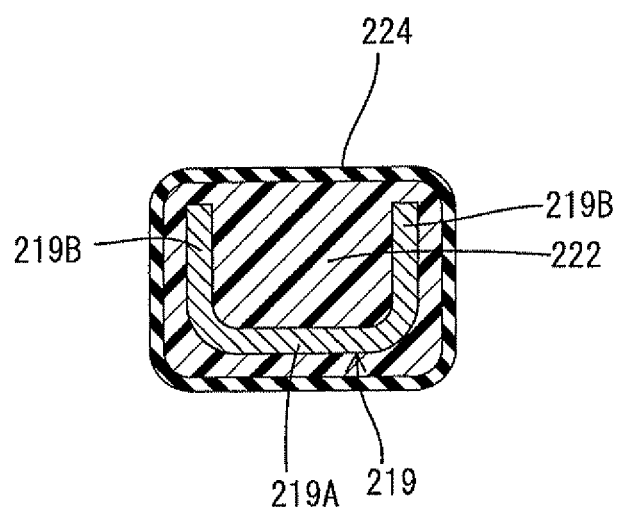
FIG. 18 is an enlarged sectional view of a main part of a water blocking wall.

As shown in FIG. 18, the upper surface of the bridging portion 219 on which the core wire 213 is placed is bent into a concave shape, and therefore the bridging portion 219 has a substantially U-shaped cross-section. The bridging portion 219 includes a bottom plate 219A extending backward from the connecting portion 220 and a pair of side plates 219B and 219B extending upward from both the side edges of the bottom plate 219A. Both the side plates 219B and 219B are provided so as to connect to both the wire barrel pieces 217B and 217B, respectively. It is to be noted that the bridging portion 219 may have any cross-sectional shape such as a semicircular shape as appropriate.

(Water Blocking Wall 222)

The bridging portion 219 is provided with a water blocking wall 222 formed by molding a synthetic resin. As the synthetic resin constituting the water blocking wall 222, any synthetic resin, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

As shown in FIG. 18, the water blocking wall 222 is provided so as to surround the entire outer periphery of the bridging portion 219. That is, part of the bridging portion 219 where the water blocking wall 222 is provided is buried in the water blocking wall 222. The water blocking wall 222 has a substantially rectangular shape with rounded corners.

(Resin Ring 223) A resin ring 223 is fitted onto the end of the electric wire 211. More specifically, the resin ring 223 having a circular cross-section is fitted onto the end of the insulating coating 214 at a position behind a portion where the insulation barrel 216 is crimped (i.e., at a position on the opposite side of the insulation barrels 216 from the exposed core wire 213). The resin ring 223 is in close contact with the entire periphery of the insulating coating 214. The inner diameter of the resin ring 223 is set to be substantially the same as the outer diameter of the insulating coating 214. It is to be noted that the term "substantially the same" includes a case where the inner diameter of the resin ring 223 is the same as the outer diameter of the insulating coating 214, a case where the inner diameter of the resin ring 223 is slightly larger than the outer diameter of the insulating coating 214, and a case where the inner diameter of the resin ring 223 is slightly smaller than the outer diameter of the insulating coating 214. This makes it possible to easily fit the resin ring 223 onto the end of the electric wire 211.

As the synthetic resin material constituting the resin ring 223, any synthetic resin, such as a thermoplastic resin (e.g., polyamide, polyester, polypropylene, polyethylene), a thermosetting resin (e.g., epoxy resin), or synthetic rubber, may be used as appropriate. The above synthetic resins may be used singly or in combination of two or more of them. In this embodiment, a polyamide-based thermoplastic resin is used.

(Heat Shrinkable Tube 224)

As shown in FIG. 15, a region extending from the water blocking wall 222 to the insulating coating 214 beyond the resin ring 223 through the wire barrel 217, the insulation barrel 216, and the resin ring 223 fitted onto the insulating coating 214 is covered with a heat-shrinkable tube 224 (corresponding to a water blocking coating) made of a synthetic resin. In this embodiment, the heat-shrinkable tube 224 has an adhesive or pressure-sensitive adhesive layer (not shown) provided on the inner surface thereof. The adhesive or pressure-sensitive adhesive layer is designed to develop adhesiveness or tackiness by thermal softening or melting. It is to be noted that the heat-shrinkable tube 224 may have a structure in which an adhesive or pressure-sensitive adhesive layer is not provided on the inner surface thereof. The longitudinal length of the heat-shrinkable tube 224 is set such that a region extending from the connecting portion 220-side end of the water blocking wall 222 to the resin ring 223 fitted onto the electric wire 211 can be covered with the heat-shrinkable tube 224.

In a state where the heat-shrinkable tube 224 is thermally shrunk, the inner periphery of the heat-shrinkable tube 224 is in close contact with the entire outer periphery of the water blocking wall 222 without any gap. In addition, the inner periphery of the heat-shrinkable tube 224 is in close contact with the entire outer periphery of the resin ring 223 without any gap.

The synthetic resin constituting the water blocking wall 222 may be one that develops adhesiveness by thermal softening or melting. In this case, the inner periphery of the heat-shrinkable tube 224 can be adhered to the outer periphery of the water blocking wall 222 by softening or melting the water blocking wall 222 in the step of heating the heat-shrinkable tube 224.

The synthetic resin constituting the resin ring 223 may be one that develops adhesiveness by thermal softening or melting. In this case, the inner periphery of the heat-shrinkable tube 224 can be adhered to the outer periphery of the resin ring 223 by softening or melting the resin ring 223 in the step of heating the heat-shrinkable tube 224. Further, by forming the resin ring 223 using such a synthetic resin as described above, it is possible to adhere the inner periphery of the resin ring 223 to the outer periphery of the insulating coating 214.

(Continuously-Provided Portion 225)

A continuously-provided portion 225 is integrally provided with the water blocking wall 222. The continuously-provided portion 225 is connected to the wire barrel 217-side back end surface of the water blocking wall 222.

Figure 16:
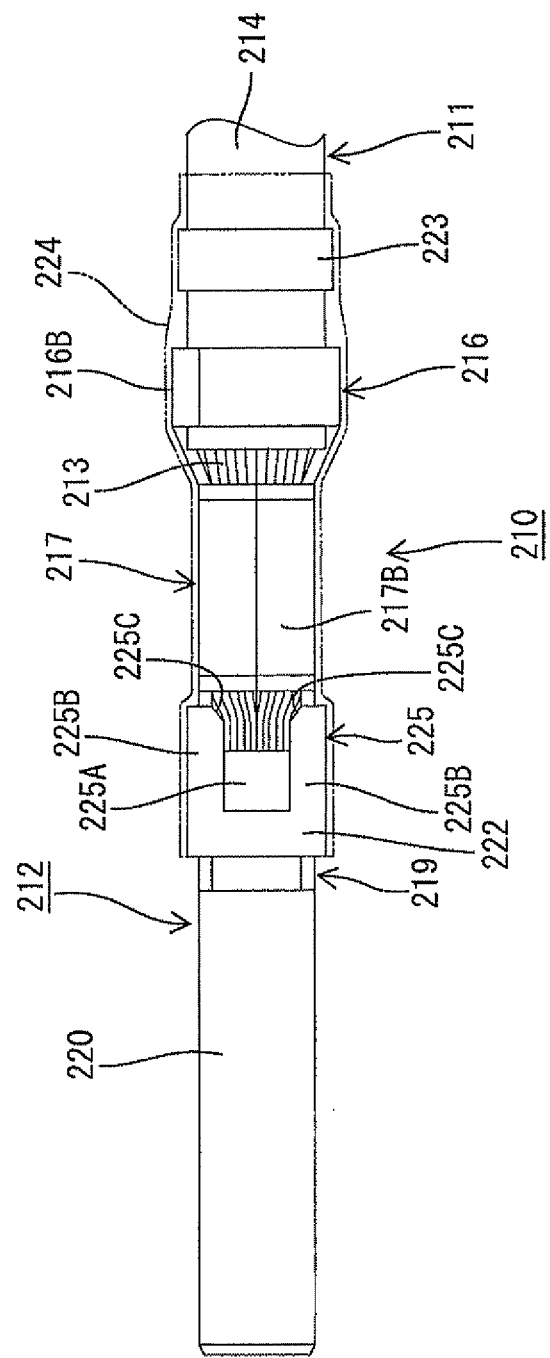
FIG. 16 is a plan view of the same.
Figure 19:
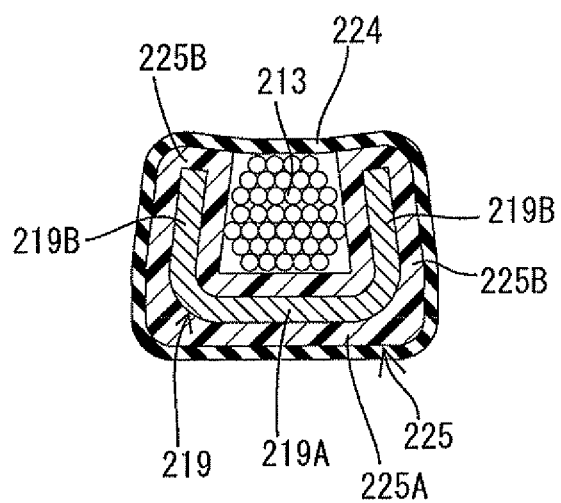
FIG. 19 is an enlarged sectional view of a main part of a continuously-provided portion.

As shown in FIG. 19, the continuously-provided portion 225 is formed by covering the entire outer periphery of the bottom plate 219A and the pair of side plates 219B and 219B of the bridging portion 219 with a substantially uniform synthetic resin layer. That is, the continuously-provided portion 225 includes a bottom plate part 225A covering the bottom plate 219A and a pair of side plate parts 225B and 225B covering both the side plates 219B and 219B. Therefore, the continuously-provided portion 225 has a groove shape whose upper end and back end are open. Further, when the bottom plate part 225A side of the continuously-provided portion 225 is defined as a proximal side, both the side plate parts 225B and 225B are configured so as to be flexurally deformable in a direction in which the distal ends thereof come close to or separate from each other. That is, the resin-occupied area of the cross-section of the continuously-provided portion 225 orthogonal to the direction in which the core wire 213 extends is smaller than that of the cross-section of the water blocking wall 222. Further, as shown in FIG. 16, the continuously-provided portion 225 extends from the back end surface of the water blocking wall 222 to a position slightly in front of the front edge of the wire barrel 217, and therefore a narrow gap is created between the continuously-provided portion 225 and the wire barrel 217.

Further, as shown in FIGS. 17 and 19, the continuously-provided portion 225 is configured such that when the core wire 213 is strongly compressed and stretched forward by crimping the wire barrel 217 onto the core wire 213, the tip of the core wire 213 can be inserted through the back opening of the continuously-provided portion 225 and accommodated in a space surrounded by the bottom plate part 225A and both the side plate parts 225B and 225B. This makes it possible, even when the core wire 213 is stretched forward by crimping, to inhibit the core wire 213 from being pressed against the back surface of the continuously-provided portion 225 to inhibit damage to the continuously-provided portion 225.

Further, the rim of back-side opening of the continuously-provided portion 225 has an inclined surface 2250 (corresponding to a guiding surface) that is straightly inclined such that the opening becomes larger toward the back side of the continuously-provided portion 225. The inclined surface 2250 plays a role in guiding the core wire 213 to its correct accommodated position when the core wire 213 enters the space surrounded by the bottom plate part 225A and both the side plate parts 225B and 225B from the back side of the continuously-provided portion 225.

(Production Process)

Hereinbelow, one example of a production process of the electric wire with terminal 210 according to this embodiment will be described. First, a metallic plate material is subjected to a punching step (not shown) to form a strip-shaped carrier 226 and a plurality of terminal strips 227 connected to the side edge of the carrier 226.

As shown in FIG. 20, the terminal strips 227 connected to the carrier 226 are arranged at substantially regular intervals along the longitudinal direction of the carrier 226. The carrier 226 has feed holes 228 arranged at substantially regular intervals along the longitudinal direction thereof. The feed holes 228 are configured to be engaged with feed claws (not shown) of a processing machine. It is to be noted that in the punching step, a plurality of recesses 218 may be formed in the crimping surface of the wire barrel 217. Alternatively, the recesses 218 may be formed in a step other than the punching step.

Then, as shown in FIG. 20, each of the terminal strips 227 that has been subjected to the punching step is then subjected to a bending step. In this bending step, each of the terminal strips 227 is bent in a longitudinal direction in which the core wire 213 extends to form a bridging portion 219 and a connecting portion 220.

Figure 21:
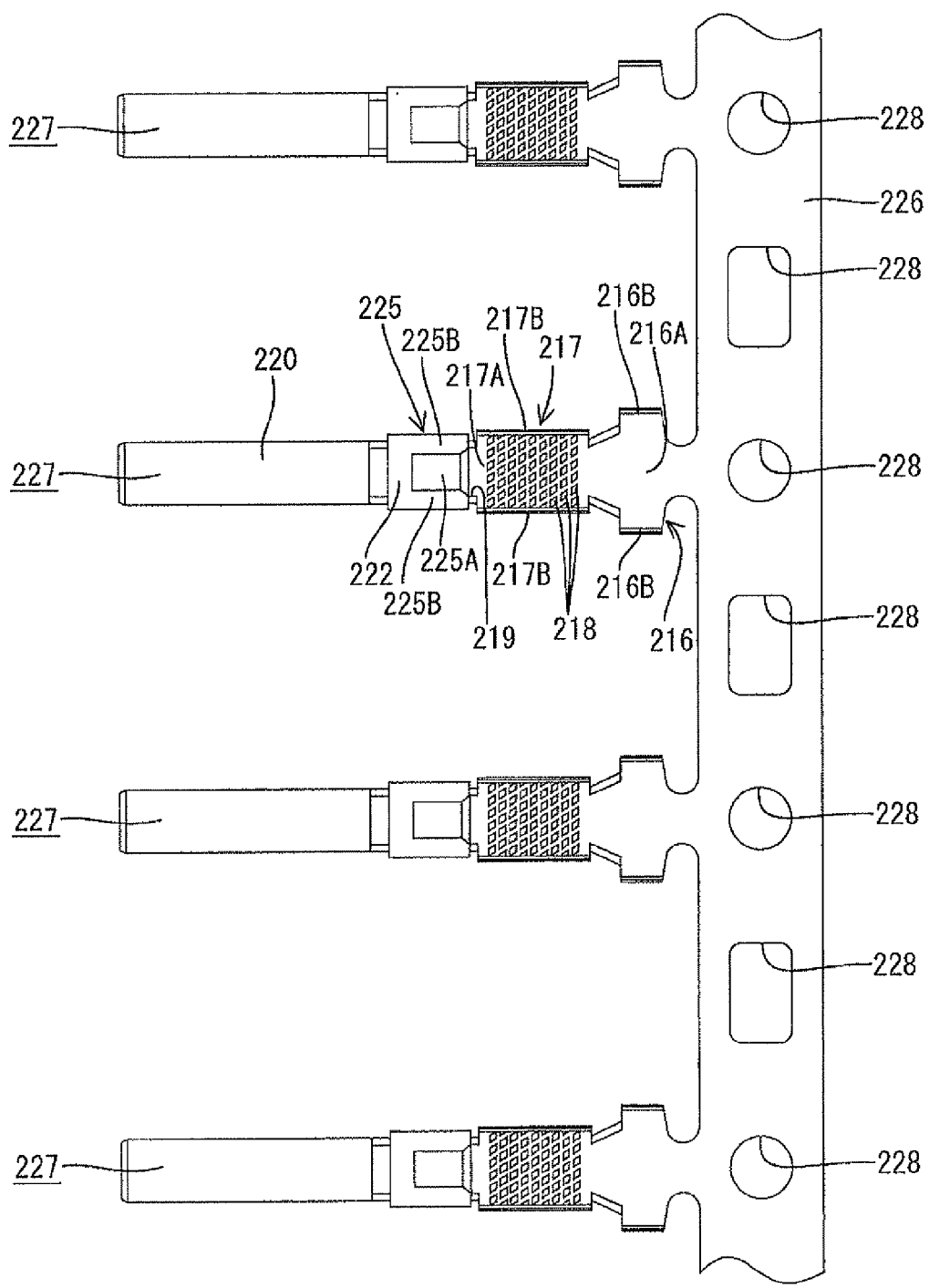
FIG. 21 is a plan view showing a state where a molding step is completed.

Then, as shown in FIG. 21, a water blocking wall 222 and a continuously-provided portion 225 are formed by molding in the bridging portion 219 of each of the terminal strips 227 while the terminal strips 227 are fed one after another by engaging the feed holes 228 formed in the carrier 226 with the feed claws. More specifically, first, part of the bridging portion 219 where a water blocking wall 222 and a continuously-provided portion 225 should be formed is sandwiched between a pair of dies (not shown) in a vertical direction. Then, a synthetic resin in a molten state is injected into a molding cavity formed in the dies. After the synthetic resin is solidified in the dies, the pair of dies is opened to separate the terminal strip 227 provided with the water blocking wall 222 and the continuously-provided portion 225 from the dies. The above step is sequentially performed on the terminal strips 227 connected to the carrier 226 at substantially regular intervals.

In the step of opening the dies, the dies can be easily opened in a vertical direction because the continuously-provided portion 225 is formed into a groove shape whose upper end is open (in a direction orthogonal to the direction in which the core wire extends). This makes it possible to simplify the shape of the molding dies for forming the continuously-provided portion 225 by molding and therefore to reduce cost.

On the other hand, the insulating coating 214 of the electric wire 211 is stripped off to expose the core wire 213. Then, a resin ring 223 is fitted onto the end of the insulating coating 214. The resin ring 223 is fitted onto the insulating coating 214 at a position behind a position where an insulation barrel 216 is to be crimped (i.e., at a position on the opposite side of the insulation barrel 216 from the wire barrel 217). It is to be noted that the resin ring 223 is fitted onto the insulating coating 214 so as to be in close contact with the entire outer periphery of the insulating coating 214.

Then, a crimping step is performed on each of the terminal strips 227. More specifically, the exposed core wire 213 of the electric wire 211 and the insulating coating 214 are placed on each of the terminal strips 227. Then, both wire barrel pieces 217B and 217B are crimped with a die (not shown) to externally hold the core wire 213 and both insulation barrel pieces 216B and 216B are crimped with a die (not shown) to externally hold the insulating coating 214. This makes it possible to crimp the wire barrel 217 onto the core wire 213 and to crimp the insulation barrel 216 onto the insulating coating 214.

In the crimping step, when the wire barrel 217 is strongly crimped onto the core wire 213, there is a case where part of the bridging portion 219 adjacent to the wire barrel 217 flexurally deforms following the deformation of the wire barrel pieces 217B, because the bridging portion 219 is connected to the wire barrel 217. In this regard, according to this embodiment, the continuously-provided portion 225 is formed into a groove shape along the outer surface of the bridging portion 219, and therefore both side plate parts 225B and 225B of the continuously-provided portion 225 can flexurally deform following the deformation of both the wire barrel pieces 217B and 217B. This makes it possible to inhibit the resin layer of the continuously-provided portion 225 from being damaged or separated from the bridging portion 219. Further, when the core wire 213 is stretched forward by strongly crimping the wire barrel 217 onto the core wire 213, the tip of the core wire 213 can be accommodated in a space surrounded by the bottom plate part 225A and both the side plate parts 225B and 225B of the continuously-provided portion 225. This makes it possible to inhibit the core wire from being pressed against the back surface of the continuously-provided portion to inhibit damage to the continuously-provided portion.

Further, the rim of back-side opening of the continuously-provided portion 225 has an inclined surface 225C such that the opening becomes larger toward the back side of the continuously-provided portion 225, which makes it possible to guide the core wire 213 to the space surrounded by the bottom plate part 225A and both the side plate parts 225B and 225B without the tip of the core wire 213 being stopped by the back end surface of the continuously-provided portion 225. This makes it possible to more reliably inhibit the core wire 213 from being pressed against the back end surface of the continuously-provided portion 225.

Figure 22:
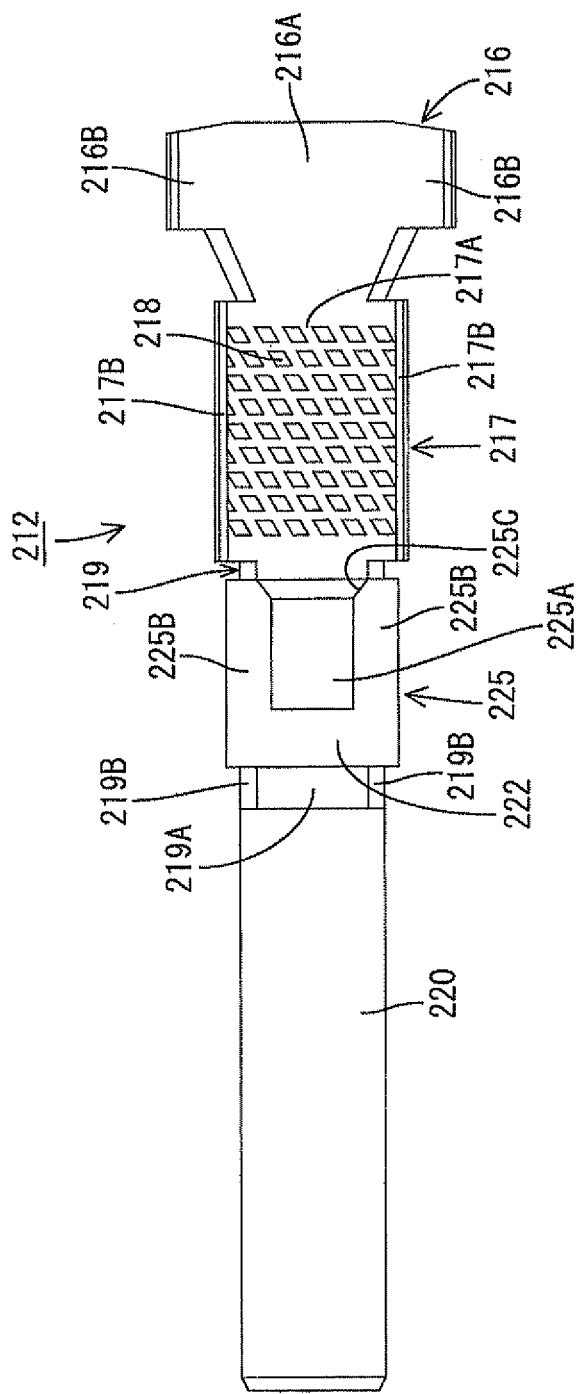
FIG. 22 is a plan view of a terminal according to the embodiment 2-1 of the present invention.

In this embodiment, a cutting step to cut each of the terminal strips 227 from the carrier 226 is performed at the same time as the above-described crimping step. As a result, as shown in FIG. 16, each of the terminal strips 227 is cut from the carrier 226 as a female terminal 212 connected to the electric wire 211. It is to be noted that as shown in. FIG. 22, the female terminal 212 connected to the electric wire 211 may be obtained by crimping the female terminal 212 cut from the carrier 226 onto the electric wire 211.

Then, a covering step is performed. More specifically, a heat-shrinkable tube 224 is passed through from the connecting portion 220 side to cover a region extending from the water blocking wall 222 to the insulating coating 214 beyond the resin ring 223. The entire female terminal 212 can be relatively easily passed through the heat shrinkable tube 224 from the connecting portion 220 side by setting the inner diameter of the heat-shrinkable tube 224 before heating larger than the outer diameter of the connecting portion 220. When the female terminal 212 connected to the electric wire 211 is passed through the heat-shrinkable tube 224 from the electric wire 211 side, the electric wire 211 may be passed through the heat-shrinkable tube 224 in advance before the crimping step is performed.

After the female terminal 212 connected to the electric wire 211 is passed through the heat-shrinkable tube 224, the heat-shrinkable tube 224 is shrunk by performing a heating step using a heating device not shown. This makes it possible to bring the inner surface of the heat-shrinkable tube 224 into close contact with the outer surfaces of the water blocking wall 222, the resin ring 223, and the insulating coating 214 without any gap. In such a way as described above, an electric wire with terminal 210 is completed.

It is to be noted that in the above-described heating step, in a state where the connecting portion 220 is placed upward, the synthetic resin constituting the water blocking wall 222 can be inhibited from flowing into the connecting portion 220 even when the water blocking wall 222 is melted in the heating step. This makes it possible to improve the reliability of electrical connection with a mating male terminal in the connecting portion 220.

(Functions and Effects)

Hereinbelow, the functions and effects of this embodiment will be described. According to this embodiment, the bridging portion 219 is provided with the water blocking wall 222, which makes it possible to inhibit the entry of water through the bridging portion 219 to inhibit the adhesion of water to the core wire 213 and the wire barrel 217. Further, the entire outer periphery of the water blocking wall 222 is in close contact with the inner periphery of the heat-shrinkable tube 224 without any gap, which makes it possible to inhibit the entry of water from between the water blocking wall 222 and the heat-shrinkable tube 224. Therefore, the region extending from part of the bridging portion 219 where the water blocking wall 222 is provided to the insulating coating 214 beyond the resin ring 223 through the wire barrel 217, the insulation barrel 216, and the resin ring 223 fitted onto the insulating coating 214 is made waterproof by the heat-shrinkable tube 224, which makes it possible to reliably inhibit the adhesion of water to the core wire 213 and the wire barrel 217.

Further, according to this embodiment, the resin ring 223 is fitted onto the end of the insulating coating 214 and the inner surface of the heat-shrinkable tube 224 is in close contact with the entire periphery of the resin ring 223. This makes it possible to reliably inhibit the entry of water from the end side of the insulating coating 214 and therefore to more reliably inhibit the adhesion of water to the core wire 213 and the wire barrel 217.

When the metal constituting the core wire 213 and the metal constituting the female terminal 212 are different from each other, there is a fear that when water adheres to both the core wire 213 and the wire barrel 217, electrolytic corrosion occurs in the core wire 213 or the wire barrel 217. According to this embodiment, the core wire 213 and the wire barrel 217 are reliably made waterproof by the heat-shrinkable tube 224, which makes it possible to inhibit the core wire 213 or the wire barrel 217 from being dissolved by electrolytic corrosion.

This is effective particularly when the core wire 213 is made of aluminum or an aluminum alloy and the female terminal 212 has a tin plated layer on its surface made of copper or a copper alloy as in the case of this embodiment, because there is a fear that the core wire 213 made of aluminum or an aluminum alloy having a relatively high ionization tendency is dissolved by electrolytic corrosion. It is to be noted that aluminum or an aluminum alloy has a relatively low specific gravity, which makes it possible to reduce the weight of the electric wire 211.

Further, according to this embodiment, the bridging portion 219 is provided not only with the water blocking wall 222 but also with the continuously-provided portion 225. The continuously-provided portion 225 is integrally provided with the water blocking wall 222 so as to extend backward from the water blocking wall 222, which makes it possible to increase the length of the interface between the bridging portion 219 and the synthetic resin as compared to a case where the continuously-provided portion 225 is not provided. This makes it possible, even when part of the bridging portion 219 where a molded product (the water blocking wall 222 and the continuously-provided portion 225) is provided is gradually corroded by water or the like from the connecting portion 220 side, to prolong the time that elapses before water reaches the core wire 213.

Further, when the wire barrel 217 is strongly crimped onto the core wire 213, there is a case where part of the bridging portion 219 adjacent to the wire barrel 217 flexurally deforms following the deformation of the wire barrel pieces 217B, because the bridging portion 219 is connected to the wire barrel 217. In this regard, according to this embodiment, the continuously-provided portion 225 is formed into a groove shape along the outer surface of the bridging portion 219, and therefore both the side plate parts 225B and 225B of the continuously-provided portion 225 can flexurally deform following the deformation of both the wire barrel pieces 217B and 217B. This makes it possible to inhibit the resin layer of the continuously-provided portion 225 from being damaged or separated from the bridging portion 219.

Further, when the core wire is stretched forward by strongly crimping the wire barrel 217 onto the core wire 213, the tip of the core wire 213 can be accommodated in the space surrounded by the bottom plate part 225A and both the side plate parts 225B and 225B of the continuously-provided portion 225. This makes it possible to inhibit the core wire 213 from being pressed against the back surface of the continuously-provided portion 225 and to inhibit damage to the continuously-provided portion 225.

Further, the rim of back-side opening of the continuously-provided portion 225 has the inclined surface 225C such that the opening becomes larger toward the back side of the continuously-provided portion 225, which makes it possible to guide the core wire 213 to the space surrounded by the bottom plate part 225A and both the side plate parts 225B and 225B without the tip of the core wire 213 being stopped by the back end surface of the continuously-provided portion 225. This makes it possible to more reliably inhibit the core wire 213 from being pressed against the back end surface of the continuously-provided portion 225.

Further, according to this embodiment, the water blocking coating is composed of the heat-shrinkable tube 224. The inner diameter of the heat-shrinkable tube 224 before heating is relatively large, which makes it easy for the heat-shrinkable tube 224 to externally surround the above-described region. Then, by thermally shrinking the heat-shrinkable tube 224, the inner surface of the heat-shrinkable tube 224 can be brought into close contact with the outer surface of the water blocking wall 222 and the outer surface of the end of the insulating coating 214 without any gap. As described above, the use of the heat-shrinkable tube 224 as the water blocking coating makes it possible to improve the work efficiency of the step of externally surrounding the region extending from the water blocking wall 222 to the end of the insulating coating 214 with the heat-shrinkable tube 224.

Further, the heat-shrinkable tube 224 has an adhesive or pressure-sensitive adhesive layer provided on the inner surface thereof, and therefore by performing the heating step to shrink the heat-shrinkable tube 224, the inner surface of the heat-shrinkable tube 224 can be reliably brought into close contact with the outer surface of the water blocking wall 222 without any gap and the heat-shrinkable tube 224 can be reliably brought into close contact with the outer surface of the end of the insulating coating 214 without any gap.

As described above, the use of the heat-shrinkable tube 224 having an adhesive or pressure-sensitive adhesive layer provided on the inner periphery thereof as the water blocking coating makes it possible to improve the work efficiency of the step of externally surrounding the region extending from the water blocking wall 222 to the end of the insulating coating 214 with the heat-shrinkable tube 224. In addition, it is possible to improve adhesion between the heat-shrinkable tube 224 and the outer surface of the water blocking wall 222 and adhesion between the heat-shrinkable tube 224 and the outer surface of the end of the insulating coating 214.

In general, when a synthetic resin is injection-molded to obtain molded articles, higher efficiency is achieved by continuously performing injection molding at regular intervals than by performing injection molding at irregular intervals. This is because die temperature conditions and synthetic resin injection conditions can be made stable by continuously performing a series of steps, that is, the step of injecting a synthetic resin in a molten state into a molding space, the step of solidifying the resin, and the step of separating a molded article from a molding die. According to this embodiment, the water blocking wall 222 is formed by continuously performing the molding step on the terminal strips 227 connected to the carrier 226. As a result, the work efficiency of the molding step can be improved.

Further, in this embodiment, the dies can be easily opened in a vertical direction because the continuously-provided portion 225 is formed into a groove shape whose upper end is open. This makes it possible to simplify the shape of the molding dies for forming the continuously-provided portion 225 by molding and therefore to reduce the cost of the molding dies.

Further, according to this embodiment, the cutting step is performed at the same time as the crimping step. This makes it possible to improve work efficiency as compared to a case where the cutting step and the crimping step are separately performed.

<Embodiment 2-2>

Hereinbelow, an embodiment 2-2 according to the present invention will be described with reference to FIG. 23.

An electric wire with terminal 230 according to this embodiment is different from the embodiment 2-1 in the structure of the continuously-provided portion 225 and its vicinity, and a description of the components, functions, and effects of this embodiment that are the same as those of the embodiment 2-1 will not be repeated. Further, the same components as the embodiment 2-1 are denoted by the same reference numerals.

Figure 23:
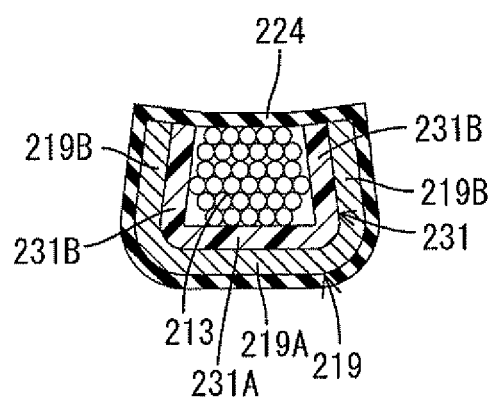
FIG. 23 is an enlarged sectional view of a main part of a continuously-provided portion of an electric wire with terminal according to an embodiment 2-2 of the present invention.

As shown in FIG. 23, a continuously-provided portion 231 is formed by covering only the inner surface of the bridging portion 219 (i.e., the upper surface of the bottom plate 219A and the opposed surfaces of both the side plates 219B and 219B) with a substantially uniform synthetic resin layer. That is, the continuously-provided portion 231 includes a bottom plate part 231A covering the upper surface of the bottom plate 219A and a pair of side plate parts 231B and 231S covering the opposed surfaces of both the side plates 219B.

Further, the inner surface of the heat-shrinkable tube 224 is in close contact with the outer periphery of the bridging portion 219, the distal end surfaces of both the side plates 219B and 219B of the bridging portion 219, and the distal end surfaces of both the side plate parts 231B and 231B of the continuously-provided portion 231. Therefore, according to this embodiment, it is possible to reduce the amount of the synthetic resin constituting the continuously-provided portion 231 and therefore to reduce production cost.

Further, both the side plate parts 231B and 231B of the continuously-provided portion 231 easily flexurally deform following the flexural deformation of both the wire barrel pieces 217B and 217B, because the amount of the synthetic resin of the continuously-provided portion 231 is smaller and the synthetic resin layer does not surround the entire periphery of the bridging portion 219. This makes it possible to inhibit the resin layer of the continuously-provided portion 231 from being damaged or separated from the bridging portion 219.

<Embodiment 2-3>

Hereinbelow, an embodiment 2-3 according to the present invention will be described with reference to FIG. 24. A electric wire with terminal 240 according to this embodiment is different from the embodiment 2-1 in that the water blocking wall 222 is located closer to the wire barrel 217, and a description of the components, functions, and effects of this embodiment that are the same as those of the embodiment 2-1 will not be repeated. Further, the same components as the embodiment 2-1 are denoted by the same reference numerals.

Figure 24:
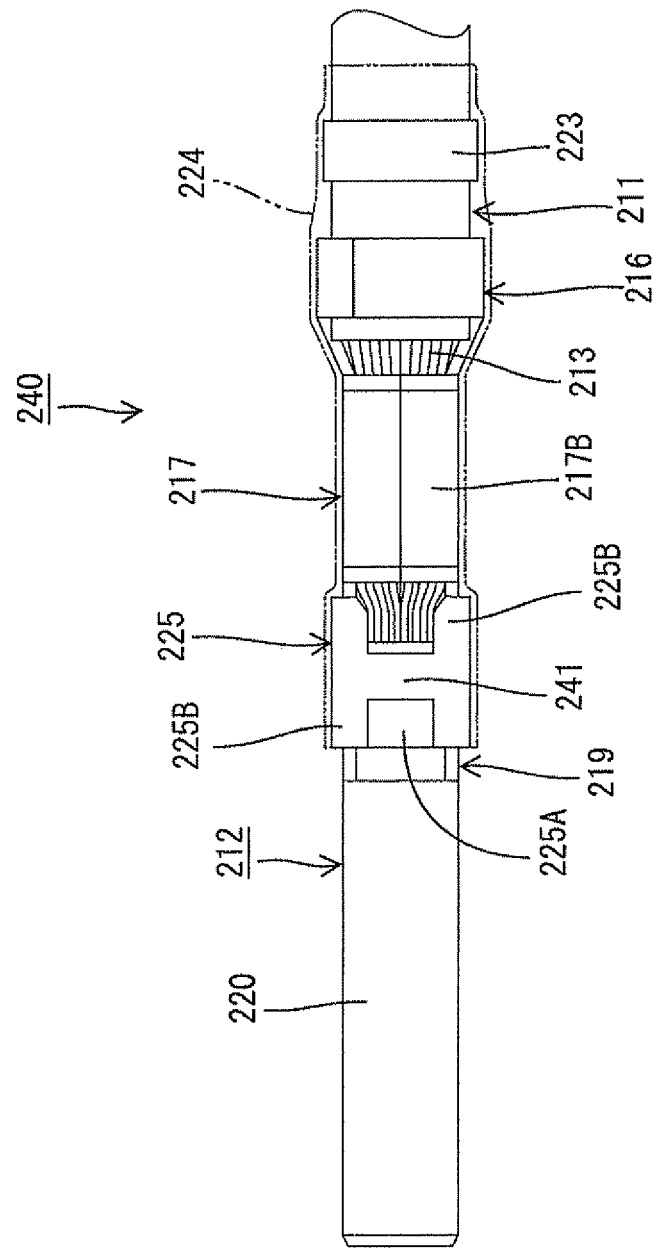
FIG. 24 is a plan view of an electric wire with terminal according to an embodiment 2-3 of the present invention.

As shown in FIG. 24, in this embodiment, a water blocking wall 241 is provided in the central part of the continuously-provided portion 225 in the longitudinal direction of the continuously-provided portion 225. That is, part of the bridging portion 219 where molding is performed has an H-shape when viewed from above. As described above, the position of the water blocking wall 241 can be appropriately set depending on the length of the core wire 213 to be accommodated in the continuously-provided portion 225.

<Other Embodiment>

The present invention is not limited to the embodiments described above with reference to the drawings, and for example, the following embodiments are also included in the technical scope of the present invention.

(1) In the above embodiments, the terminal is the female terminal 212. However, the terminal is not limited thereto. For example, the terminal may be a male terminal having a male tab provided so as to further extend from the bridging portion 219 in a direction in which the core wire 213 extends or may be a so-called LA terminal provided with a disk-shaped connecting portion having a through hole and connected to the bridging portion 219.

(2) In the embodiment 2-1, the water blocking wall. 222 has a substantially quadrangular cross-section. However, the cross-sectional shape of the water blocking wall 222 is not limited thereto. The water blocking wall 222 may have any cross-sectional shape, such as a circular shape, an elliptical shape, an oval shape, or a polygonal shape (e.g., a triangular shape), as appropriate.

(3) In the above embodiments, the water blocking coating may be provided by wrapping a sheet shaped water blocking tape around a region extending from the water blocking wall 222 to the end of the insulating coating 214.

(4) In the above embodiments, the step of forming the water blocking wall 222 is performed before the step of crimping the wire barrel 217 onto the core wire 213 is performed. However, the order in which these steps are performed is not limited thereto. For example, the step of forming the water blocking wall 222 may be performed after the step of crimping the wire barrel 217 onto the core wire 213 is performed.

(5) In the above embodiments, the core wire 213 is made of aluminum or an aluminum alloy. However, the material of the core wire 213 is not limited thereto, and the core wire 213 may be made of any metal as appropriate. For example, the core wire 213 may be made of copper or a copper alloy. Further, in the above embodiments, the terminal is made of copper or a copper alloy and has a tin plated layer on the surface thereof. However, the material of the terminal is not limited thereto, and the terminal may be made of any metal as appropriate.

(6) In the above embodiments, the crimping step and the cutting step are performed at the same time. However, the order in which these steps are performed is not limited thereto. For example, the cutting step may be performed after the crimping step is performed or the crimping step may be performed on each of the terminal strips cut from the carrier after the cutting step is performed.

(7) In the above embodiments, the female terminal has the insulation barrel 216. However, the insulation barrel 216 may be omitted.

(8) The water blocking coating (the heat-shrinkable tube 224, the elastic tube) may be configured to cover a region extending from part of the bridging portion 219 where the water blocking wall 222 is provided to the resin ring 223 fitted onto the insulating coating 214 through the wire barrel 217 and the insulation barrel 216.

(9) In the above embodiments, the resin ring 223 has an annular shape. However, the shape of the resin ring 223 is not limited thereto. For example, the resin ring 223 may have a slit to have a substantially C-shaped cross-section. This makes it easy to expand the resin ring 223 in its radial direction. Therefore, for example, the resin ring 223 can be fitted onto the electric wire 211 by expanding the resin ring 223 in its radial direction after the terminal is crimped onto the electric wire 211.

(10) In the above embodiments, the guiding surface provided in the rim of the back-side opening of the continuously-provided portion 225 is the inclined surface straightly inclined to expand the opening toward the back end of the continuously-provided portion 225. However, the guiding surface is not limited thereto. For example, the guiding surface may be a curved surface (R-surface).

Means for Solving the Problem

The technique disclosed in this description as means for achieving the above object relates to an electric wire with terminal including: an electric wire obtained by covering an outer periphery of a core wire with an insulating coating; and a terminal connected to the electric wire. The terminal has a connecting portion to be connected to a conductive member, a wire barrel crimped onto the core wire exposed beyond an end of the insulating coating, and a bridging portion connecting the connecting portion and the wire barrel to each other. The bridging portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating. The water blocking wall is integrally provided with a continuously-provided portion connected to the water blocking wall and extending along an outer surface of the bridging portion toward the wire barrel. The continuously-provided portion is configured to be flexurally deformable by setting a resin-occupied area of a cross-section of the continuously-provided portion orthogonal to a direction in which the core wire extends smaller than that of a cross-section of the water blocking wall.

The technique disclosed in this description relates to a terminal to be connected to an exposed portion of a core wire of an electric wire obtained by covering an outer periphery of the core wire with an insulating coating, the terminal including: a connecting portion to be connected to a conductive member, a wire barrel to be crimped onto the core wire exposed beyond an end of the insulating coating, and a bridging portion connecting the connecting portion and the wire barrel to each other. The bridging portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating. The water blocking wall is integrally molded with a continuously-provided portion connected to the water blocking wall and extending along an outer surface of the bridging portion toward the wire barrel. The continuously-provided portion is configured to be flexurally deformable by setting a resin-occupied area of a cross-section of the continuously-provided portion orthogonal to a direction in which the core wire extends smaller than that of a cross-section of the water blocking wall.

In such a structure, the bridging portion is provided with the water blocking wall, which makes it possible to inhibit the entry of water from between the bridging portion and the water blocking wall. Further, the water blocking coating is in close contact with the outer surface of the water blocking wall, which also makes it possible to inhibit the entry of water from between the water blocking coating and the outer surface of the water blocking wall. Therefore, a region extending from the water blocking wall to the end of the insulating coating is made waterproof by the water blocking coating, which makes it possible to inhibit the adhesion of water to the core wire and the wire barrel.

Further, the bridging portion is provided not only with the water blocking wall but also with the continuously-provided portion integrally provided with the water blocking wall so as to extend toward the wire barrel, which makes it possible to increase the length of the interface between the synthetic resin constituting the water blocking wall and the continuously-provided portion and the bridging portion in a direction from the connecting portion side toward the wire barrel side as compared to a case where the continuously-provided portion is not provided. This makes it possible, even when the bridging portion is corroded by water or the like from the connecting portion side, to prolong the time that elapses before water reaches the core wire.

Further, when the wire barrel is strongly crimped onto the core wire, there is a case where part of the bridging portion adjacent to the wire barrel flexurally deforms following the deformation of the wire barrel. In this case, the continuously-provided portion is subjected to stress due to the deformation of the bridging portion, and therefore the resin layer of the continuously-provided portion is likely to be damaged or separated from the bridging portion. In this regard, according to the technique disclosed in this description, the resin-occupied area of the cross-section of the continuously-provided portion is set smaller than that of the cross-section of the water blocking wall. Therefore, the continuously-provided portion can flexurally deform following the deformation of the wire barrel. This makes it possible to inhibit the resin layer of the continuously-provided portion from being damaged or separated from the bridging portion.

Preferred embodiments of the technique disclosed in this description are as follows.

The bridging portion may include a bottom plate and a pair of side plates extending upward from both the side edges of the bottom plate on the core wire side to have a concave cross-section, and the continuously-provided portion may be formed into a groove shape along the outer surface of the bottom plate and the outer surface of the pair of side plates.

When the wire barrel is strongly crimped onto the core wire, there is a case where the pair of side plates of the bridging portion flexurally deforms following the deformation of the wire barrel. In this regard, according to the technique disclosed in this description, the resin layer of the continuously-provided portion is formed into a groove shape along the outer surface of the bridging portion, and therefore part of the continuously-provided portion provided along both the side plates can flexurally deform following the deformation of the wire barrel. This makes it possible to inhibit the resin layer of the continuously-provided portion from being damaged or separated from the bridging portion. Further, since the continuously-provided portion is formed into a groove shape, the molding dies can be opened in a direction orthogonal to a direction in which the core wire extends after the continuously-provided portion is formed by molding. This makes it possible to simplify the shape of the molding dies and therefore to reduce the cost of the molding dies.

The continuously-provided portion may have an opening on the wire barrel side so as to be able to accommodate the core wire.

In this case, the continuously-provided portion can accommodate the tip of the core wire when the core wire is strongly compressed by crimping the wire barrel onto the core wire and is therefore stretched forward. This makes it possible to inhibit the core wire from being pressed against the back surface of the continuously-provided portion to inhibit damage to the continuously-provided portion.

The rim of the wire barrel-side opening of the continuously-provided portion may be configured to have a guiding surface to expand the opening toward the wire barrel side.

In this case, the guiding surface can smoothly guide the core wire to the continuously-provided portion.

The water blocking wall may be configured so as to surround the entire outer periphery of the bridging portion.

In this case, the water blocking wall can come into close contact with the entire inner periphery of the water blocking coating, which makes it possible to further improve waterproofness.

A resin ring may be fitted onto the end of the insulating coating such that the inner surface of the water blocking coating is in close contact with the resin ring.

In this case, the water blocking coating has irregularities in its outer surface, and is therefore easily fitted onto the insulating coating, which makes it possible to bring the inner surface of the water blocking coating into close contact with the outer surface of the end of the insulating coating without any gap.

A metal constituting the core wire and a metal constituting the terminal may be different from each other.

When a metal constituting the core wire and a metal constituting the terminal are different from each other, there is a fear that when water adheres to both the core wire and the wire barrel, electrolytic corrosion occurs in the core wire or the wire barrel. However, according to the above embodiments, the core wire and the wire barrel are reliably made waterproof by the water blocking coating, which makes it possible to inhibit the core wire or the wire barrel from being dissolved by electrolytic corrosion. Therefore, the above embodiments are particularly effective when a metal constituting the core wire and a metal constituting the terminal are different from each other.

The core wire may be made of aluminum or an aluminum alloy.

In this case, aluminum or an aluminum alloy has a relatively small specific gravity, which makes it possible to reduce the weight of the electric wire. On the other hand, aluminum or an aluminum alloy has a relatively high ionization tendency, and is therefore easily dissolved when electrolytic corrosion occurs. However, according to the above embodiments, the core wire and the wire barrel are reliably made waterproof by the water blocking coating. Therefore, the above embodiments are particularly effective when the core wire is made of aluminum or an aluminum alloy.

The water blocking coating may have an adhesive or pressure-sensitive adhesive layer provided on the inner periphery thereof.

In this case, it is possible to bring the inner periphery of the water blocking coating into close contact with a region extending from the water blocking wall to the end of the insulating coating without any gap.

The water blocking coating may be a heat-shrinkable tube.

In this case, the inner diameter of the heat-shrinkable tube before heating is relatively large, which makes it easy to externally surround the above-described region with the heat-shrinkable tube. Then, by thermally shrinking the heat-shrinkable tube, the inner surface of the heat-shrinkable tube can be brought into close contact with the outer surface of the water blocking wall and the outer surface of the end of the insulating coating. As described above, the use of the heat-shrinkable tube as the water blocking coating makes it possible to improve the work efficiency of the step of externally surrounding a region extending from the water blocking wall to the end of the insulating coating with the heat-shrinkable tube.

The water blocking coating may be an elastic tube having rubber elasticity.

In this case, a region extending from the water blocking wall to the end of the insulating coating is externally surrounded with the elastic tube expanded in its radial direction, and then the elastic tube is allowed to recover its original shape. As a result, the inner surface of the elastic tube comes into close contact with the outer surface of the water blocking wall and the outer surface of the end of the insulating coating. According to this embodiment, the region extending from the water blocking wall to the end of the insulating coating can be covered with the elastic tube by such a simple process.

(Effects)

According to the technique disclosed in this description, it is possible to improve the waterproofness of the terminal and the electric wire with terminal.

<Embodiment 3-1>

As a conventional electric wire with terminal, one disclosed in JP 2000-285983 A is known. This electric wire with terminal includes: an electric wire obtained by covering the outer periphery of a core wire with an insulating coating; and a terminal connected to an exposed portion of the core wire not covered with the insulating coating. The terminal has a flat plate-shaped board portion on which the core wire is placed and a wire barrel that projects from the board portion and is crimped onto the core wire. A region extending from the board portion to the end of the insulating coating is covered with a heat-shrinkable tube, and one of the ends of the heat-shrinkable tube covers the core wire onto which the wire barrel is crimped and the other end is in close contact with the insulating coating.

However, in the case of the above-described structure, the board portion has a flat plate shape and therefore there is a fear that a gap is likely to be left between the one of the ends of the heat-shrinkable tube and the board portion. This causes a fear that water enters the inside of the heat-shrinkable tube through the gap and then comes into contact with the core wire and the wire barrel. As a result, there is a fear that a problem such as oxidation of the surface of the core wire or the wire barrel occurs.

Under the above circumstances, the technique disclosed in this description has been completed to prevent the adhesion of water to the core wire and the wire barrel.

An electric wire with terminal 3A according to an embodiment 3-1 of the present invention will be described with reference to FIGS. 25 to 32.

The electric wire with terminal 3A includes an electric wire 310 and a female terminal 320 (corresponding to a terminal) connected to the end of the electric wire 310.

Figure 26:
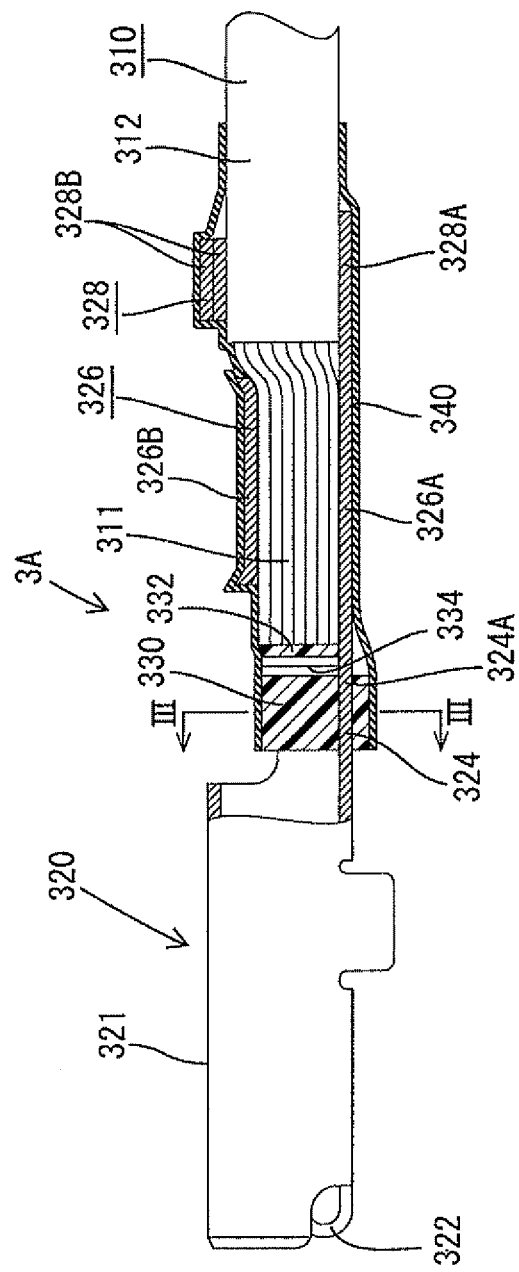
FIG. 26 is a partially cutaway sectional view of the same.
Figure 27:
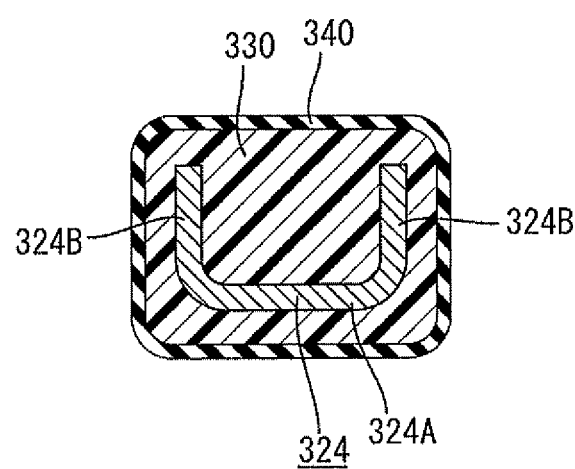
FIG. 27 is an enlarged sectional view taken along a line III-III shown in FIG. 26.

As shown in FIG. 26, the electric wire 310 includes a core wire 311 obtained by twisting a plurality of thin metallic wires and an insulating coating 312 made of a synthetic resin and covering the outer periphery of the core wire 311. The core wire 311 is made of any metal, such as copper, a copper alloy, aluminum, or an aluminum alloy, as appropriate. In this embodiment, aluminum or an aluminum alloy is used. A predetermined length of the insulating coating 312 is stripped off at the end of the electric wire 310 to expose the end of the core wire 311. It is to be noted that the core wire 311 may be a single core wire.

The female terminal 320 is formed by pressing a metallic plate material into a predetermined shape. As a metal constituting the female terminal 320, any metal, such as copper or a copper alloy, may be used as appropriate. Further, the metallic plate material has a plated layer (not shown) provided on the surface thereof. As a metal constituting the plated layer, any metal such as tin or nickel may be used as appropriate. In this embodiment, a tin plated layer is provided on the surface made of copper or a copper alloy. It is to be noted that the metallic plate material may have a structure in which a plated layer is not provided on the surface thereof.

Figure 25:
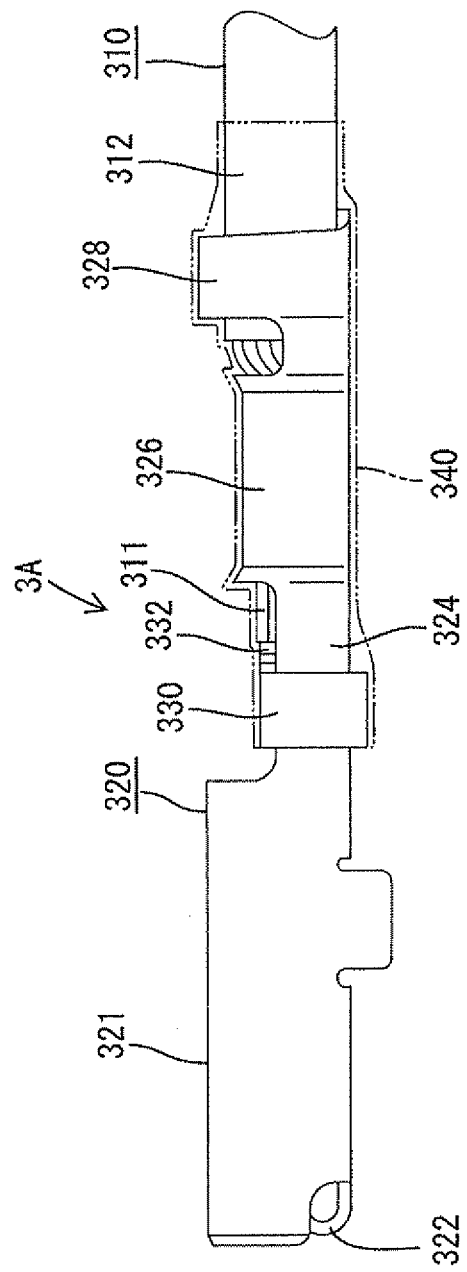
FIG. 25 is a side view of an electric wire with terminal according to an embodiment 3-1 of the present invention.
Figure 28:
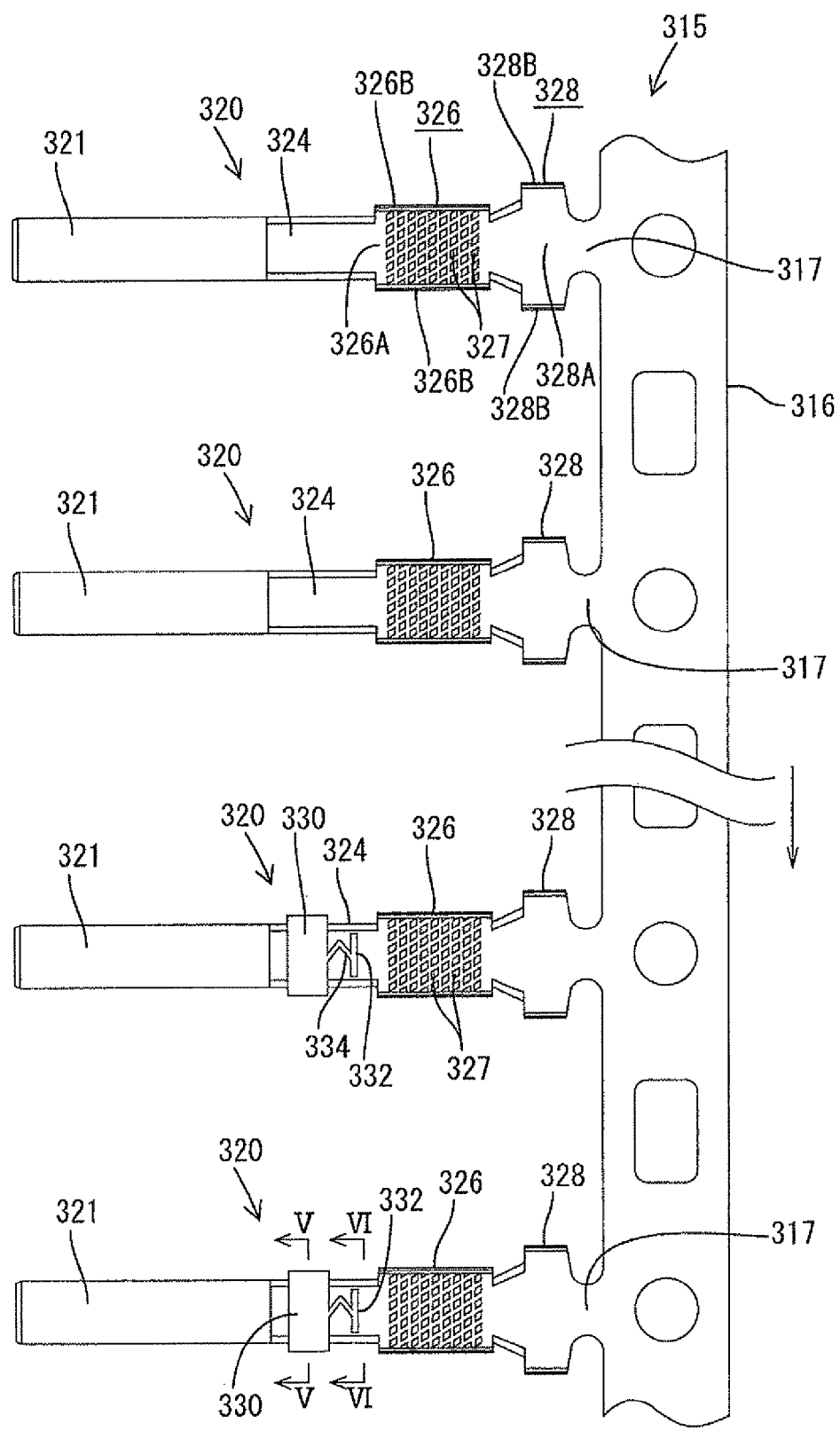
FIG. 28 is a plan view of a chain-terminal in a state from a bending step and to a molding step.

As shown in FIGS. 25 and 28, the female terminal 320 has a structure in which a wire barrel 326 connected to a bridging portion 324 and an insulation barrel 328 are provided behind a tubular connecting portion 321 (corresponding to a connecting portion).

The tubular connecting portion 321 is to be connected to a mating male terminal (not shown) by inserting a tab of the male terminal thereinto. In the tubular connecting portion 321, an elastic contact piece 322 is provided.

Figure 29:
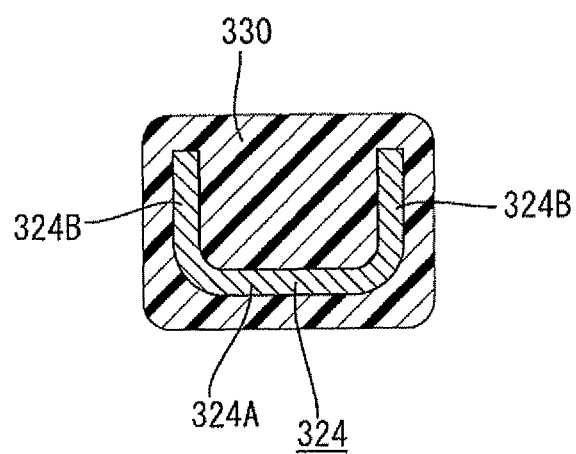
FIG. 29 is an enlarged sectional view taken along a line V-V shown in FIG. 28.

As shown in FIG. 29, the bridging portion 324 includes a bottom plate 324A and side plates 324B extending upward from both the side edges of the bottom plate 324A, and therefore has a channel shape.

The wire barrel 326 has the function of compressing the exposed end of the core wire 311 of the electric wire 310, and includes a bottom plate 326A extending backward from the bottom plate 324A of the bridging portion 324 and a pair of barrel pieces 326B extending upward from both the side edges of the bottom plate 326A. The wire barrel 326 is configured to be crimped onto the core wire 311 in a so-called heart shape by externally holding the core wire 311 in a manner such that the tips of both the projecting barrel pieces 326B dig into the core wire 311 while abutting against each other.

It is to be noted that as shown in FIG. 28, a plurality of parallelogrammatic recesses 327 are formed in the inner surface of the bottom plate 326A of the wire barrel 326 so as to be arranged in a matrix. Here, a pair of opposed sides of each of the recesses 327 is orthogonal to a direction in which the core wire 311 extends, which improves the strength of fixation of the wire barrel 326 to the core wire 311. Further, the rims of openings of the recesses 327 are in sliding contact with the surface of the core 311. Therefore, the area of contact between the rims of openings of the recesses 327 and the core wire 311 is increased, which as a result makes it possible to reduce the value of electrical resistance between the female terminal 320 and the core wire 311.

The insulation barrel 328 has the function of compressing the end of the insulating coating 312 of the electric wire 310 remaining after stripping, and includes a bottom plate 328A extending from the bottom plate 326A of the wire barrel 326 and a pair of long barrel pieces 3283 extending upward from both the side edges of the bottom plate 328A. The insulation barrel 328 is configured to be crimped onto the end of the insulating coating 312 in a so-called overlapping manner such that the insulating coating 312 is externally held by the barrel pieces 328B while the tips of the projecting barrel pieces 328B overlap one another.

A water blocking wall 330 is provided at some midpoint in the length direction of the bridging portion 324 by molding a synthetic resin material. As the synthetic resin material constituting the water blocking wall 330, any synthetic resin material, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

As shown in FIG. 29, the water blocking wall 330 is configured to be able to surround the entire outer periphery of the bridging portion 324, and is formed as a thick plate having a substantially quadrangular shape with rounded corners when viewed from the front.

Figure 30:
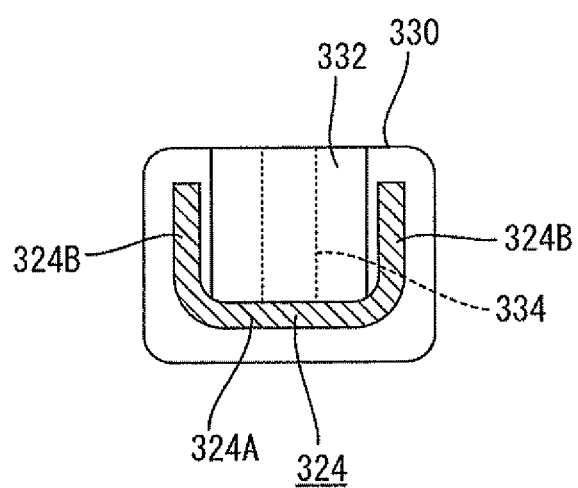
FIG. 30 is an enlarged sectional view taken along a line VI-VI shown in FIG. 28.
Figure 31:
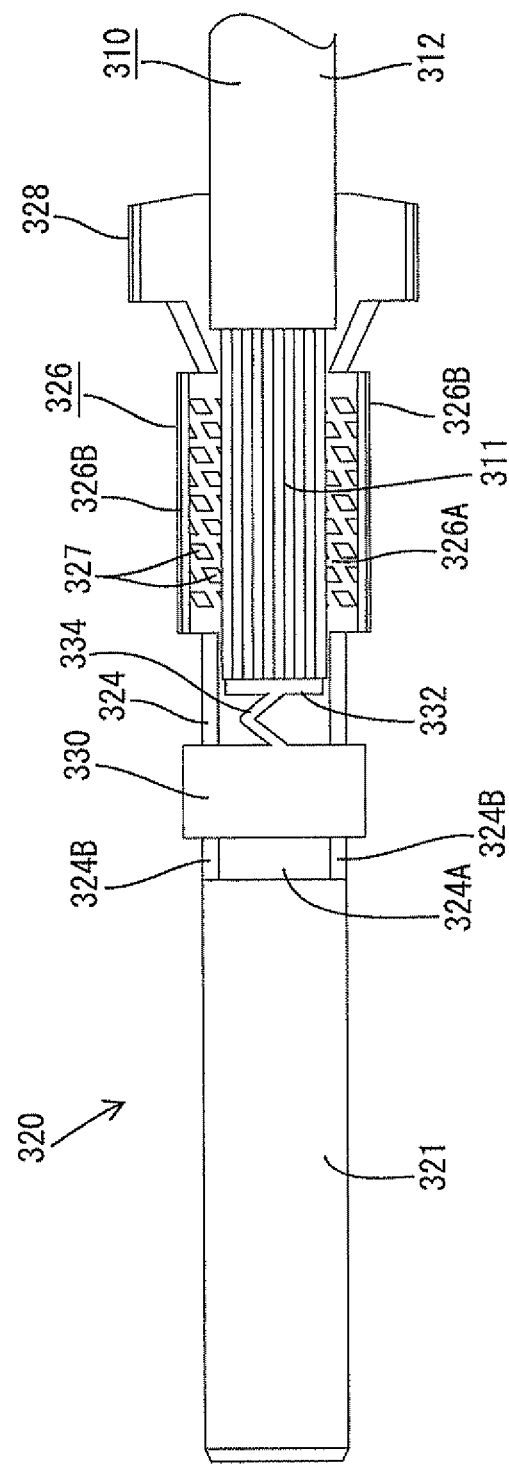
FIG. 31 is a plan view showing a state where a core wire is set on a wire barrel.

Here, an abutment plate 332 (corresponding to an abutment portion) is provided on the back surface side of the water blocking wall 330. The abutment plate 332 has the function of stopping the core wire 311 at its front-limit position. The core wire 311 is stopped at its front-limit position by abutting the tip of the core wire 311 against the abutment plate 332 when the core wire 311 is placed on the bottom plate 326A of the wire barrel 326 to crimp the wire barrel 326 onto the end of the core wire 311 of the electric wire 310. As shown in FIGS. 30 and 31, the abutment plate 332 has a substantially square shape when viewed from the front so as to be accommodated inside the bridging portion 324, and is integrally molded with the water blocking wall 330 so as to connect to the water blocking wall 330 through a connecting portion 334. The connecting portion 334 has an angular shape when viewed from above, and is deformable to flatten. The abutment plate 332 and the connecting portion 334 are provided so as to stand on the bottom plate 324A of the bridging portion 324 in terms of die separation for molding.

The purpose of providing the abutment plate 332 is to position the tip of the core wire 311 behind the abutment plate 332 before crimping to prevent, when the core wire 311 is stretched in the direction of axis by crimping the wire barrel 326 onto the core wire 311, the tip of the core wire 311 from applying a pressing force to the back surface of the water blocking wall 330. For example, when the core wire 311 is stretched by crimping in a state where the tip of the core wire 311 abuts against the abutment plate 332, the abutment plate 332 is pushed by the tip of the core wire 311 such that the connecting portion 334 is deformed to flatten. Therefore, the length of the connecting portion 334, that is, the distance between the abutment plate 332 and the back surface of the water blocking wall 330 is set such that a pressing force is not applied to the back surface of the water blocking wall 330 by the tip of the core wire 311.

Therefore, it is preferred that the distance between the abutment plate 332 and the back surface of the water blocking wall 330 is set in consideration of the expected maximum elongation of the core wire 311 according to conditions such as the material and diameter of the core wire 311 and crimping force.

A region extending from the water blocking wall 330 provided in the bridging portion 324 to the insulating coating 312 through the wire barrel 326 and the insulation barrel 328 is covered with a heat-shrinkable tube 340 (corresponding to a water blocking coating) made of a synthetic resin. The length of the heat-shrinkable tube 340 is set such that the heat-shrinkable tube 340 can cover a region extending from the water blocking wall 330 to a position slightly behind a position where the insulation barrel 328 is crimped onto the insulating coating 312.

In this embodiment, the heat-shrinkable tube 340 has an adhesive or pressure-sensitive adhesive layer (not shown) provided on the inner surface thereof. The adhesive or pressure-sensitive adhesive layer is designed to develop adhesiveness or tackiness by thermal softening or melting.

In a state where the heat-shrinkable tube 340 is thermally shrunk, the inner surface of one of the ends of the heat-shrinkable tube 340 can come into close contact with the entire outer periphery of the water blocking wall 330 without any gap. Further, the inner surface of the other end of the heat-shrinkable tube 340 is in close contact with the entire outer periphery of the insulating coating 312 without any gap.

It is to be noted that the heat-shrinkable tube 340 may have no adhesive or pressure-sensitive adhesive layer on the inner surface thereof. In this case, the synthetic resin constituting the water blocking wall 330 may be one that develops adhesiveness by thermal softening or melting. When the water blocking wall 330 is made of such a synthetic resin, the water blocking wall 330 can be softened or melted in the step of heating the heat-shrinkable tube 340 such that the inner surface of the heat-shrinkable tube 340 adheres to the outer surface of the water blocking wall 330.

The heat-shrinkable tube 340 can be brought into close contact with the insulating coating 312 even when the heat-shrinkable tube 340 does not have an adhesive or pressure-sensitive adhesive layer on the inner surface thereof.

Hereinbelow, one example of a production process of the electric wire with terminal 3A according to this embodiment will be described.

A metallic hoop material is subjected to a pressing machine to sequentially perform a punching step, a bending step, etc. to form a chain-terminal 315. At the end of the bending step, as shown on the upper side of FIG. 28, fabricated female terminals 320 connected to one side edge of a carrier 316 with a regular pitch are prepared. At this time, each of the female terminals 320 is in a state where a tubular connecting portion 321 is formed into a predetermined tubular shape and a bridging portion 329 is formed into a predetermined channel shape but a wire barrel 326 and an insulation barrel 328 are left open before crimping. Each of the female terminals 320 is connected to the carrier 316 in such a state where the back edge of a bottom plate 328A of the insulation barrel 328 is connected to the one side edge of the carrier 316 through a connecting portion 317.

Then, the chain-terminal 315 is subjected to a molding step as shown by an arrow in FIG. 28. In the molding step, a water blocking wall 330 is formed by molding in the bridging portion 324 of each of the female terminals 320. An abutment plate 332 is integrally molded with the water blocking wall 330 such that the back surface of the water blocking wall 330 is connected to the abutment plate 332 through a connecting portion 334.

More specifically, in the molding step, a pair of upper and lower molding dies is closed at a predetermined position in the bridging portion 324 of each of the female terminals 320, and a synthetic resin in a molten state is injected into a cavity formed in the molding dies. The dies are opened after the synthetic resin is solidified in the cavity. As a result, as shown on the lower side of FIG. 28, the water blocking wall 330 is formed together with the connecting portion 334 and the abutment plate 332 at the predetermined position in the bridging portion 324 of the female terminal 320. Such a molding step to form the water blocking wall 330 is intermittently performed in a manner such that the two or more female terminals 320 are subjected to the molding step at the same time.

After produced, the chain-terminal 315 in which each of the female terminals 320 is provided with the water blocking wall 330 formed by molding is wound into, for example, a roll and then transferred to a site for electric wire crimping.

In the site for electric wire crimping, a terminally-processed electric wire 310, that is, an electric wire 310 in which the end of a core wire 311 is exposed by stripping off a predetermined length of insulating coating 312 is prepared.

One example of a crimping step is as follows. Each of the female terminals 320 is cut from the carrier 316, and is then set in a crimping die (not shown) including an anvil and a crimper and placed on, for example, the anvil. Then, the core wire 311 exposed at the end of the electric wire 310 is placed on a bottom plate 326A of the wire barrel 326 and the end of the remaining insulating coating 312 is placed on a bottom plate 328A of the insulation barrel 328. At this time, as shown in FIG. 31, the electric wire 310 is pushed forward until the tip of the core wire 311 abuts against the abutment plate 332 of the water blocking wall 330, which makes it possible to substantially perform the positioning of a portion onto which the wire barrel 326 is to be crimped and a portion onto which the insulation barrel 328 is to be crimped.

Figure 32:
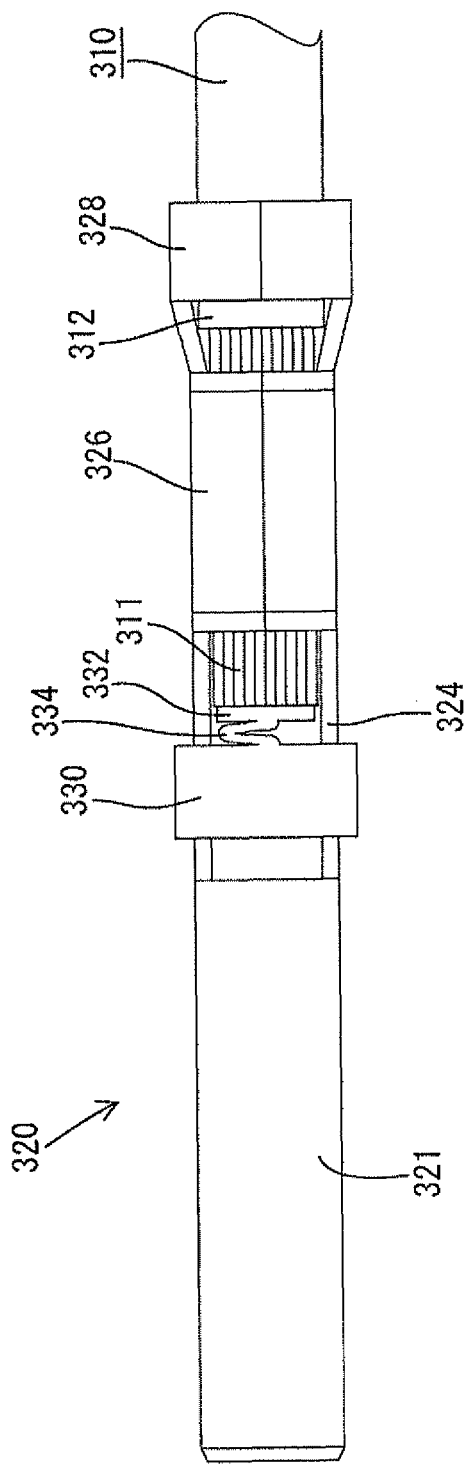
FIG. 32 is a plan view showing a state after crimping is completed.

Then, the crimping die is closed, and more specifically, the crimper comes close to the anvil such that, as described above, the wire barrel 326 is crimped onto the end of the core wire 311 in a heart shape and the insulation barrel 328 is crimped onto the end of the insulating coating 312 in an overlapping manner. Here, as shown in FIG. 32, the core wire 311 is stretched by crimping the wire barrel 326 onto the core wire 311, and therefore the tip of the core wire 311 pushes the abutment plate 332 while the connecting portion 334 is deformed to flatten. However, as described above, the distance between the abutment plate 332 and the back surface of the water blocking wall 330 is set in consideration of the maximum elongation of the core wire 311, and therefore, even when the core wire 311 is maximally stretched, a pressing force is not applied to the back surface of the water blocking wall 330 by the tip of the core wire 311. In other words, the tip of the core wire 311 stays behind the back surface of the water blocking wall 330 with the deformed connecting portion 334 and the abutment plate 332 being interposed between them. Therefore, the water blocking wall 330 is not damaged by the tip of the core wire 311 and the tip of the core wire 311 does not come into contact with the outer periphery of the water blocking wall 330.

It is to be noted that the female terminal 320 may be set in the crimping die in a state where it is connected to the carrier 316 of the chain-terminal 315 and then cut from the carrier 316 at the same time as the crimping step.

After the completion of the crimping step to crimp the female terminal 320 onto the end of the electric wire 310, a covering step is finally performed.

In the covering step, a heat-shrinkable tube 340 is passed through from the electric wire 310 side or the female terminal 320 side such that a region extending from the water blocking wall 330 to a position behind a portion where the insulation barrel 328 is crimped onto the insulating coating 312 is covered with the heat-shrinkable tube 340. The female terminal 320 connected to the electric wire 310 can be relatively easily passed through the heat shrinkable tube 340 from the female terminal 320 side by setting the inner diameter of the heat-shrinkable tube 340 before heating larger than the outer shape of the tubular connecting portion 321. When the female terminal 320 connected to the electric wire 310 is passed through the heat-shrinkable tube 340 from the electric wire 310 side, the electric wire 310 may be passed through the heat-shrinkable tube 340 in advance before the crimping step is performed.

After the heat-shrinkable tube 340 is fitted, the heat-shrinkable tube 340 is shrunk by heating with a heating device not shown. As a result, as shown in FIG. 26, the inner surface of the heat-shrinkable tube 340 comes into close contact with the outer surface of the water blocking wall 330 and the outer surface of the insulating coating 312 without any gap. In such a way as described above, production of an electric wire with terminal 3A is completed.

It is to be noted that in the above-described heating step, in a state where the tubular connecting portion 321 is placed upward, the synthetic resin constituting the water blocking wall 330 can be prevented from flowing into the tubular connecting portion 321 even when the water blocking wall 330 is unintentionally melted. This makes it possible to improve the reliability of electrical connection with a mating male terminal in the tubular connecting portion 321.

According to this embodiment, the following various effects can be obtained.

The water blocking wall 330 made of a synthetic resin is provided by molding in the bridging portion 324 that connects the tubular connecting portion 321 and the wire barrel 326 to each other, which makes it possible to prevent the entry of water through the outer surface of the bridging portion 324. Further, the inner surface of the open end of the heat-shrinkable tube 340 is in close contact with the outer surface of the water blocking wall 330, which makes it possible to prevent the entry of water from between the water blocking wall 330 and the heat-shrinkable tube 340. Therefore, the region extending from the water blocking wall 330 to the end of the insulating coating 312 is made waterproof by the heat-shrinkable tube 340, which makes it possible to prevent the adhesion of water to the core wire 311 and the wire barrel 326.

Further, the abutment plate 332 against which the tip of the core wire 311 abuts before crimping is integrally provided with the water blocking wall 330 so as to connect to the back surface of the water blocking wall 330 through the elastically-deformable connecting portion 334. This abutment plate 332 is displaced forward by the elastic compression of the connecting portion 334 to allow the tip of the core wire 311 to move forward, and the distance between the abutment plate 332 and the back surface of the water blocking wall 330 is set such that a pressing force is not applied to the back surface of the water blocking wall 330 by the tip of the core wire 311 when the core wire 311 is stretched in a state where the tip of the core wire 311 abuts against the abutment plate 332.

Therefore, when the core wire 311 is stretched by crimping the wire barrel 326 onto the end of the core wire 311, the tip of the core wire 311 pushes the abutment plate 332 and comes close to the water blocking wall 330 while the connecting portion 334 is elastically compressed, but a pressing force is not applied to the water blocking wall 330 by the tip of the core wire 311. This is because when the end of the core wire 311 is set on the wire barrel 326 for crimping, the core wire 311 is stopped at its front-limit position by abutting the tip of the core wire 311 against the abutment plate 332. Therefore, the water blocking wall 330 is not damaged by the tip of the core wire 311 and the tip of the core wire 311 does not come into contact with the outer periphery of the water blocking wall 330. As a result, when the heat-shrinkable tube 340 is fitted, the open end of the heat-shrinkable tube 340 can be reliably brought into close contact with the outer surface of the water blocking wall 330, and therefore the heat-shrinkable tube 340 can more reliably exhibit its waterproof function.

When the metal constituting the core wire 311 and the metal constituting the female terminal 320 are different from each other, there is a fear that when water adheres to both the core wire 311 and the wire barrel 326, electrolytic corrosion occurs in the core wire 311 or the wire barrel 326. However, the core wire 311 and the wire barrel 326 are reliably made waterproof by the heat-shrinkable tube 340, which makes it possible to prevent the core wire 311 or the wire barrel 326 from being dissolved by electrolytic corrosion.

This is effective particularly when the core wire 311 is made of aluminum or an aluminum alloy and the female terminal 320 has a tin plated layer on its surface made of copper or a copper alloy as in the case of this embodiment, because there is a fear that the core wire 311 made of aluminum or an aluminum alloy having a relatively high ionization tendency is dissolved by electrolytic corrosion. It is to be noted that aluminum or an aluminum alloy has a relatively low specific gravity, which makes it possible to reduce the weight of the electric wire 310.

In this embodiment, the heat-shrinkable tube 340 is used as the water blocking coating. The inner diameter of the heat-shrinkable tube 340 is relatively large before heating, and therefore the region extending from the water blocking wall 330 to the end of the insulating coating 312 can be easily covered with the heat-shrinkable tube 340. Then, by thermally shrinking the heat-shrinkable tube 340, the inner surface of the heat-shrinkable tube 340 can be brought into close contact with the water blocking wall 330 and the end of the insulating coating 312. The use of the heat-shrinkable tube 340 as the water blocking coating makes it possible to improve the work efficiency of the step of externally surrounding the region extending from the water blocking wall 330 to the end of the insulating coating 312 with the water blocking coating.

The heat-shrinkable tube 340 has an adhesive or pressure-sensitive adhesive layer provided on the inner periphery thereof, which makes it possible to bring the inner surface of the heat-shrinkable tube 340 into close contact with the region extending from the water blocking wall 330 to the end of the insulating coating 312 without any gap.

<Embodiment 3-2>

Hereinbelow, an embodiment 3-2 according to the present invention will be described with reference to FIGS. 33 to 35. The embodiment 3-2 is a modification of the structure of a portion where the abutment portion against which the tip of the core wire 311 abuts before crimping is provided on the back surface side of the water blocking wall 330 provided by molding in the bridging portion 324 of the female terminal 320.

Hereinbelow, the difference from the embodiment 3-1 will be mainly described, and therefore the same components as the embodiment 3-1 are denoted by the same reference numerals and a description thereof will be simplified or will not be repeated.

Figure 33:
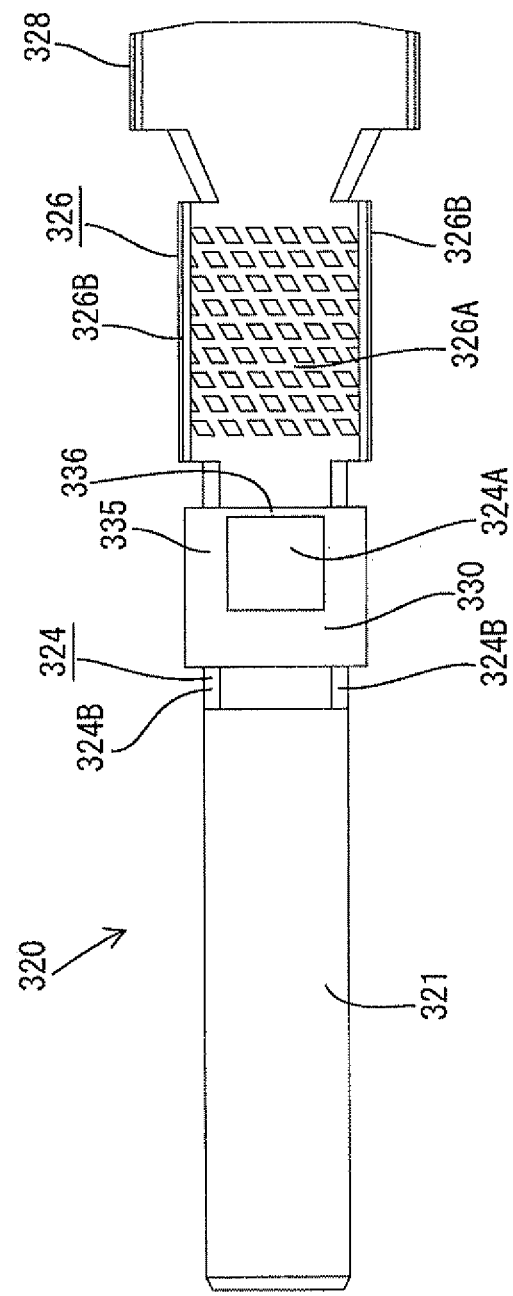
FIG. 33 is a plan view of a female terminal according to an embodiment 3-2 of the present invention before crimping.
Figure 34:
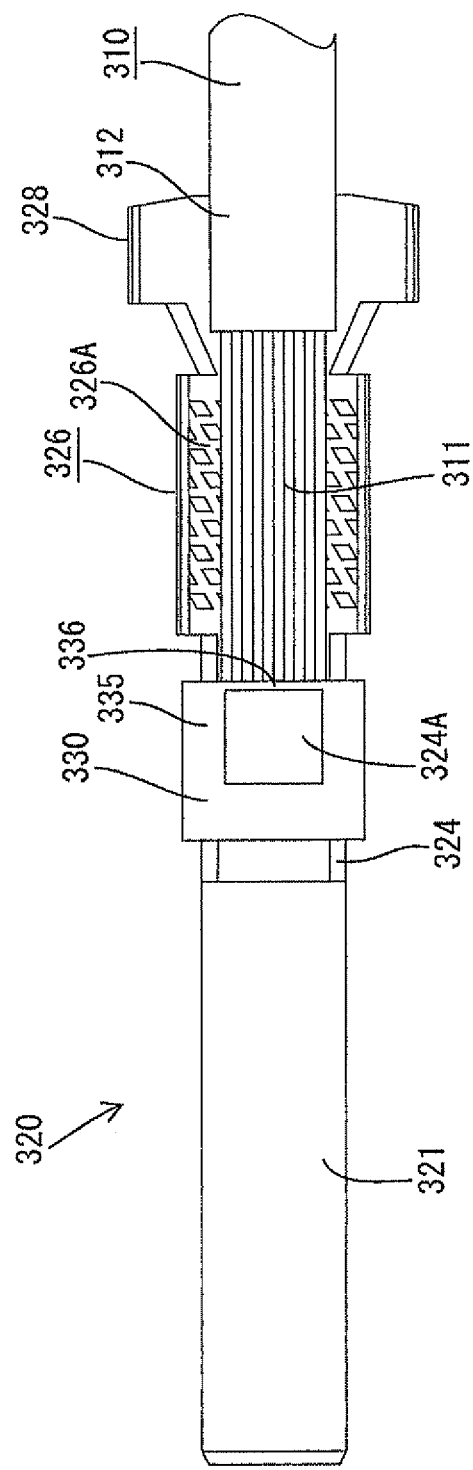
FIG. 34 is a plan view showing a state where a core wire is set on a wire barrel.

As shown in FIG. 33, a surrounding wall 335 whose upper end is open is provided on the back surface side of the water blocking wall 330. The surrounding wall 335 has a channel shape when viewed from the front. For example, this surrounding wall 335 is in close contact with both the outer and inner surfaces of the side plates 3245 of the bridging portion 324 and in close contact with only the outer surface of the bottom plate 324A of the bridging portion 324.

A thin film 336 is provided at the back end-side opening of the surrounding wall 335 within the bridging portion 324. More specifically, both the right and left side edges of the thin film 336 are connected to the inner surface of the surrounding wall 335 and the lower edge of the thin film 336 is in contact with the bottom plate 324A of the bridging portion 324. This thin film 336 corresponds to the abutment portion.

The thin film 336 is designed to break to allow the tip of the core wire 311 to enter the inside of the surrounding wall 335. For example, when the core wire 311 is stretched by crimping in a state where the tip of the core wire 311 abuts against the thin film 336, the tip of the core wire 311 is pushed into the inside of the surrounding wall 335 while breaking the thin film 336. However, the length of the surrounding wall 335 projecting from the water blocking wall 330, that is, the distance between the thin film 336 and the back surface of the water blocking wall 330 is set such that the tip of the wire 311 can stay behind the back surface of the water blocking wall 330.

Figure 35:
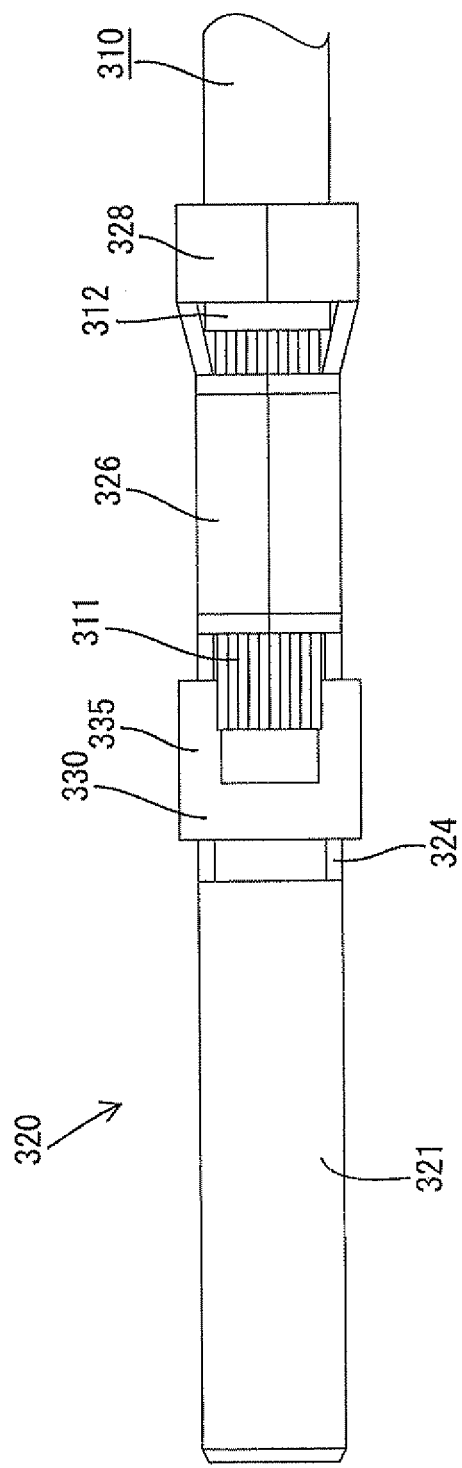
FIG. 35 is a plan view showing a state after crimping is completed.

Therefore, when the core wire 311 is stretched by crimping the wire barrel 326 onto the end of the core wire 311, as shown in FIG. 35, the tip of the core wire 311 enters the inside of the surrounding wall 335 while breaking the thin film 336, but does not reach the back surface of the water blocking wall 330. This is because when the end of the core wire 311 of the electric wire 310 is set on the wire barrel 326 for crimping, as shown in FIG. 34, the core wire 311 is stopped at its front-limit position by abutting the tip of the core wire 311 against the thin film 336. Therefore, the water blocking wall 330 is not damaged by the tip of the core wire 311 and the tip of the core wire 311 does not come into contact with the outer periphery of the water blocking wall 330. As in the case of the embodiment 3-1, when the heat-shrinkable tube 340 is fitted, the open end of the heat-shrinkable tube 340 can be reliably brought into close contact with the outer surface of the water blocking wall 330, and therefore the heat-shrinkable tube 340 can more reliably exhibit its waterproof function.

<Embodiment 3-3>

Figure 36:
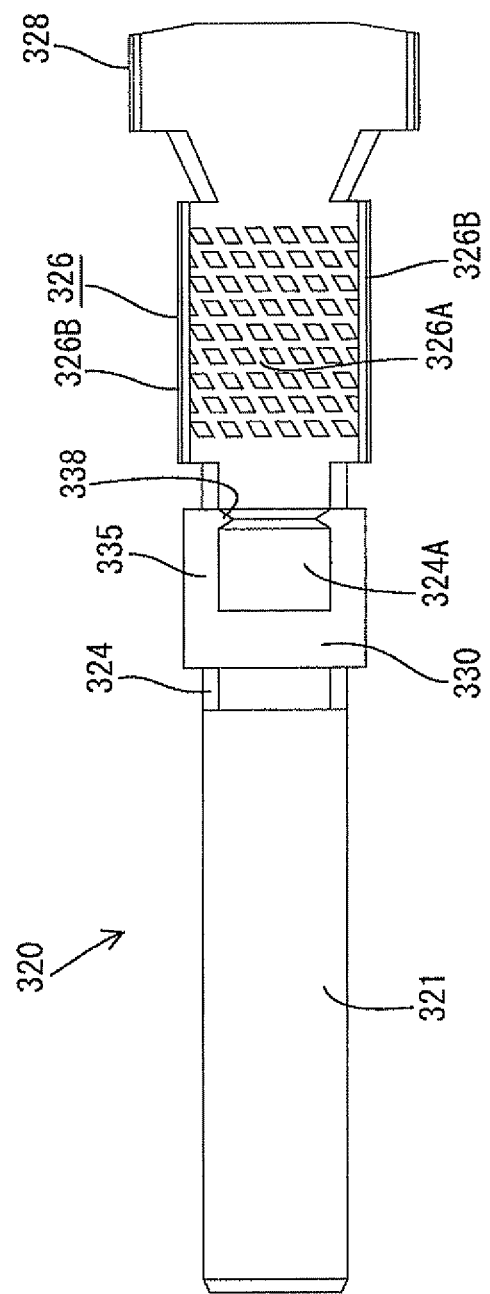
FIG. 36 is a plan view of a female terminal according to an embodiment 3-3 of the present invention before crimping.
Figure 37:
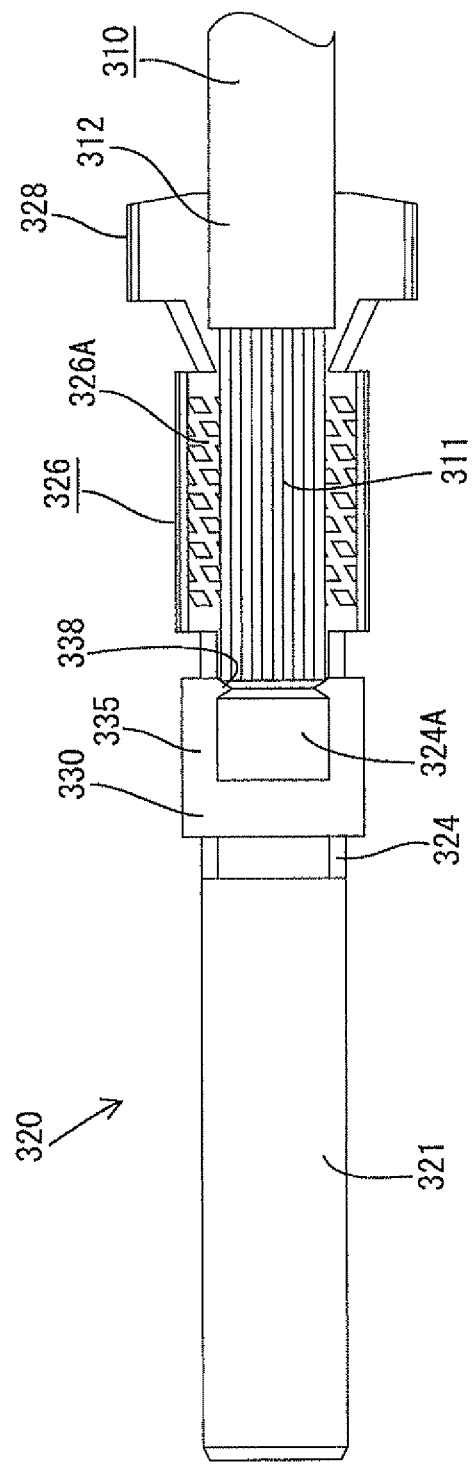
FIG. 37 is a plan view showing a state where a core wire is set on a wire barrel.
Figure 38:
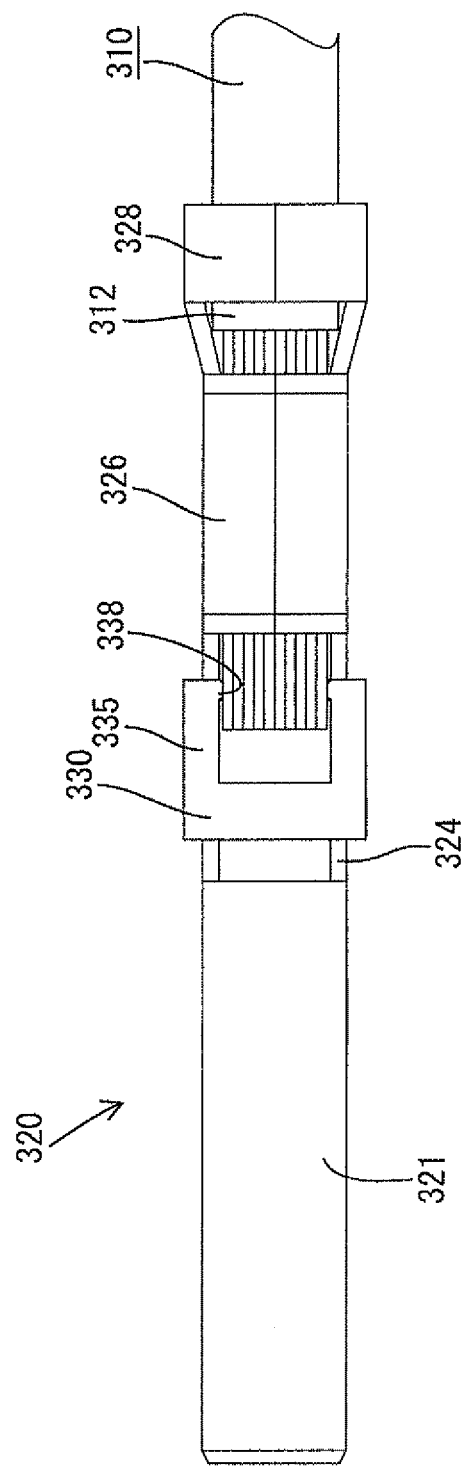
FIG. 38 is a plan view showing a state after crimping is completed.
Figure 39:
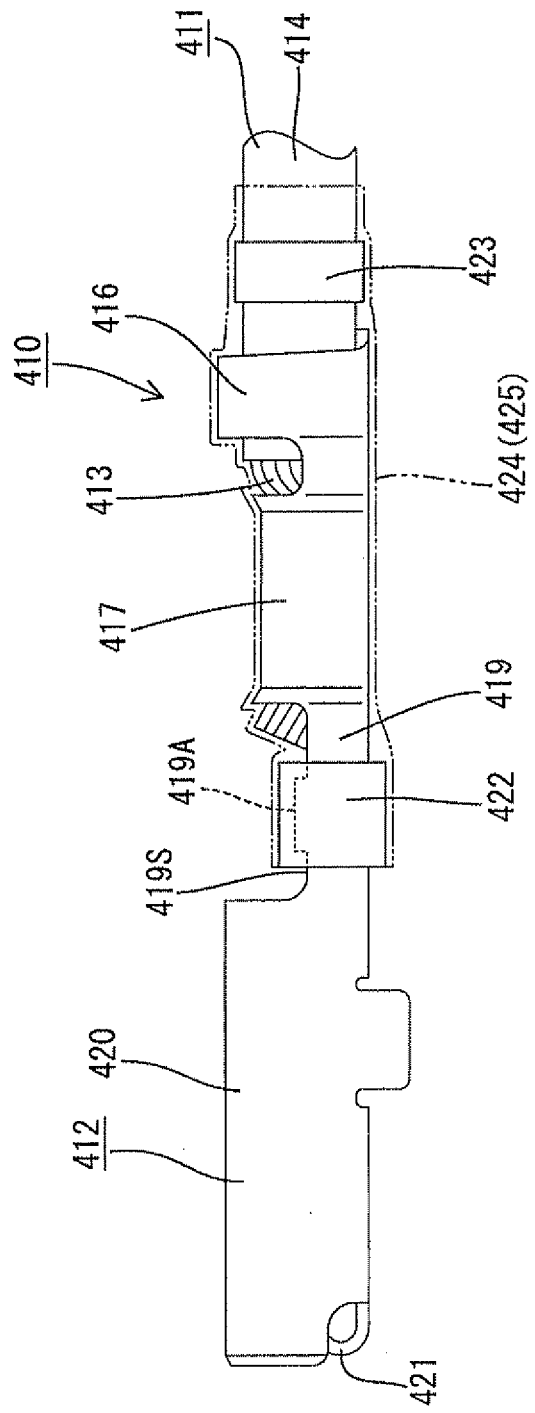
FIG. 39 is a side view of an electric wire with terminal according to an embodiment 4-1 of the present invention.
Figure 40:
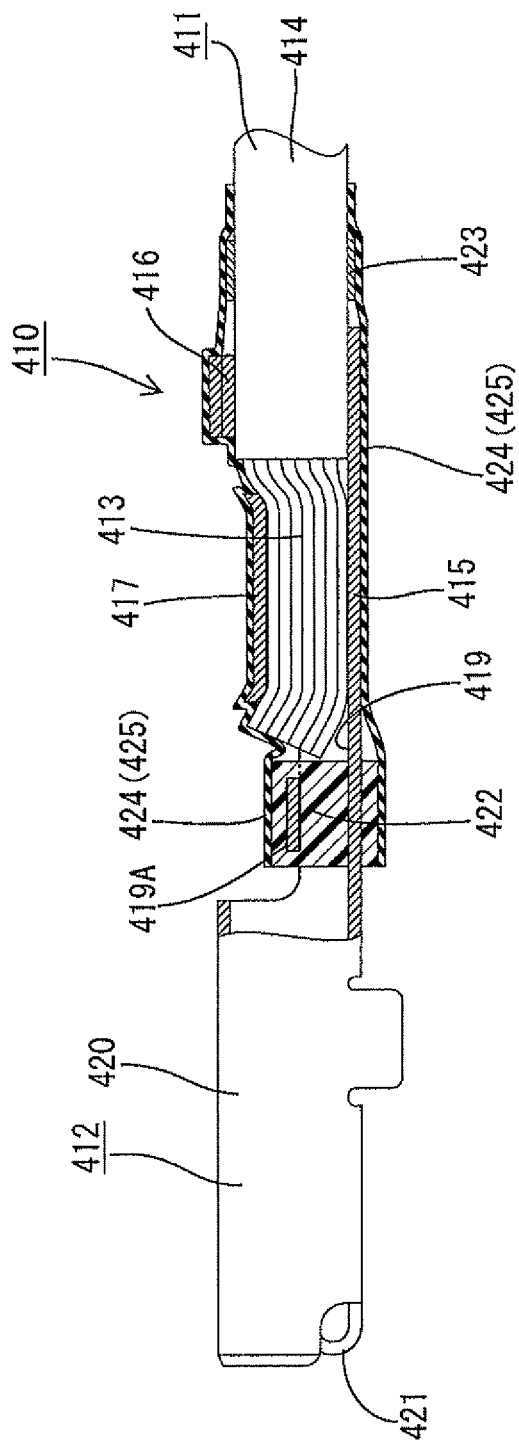
FIG. 40 is a cutaway sectional view of a main part of the electric wire with terminal.
Figure 41:
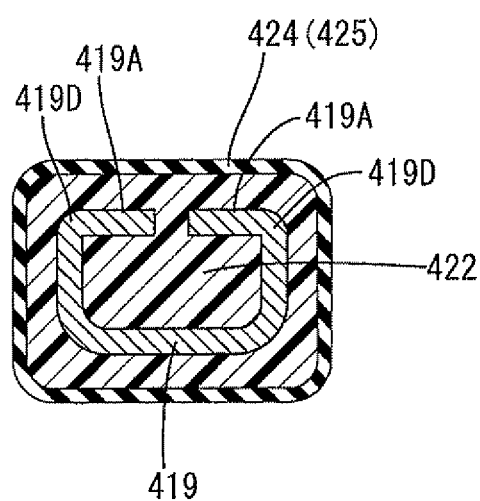
FIG. 41 is an enlarged sectional view of a main part of an extending portion.

FIGS. 36 to 38 show an embodiment 3-3 according to the present invention. The embodiment 3-3 is another modification of the structure of a portion where the abutment portion against which the tip of the core wire 311 abuts before crimping is provided on the back surface side of the water blocking wall 330 provided by molding in the bridging portion 324 of the female terminal 320. As in the case of the embodiment 3-2, the difference between the embodiment 3-1 and the embodiment 3-3 will be mainly described.

As shown in FIG. 36, a surrounding wall 335 whose upper end is open is provided on the back surface side of the water blocking wall 330. The surrounding wall 335 has a channel shape when viewed from the front. For example, this surrounding wall 335 is in close contact with both the outer and inner surfaces of the side plates 324B of the bridging portion 324 and in close contact with only the outer surface of the bottom plate 324A of the bridging portion 324.

A protrusion 338 having an angle section is provided along the inner periphery of back-side opening of the surrounding wall 335 within the bridging portion 324. More specifically, the right and left vertical parts of the protrusion 338 are connected to the inner surface of the surrounding wall 335 and the horizontal part of the protrusion 338 runs on the bottom plate 324A of the bridging portion 324. This protrusion 338 corresponds to the abutment portion.

The protrusion 338 is designed to break to allow the tip of the core wire 311 to enter the inside of the surrounding wall 335. For example, when the core wire 311 is stretched by crimping in a state where the tip of the core wire 311 abuts against the protrusion 338, the tip of the core wire 311 is pushed into the inside of the surrounding wall 335 while breaking the protrusion 338. However, the length of the surrounding wall 335 projecting from the water blocking wall 330, that is, the distance between the protrusion 338 and the back surface of the water blocking wall 330 is set such that the tip of the wire 311 can stay behind the back surface of the water blocking wall 330.

Therefore, when the core wire 311 is stretched by crimping the wire barrel 326 onto the end of the core wire 311, as shown in FIG. 38, the tip of the core wire 311 enters the inside of the surrounding wall 335 while breaking the protrusion 338, but does not reach the back surface of the water blocking wall 330. This is because when the end of the core wire 311 of the electric wire 310 is set on the wire barrel 326 for crimping, as shown in FIG. 37, the tip of the core wire 311 is stopped at its front-limit position by abutting the tip of the core wire 311 against the protrusion 338. Therefore, the water blocking wall 330 is not damaged by the tip of the core wire 311 and the tip of the core wire 311 does not come into contact with the outer periphery of the water blocking wall 330. As in the case of the embodiments 3-1 and 3-2, when the heat-shrinkable tube 340 is fitted, the open end of the heat-shrinkable tube 340 can be reliably brought into close contact with the outer surface of the water blocking wall 330, and therefore the heat-shrinkable tube 340 can more reliably exhibit its waterproof function.

<Other Embodiment>

The present invention is not limited to the embodiments described above with reference to the drawings, and for example, the following embodiments are also included in the technical scope of the present invention.

(1) The abutment portion which is provided on the back surface side of the water blocking wall 330 and against which the tip of the core wire 311 abuts is not limited to those exemplified in the above embodiments. That is, the abutment portion is not particularly limited as long as it is displaced or damaged to allow the tip of the core wire 311 to move forward and the distance between the abutment portion and the back surface of the water blocking wall 330 is set such that, when the core wire 311 is stretched in a state where the tip of the core wire 311 abuts against the abutment portion, a pressing force is not applied to the back surface of the water blocking wall 330 by the tip of the core wire 311 or the tip of the core wire 311 does not reach the back surface of the water blocking wall 330.

(2) However, the distance between the abutment portion and the back surface of the water blocking wall 330 is not limited to one that prevents, when the core wire 311 is stretched in a state where the tip of the core wire 311 abuts against the abutment portion, the tip of the core wire 311 from applying a pressing force to the back surface of the water blocking wall 330 or from reaching the back surface of the water blocking wall 330. The distance between the abutment portion and the back surface of the water blocking wall 330 may be set such that the tip of the core wire 311 applies a slight pressing force to the back surface of the water blocking wall 330 or the tip of the core wire 311 comes into slight contact with the back surface of the water blocking wall 330 as long as the water blocking wall 330 is not damaged or the tip of the core wire 311 does not come into contact with the outer periphery of the water blocking wall 330.

(3) Unlike the above-described embodiments, the water blocking wall 330 formed by molding in the bridging portion 324 of the female terminal 320 does not always need to surround the entire periphery of the bridging portion 324. For example, the water blocking wall 330 may be provided so as to fill at least the inside of the groove of the bridging portion 324. In this case, there is a possibility that the inner surface of the heat-shrinkable tube 340 and the exposed outer periphery of the bridging portion 324 are not incomplete contact with each other. However, if water enters from the outer periphery side of the bridging portion 324, water does not easily reach the contact portion of the core wire 311 and the wire barrel 326, and therefore the occurrence of electrolytic corrosion can be prevented. In this case, the amount of the synthetic resin as a material of the water blocking wall 330 can be reduced, which contributes to reduce production cost.

(4) As the water blocking coating, an elastic tube having rubber elasticity may be used instead of the heat-shrinkable tube 340 exemplified in the above embodiments. In this case, a region extending from the water blocking wall 330 to the end of the insulating coating 312 is externally surrounded with the elastic tube expanded in its radial direction, and then the elastic tube is allowed to recover its original shape. As a result, the inner surface of the elastic tube comes into close contact with the water blocking wall 330 and the end of the insulating coating 312. Therefore, the region extending from the water blocking wall 330 to the end of the insulating coating 312 can be covered with the elastic tube, that is, with the water blocking coating by a simple process.

(5) In the above embodiments, the core wire 311 is made of aluminum or an aluminum alloy. However, the material of the core wire 311 is not limited thereto, and the core wire 311 may be made of any metal as appropriate. For example, the core wire 311 may be made of copper or a copper alloy. Further, the female terminal 320 is made of copper or a copper alloy and has a tin plated layer on the surface thereof. However, the material of the female terminal is not limited thereto, and the terminal may be made of any metal as appropriate.

(6) In the above embodiment, the female terminal 320 is exemplified as the terminal. However, the present invention can be applied to all the terminals including a connecting portion to be connected to a conductive member, a wire barrel to be crimped onto the end of a core wire exposed beyond the end of an insulating coating, and a bridging portion connecting the wire barrel and the connecting portion to each other, such as a male terminal provided with a connecting portion having a male tab, an LA terminal provided with an annular connecting portion, and a splice terminal provided with a connecting portion serving as a wire barrel to be crimped onto the core wire of another electric wire.

Means for Solving the Problem

The technique disclosed in this description relates to an electric wire with terminal including: an electric wire obtained by covering an outer periphery of a core wire with an insulating coating; and a terminal connected to an end of the electric wire. The terminal has a connecting portion to be connected to a conductive member, a wire barrel crimped onto an end of the core wire exposed beyond an end of the insulating coating, and a bridging portion connecting the wire barrel and the connecting portion to each other. The bridging portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating. The water blocking wall is integrally provided with an abutment portion against which a tip of the core wire abuts before crimping. The abutment portion is provided behind the water blocking wall at a position distant from a back surface of the water blocking wall opposed to the tip of the core wire and is displaced or damaged to allow the tip of the core wire to move forward, and a distance between the abutment portion and the back surface of the water blocking wall is set such that, when the core wire is stretched in a state where the tip of the core wire abuts against the abutment portion, the tip of the core wire does not apply a pressing force to the back surface of the water blocking wall or the tip of the core wire does not reach the back surface of the water blocking wall.

Further, the technique disclosed in this description relates to a terminal to be connected to an end of an electric wire obtained by covering an outer periphery of a core wire with an insulating coating, the terminal including: a connecting portion to be connected to a conductive member; a wire barrel to be crimped onto an end of the core wire exposed beyond an end of the insulating coating; and a bridging portion connecting the wire barrel and the connecting portion to each other. The bridging portion is provided with a water blocking wall obtained by molding a synthetic resin. In a state where the wire barrel is crimped onto the core wire, a tubular water blocking coating extending from the water blocking wall to the end of the insulating coating can be fitted so as to cover the core wire. The water blocking wall is integrally provided with an abutment portion against which a tip of the core wire abuts before crimping. The abutment portion is provided behind the water blocking wall at a position distant from a back surface of the water blocking wall opposed to the tip of the core wire and is displaced or damaged to allow the tip of the core wire to move forward, and a distance between the abutment portion and the back surface of the water blocking wall is set such that, when the core wire is stretched in a state where the tip of the core wire abuts against the abutment portion, the tip of the core wire does not apply a pressing force to the back surface of the water blocking wall or the tip of the core wire does not reach the back surface of the water blocking wall.

According to the technique disclosed in this description, the bridging portion connecting the connecting portion and the wire barrel to each other is provided with the water blocking wall obtained by molding a synthetic resin, which makes it possible to prevent the entry of water through the outer surface of the bridging portion. Further, the open end of the insulating coating is in close contact with the outer surface of the water blocking wall, which makes it possible to prevent the entry of water from between the water blocking wall and the water blocking coating. Therefore, a region extending from the water blocking wall to the end of the insulating coating is made waterproof by the water blocking coating, which makes it possible to prevent the adhesion of water to the core wire and the wire barrel.

Here, when the wire barrel of the terminal is crimped onto the end of the core wire of the electric wire, the core wire tends to stretch in the direction of axis. Therefore, it is considered that the core wire significantly stretches depending on conditions such as the material or diameter of the core wire and crimp force. Therefore, when the end of the core wire set on the bottom of the wire barrel for crimping is close to the water blocking wall by excessively pushing the core wire forward, there is a fear that, when the core wire is stretched by crimping the wire barrel onto the core wire, the tip of the core wire is pressed against the water blocking wall and causes damage to the water blocking wall or the tip of the core wire comes into contact with the outer periphery of the water blocking wall. In this case, when the water blocking coating is fitted, the open end of the water blocking coating cannot reliably come into close contact with the outer surface of the water blocking wall, and therefore there is a fear that the entry of water occurs.

However, according to the technique disclosed in this description, the abutment portion is integrally provided with the water blocking wall. The abutment portion is provided on the back surface side of the water blocking wall at a predetermined distance away from the back surface of the water blocking wall. The abutment portion is designed to be displaced or damaged to allow the tip of the core wire to move forward, and the distance between the abutment portion and the back surface of the water blocking wall is set such that, when the core wire is stretched in a state where the tip of the core wire abuts against the abutment portion, the tip of the core wire does not apply a pressing force to the back surface of the water blocking wall or the tip of the core wire does not reach the back surface of the water blocking wall.

Therefore, when the end of the core wire is set on the wire barrel for crimping, the tip of the core wire is set so as to abut against the abutment portion to a maximum extent. When the end of the core wire is stretched by crimping, the tip of the core wire displaces or damages the abutment portion and comes close to the water blocking wall. However, as described above, the distance between the abutment portion and the water blocking wall is set to a predetermined value, and therefore the tip of the core wire does not apply a pressing force to the back surface of the water blocking wall or the tip of the core wire does not reach the back surface of the water blocking wall, which makes it possible to avoid damage to the water blocking wall or to avoid the tip of the core wire from coming into contact with the outer periphery of the water blocking wall. As a result, when the water blocking coating is fitted, the open end of the water blocking coating can be reliably brought into close contact with the outer surface of the water blocking wall, and therefore the water blocking coating can more reliably exhibit its waterproof function.

Other aspects of the electric wire with terminal and the terminal are as follows.

(1) The abutment portion may be an abutment plate provided at the tip of an elastically-compressible connecting portion projecting from the back surface of the water blocking wall. The abutment plate is displaced forward by elastic compression of the connecting portion to allow the tip of the core wire to move forward, and the distance between the abutment portion and the back surface of the water blocking wall is set such that, when the core wire is stretched in a state where the tip of the core wire abuts against the abutment plate, the tip of the core wire does not apply a pressing force to the back surface of the water blocking wall.

When the end of the core wire is set on the wire barrel, the core wire is stopped at its front-limit position by abutting the tip of the core wire against the abutment plate. When the end of the core wire is stretched by crimping, the tip of the core wire pushes the abutment plate and comes close to the water blocking wall while the connecting portion is elastically compressed, but a pressing force is not applied to the water blocking wall by the tip of the core wire.

(2) The abutment portion may be a thin film provided at the end of a surrounding wall projecting from the peripheral edge of the back surface of the water blocking wall. The thin film is damaged to allow the tip of the core wire to enter the inside of the surrounding wall, and the distance between the thin film and the back surface of the water blocking wall is set such that, when the core wire is stretched in a state where the tip of the core wire abuts against the thin film, the tip of the core wire does not reach the back surface of the water blocking wall.

When the core wire is set, the core wire is stopped at its front-limit position by abutting the tip of the core wire against the thin film. When the core wire is stretched by crimping, the tip of the core wire enters the inside of the surrounding wall by breaking the thin film and comes close to the water blocking wall, but does not reach the water blocking wall.

(3) The abutment portion may be a protrusion provided along a circumferential direction on the inner surface of a surrounding wall projecting from the peripheral edge of the back surface of the water blocking wall. The protrusion is damaged to allow the tip of the core wire to enter the inside of the surrounding wall, and the distance between the protrusion and the back surface of the water blocking wall is set such that, when the core wire is stretched in a state where the tip of the core wire abuts against the protrusion, the tip of the core wire does not reach the back surface of the water blocking wall.

When the core wire is set, the core wire is stopped at its front-limit position by abutting the tip of the core wire against the protrusion. When the core wire is stretched by crimping, the tip of the core wire enters the inside of the surrounding wall by breaking the protrusion and comes close to the water blocking wall, but does not reach the water blocking wall.

(4) The water blocking wall may be provided so as to surround the entire outer periphery of the bridging portion. The water blocking wall can come into close contact with the entire inner periphery of the open end of the water blocking coating, which makes it possible to further improve waterproofness.

Other embodiments of the electric wire with terminal are as follows.

(5) A metal constituting the core wire and a metal constituting the terminal may be different from each other.

When a metal constituting the core wire and a metal constituting the terminal are different from each other, there is a fear that when water adheres to both the core wire and the wire barrel, electrolytic corrosion occurs in the core wire or the wire barrel. However, according to the above embodiments, the core wire and the wire barrel are reliably made waterproof by the water blocking coating, which makes it possible to inhibit the core wire or the wire barrel from being dissolved by electrolytic corrosion. Therefore, the above embodiments are particularly preferred when a metal constituting the core wire and a metal constituting the terminal are different from each other.

(6) The core wire may be made of aluminum or an aluminum alloy.

Aluminum or an aluminum alloy has a relatively low specific gravity, which makes it possible to reduce the weight of the electric wire. On the other hand, aluminum or an aluminum alloy has a relatively high ionization tendency, and is therefore easily dissolved when electrolytic corrosion occurs. However, according to the above embodiments, the core wire and the wire barrel are reliably made waterproof by the water blocking coating. Therefore, the above embodiments are particularly effective when the core wire is made of aluminum or an aluminum alloy.

(7) The water blocking coating may have an adhesive or pressure-sensitive adhesive layer provided on the inner periphery thereof. This makes it possible to bring the inner surface of the water blocking coating into close contact with a region extending from the water blocking wall to the end of the insulating coating without any gap.

(8) The water blocking coating may be a heat-shrinkable tube.

The inner diameter of the heat-shrinkable tube is relatively large before heating, and therefore a region extending from the water blocking wall to the end of the insulating coating can be easily covered with the heat-shrinkable tube. Then, by thermally shrinking the heat-shrinkable tube, the inner surface of the heat-shrinkable tube can be brought into close contact with the water blocking wall and the end of the insulating coating. As described above, the use of the heat-shrinkable tube as the water blocking coating makes it possible to improve the work efficiency of the step of externally surrounding the region extending from the water blocking wall to the end of the insulating coating with the water blocking coating.

(9) The water blocking coating may be an elastic tube having rubber elasticity.

In this case, a region extending from the water blocking wall to the end of the insulating coating is externally surrounded with the elastic tube expanded in this radial direction, and then the elastic tube is allowed to recover its original shape. As a result, the inner surface of the elastic tube comes into close contact with the water blocking wall and the end of the insulating coating. Therefore, the region extending from the water blocking wall to the end of the insulating coating can be covered with the elastic tube, that is, with the water blocking coating by a simple process.

(Effects)

According to the technique disclosed in this description, damage to the water blocking wall or contact of the core wire with the outer periphery of the water blocking wall, which results from the elongation of the core wire, can be prevented and the open end of the water blocking coating can be properly brought into contact with the outer surface of the water blocking wall, which makes it possible to reliably prevent the adhesion of water to the core wire and the wire barrel.

<Embodiment 4-1>

As a conventional electric wire with terminal, one disclosed in JP 2000-285983 A is known. This electric wire with terminal includes: an electric wire obtained by covering the outer periphery of a core wire with an insulating coating; and a terminal connected to an exposed portion of the core wire not covered with the insulating coating. The terminal has a flat plate-shaped board portion on which the core wire is placed and a wire barrel that projects from the board portion and is crimped onto the core wire.

A region extending from the board portion to the end of the insulating coating is covered with a heat-shrinkable tube. One of the ends of the heat-shrinkable tube covers the core wire onto which the wire barrel is crimped and the other end is in close contact with the insulating coating.

However, in the case of the above-described structure, the board portion has a flat plate shape, and therefore there is a fear that a gap is left between the one of the ends of the heat-shrinkable tube and the board portion.

This causes a fear that water enters the inside of the heat-shrinkable tube through the gap and then comes into contact with the core wire and the wire barrel. This further causes a fear that a problem such as oxidation of the surface of the core wire or the wire barrel occurs.

Under the above circumstances, the technique disclosed in this description has been completed to provide an electric wire with terminal and a terminal excellent in waterproofness.

An electric wire with terminal 410 according to an embodiment 4-1 of the present invention will be described with reference to FIGS. 39 to 43. The electric wire with terminal 410 according to this embodiment includes an electric wire 411 and a female terminal 412 (one example of the terminal 12) connected to the end of the electric wire 411.

(Electric Wire 411)

The electric wire 411 includes one core wire 413 obtained by twisting a plurality of thin metallic wires and an insulating coating 414 made of a synthetic resin and covering the outer periphery of the core wire 413. The core wire 413 is made of any metal, such as copper, a copper alloy, aluminum, or an aluminum alloy, as appropriate. In this embodiment, aluminum or an aluminum alloy is used. The insulating coating 914 is stripped off at the end of the electric wire 411 to expose the core wire 413. It is to be noted that the core wire 413 may be a single core wire.

(Female Terminal 412)

The female terminal 412 is formed by pressing a metallic plate material into a predetermined shape. As a metal constituting the female terminal 412, any metal, such as copper or a copper alloy, may be used as appropriate. Further, the metallic plate material has a plated layer (not shown) provided on the surface thereof. As a metal constituting the plated layer, any metal such as tin or nickel may be used as appropriate. In this embodiment, a tin plated layer is provided on the surface made of copper or a copper alloy. It is to be noted that the metallic plate material may have a structure in which a plated layer is not provided on the surface thereof.

The female terminal 412 includes a bottom plate 415 on which the insulating coating 414 of the electric wire 411 and the core wire 413 are placed. The bottom plate 415 has a pair of insulation barrels 416 projecting from the side edges thereof. The insulation barrels 416 are crimped onto the insulating coating 414 to externally hold the insulating coating 414 in a state where the insulating coating 414 of the electric wire 411 and the core wire 413 are placed on the bottom plate 415.

The bottom plate 415 has a pair of wire barrels 417 projecting from the side edges thereof at positions closer to the end of the core wire 413 than the insulation barrels 416. The wire barrels 417 are crimped onto the core wire 413 to externally hold the core wire 413 in a state where the insulating coating 414 of the electric wire 411 and the core wire 413 are placed on the bottom plate 415.

Figure 42:
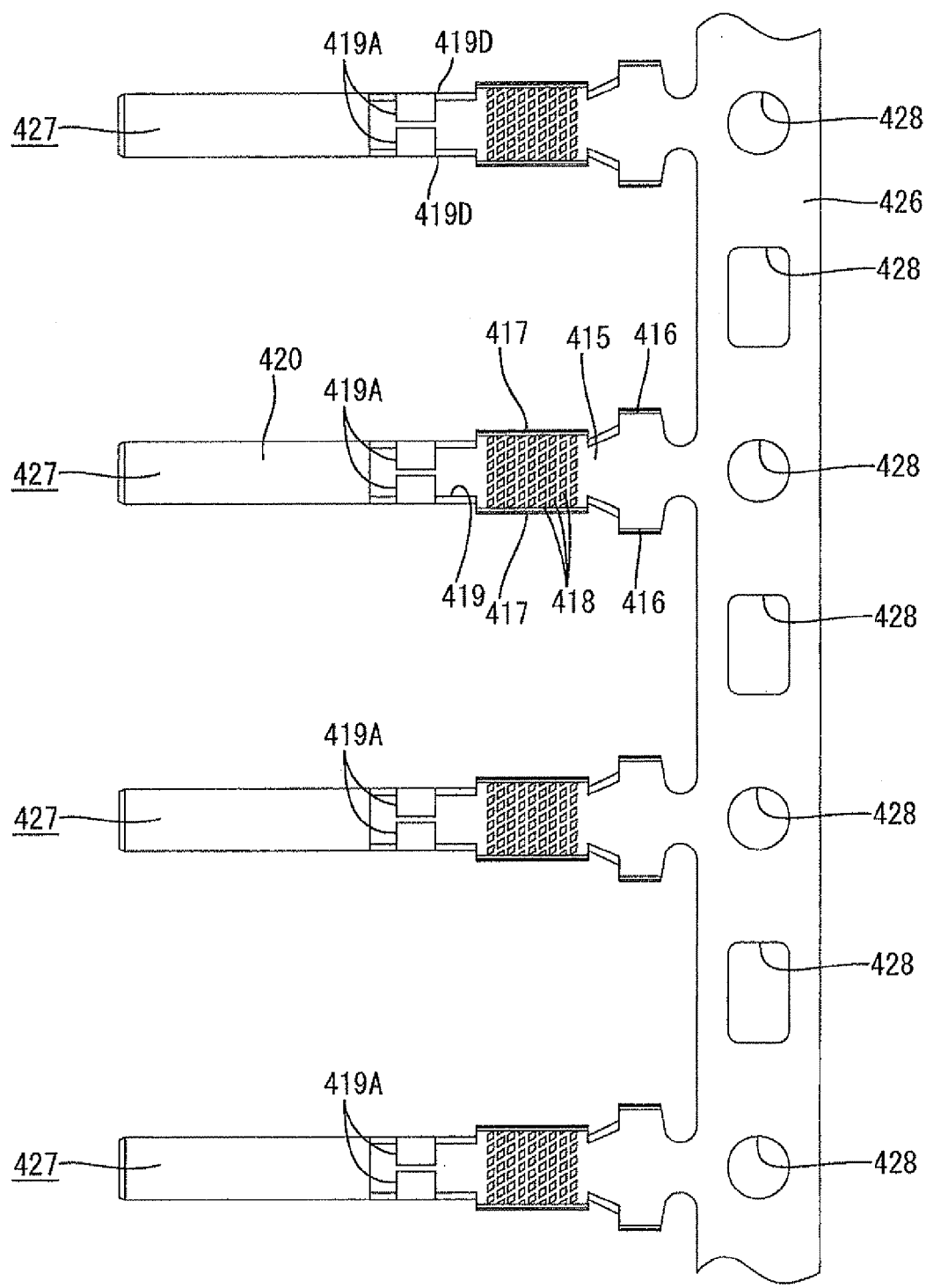
FIG. 42 is a plan view showing a state where a bending step is completed.
Figure 43:
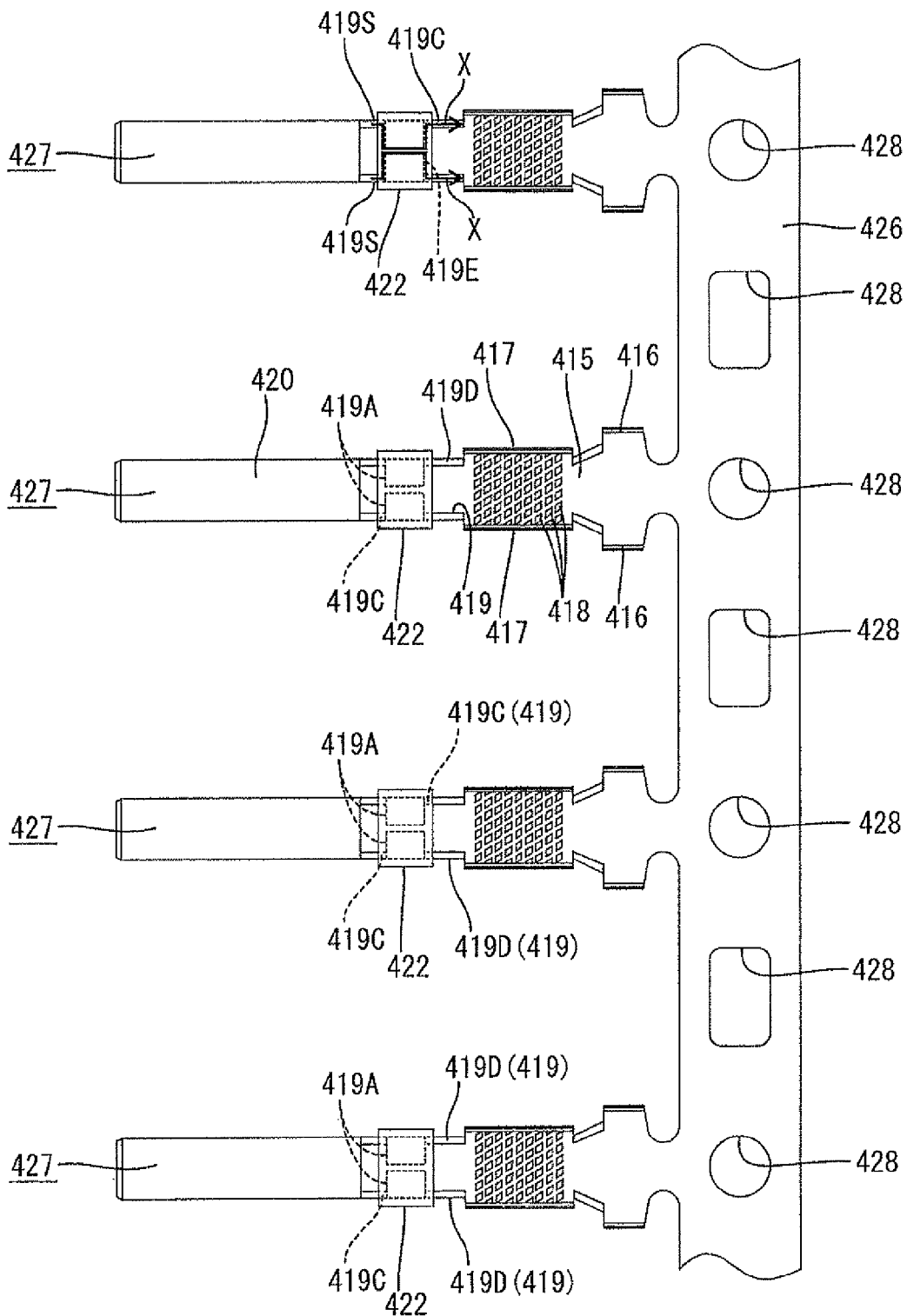
FIG. 43 is a plan view showing a state where a molding step is completed.

As shown in FIG. 42, part of the bottom plate 415 located between the wire barrels 417 and the wire barrels 417 have a plurality of recesses 418 formed in their surfaces on which the core wire 413 is placed. Each of the recesses 418 is almost quadrangular and more specifically almost parallelogrammatic. Each of the recesses 418 has a pair of first sides substantially orthogonal to a direction in which the core wire 413 extends (i.e., a right-left direction in FIG. 42) and a pair of second sides intersecting with the direction in which the core wire 413 extends at an angle smaller than 90°. The recesses 418 are arranged such that the first sides of the adjacent recesses 418 are in alignment with each other and the second sides of the adjacent recesses 418 are also in alignment with each other. Therefore, a die (not shown) for use in forming the recesses 418 by pressing can be produced by forming a plurality of grooves, which makes it possible to reduce production cost. The first sides of the recesses 418 adjacent to each other in the direction in which the core wire 413 extends overlap one another in the direction in which the core wire 413 extends, which makes it possible to improve the strength of fixation of the wire barrels 417 to the core wire 413. Further, the rims of openings of the recesses 418 are in sliding contact with the surface of the core wire 413, and therefore the area of contact between the rims of openings of the recesses 418 and the core wire 413 is increased, which as a result makes it possible to reduce the value of electrical resistance between the female terminal 412 and the core wire 413.

An extending portion 419 is provided so as to further extend from the bottom plate 415 in the direction in which the core wire 413 extends. The extending portion 419 is bent such that its surface on the side where the core wire 413 is placed has a concave shape. The extending portion 419 has a substantially U-shaped cross-section, and therefore its upper end is open. It is to be noted that the cross-sectional shape of the extending portion 419 may be, for example, a semicircular shape, and the extending portion 419 may have any shape, such as a flat plate shape, as appropriate.

A rectangular projection 419A is provided so as to project from each of both edges 419D and 419D in the width direction of the extending portion 419 (in an up-down direction in FIG. 42). Each of the projections 419A and 419A is bent in an inward direction (i.e. in a direction toward the center axis of the terminal 412).

A tubular connecting portion 420 is provided so as to further extend from the extending portion 419 in the direction in which the core wire 413 extends. The tubular connecting portion 420 has a tubular shape and is configured to connect to a mating terminal not shown. An elastic contact piece 421 is provided in the tubular connecting portion 420. The elastic contact piece 421 is to be brought into elastic contact with a mating terminal.

(Water Blocking Wall 422)

The extending portion 419 is provided with a water blocking wall 422 obtained by molding a synthetic resin material. As the synthetic resin material constituting the water blocking wall 422, any synthetic resin material, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

The water blocking wall 422 is provided so as to surround the entire outer periphery of the extending portion 419, and the projections 419A and 419A provided at both the edges 419D and 419D of the extending portion 419 are accommodated in the water blocking wall 422 in a state where they are bent in the inward direction. The inside of the extending portion 419 is filled with the synthetic resin constituting the water blocking wall 422. In this embodiment, the water blocking wall 422 has a substantially quadrangular cross-section with rounded corners.

(Resin Ring 423)

A resin ring 423 made of a synthetic resin is fitted onto the end of the electric wire 411. More specifically, the resin ring 423 having a circular cross-section is fitted onto the end of the insulating coating 414 at a position behind a portion where the insulation barrels 416 are crimped (i.e., at a position on the opposite side of the insulation barrels 416 from the exposed core wire 413). The inner diameter of the resin ring 423 is set to be substantially the same as the outer diameter of the insulating coating 414. This makes it possible to easily fit the resin ring 423 onto the end of the electric wire 411. It is to be noted that the term "substantially the same" includes a case where the inner diameter of the resin ring 423 is the same as the outer diameter of the insulating coating 414, a case where the inner diameter of the resin ring 423 is slightly larger than the outer diameter of the insulating coating 414, and a case where the inner diameter of the resin ring 423 is slightly smaller than the outer diameter of the insulating coating 414.

As the synthetic resin constituting the resin ring 423, any synthetic resin, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

(Water Blocking Coating 425)

A water blocking coating 425 made of a synthetic resin covers a region extending from part of the extending portion 419 where the water blocking wall 422 is provided to the insulating coating 414 beyond the resin ring 423 through the wire barrels 417, the insulation barrels 416, and the resin ring 423 fitted onto the insulating coating 414. In this embodiment, the water blocking coating 425 is composed of a heat-shrinkable tube 424. In this embodiment, an adhesive or pressure-sensitive adhesive layer (not shown) is provided on the inner surface of the heat-shrinkable tube 424. The adhesive or pressure-sensitive adhesive layer is designed to develop adhesiveness or tackiness by thermal softening or melting. It is to be noted that the heat-shrinkable tube 424 may have a structure in which an adhesive or pressure-sensitive adhesive layer is not provided on the inner surface thereof. The length of the heat-shrinkable tube 424 is set longer than that of a region extending from the water blocking wall 422 to the resin ring 423.

In a state where the heat-shrinkable tube 424 is thermally shrunk, the inner surface of the heat-shrinkable tube 424 is in close contact with the entire outer periphery of the water blocking wall 422 without any gap. Further, the inner surface of the heat-shrinkable tube 424 is in close contact with the entire outer periphery of the resin ring 423 without any gap.

The synthetic resin constituting the water blocking wall 422 may be one that develops adhesiveness by thermal softening or melting. In this case, the inner surface of the heat-shrinkable tube 424 can be adhered to the water blocking wall 422 by softening or melting the water blocking wall 422 in the step of heating the heat-shrinkable tube 424.

The synthetic resin constituting the resin ring 423 may be one that develops adhesiveness by thermal softening or melting. In this case, the inner surface of the heat-Shrinkable tube 424 can be adhered to the resin ring 423 by softening or melting the resin ring 423 in the step of heating the heat-shrinkable tube 424. Further, by forming the resin ring 423 using such a synthetic resin as described above, it is possible to adhere the resin ring 423 to the outer periphery of the insulating coating 414.

(Production Process)

Hereinbelow, one example of a production process of the electric wire with terminal 410 according to this embodiment will be described. First, a metallic plate material is subjected to a punching step to form a strip-shaped carrier 426 and a plurality of terminal strips 427 connected to the side edge of the carrier 426. The carrier 426 has feed holes 428 arranged at substantially regular intervals along the longitudinal direction thereof. The feed holes 428 are configured to be engaged with feed claws (not shown) of a processing machine.

The terminal strips 427 connected to the carrier 426 are arranged at substantially regular intervals along the longitudinal direction of the carrier 426. Each of the terminal strips 427 includes a bottom plate 415 on which an insulating coating 414 of an electric wire 411 and a core wire 413 are to be placed, insulation barrels 416 that project from the bottom plate 415 and are to be crimped onto the insulating coating 414, and wire barrels 417 that project from the bottom plate 415 and are to be crimped onto the core wire 413.

In the punching step, a plurality of recesses 418 may be formed in the surfaces of the wire barrels 417 on which the wire core 413 is to be placed. Alternatively, the recesses 418 may be formed in a step other than the punching step.

The metallic plate material that has been subjected to the punching step is then subjected to a bending step. By performing the bending step, an extending portion 419 and a tubular connecting portion 420 are formed (see FIG. 42). The extending portion 419 extends in a direction in which the core wire 413 extends in a state where the core wire 413 is placed on the bottom plate 415 and has a concave-shaped surface on the side where the core wire 413 is to be placed. The tubular connecting portion 420 extends from the extending portion 419 in a direction corresponding to the direction in which the core wire 413 extends.

When the bending step is performed, the extending portion 420 is formed into a box shape by bending projections 419A and 419A projecting from both widthwise edges 419D and 419D of the extending portion 419, respectively, in an inward direction (i.e., in a direction toward the center axis of the terminal strip 427).

Then, a synthetic resin is molded in the extending portion 419 of each of the terminal strips 427 while the terminal strips 427 are fed one after another by engaging the feed holes 428 formed in the carrier 426 with the feed claws. More specifically, first, part of the extending portion 419 where a water blocking wall 422 should be formed is sandwiched between a pair of dies (not shown). Then, a synthetic resin in a molten state is injected into a cavity formed by the dies. After the synthetic resin is solidified in the dies, the pair of dies is opened to separate the terminal strip 427 provided with the water blocking wall 422 from the dies. The above step is continuously performed on the terminal strips 427 connected to the carrier 426 at substantially regular intervals (see FIG. 43).

On the other hand, the insulating coating 414 of the electric wire 411 is stripped off to expose the core wire 413. Then, a resin ring 423 is fitted onto the end of the insulating coating 414. The resin ring 423 is fitted onto part of the insulating coating 414 different from part of the insulating coating 414 onto which the insulation barrels 416 are to be crimped (i.e., onto part of the insulating coating 414 located on the side opposite to the core wire 413).

Then, a crimping step is performed on each of the terminal strips 427. More specifically, the exposed core wire 413 of the electric wire 411 and the insulating coating 414 are placed on the bottom plate 415 of each of the terminal strips 427. Then, the insulation barrels 416 and the wire barrels 417 are bent using a die (not shown) to externally hold the insulating coating 414 and the core wire 413, respectively. This makes it possible to crimp the insulation barrels 416 onto the insulating coating 414 and to crimp the wire barrels 417 onto the core wire 413.

In this embodiment, a cutting step to cut each of the terminal strips 427 from the carrier 426 is performed at the same time as the above-described crimping step. This makes it possible to cut each of the terminal strips 427 from the carrier 426 as a female terminal 412 and to provide an electric wire with terminal 410 in which the female terminal 412 is connected to the electric wire 411.

Then, a covering step is performed. More specifically, a heat-shrinkable tube 424 is passed through from the electric wire 411 side or the female terminal 412 side such that the heat-shrinkable tube 424 covers a region extending from the water blocking wall 422 to the insulating coating 414 beyond the resin ring 423. The electric wire with terminal 410 can be relatively easily passed through the heat shrinkable tube 424 from the female terminal 412 side by setting the inner diameter of the heat-shrinkable tube 424 before heating larger than the outer shape of the tubular connecting portion 420. When the electric wire with terminal 410 is passed through the heat-shrinkable tube 424 from the electric wire 411 side, the electric wire 411 may be passed through the heat-shrinkable tube 424 in advance before the crimping step is performed.

After the electric wire with terminal 410 is passed through the heat-shrinkable tube 424, the heat-shrinkable tube 924 is shrunk by performing a heating step using a heating device not shown. This makes it possible to bring the inner surface of the heat-shrinkable tube 424 into close contact with the water blocking wall 422 and the resin ring 423 without any gap. In such a way as described above, the electric wire with terminal 410 is completed.

It is to be noted that in the above-described heating step, in a state where the tubular connecting portion 420 is placed upward, the synthetic resin constituting the water blocking wall 422 can be prevented from flowing into the tubular connecting portion 420 even when the water blocking wall 422 is melted in the heating step. This makes it possible to improve the reliability of electrical connection with a mating terminal in the tubular connecting portion 420.

(Functions and Effects)

Hereinbelow, the functions and effects of this embodiment will be described. According to this embodiment, the extending portion 419 is provided with the water blocking wall 422, which makes it possible to inhibit the entry of water through the extending portion 419 to inhibit the adhesion of water to the core wire 413 and the wire barrels 417. Further, the entire outer periphery of the water blocking wall 422 is in close contact with the inner surface of the heat-shrinkable tube 424 without any gap, which makes it possible to inhibit the entry of water from between the water blocking wall 422 and the heat-shrinkable tube 424. Therefore, a region extending from part of the extending portion 419 where the water blocking wall 422 is provided to the insulating coating 414 beyond the resin ring 423 through the wire barrels 417, the insulation barrels 416, and the resin ring 423 fitted onto the insulating coating 414 is made waterproof by the heat-shrinkable tube 424, which makes it possible to reliably inhibit the adhesion of water to the core wire 413 and the wire barrels 417.

Further, according to this embodiment, the resin ring 423 is fitted onto the end of the insulating coating 414 and the inner surface of the heat-shrinkable tube 424 is in close contact with the entire periphery of the resin ring 423. This makes it possible to reliably inhibit the entry of water from the end side of the insulating coating 414 and therefore to more reliably inhibit the adhesion of water to the core wire 413 and the wire barrels 417.

According to this embodiment, as described above, since the water blocking wall 422 and the heat-shrinkable tube 424 are provided, the entry of water through the extending portion 419 is inhibited. However, there is a case where water enters through a gap between the water blocking wall 422 and a tubular connecting portion 420-side end 419S (i.e., an end opposite to a wire barrel 417-side end) of the extending portion 419 and adheres to the extending portion 419.

Here, since the female terminal 412 of this embodiment is formed through the punching step in which a plated metallic plate material is punched into a predetermined shape, the end surface of the female terminal 412 is not plated and is therefore more likely to be oxidized (corroded) than other portions. Therefore, when water enters through a gap between the extending portion 419 and the water blocking wall 422 and adheres to the extending portion 419, as shown by an arrow X in FIG. 43, corrosion progresses along an edge surface 419C of the extending portion 419.

However, according to this embodiment, since the projections 419A are provided at the widthwise edges 419D of the extending portion 419, the length of the edge surface of the extending portion 419 is longer by the length of perimeter of the projections 419A than that of the extending portion 419 having no projections 419A. As a result, according to this embodiment, the length of a corrosion path is increased, which makes it possible to delay the start of corrosion of the wire barrels 417.

Particularly, according to this embodiment, since the projections 419A and 419A are provided at both the widthwise edges 419D and 419D of the extending portion 419, respectively, which makes it possible to increase the length of a corrosion path at both the edges 419D and 419D of the extending portion 419 and to enhance the strength of the extending portion 419.

Meanwhile, when the metal constituting the core wire 413 and the metal constituting the female terminal 412 are different from each other, there is a fear that when water adheres to both the core wire 413 and the wire barrels 417, electrolytic corrosion occurs in the core wire 413 or the wire barrels 417. According to this embodiment, the core wire 413 and the wire barrels 417 are reliably made waterproof by the heat-shrinkable tube 424, which makes it possible to inhibit the core wire 413 or the wire barrels 417 from being dissolved by electrolytic corrosion.

This is effective particularly when the core wire 413 is made of aluminum or an aluminum alloy and the female terminal 412 has a tin plated layer on its surface made of copper or a copper alloy as in the case of this embodiment, because there is a fear that the core wire 413 made of aluminum or an aluminum alloy having a relatively high ionization tendency is dissolved by electrolytic corrosion. It is to be noted that aluminum or an aluminum alloy has a relatively low specific gravity, which makes it possible to reduce the weight of the electric wire 411.

Further, according to this embodiment, the water blocking coating 425 is composed of the heat-shrinkable tube 424. The inner diameter of the heat-shrinkable tube 424 before heating is relatively large, which makes it easy for the heat-shrinkable tube 424 to externally surround the above-described region. Then, by thermally shrinking the heat-shrinkable tube 424, the inner surface of the heat-shrinkable tube 424 can be brought into close contact with the water blocking wall 922 and the end of the insulating coating 414 without any gap. As described above, the use of the heat-shrinkable tube 424 as the water blocking coating 425 makes it possible to improve the work efficiency of the step of externally surrounding the region extending from the water blocking wall 422 to the end of the insulating coating 414 with the heat-shrinkable tube 424.

Further, the heat-shrinkable tube 424 has an adhesive or pressure-sensitive adhesive layer provided on the inner surface thereof, and therefore by performing the heating step to shrink the heat-shrinkable tube 924, the inner surface of the heat-shrinkable tube 424 can be reliably brought into close contact with the water blocking wall 422 without any gap and the heat-shrinkable tube 424 can be reliably brought into close contact with the end of the insulating coating 419 without any gap.

As described above, the use of the heat-shrinkable tube 424 having an adhesive or pressure-sensitive adhesive layer provided on the inner surface thereof as the water blocking coating 425 makes it possible to improve the work efficiency of the step of externally surrounding the region extending from the water blocking wall 422 to the end of the insulating coating 414 with the heat-shrinkable tube 424 as well as to improve adhesion between the heat-shrinkable tube 424 and the water blocking wall 422 and adhesion between the heat-shrinkable tube 424 and the end of the insulating coating 414.

<Embodiment 4-2>

Hereinbelow, an embodiment 4-2 according to the present invention will be described with reference to FIGS. 44 to 49. This embodiment is different from the embodiment 4-1 in that rectangular apertures 419B and 419B are provided in the projections 419A and 419A provided at both the widthwise edges 419D and 419D of the extending portion 419, respectively. The structure of this embodiment is substantially the same as that of the embodiment 4-1 except for the above-described point, and the same components as the embodiment 4-1 are denoted by the same reference numerals and a description thereof will not be repeated.

Figure 44:
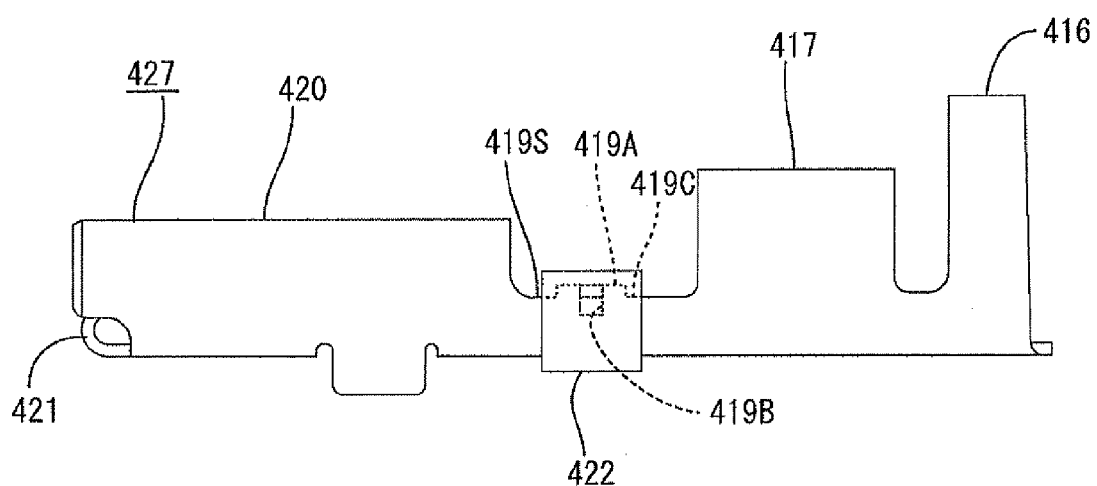
FIG. 44 is a side view showing a state where a molding step is completed in the process of producing an electric wire with terminal according to an embodiment 4-2.
Figure 45:
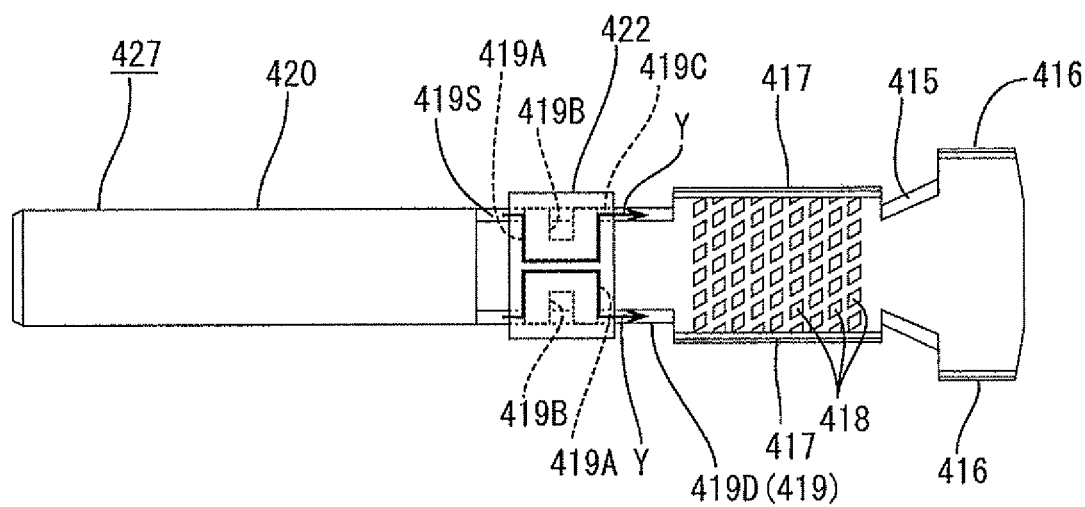
FIG. 45 is a plan view showing the state shown in FIG. 44.
Figure 46:
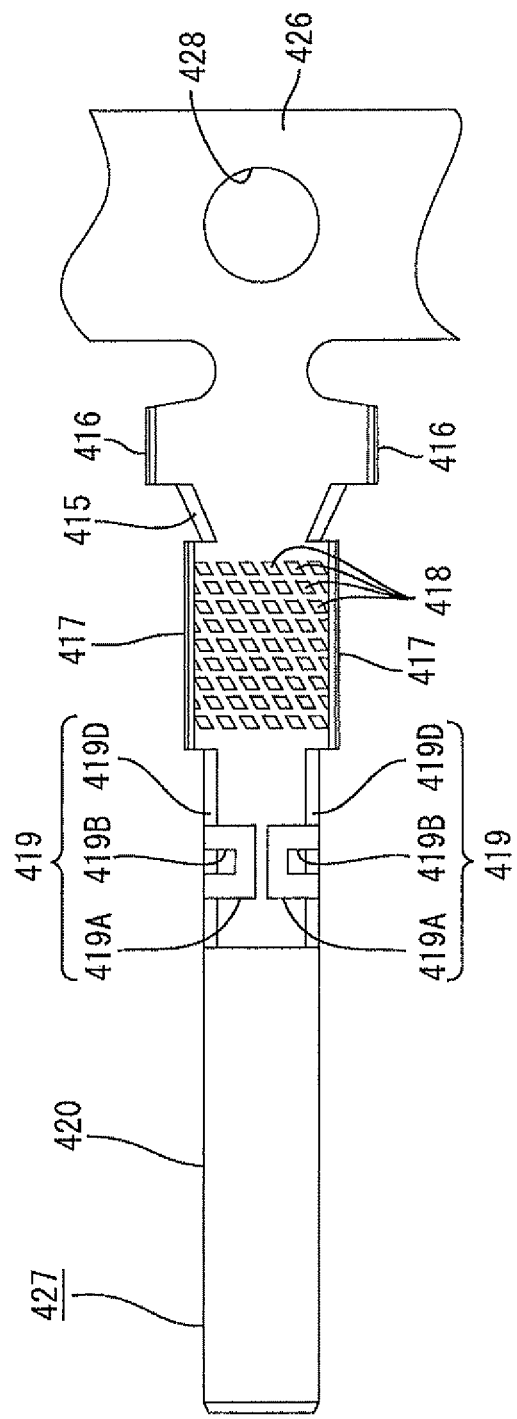
FIG. 46 is a plan view showing a state where a bending step is completed.
Figure 47:
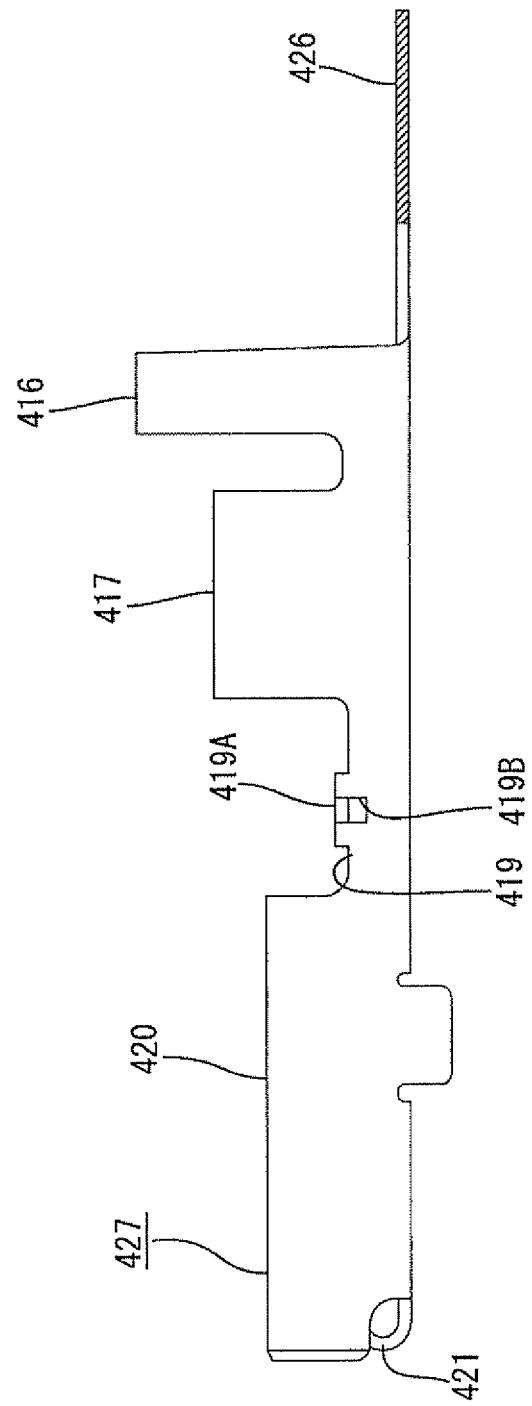
FIG. 47 is a side view showing the state shown in FIG. 46.

According to this embodiment, as shown in FIGS. 44 and 45, the water blocking wall 422 is provided so as to surround the entire outer periphery of the extending portion 419, and the projections 419A and 419A provided at both the edges 419D and 419D of the extending portion 419 are accommodated in the water blocking wall 422 in a state where they are bent in an inward direction. As shown in FIGS. 46 and 47, each of the projections 419A and 419A has a rectangular aperture 419B, 419B provided therein.

Hereinbelow, the functions and effects of this embodiment will be described.

According to this embodiment, as in the case of the embodiment 4-1, the extending portion 419 is provided with the projections 419A, and therefore the length of edge surface of the extending portion 419 is longer by the length of perimeter of the projections 419A than that of the extending portion 419 having no projections 419A. Therefore, also in this embodiment, the length of a corrosion path (shown by an arrow Y in FIG. 45) is increased, which makes it possible to delay the start of corrosion of the wire barrels 417.

Figure 48:
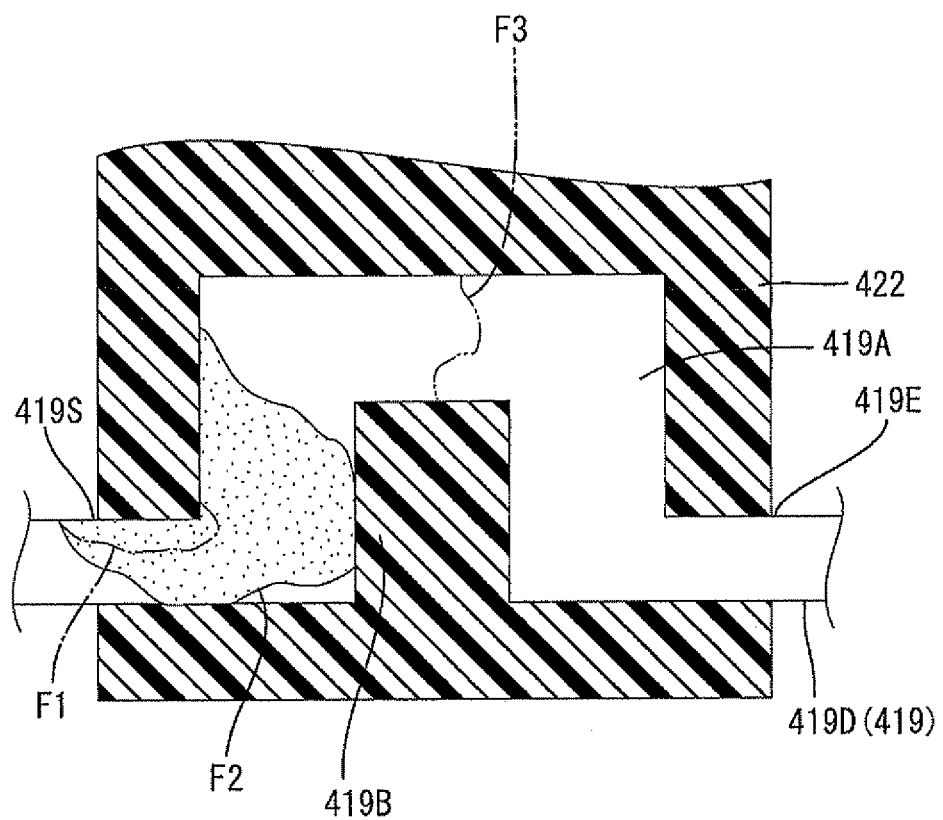
FIG. 48 is a schematic view schematically showing the state of corrosion in a projection of an extending portion.
Figure 49:
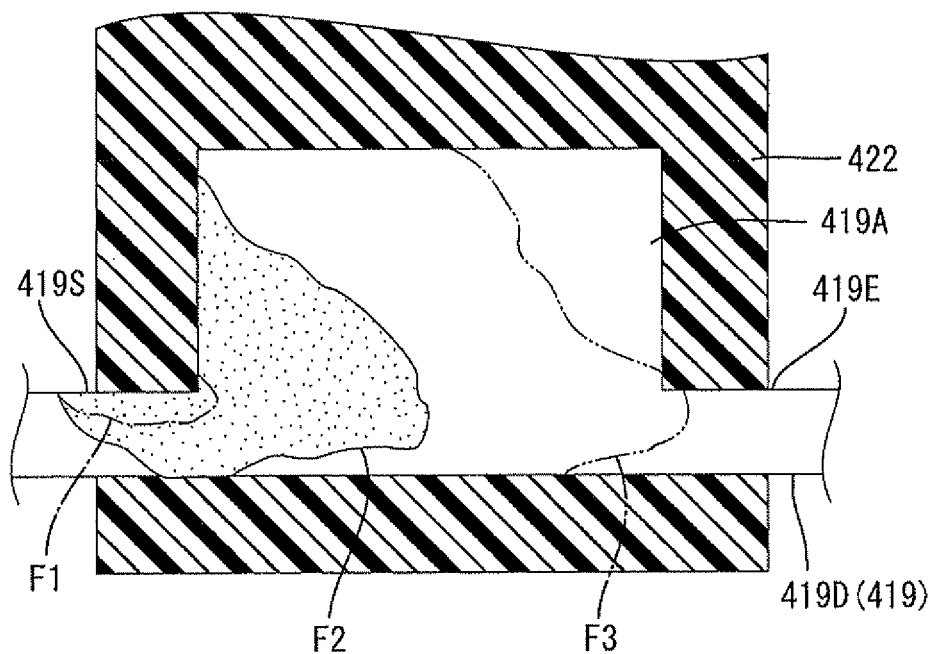
FIG. 49 is a schematic view schematically showing the state of corrosion in a projection having no aperture.

Meanwhile, the corrosion of the terminal 412 progresses not only along the edge surface of the terminal 412 but also toward the inside of the terminal 412. Here, the progression of corrosion in this embodiment (i.e., in the extending portion 419 provided with the projections 419A having the aperture 419S) and the progression of corrosion in the extending portion 419 provided with the projections 419A having no aperture 419B will be described by comparison between FIGS. 48 and 49. In FIGS. 48 and 49, lines F1, F2, and F3 indicate the extent of corrosion, and the lines denoted by the same symbol in both the drawings indicate the extent of corrosion after the passage of the same amount of time.

In this embodiment, as shown in FIG. 48, corrosion that progresses from the tubular connecting portion-side end 419S toward the inside of the extending portion 419 partially stops when reaching the aperture 419B (see F2 in FIG. 48). Thereafter, corrosion progresses upward in FIG. 48 while avoiding the aperture 419B (see F3), but does not easily reach a wire barrel 417-side end 419E of the extending portion 419.

On the other hand, in the case of the extending portion 419 provided with the projections 419A having no aperture 419B, there is no object that stops corrosion between the tubular connecting portion-side end 419S and the wire barrel 417-side end 419E of the extending portion 419. Therefore, as shown in FIG. 49, corrosion easily progresses even after reaching the line F2, and therefore extends close to the wire barrel 417-side end 419E.

According to this embodiment, as described above, the aperture 419B is provided in each of the projections 419A of the extending portion 419, which makes it possible to prevent corrosion from reaching the wire barrels 417.

<Embodiment 4-3>

Figure 50:
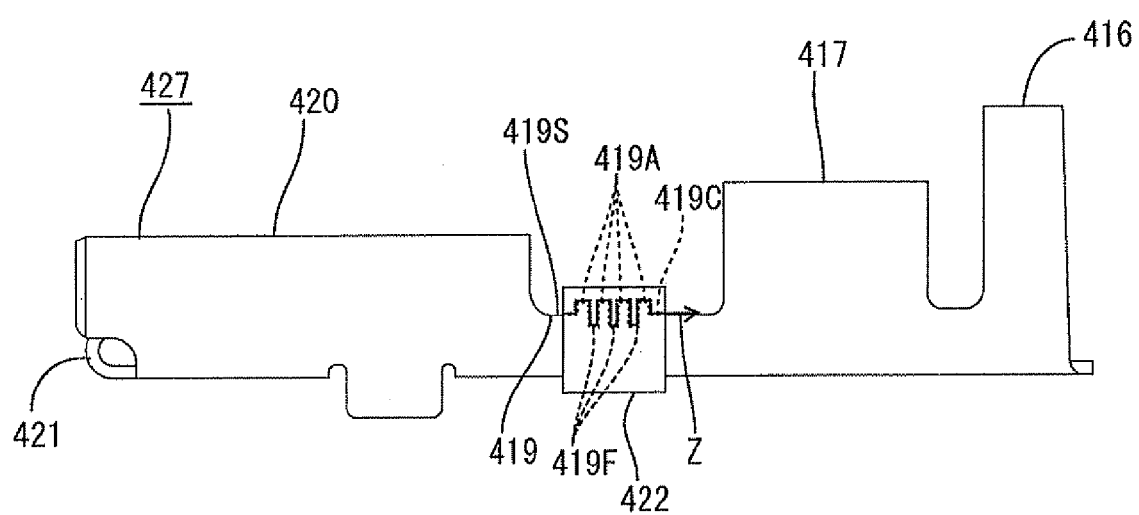
FIG. 50 is a side view showing a state where a molding step is completed in the process of producing an electric wire with terminal according to an embodiment 4-3.
Figure 51:
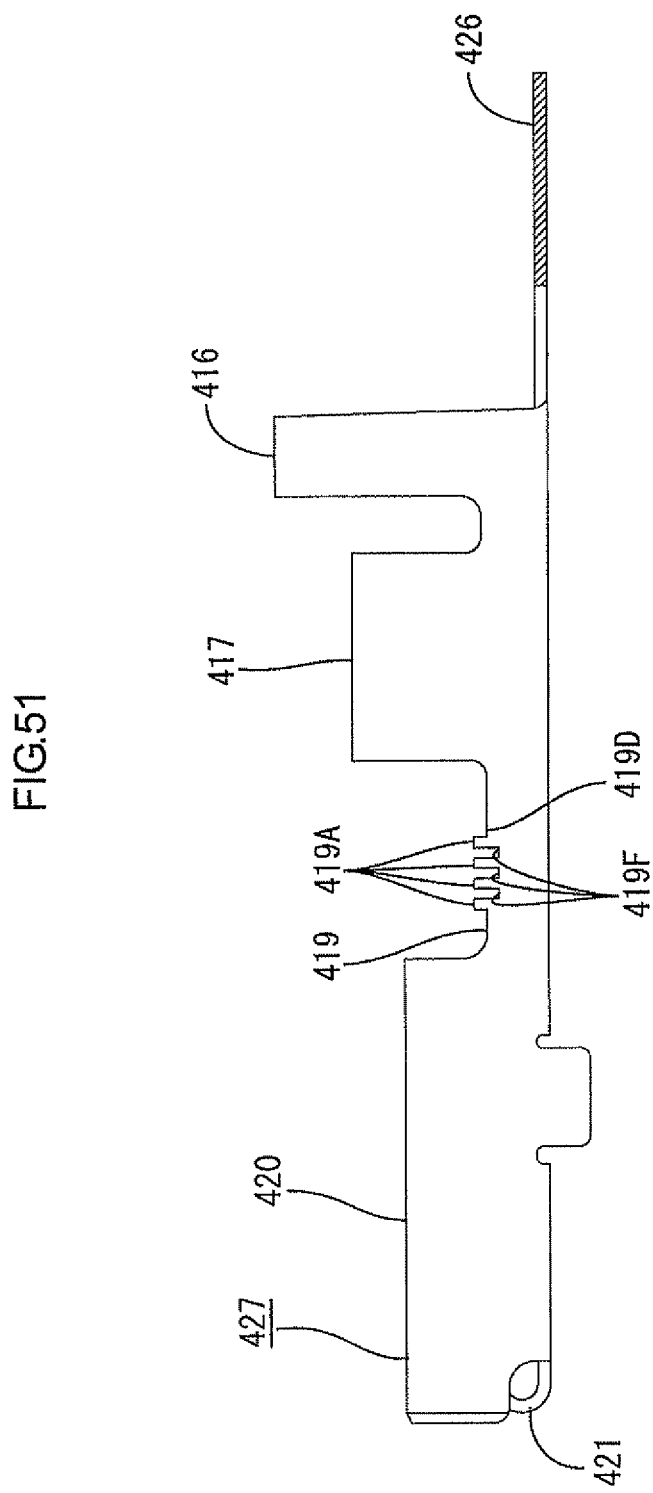
FIG. 51 is a side view showing a state where a bending step is completed.

Hereinbelow, an embodiment 4-3 according to the present invention will be described with reference to FIGS. 50 and 51. This embodiment is different from the embodiment 4-1 in that projections 419A and depressions 419F are alternately provided at both the widthwise edges 4190 and 4190 of the extending portion 419. The structure of this embodiment is substantially the same as that of the embodiment 4-1 except for the above-described point, and the same members as the embodiment 4-1 are denoted by the same reference numerals and a description thereof will not be repeated.

In this embodiment, projections 419A and depressions 419F are alternately provided at both the widthwise edges 419D and 419D of the extending portion 419. More specifically, four projections 419A are provided and a depression 419F (three in total) is provided between the projections 419A.

According to this embodiment, the projections 419A and the depressions 419F are alternately provided at each of both the widthwise edges 419D and 419D of the extending portion 419. Therefore, the length of edge surface of the projecting portion 419 is longer than that of the extending portion 919 having no projections 419A and no depressions 419F by the length of perimeter of the projections 419A and the depressions 419F. As a result, according to this embodiment, the length of a corrosion path (shown by an arrow Z in FIG. 50) is increased, which makes it possible to delay the start of corrosion of the wire barrels 417.

<Other Embodiment>

The present invention is not limited to the embodiments described above with reference to the drawings, and for example, the following embodiments are also included in the technical scope of the present invention.

(1) In the above embodiments, the terminal is the female terminal 412. However, the terminal is not limited thereto and may have any shape as appropriate. For example, the terminal may be a male terminal provided with a male tab further extending from the extending portion 419 in a direction in which the core wire 413 extends, a so-called LA terminal provided with a disk-shaped connecting portion connected to the extending portion 419 and having a through hole, and a splice terminal provided with another wire barrel 417 connected to the extending portion 419 to connect to the two or more electric wires 411.

(2) In the embodiment 4-1, the water blocking wall 422 has a substantially quadrangular cross-section. However, the cross-sectional shape of the water blocking wall 422 is not limited thereto. The water blocking wall 422 may have any cross-sectional shape, such as a circular shape, an elliptical shape, an oval shape, or a polygonal shape (e.g., a triangular shape), as appropriate.

(3) The water blocking coating 425 may be provided by wrapping a sheet-shaped water blocking tape around a region extending from the water blocking wall 422 to the end of the insulating coating 414.

(4) In the above embodiments, the step of forming the water blocking wall 422 is performed before the step of crimping the wire barrels 417 onto the core wire 413 is performed. However, the order in which these steps are performed is not limited thereto. For example, the step of forming the water blocking wall 422 may be performed after the step of crimping the wire barrels 417 onto the core wire 413 is performed.

(5) In the above embodiments, the core wire 413 is made of aluminum or an aluminum alloy. However, the material of the core wire 413 is not limited thereto, and the core wire 413 may be made of any metal as appropriate. For example, the core wire 413 may be made of copper or a copper alloy. Further, in the above embodiments, the terminal is made of copper or a copper alloy and has a tin plated layer on the surface thereof. However, the material of the terminal is not limited thereto, and the terminal may be made of any metal as appropriate.

It is to be noted that even when a non-plated metallic plate material is used as a material constituting the terminal, the effects of the present invention can be obtained because the end surface of the terminal is more likely to be corroded than other portions.

(6) In the above embodiments, the crimping step and the cutting step are performed at the same time. However, the order in which these steps are performed is not limited thereto. For example, the cutting step may be performed after the crimping step is performed.

(7) In the above embodiments, the terminal has the insulation barrels 416. However, the insulation barrels 416 may be omitted.

(8) The water blocking coating 425 may be configured to cover a region extending from part of the extending portion 419 where the water blocking wall 422 is provided to the resin ring 423 fitted onto the insulating coating 414 through the wire barrels 417 and the insulation barrels 416.

(9) In the above embodiments, the resin ring 423 has an annular shape. However, the shape of the resin ring 423 is not limited thereto. For example, the resin ring 423 may have a slit to have a substantially C-shaped cross section. This makes it easy to expand the resin ring 423 in its radial direction. Therefore, for example, the resin ring 423 can be fitted onto the electric wire 411 by expanding the resin ring 423 in its radial direction after the terminal is crimped onto the electric wire 411.

(10) In the above embodiments, at least one of the projection 419A and the depression 419F is provided at each of both the edges 419D and 419D of the extending portion 419. However, at least one of the projection 419A and the depression 419F may be provided at only one of the edges 419D.

(11) In the above embodiments, the heat-shrinkable tube 424 is used as the water blocking coating 425. However, an elastic tube may be used as the water blocking coating 425.

Means for Solving the Problem

The technique disclosed in this description to achieve the above object relates to an electric wire with terminal including: an electric wire obtained by covering an outer periphery of a core wire with an insulating coating; and a terminal connected to the electric wire. The terminal has a wire barrel crimped onto the core wire exposed beyond an end of the insulating coating and an extending portion extending from a bottom plate of the wire barrel. The extending portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating. At a widthwise edge of the extending portion, at least one of a projection projecting from the edge and a depression formed by depressing the edge is provided.

The technique disclosed in the specification relates to a terminal to be connected to an exposed portion of a core wire of an electric wire obtained by covering an outer periphery of the core wire with an insulating coating, the terminal including: a wire barrel to be crimped onto the core wire exposed beyond an end of the insulating coating; and an extending portion extending from a bottom plate of the wire barrel. The extending portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating. At a widthwise edge of the extending portion, at least one of a projection projecting from the edge and a depression formed by depressing the edge is provided.

According to the technique disclosed in this description, the extending portion is provided with the water blocking wall, which makes it possible to inhibit the entry of water through the extending portion. Further, the water blocking wall is in close contact with the inner surface of the water blocking coating, which also makes it possible to inhibit the entry of water from between the water blocking wall and the water blocking coating. Therefore, the region extending from the water blocking wall to the end of the insulating coating is made waterproof by the water blocking coating, which makes it possible to inhibit the adhesion of water to the core wire and the wire barrel. As a result, according to the present invention, it is possible to provide an electric wire with terminal and a terminal excellent in waterproofness.

As described above, waterproofness can be improved by providing the water blocking wall and the water blocking coating. However, there is a case where water enters through a gap between the water blocking wall and the end of the extending portion opposite to the wire barrel-side end of the extending portion and adheres to part of the extending portion. The terminal is often produced through the step of punching a plated metallic plate material into a predetermined shape, and therefore the edge surface of the terminal is not plated and is more likely to be oxidized (corroded) than other portions. Therefore, when water enters the extending portion, there is a fear that corrosion progresses along the edge surface.

Figure 5:
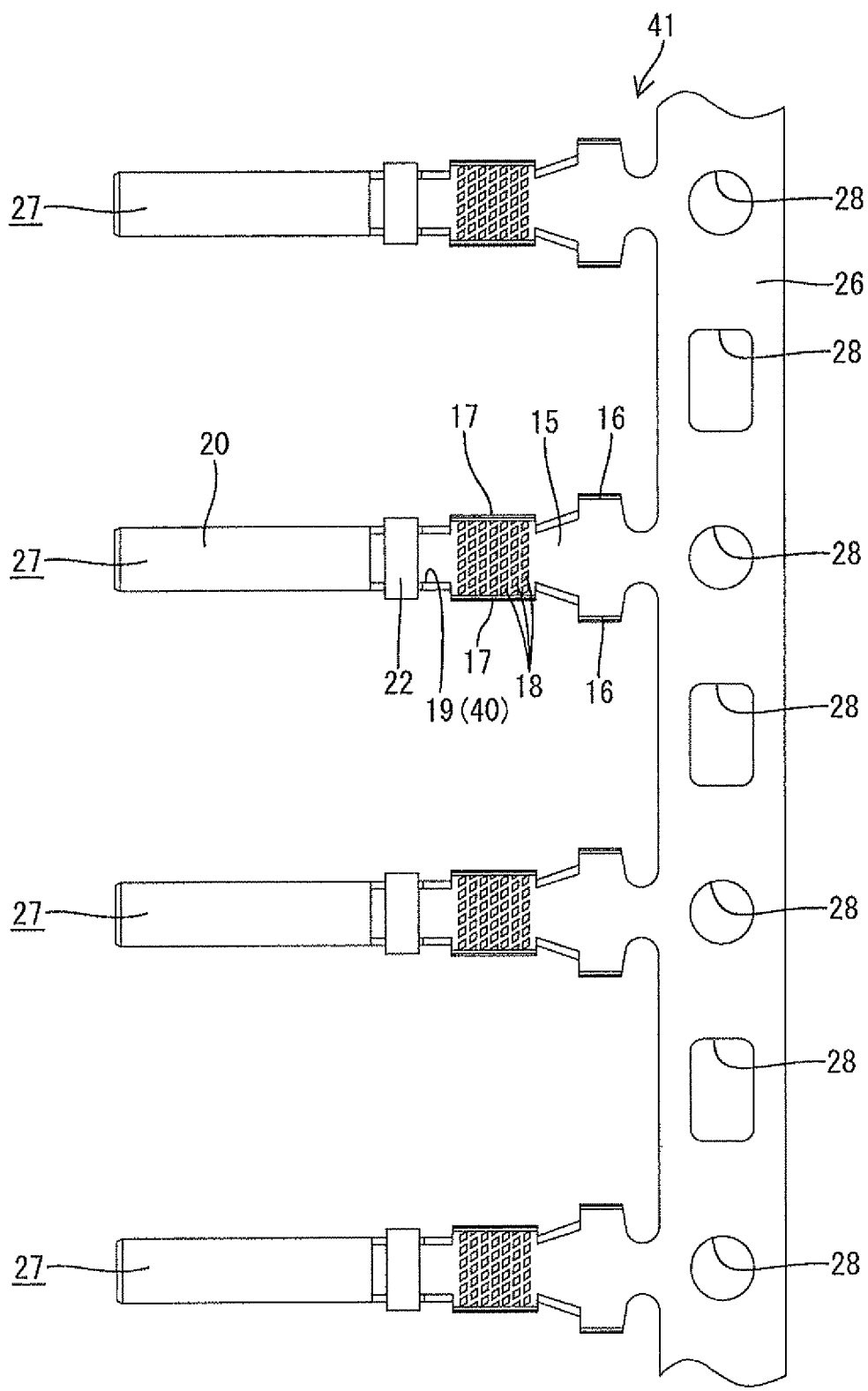
FIG. 5 is a plan view showing a state where a molding step is completed.

However, according to the technique disclosed in this description, since at least one of the projection and the depression is provided at the widthwise edge of the extending portion, the length of the edge surface of the extending portion is longer by the length of perimeter of the projection and/or the depression than that of the extending portion having no projection and no depression (see FIG. 5). As a result, according to the technique disclosed in this description, the length of a corrosion path is increased, which makes it possible to delay the start of corrosion of the wire barrel.

Preferred embodiments of the technique disclosed in this description are as follows.

It is preferred that the projection is provided at each of both the widthwise edges of the extending portion. This makes it possible to increase the length of a corrosion path at both the widthwise edges of the extending portion and to enhance the strength of the extending portion.

It is also preferred that the projection has an aperture.

The corrosion of the terminal progresses not only along the edge surface of the terminal but also toward the inside of the terminal. Therefore, when the projection of the extending portion has no aperture, as shown in FIG. 49, there is a fear that corrosion that has started from one of the ends of the extending portion progresses without stopping and reaches the other end of the extending portion opposite to the one of the ends. However, according to the above embodiment, as shown in FIG. 48, even when corrosion starts from one of the ends (edge surface) of the extending portion and progresses toward the inside of the extending portion, the aperture stops corrosion (see the line F2 in FIG. 10), which makes it possible to prevent corrosion from reaching the wire barrel.

It is also preferred that the water blocking wall is provided so as to surround the entire outer periphery of the extending portion. In this case, the water blocking wall can come into close contact with the entire inner periphery of the water blocking coating, which makes it possible to further improve waterproofness.

It is also preferred that a resin ring is fitted onto the end of the insulating coating such that the inner surface of the water blocking coating is in close contact with the resin ring. This makes it possible to reliably inhibit the entry of water from the end side of the insulating coating, which makes it possible to further improve waterproofness.

When a metal constituting the core wire and a metal constituting the terminal are different from each other, there is a fear that, when water adheres to both the core wire and the wire barrel, electrolytic corrosion occurs in the core wire or the wire barrel. However, according to the technique disclosed in this description, the core wire and the wire barrel are reliably made waterproof by the water blocking coating, which makes it possible to inhibit the core wire or the wire barrel from being dissolved by electrolytic corrosion. Therefore, the present invention is particularly effective when a metal constituting the core wire and a metal constituting the terminal are different from each other.

Further, the present invention is particularly effective when the core wire is made of aluminum or an aluminum alloy.

Aluminum or an aluminum alloy has a relatively low specific gravity, which makes it possible to reduce the weight of the electric wire. On the other hand, aluminum or an aluminum alloy has a relatively high ionization tendency, and is therefore easily dissolved when electrolytic corrosion occurs. However, according to the above embodiments, the core wire and the wire barrel are reliably made waterproof by the water blocking coating. Therefore, the above embodiments are particularly effective when the core wire is made of aluminum or an aluminum alloy.

It is also preferred that the water blocking coating has an adhesive or pressure-sensitive adhesive layer provided on the inner periphery thereof.

In this case, it is possible to bring the inner periphery of the water blocking coating into close contact with a region extending from the water blocking wall to the end of the insulating coating without any gap.

It is also preferred that the water blocking coating is a heat-shrinkable tube or an elastic tube having rubber elasticity.

When the water blocking coating is a heat-shrinkable tube, the inner diameter of the heat-shrinkable tube before heating is relatively large, which makes it easy for the heat-shrinkable tube to externally surround the above-described region. Then, by thermally shrinking the heat-shrinkable tube, the inner surface of the heat-shrinkable tube can be brought into close contact with the water blocking wall and the end of the insulating coating. As described above, the use of the heat-shrinkable tube as the water blocking coating makes it possible to improve the work efficiency of the step of externally surrounding the region extending from the water blocking wall to the end of the insulating coating with the heat-shrinkable tube.

On the other hand, when the water blocking coating is an elastic tube, a region extending from the water blocking wall to the end of the insulating coating is externally surrounded with the elastic tube expanded in its radial direction, and then the elastic tube is allowed to recover its original shape. As a result, the inner surface of the elastic tube comes into close contact with the water blocking wall and the end of the insulating coating. According to this embodiment, the region extending from the water blocking wall to the end of the insulating coating can be covered with the elastic tube by such a simple process.

(Effects)

According to the technique disclosed in this description, it is possible to improve the waterproofness of the electric wire with terminal and the terminal.

<Embodiment 5-1>

As a conventional electric wire with terminal, one disclosed in JP 2000-285983 A is known. This electric wire with terminal includes: an electric wire obtained by covering the outer periphery of a core wire with an insulating coating; and a terminal connected to an exposed portion of the core wire not covered with the insulating coating. The terminal has a flat plate-shaped board portion on which the core wire is placed and a wire barrel that projects from the board portion and is crimped onto the core wire. A region extending from the board portion to the end of the insulating coating is covered with a heat shrinkable tube, and one of the ends of the heat-shrinkable tube covers the core wire onto which the wire barrel is crimped and the other end is in close contact with the insulating coating.

However, in the case of the above-described structure, the board portion has a flat plate shape and therefore there is a fear that a gap is easily left between the one of the ends of the heat-shrinkable tube and the board portion. This causes a fear that water enters the inside of the heat-shrinkable tube through the gap and then comes into contact with the core wire and the wire barrel. As a result, there is a fear that a problem such as oxidation of the surface of the core wire or the wire barrel occurs.

Under the above circumstances, the technique disclosed in this description has been completed to provide an electric wire with terminal and a terminal excellent in waterproofness.

Hereinbelow, one embodiment of the present invention will be described in detail with reference to FIGS. 52 to 61.

A electric wire with terminal 510 according to this embodiment includes an electric wire 511 obtained by covering the outer periphery of a core wire 513 with an insulating coating 514 and a female terminal (terminal) 512 connected to the end of the electric wire 511. This embodiment will be described with reference to a case where the electricwire 511 is an aluminum electric wire 511 having a core wire 513 made of aluminum or an aluminum alloy and the female terminal 512 is made of copper or a copper alloy.

The electric wire 511 includes a core wire 513 obtained by twisting a plurality of thin metallic wires and an insulating coating 514 made of a synthetic resin and covering the outer periphery of the core wire 513. A predetermined length of the insulating coating 514 is stripped off at the end of the electric wire 511 to expose the end of the core wire 513. It is to be noted that the core wire 513 may be a single core wire.

The female terminal 512 includes a connecting portion 520 to be connected to a mating male terminal (conductive member) not shown, a wire barrel 517 crimped onto the end of the core wire 513 exposed beyond the end of the insulating coating 514, and a bridging portion 519 connecting the wire barrel 517 and the connecting portion 520 to each other. In the female terminal 512, the wire barrel 517 is provided behind the connecting portion 520 and is connected to the connecting portion 520 through the bridging portion 519, and an insulation barrel 516 is provided behind the wire barrel 517. The female terminal 512 is formed by subjecting a metallic plate material to pressing and has an elongated shape in the longitudinal direction as a whole (see FIG. 52). Further, the metallic plate material has a plated layer (not shown) provided on the surface thereof. As a metal constituting the plated layer, any metal such as tin or nickel may be used as appropriate. In this embodiment, a tin plated layer is provided on the surface made of copper or a copper alloy. It is to be noted that the metallic plate material may have a structure in which a plated layer is not provided on the surface thereof.

The connecting portion 520 is to be connected to a mating male terminal (not shown) by inserting a tab of the male terminal thereinto, and therefore has a substantially rectangular tubular shape into which the tab can be inserted. In the connecting portion 520, an elastic contact piece 521 is provided.

Figure 57:
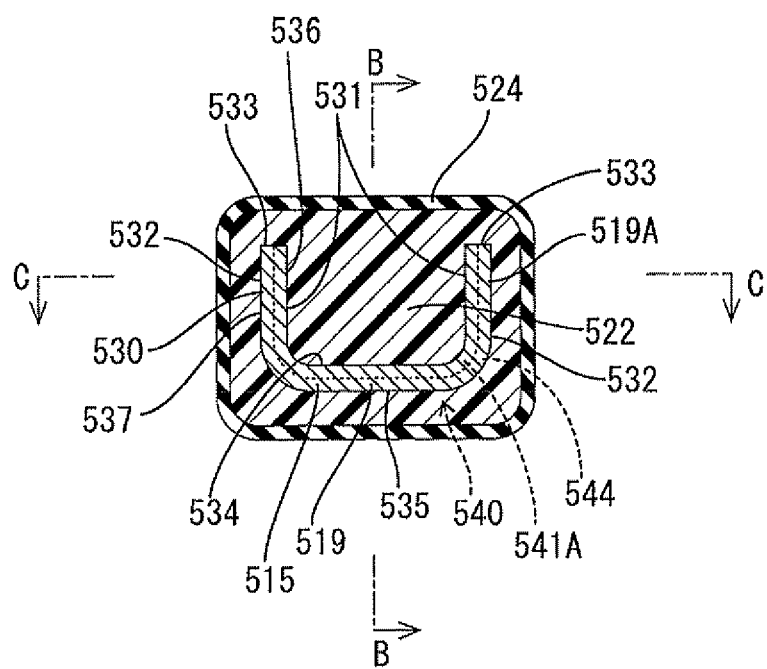
FIG. 57 is a sectional view taken along a line A-A shown in FIG. 56, which shows the sectional structure of a bridging portion after the water blocking wall is formed by molding.

The bridging portion 519 includes side plates 519A extending upward from both the side edges of a bottom plate 515, and has a U-shaped cross-section (see FIG. 57).

The wire barrel 517 has the function of compressing the exposed end of the core wire 513 of the electric wire 511, and includes a pair of barrel pieces extending upward from both the side edges of the bottom plate 515. The wire barrel 517 is crimped onto the core wire 513 in a so-called heart shape by externally holding the core wire 513 in a manner such that the tips of both the projecting barrel pieces dig into the core wire 513 while abutting against each other.

Figure 55:
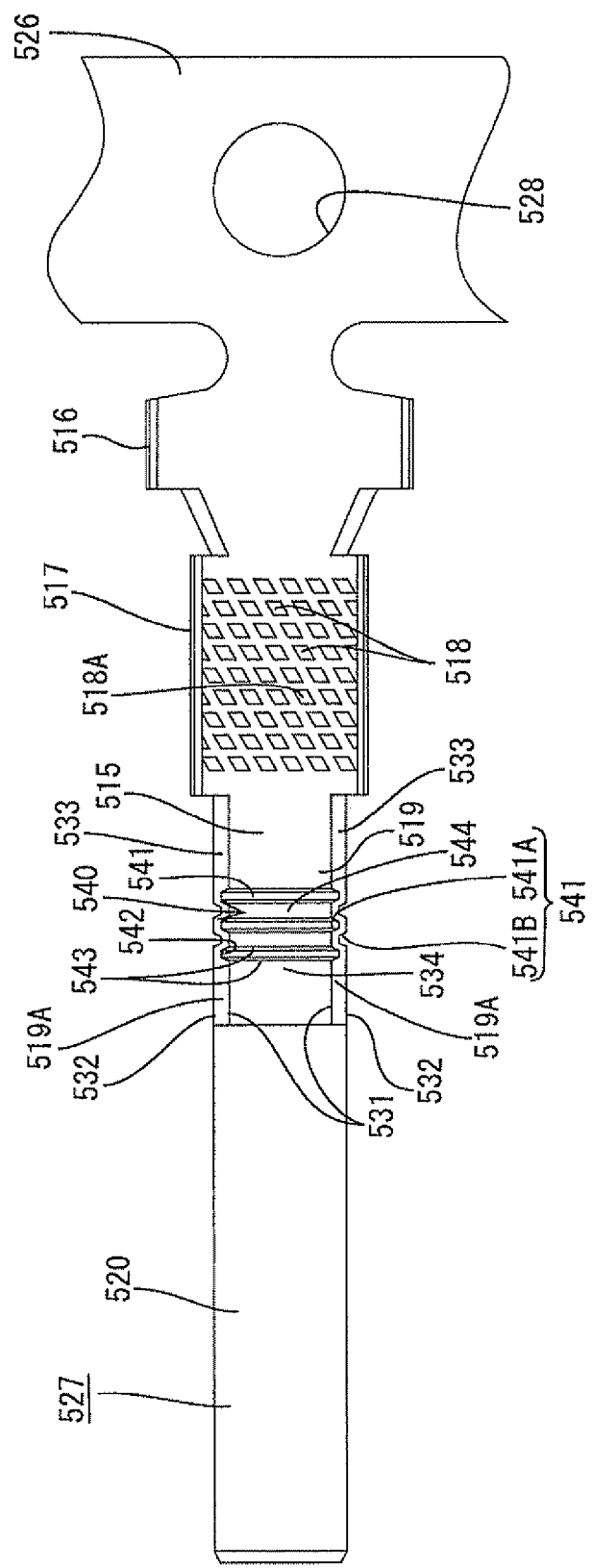
FIG. 55 is a plan view showing the structure of a female terminal strip before a water blocking wall is formed by molding.
Figure 56:
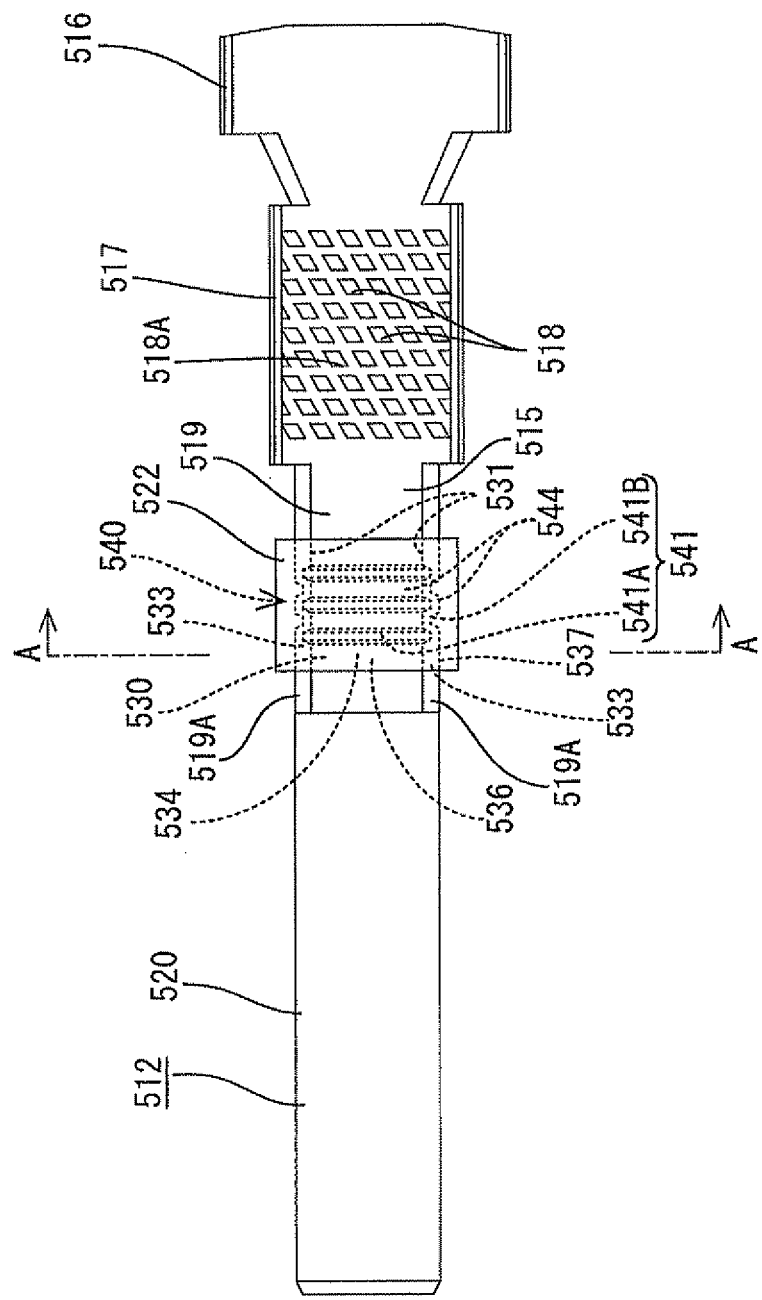
FIG. 56 is a plan view showing the structure of the female terminal strip after the water blocking wall is formed by molding.

It is to be noted that a serration 518A is provided in the inner surface of the wire barrel 517 (see FIG. 55). The serration 518A is provided by arranging a plurality of parallelogrammatic recesses 518 in a matrix. Here, a pair of opposed edges of the rim of opening of each of the recesses 518 is orthogonal to a direction in which the core wire 513 extends, which makes it possible to improve the strength of fixation of the wire barrel 517 to the core wire 513. Further, the rims of openings of the recesses 518 scrape the metal oxide layer of the core wire 513 when the wire barrel 517 is crimped onto the core wire 513 such that cracks are produced in the metal oxide layer and a new metal surface of the core wire 513 is exposed. This makes it possible to bring the wire barrel 517 into contact with the new metal surface and therefore to reduce the value of electric resistance between the female terminal 512 and the core wire 513.

The insulation barrel 516 has the function of compressing the end of the insulating coating 514 of the electric wire 511 remaining after stripping, and includes a pair of long barrel pieces extending upward from both the side edges of the bottom plate 515. The insulation barrel 516 is crimped onto the end of the insulating coating 514 in a so-called overlapping manner such that the insulating coating 514 is externally held by the barrel pieces while the tips of the projecting barrel pieces overlap one another.

The bridging portion 519 is provided with a water blocking wall 522 obtained by molding a synthetic resin. As the synthetic resin material constituting the water blocking wall 522, any synthetic resin material, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

The water blocking wall 522 surrounds the entire outer periphery of the bridging portion 519 (see FIG. 57). More specifically, the water blocking wall 522 fills an inner portion surrounded by the bottom plate 515 and the pair of side plates 519A without any gap and surrounds the bridging portion 519 to cover the opening side (opposite to the bottom plate 515 side) of the bridging portion 519, the outside of the pair of side plates 519A, and the outside of the bottom plate 515. The water blocking wall 522 surrounding the bridging portion 519 has a predetermined thickness. The water blocking wall 522 is in close contact with the entire periphery of the bridging portion 519, that is, with inner surfaces 531 (opposed surfaces) and outer surfaces 532 of the pair of side plates 519A, an inner surface 534 and an outer surface 535 of the bottom plate 515, and an edge surface 533 of each of the side plates 519A (an upper edge surface of the bottom plate 515) without any gap. It is to be noted that part of the entire periphery of the bridging portion 519 surrounded by the water blocking wall 522 is a boundary surface 530 with the water blocking wall 522. The water blocking wall 522 is uniform in thickness in a portion located outside the outer surface 535 of the bottom plate 515, a portion located outside the outer surface 532 of the side plate 519A, and a portion located outside the edge surface 533 of the side plate 519A. The water blocking wall 522 has a substantially rectangular cross-section that has rounded corners and is one size larger than that of the bridging portion 519 as a whole.

Figure 52:
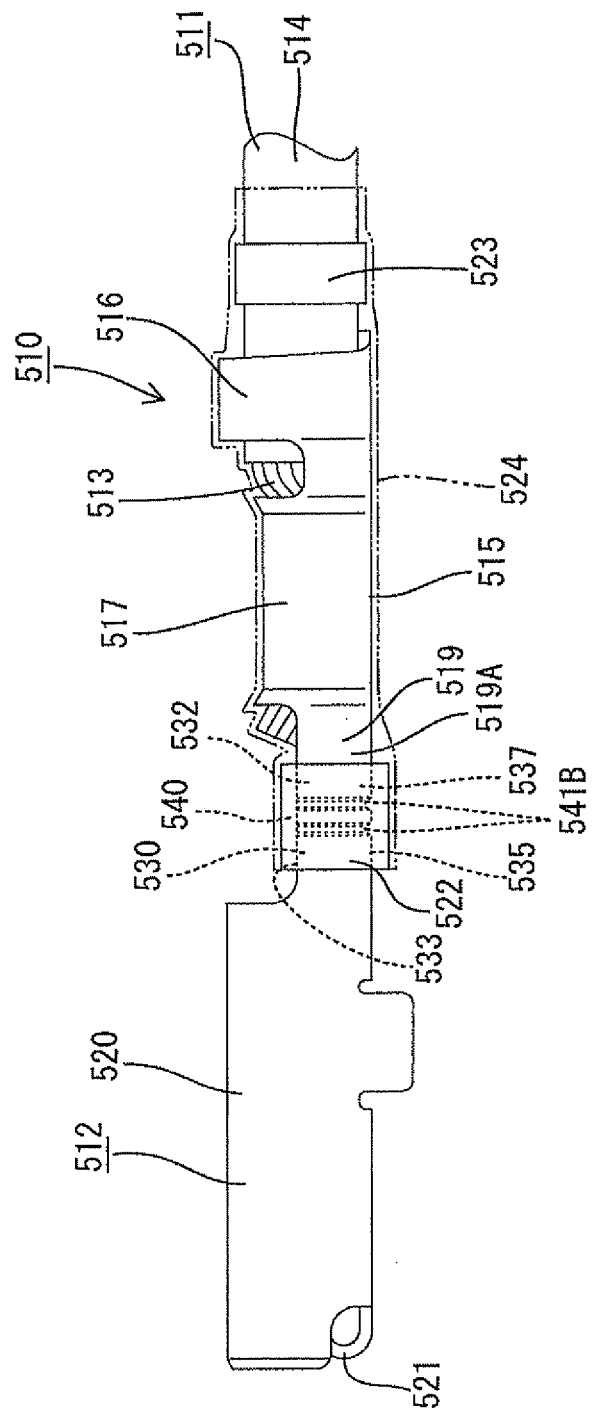
FIG. 52 is a side view showing the electric wire with terminal according to this embodiment.

A resin ring 523 is fitted onto the end of the insulating coating 514 (see FIG. 52). More specifically, the resin ring 523 is fitted onto the end of the insulating coating 514 at a position behind a position where the insulation barrel 516 is crimped (i.e., at a position on the opposite side of the insulation barrel 516 from the exposed core wire 513). The resin ring 523 is made of a synthetic resin and has a circular cross-section. As the synthetic resin constituting the resin ring 523, any synthetic resin, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, polyamide-based thermoplastic resin is used.

The synthetic resin constituting the resin ring 523 may be one that develops adhesiveness by thermal softening or melting. In this case, the inner surface of a heat-shrinkable tube 524 (water blocking coating) that will be described later can be adhered to the resin ring 523 by softening or melting the resin ring 523 in the step of heating the heat-shrinkable tube 524. Further, by forming the resin ring 523 using such a synthetic resin as described above, it is possible to adhere the resin ring 523 to the outer periphery of the insulating coating 514.

The heat-shrinkable tube 524 is fitted which extends from the water blocking wall 522 to the end of the insulating coating 514, more specifically, from the water blocking wall 522 to a portion behind the resin ring 523 fitted onto the insulating coating 514 through the wire barrel 517, the insulation barrel 516, and the resin ring 523. The heat-shrinkable tube 524 is made of a synthetic resin and has a tubular shape. The length of the heat-shrinkable tube 524 is set such that the heat-shrinkable tube 524 can cover a region extending from the front edge of the water blocking wall 522 to a position behind a position where the resin ring 523 is fitted onto the insulating coating 514. The inner surface of the heat-shrinkable tube 524 is in close contact with the entire outer peripheries of the water blocking wall 522, the core wire 513, the wire barrel 517, the insulation barrel 516, the resin ring 523, and the insulating coating 514 without any gap. In this embodiment, the heat-shrinkable tube 524 has an adhesive or pressure-sensitive adhesive layer (not shown) provided on the inner surface thereof. The adhesive or pressure-sensitive adhesive layer is designed to develop adhesiveness or tackiness by thermal softening or melting.

It is to be noted that the heat-shrinkable tube 524 may have no adhesive or pressure-sensitive adhesive layer on the inner surface thereof. In this case, the synthetic resin constituting the water blocking wall 522 may be one that develops adhesiveness by thermal softening or melting. When the water blocking wall 522 is made of such a synthetic resin, the water blocking wall 522 can be softened or melted in the step of heating the heat-shrinkable tube 524 such that the inner surface of the heat-shrinkable tube 524 adheres to the outer surface of the water blocking wall 522.

Figure 53:
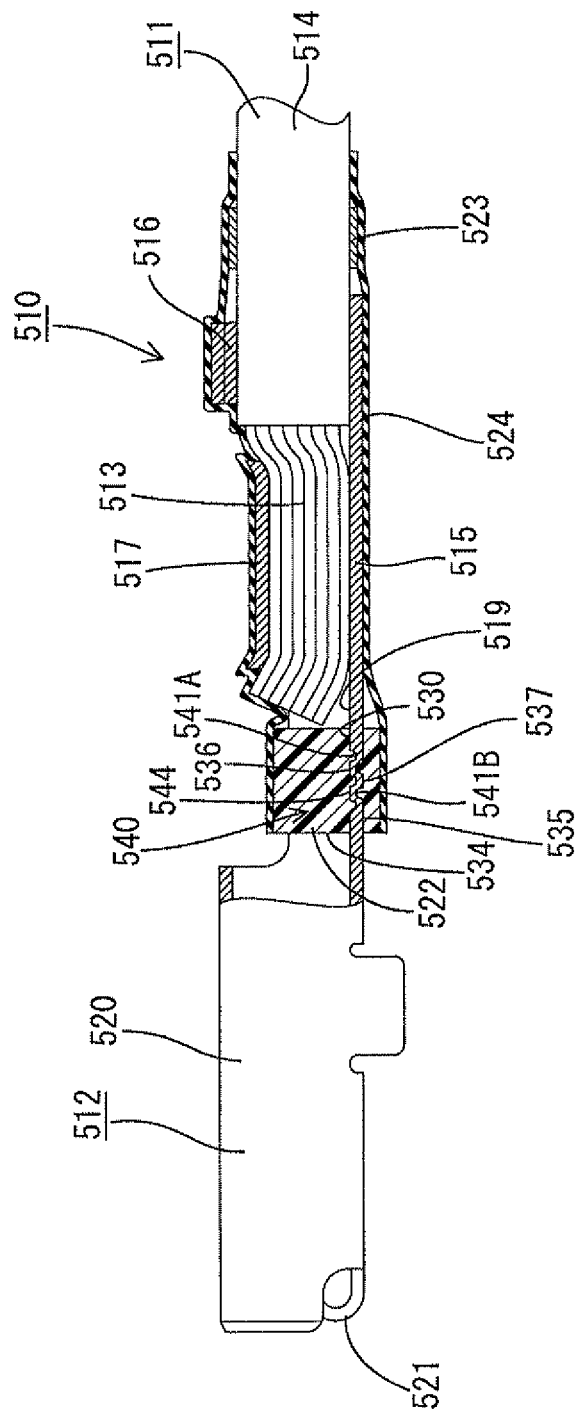
FIG. 53 is a sectional view showing the sectional structure of the electric wire with terminal.
Figure 54:
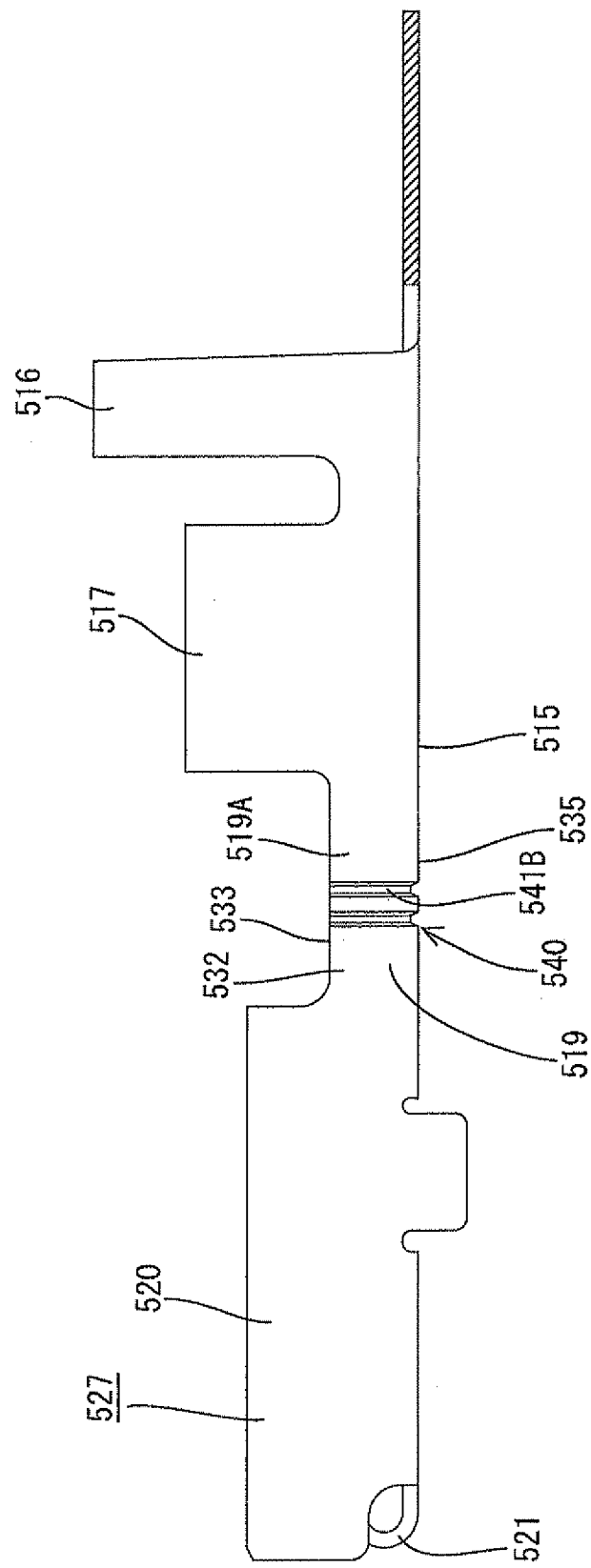
FIG. 54 is a side view showing the structure of a female terminal strip before a water blocking wall is formed by molding.

The boundary surface 530 of the bridging portion 519 with the water blocking wall 522 has irregularities 540 (see FIG. 53). More specifically, the irregularities 540 are provided in both surfaces of the boundary surface 530 of the bridging portion 519 with the water blocking wall 522, that is, in the boundary surface on the side where the core wire 513 is placed (referred to as an "inner boundary surface 536) including the inner surfaces 531 of the pair of side plates 519A and the inner surface 534 of the bottom plate 515 and the boundary surface opposite thereto (referred to as an "outer boundary surface 537") including the outer surfaces 532 of the pair of side plates 519A and the outer surface 535 of the bottom plate 515.

Figure 58:
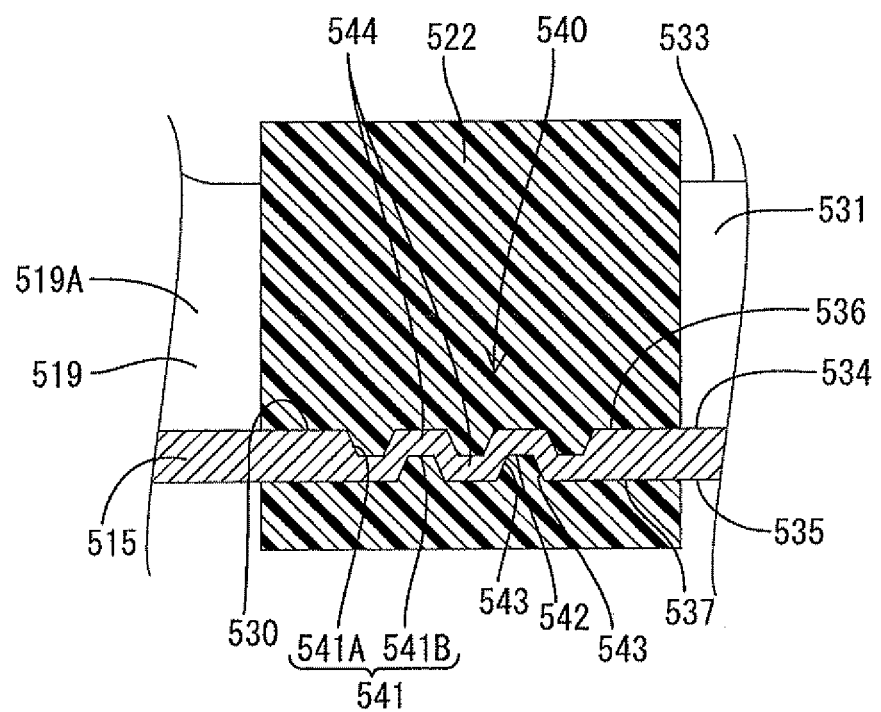
FIG. 58 is a sectional view taken along a line B-B shown in FIG. 57, which shows the shape of irregularities.
Figure 59:
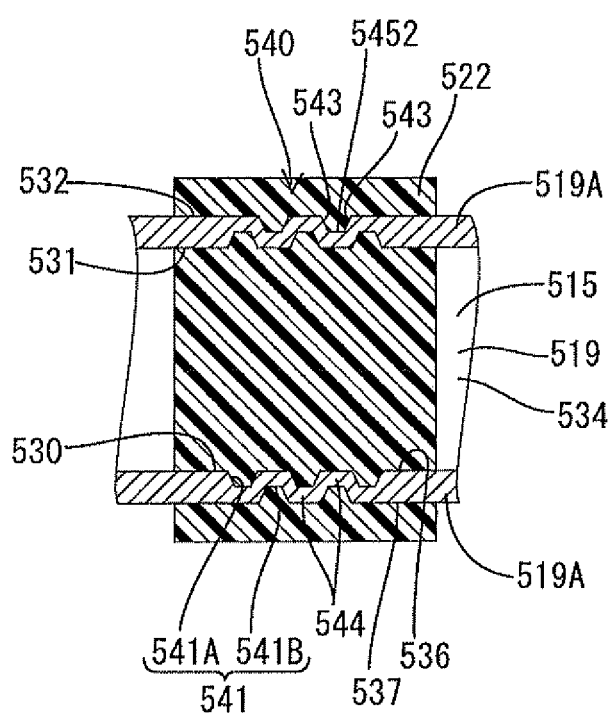
FIG. 59 is a sectional view taken along a line C-C shown in FIG. 57, which shows the shape of irregularities.

The irregularities 540 are provided by forming grooves 541 extending in the width direction of the bridging portion 519 orthogonal to the axial direction of the bridging portion 519 (i.e., to the axial direction of the female terminal 512 from the connecting portion 520 toward the wire barrel 517). The length of each of the grooves 541 is the sum of the width of both the side plates 519A and the width of the bottom plate 515. As shown in FIG. 58, each of the grooves 541 is dented to have a trapezoidal cross-section and includes a bottom surface 542 and a pair of inclined side surfaces 543 extending diagonally and outwardly from both the side edges of the bottom surface 542. The bottom surface 542 and the side surface 543 are the same in width (i.e., in size in a direction orthogonal to the direction in which the grooves 541 extend). The bottom surface 542 is substantially parallel to the plate surface of the bridging portion 519 (i.e., to the plate surface of part of the bridging portion 519 other than part where the irregularities 540 are provided). Further, the pair of side surfaces 543 have the same angle of inclination to the bottom surface 542.

The grooves 541 are arranged side by side in the axial direction of the bridging portion 519 such that portions between the grooves 541 remain as ribs 544, and therefore the irregularities 540 are provided by alternately arranging the grooves 541 and the ribs 544 in the axial direction of the bridging portion 519. The grooves 541 are arranged at regular intervals in the axial direction of the bridging portion 519. The surfaces of the ribs 544 provided between the adjacent grooves 541 are at the same level in the thickness direction of the bridging portion 519 as the plate surface of part of the bridging portion 519 other than part where the irregularities 540 are provided. The number of the grooves 541 provided in the inner boundary surface 536 is larger than that in the outer boundary surface 537. In this embodiment, the number of the grooves 541 in the inner boundary surface 536 is three and the number of the groove portion portions 541 in the outer boundary surface 537 is two. It is to be noted that the grooves 541 provided in the inner boundary surface 536 are referred to as "inner grooves 541A" and the grooves 541 provided in the outer boundary surface 537 are referred to as "outer grooves 541B".

The inner grooves 541A and the outer grooves 541B are substantially the same in size and shape. The inner grooves 541A and the outer grooves 541B are arranged in a staggered manner in the axial direction of the bridging portion 519 (see FIG. 58). That is, the inner grooves 541A and the outer grooves 5413 are alternately located in the axial direction of the bridging portion 519. On the outside of the inner grooves 541A, the ribs 544 remaining after the outer grooves 541B are formed. On the inside of the outer grooves 541B, the ribs 544 remaining after formation of the inner grooves 541A are provided. The bottom surface 542 of each of the inner grooves 541A and the bottom surface 542 of each of the outer grooves 541B are located at substantially the center in the thickness direction of the bridging portion 519.

Figure 60:
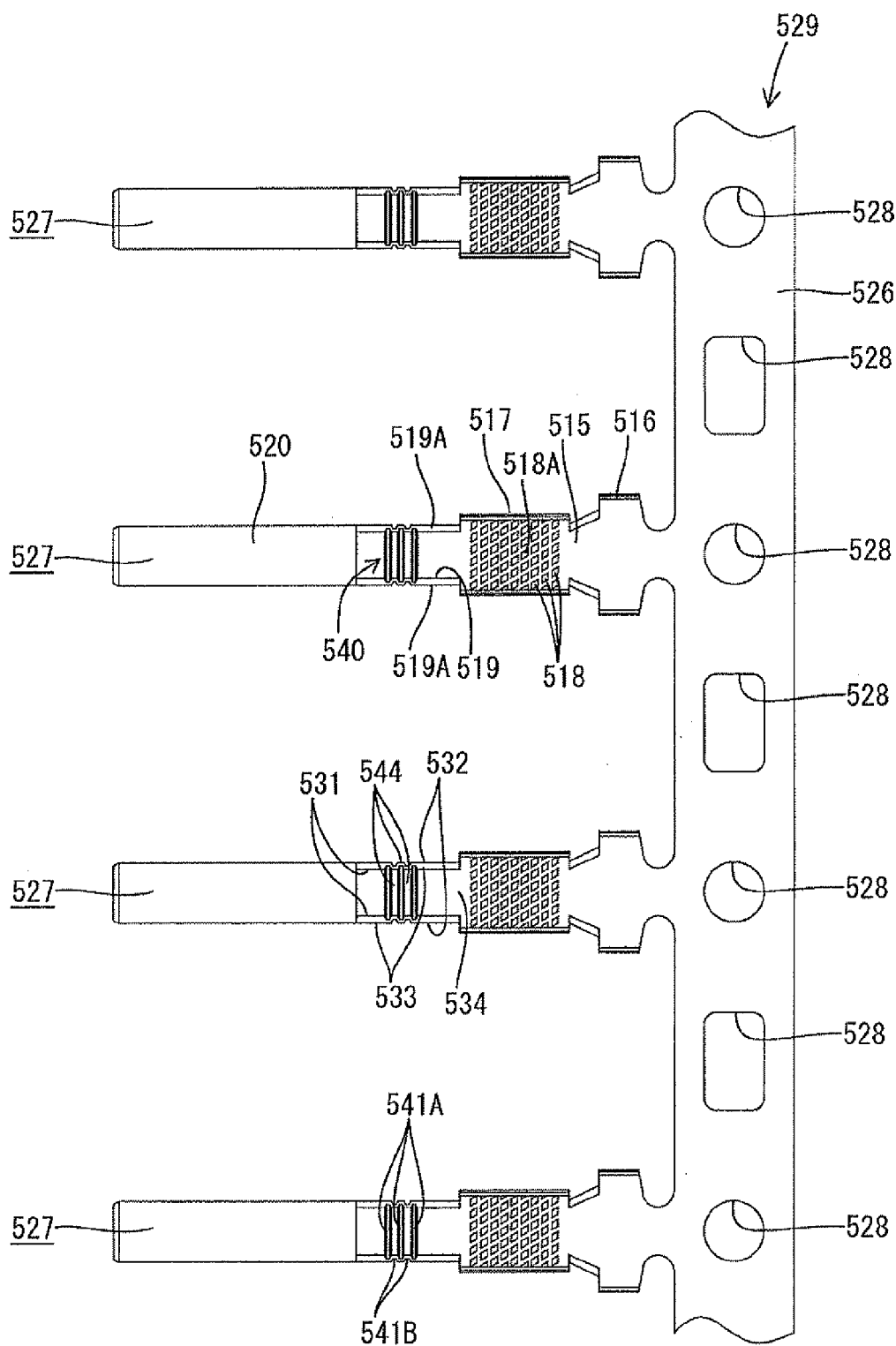
FIG. 60 is a plan view showing the structure of a chain-terminal after a bending step is completed.
Figure 61:
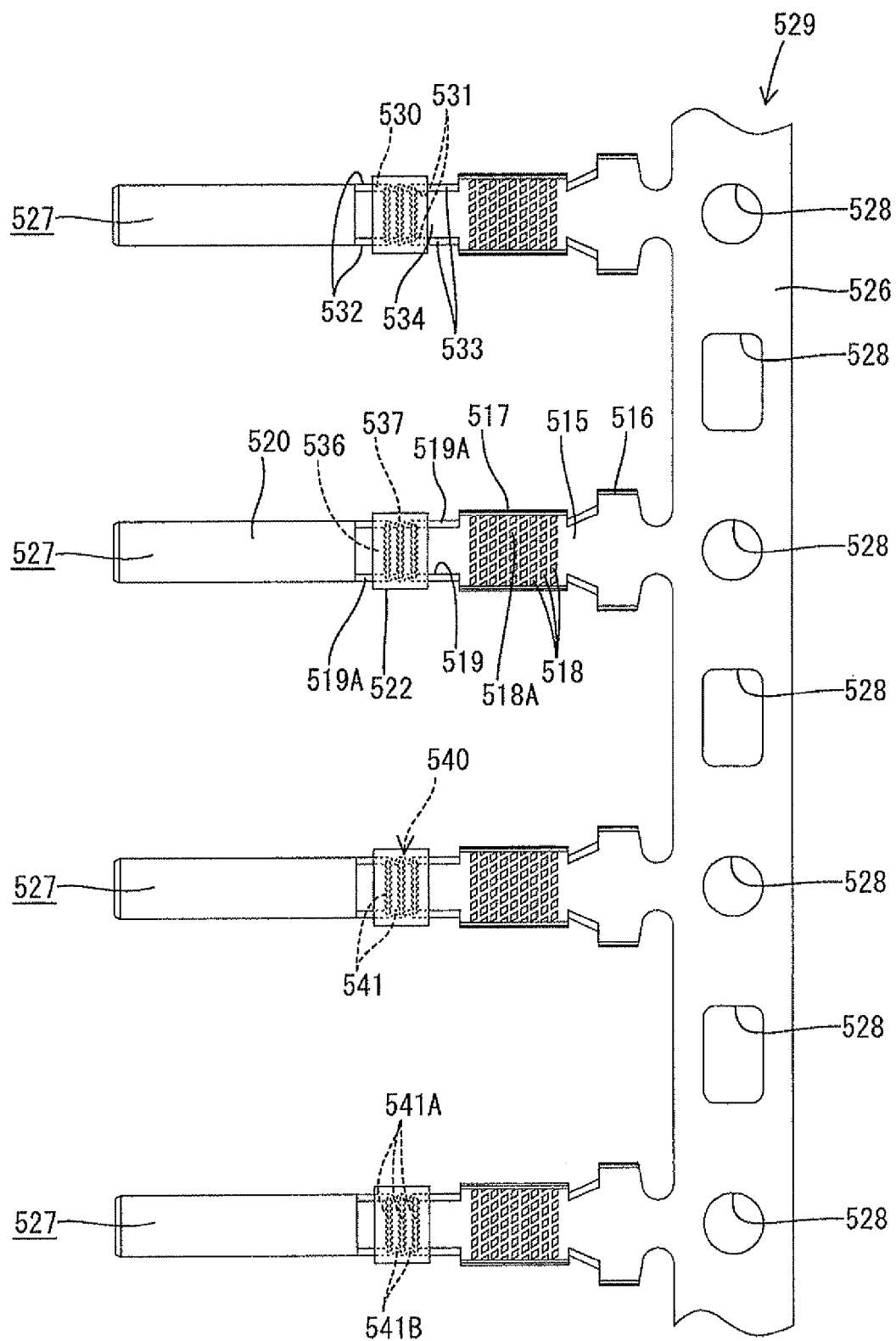
FIG. 61 is a plan view showing the structure of the chain-terminal after a molding step is completed.

Hereinbelow, one example of a production process of the electric wire with terminal 510 according to this embodiment will be described with reference to FIGS. 60 and 61.

First, a metallic plate material is subjected to a punching step. This makes it possible to form a chain-terminal 529 including a strip-shaped carrier 526 and a plurality of terminals 527 connected to the side edge of the carrier 526. The carrier 526 has feed holes 528 arranged at substantially regular intervals along the longitudinal direction thereof. The feed holes 528 are configured to be engaged with feed claws (not shown) of a processing machine.

The terminal strips 527 are arranged at substantially regular intervals along the longitudinal direction of the carrier 526. Each of the terminal strips 527 has a portion constituting a connecting portion 520, a portion constituting a bridging portion 519, a portion constituting a wire barrel 517, and a portion constituting an insulation barrel 516 which are connected to one another through a bottom plate 515 extending in the longitudinal direction thereof.

In this punching step, a serration 518A is formed in the surface of the portion constituting a wire barrel 517 on which a core wire 513 is to be placed, and irregularities 540 are formed in the periphery of the portion constituting a bridging portion 519. It is to be noted that they may be formed in a step other than the punching step.

Then, the metallic plate material that has been subjected to the punching step is subjected to a bending step. By performing the bending step, each of the connecting portion 520, the bridging portion 519, the wire barrel 517, and the insulation barrel 516 is formed into a predetermined shape.

Then, a molding step is performed to form a water blocking wall 522. A synthetic resin is molded in the bridging portion 519 of each of the terminal strips 527 while the terminal strips 527 are fed one after another by engaging the feed holes 528 formed in the carrier 526 with the feed claws. More specifically, first, part of the bridging portion 519 where a water blocking wall 522 should be formed is sandwiched between a pair of dies (not shown). Then, a synthetic resin in a molten state is injected into a cavity formed by the dies. After the synthetic resin is solidified in the dies, the pair of dies is opened to separate the terminal strip 527 provided with the water blocking wall 522 from the dies. The above step is continuously performed on the terminal strips 527 connected to the carrier 526 at substantially regular intervals (see FIG. 61).

Then, a crimping step is performed on an electric wire 511. First, a core wire 513 is exposed by stripping off an insulating coating 514 of an electric wire 511 and a resin ring 523 is fitted onto the end of the insulating coating 514. The resin ring 523 is fitted onto part of the insulating coating 514 different from part of the insulating coating 514 where the insulation barrel 516 is to be crimped (i.e., onto part of the insulating coating 514 located on the side opposite to the core wire 513). Then, the exposed portion of the core wire 513 not covered with the insulating coating 514 and the end of the insulating coating 514 are placed on the bottom plate 515 of each of the terminal strips 527. Then, the insulation barrel 516 and the wire barrel 517 are bent and crimped by a die (not shown) to externally hold the insulating coating 514 and the core wire 513, respectively. A cutting step to cut each of the terminal strips 527 from the carrier 526 is performed at the same time as the above-described crimping step to obtain an electric wire with terminal 510.

Then, a covering step is performed using a heat-shrinkable tube 524. The heat-shrinkable tube 524 is passed through from the female terminal 512 side such that a region extending from the water blocking wall 522 to a position beyond the resin ring 523 is covered with the heat-shrinkable tube 524. Then, the heat-shrinkable tube 524 is shrunk by performing a heating step using a heating device not shown. As a result, the inner surface of the heat-shrinkable tube 524 comes into close contact with the outer surface of the electric wire with terminal 510 without any gap. In such a way as described above, production of the electric wire with terminal 510 is completed.

It is to be noted that the electric wire 511 may be passed through the heat-shrinkable tube 524 in advance before the crimping step is performed.

It is to be noted that in the above-described heating step, in a state where the connecting portion 520 is placed upward, the synthetic resin constituting the water blocking wall 522 can be prevented from flowing into the connecting portion 520 even when the water blocking wall 522 is melted in the heating step. This makes it possible to improve the reliability of electrical connection with a mating terminal in the connecting portion 520.

In general, when a synthetic resin is injection-molded to obtain molded articles, higher efficiency is achieved by continuously performing injection molding at regular intervals than by performing injection molding at irregular intervals. This is because die temperature conditions and synthetic resin injection conditions can be made stable by continuously performing a series of steps, that is, the step of injecting a synthetic resin in a molten state into a die, the step of solidifying the resin, and the step of separating a molded article from the die. According to this embodiment, formation of the water blocking wall 522 is performed by continuously performing the molding step on the terminal strips 527 connected to the carrier 526. As a result, the work efficiency of the molding step can be improved.

Further, according to this embodiment, the cutting step is performed at the same time as the crimping step. This makes it possible to improve work efficiency as compared to a case where the cutting step and the crimping step are separately performed.

Hereinbelow, the functions and effects of this embodiment having such a structure as described above will be described.

According to this embodiment, the electric wire with terminal 510 includes the electric wire 511 obtained by covering the outer periphery of the core wire 513 with the insulating coating 514 and the female terminal 512 connected to the end of the electric wire 511, the female terminal 512 include the connecting portion 520 to be connected to a mating terminal, the wire barrel 517 crimped onto the end of the core wire 513 exposed beyond the end of the insulating coating 514, and the bridging portion 519 connecting the wire barrel 517 and the connecting portion 520 to each other, the bridging portion 519 is provided with the water blocking wall 522 obtained by molding a synthetic resin, the core wire 513 is covered with the tubular heat-shrinkable tube 524 that is in close contact with the outer surface of the water blocking wall 522 and the outer surface of the end of the insulating coating 514 and extends from the water blocking wall 522 to the end of the insulating coating 514, and the bridging portion 519 has the boundary surface 530 with the water blocking wall 522 in which the irregularities 540 are provided.

As described above, the core wire 513 is covered with the heat-shrinkable tube 524 that is in close contact with the outer surface of the water blocking wall 522 and the outer surface of the end of the insulating coating 514 and extends from the water blocking wall 522 to the end of the insulating coating 514, which makes it possible to prevent water from entering the core wire 513 side and therefore to improve waterproofness.

In addition, the boundary surface 530 of the bridging portion 519 with the water blocking wall 522 has the irregularities 540 formed therein. This makes it possible to increase the length of a pathway by which water reaches the core wire 513 as compared to a case where the boundary surface 530 of the bridging portion 519 with the water blocking wall 522 is flat and therefore to keep high waterproofness for a longer time. When water adheres to a portion at the front edge of the water blocking wall 522 provided in the bridging portion 519 by molding, there is a fear that rust is formed in the portion where water adheres and then corrosion occurs during long-term use of the electric wire with terminal 510. When the thickness of the bridging portion 519 is reduced by corrosion, a gap is created between the bridging portion 519 and the water blocking wall 522 and water enters through the gap such that the extent of corrosion is further increased. When corrosion of the bridging portion 519 progresses toward the inside of the water blocking wall 522 in such a way, there is a fear that corrosion reaches the position of the exposed core wire 513. However, according to this embodiment, the irregularities 540 are provided in the boundary surface 530. Therefore, the length of a pathway by which water reaches the core wire 513 (a distance along the plate surface of the bridging portion 519 between the frond edge and the back edge of the water blocking wall 522 in the axial direction of the bridging portion 519) can be made longer by the length of the side surfaces 543 of the grooves 541, which makes it possible to prolong the time before water reaches the core wire 513.

Further, the water blocking wall 522 surrounds the entire outer periphery of the bridging portion 519 and the irregularities 540 are provided in both surfaces of the boundary surface 530 of the bridging portion 519 with the water blocking wall 522, that is, in the inner boundary surface 536 (the surface on which the core wire 513 is placed) and the outer boundary surface 537 (the surface opposite to the inner boundary surface 536), which makes it possible to further improve waterproofness.

Further, the inner grooves 541A (the grooves 541 provided in the surface on which the core wire 513 is placed) and the outer grooves 541B (the grooves 541 provided in the surface opposite to the surface where the inner grooves 541A are provided) are provided in a staggered manner in the axial direction of the bridging portion 519. Here, when the inner grooves and the outer grooves are provided at the same positions in the axial direction of the bridging portion, the thickness at the position where both the inner and outer grooves are provided (i.e., the thickness between the bottom surfaces of the grooves) needs to be reduced or the depth of each of the grooves needs to be reduced, which makes it difficult to ensure stiffness and to improve waterproofness at the same time. However, such constraints can be removed by providing the inner grooves 541A and the outer grooves 591B in a staggered manner in the axial direction of the bridging portion 519, and therefore it is possible to ensure stiffness and to improve waterproofness at the same time.

Further, the heat-shrinkable tube 524 has an adhesive or pressure-sensitive adhesive layer provided on the inner periphery thereof, which makes it possible to improve adhesion between the heat-shrinkable tube 524 and the water blocking wall 522 and adhesion between the heat-shrinkable tube 524 and the insulating coating 514 and therefore to ensure higher waterproofness.

Further, the inner surface of the heat-shrinkable tube 524 can be brought into close contact with the outer surface of the water blocking wall 522 and the outer surface of the end of the insulating coating 514 by providing the heat-shrinkable tube 524 having a relatively large inner diameter before heating at a position where it should be fitted and then thermally shrinking the heat-shrinkable tube 524, which makes it easy to produce the electric wire with terminal 510.

Further, the metal constituting the core wire 513 and the metal constituting the female terminal 512 are different from each other. In such a case where the metal constituting the core wire 513 of the electric wire 511 and the metal constituting the female terminal 512 are different from each other, it is known that when water is present in a portion where the core wire 513 and the female terminal 512 are connected to each other, both the metals are dissolved in water as ions and electrolytic corrosion caused by electrochemical reaction occurs. Therefore, it is particularly advantageous for this embodiment to ensure high waterproofness over a long period.

Further, the electric wire 511 is an aluminum electric wire 511 having a core wire 513 made of aluminum or an aluminum alloy and the female terminal 512 is made of copper or a copper alloy. In such a case where the core wire 513 made of aluminum or an aluminum alloy is used to reduce the weight of the electric wire 511 and the female terminal 512 made of copper or a copper alloy is used in terms of strength, there is a fear that electrolytic corrosion occurs when water is present in a portion where the core wire 513 and the female terminal 512 are connected to each other. Therefore, it is particularly advantageous for this embodiment to ensure high waterproofness over a long period of time.

<Other Embodiment>

The present invention is not limited to the embodiment described above with reference to the drawings, and for example, the following embodiments are also included in the technical scope of the present invention.

(1) In the above embodiment, the terminal is the female terminal 512. However, the terminal to be used is not limited thereto and may have any shape as appropriate. For example, the terminal may be a male terminal provided with a male tab or a so-called LA terminal provided with a connecting portion having a through hole.

(2) In the above embodiment, the core wire 513 of the electric wire 511 is made of aluminum or an aluminum alloy. However, the material of the core wire of the electric wire is not limited thereto, and the core wire of the electric wire may be made of any metal as appropriate. For example, the core wire of the electric wire may be made copper or a copper alloy. Further, in the above embodiment, the female terminal 512 is made of copper or a copper alloy and has a tin plated layer on the surface thereof. However, the material of the terminal is not limited thereto, and the terminal may be made of any metal as appropriate.

(3) In the above embodiment, the water blocking wall 522 has a substantially rectangular cross-section. However, the cross-sectional shape of the water blocking wall 522 is not limited thereto. The water blocking wall may have any cross-sectional shape such as a circular shape, an elliptical shape, or an oval shape.

(4) In the above embodiment, the water blocking coating is the heat-shrinkable tube 524. However, the water blocking coating is not limited thereto and may be provided by, for example, wrapping a sheet-shaped water blocking tape around a region extending from the water blocking wall 522 to the end of the insulating coating 514.

(5) In the above embodiment, the water blocking coating is the heat-shrinkable tube 524. However; the water blocking coating is not limited thereto and may be an elastic tube having rubber elasticity. In this case, the elastic tube expanded in its radial direction is provided at a position to which it should be fitted, and is then allowed to recover its original shape to bring the inner surface of the elastic tube into close contact with the outer surface of the water blocking wall 522 and the outer surface of the end of the insulating coating 514, which makes it easy to produce the electric wire with terminal.

(6) In the above embodiment, the resin ring 523 has an annular shape. However, the shape of the resin ring 523 is not limited thereto. For example, the resin ring may have a slit to have a substantially C-shaped cross-section. This makes it easy to expand the resin ring in its radial direction. Therefore, for example, the resin ring can be fitted onto the electric wire by expanding the resin ring in its radial direction after the terminal is crimped onto the electric wire.

(7) In the above embodiment, the molding step to form the water blocking wall 522 is performed before the crimping step is performed on the electric wire 511. However, the order in which these steps are performed is not limited thereto. For example, the molding step to form the water blocking wall may be performed after the crimping step is performed on the electric wire.

(8) In the above embodiment, the crimping step and the cutting step are performed at the same time. However, the order in which these steps are performed is not limited thereto. For example, the cutting step may be performed after the crimping step is performed.

Figure 62:
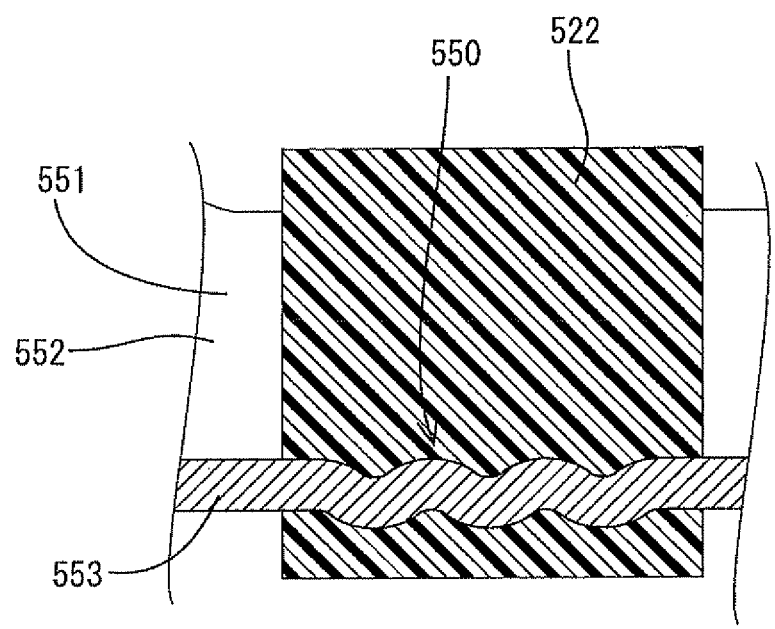
FIG. 62 is a sectional view showing the shape of irregularities according to other embodiment (9).

(9) In the above embodiment, the irregularities 540 are provided by forming the grooves 541 extending in the width direction orthogonal to the axial direction from the connecting portion 520 toward the wire barrel 517. However, the irregularities are not limited thereto. For example, as shown in FIG. 62, irregularities 550 may be formed by bending side plates 552 of a bridging portion 551 and a bottom plate 553 into a wave shape.

Figure 63:
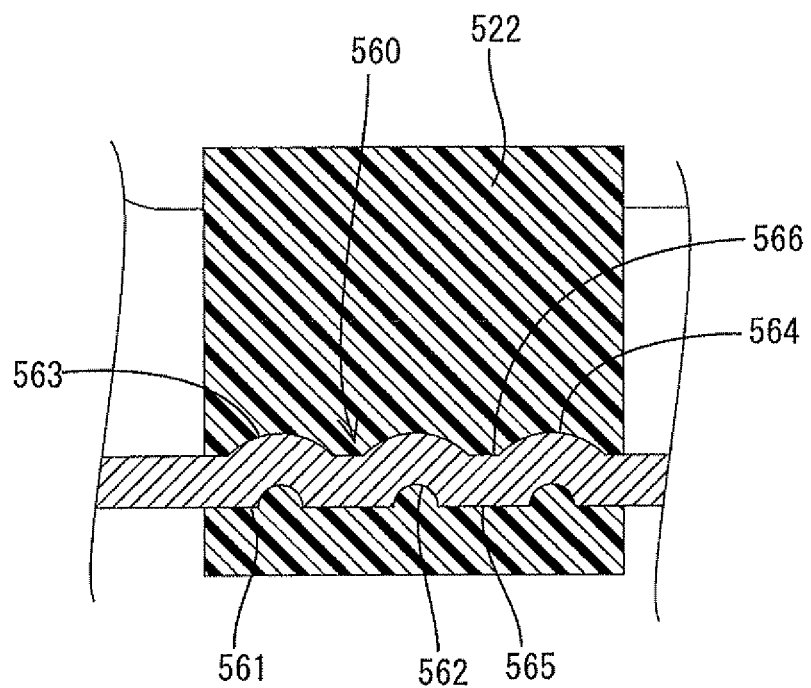
FIG. 63 is a sectional view showing the shape of irregularities according to other embodiment (10).

(10) In the above embodiment, the irregularities 540 include the inner grooves 541A, the outer grooves 541B, and the ribs 544 each remaining between the grooves 541 after forming the inner grooves 541A and the outer grooves 541B. However, the irregularities are not limited thereto. For example, as shown in FIG. 63, the irregularities 560 may include grooves 62 formed in an outer boundary surface 561 and ribs 564 formed in an inner boundary surface 563 by forming the grooves 62. More specifically, the irregularities 560 in the outer boundary surface 561 include the grooves 62 and ribs 565 remaining after the formation of the grooves 62 and the irregularities 560 in the inner boundary surface 563 include the ribs 564 and grooves 566 each remaining between the ribs 564. It is to be noted that the structure of the irregularities in the inner boundary surface and the structure of the irregularities in the outer boundary surface may be reversed.

Figure 64:
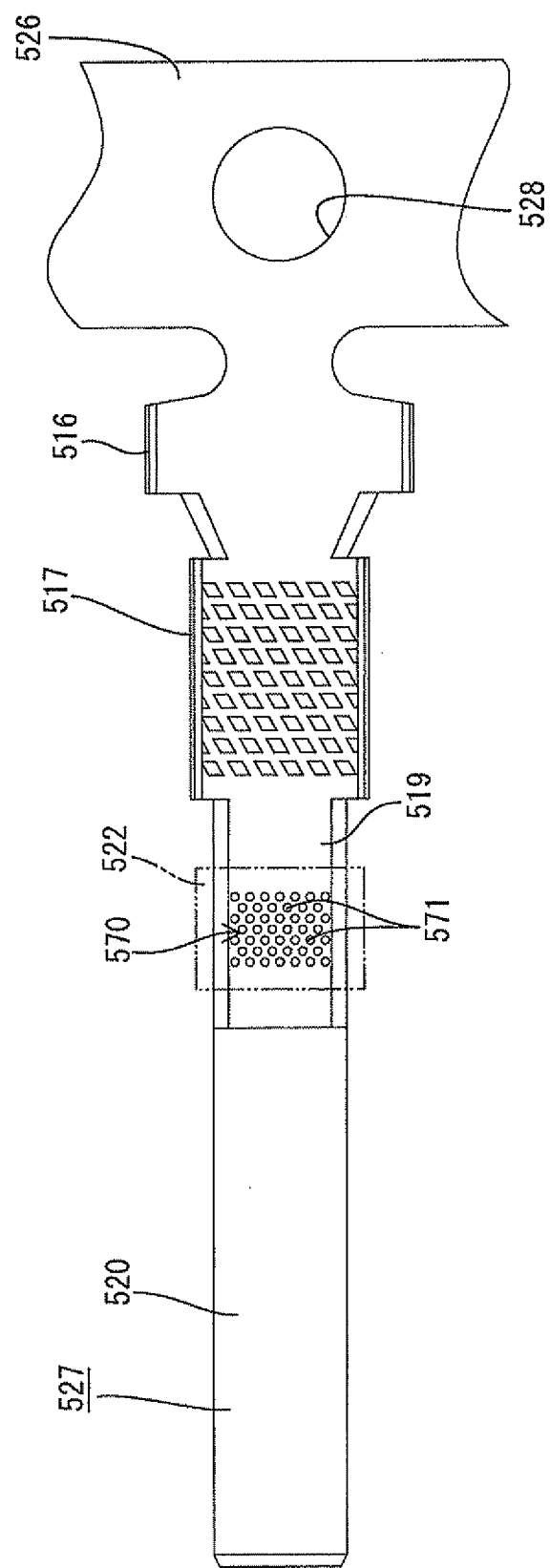
FIG. 64 is a sectional view showing the shape of irregularities according to other embodiment (11).

(11) In the above embodiment, the irregularities 540 are provided by forming the grooves 541 extending in the width direction orthogonal to the axial direction from the connecting portion 520 toward the wire barrel 517. However, the irregularities are not limited thereto. For example, as shown in FIG. 64, the irregularities 570 may be provided by forming dot-like protrusions 571 on the entire surface. It is to be noted that in FIG. 64, the protrusions 571 have a circular shape, but may have any planar shape such as a rectangular shape or a triangular shape. Alternatively, recesses may be formed instead of the protrusions 571.

(12) In the above embodiment, the irregularities 540 are provided in both the inner boundary surface 536 and the outer boundary surface 537. However, the irregularities are not limited thereto. For example, the irregularities may be provided only in the inner boundary surface.

(13) In the above embodiment, the plurality of the grooves 541 are arranged side by side in the axial direction is two or more. However, the number of the grooves 541 is not limited thereto and may be one.

(14) In the above embodiment, the grooves 541 have a length covering the entire width of the bridging portion 519. However, the grooves are not limited thereto. For example, the grooves may have a length shorter than the width of the bridging portion, and such short grooves may be provided in the width direction of the bridging portion.

(15) In the above embodiment, the inner grooves 541A and the outer grooves 541B are provided in a staggered manner in the axial direction. However, the inner grooves and the outer grooves are not limited thereto. For example, the inner grooves and the outer grooves may be provided at the same positions in the axial direction.

Means for Solving the Problem

The technique disclosed in this description relates to an electric wire with terminal including: an electric wire obtained by covering an outer periphery of a core wire with an insulating coating; and a terminal connected to an end of the electric wire. The terminal has a connecting portion to be connected to a conductive member, a wire barrel crimped onto an end of the core wire exposed beyond an end of the insulating coating, and a bridging portion connecting the wire barrel and the connecting portion to each other. The bridging portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating and the bridging portion has a boundary surface with the water blocking wall and the boundary surface has irregularities provided in at least a surface on a side where the core wire is placed.

Such a structure makes it possible to bring the water blocking coating into close contact with the outer surface of the water blocking wall and the outer surface of the end of the insulating coating to cover the core wire with the water blocking coating extending from the water blocking wall to the end of the insulating coating. This makes it possible to prevent water from entering the core wire side and therefore to achieve excellent waterproofness. In addition, the boundary surface of the bridging portion with the water blocking wall has irregularities provided in at least a surface on the side where the core wire is placed. This makes it possible to increase the length of a pathway by which water reaches the core wire as compared to a case where this surface is flat and therefore to keep high waterproofness over a longer period of time.

Further, the water blocking wall may be configured to surround the entire outer periphery of the bridging portion. In this case, the irregularities may be provided in both surfaces of the boundary surface of the bridging portion with the water blocking wall, that is in the boundary surface on the side where the core wire is placed and the boundary surface opposite thereto. This makes it possible to further improve waterproofness.

Further, the irregularities may be provided by forming a groove extending in a width direction orthogonal to an axial direction of the bridging portion from the connecting portion toward the wire barrel.

Further, the irregularities may be provided by forming the two or more grooves such that they are arranged side by side in the axial direction.

Further, the groove may have a length covering the entire width of the bridging portion.

Further, the water blocking wall may be configured to surround the entire outer periphery of the bridging portion. In this case, the irregularities may be provided in both surfaces of the boundary surface of the bridging portion with the water blocking wall, that is, in the boundary surface on the side where the core wire is placed and the boundary surface opposite thereto such that the groove provided in the surface on the side where the core wire is placed and the groove provided in the opposite surface are arranged in a staggered manner in the axial direction.

Here, when the groove provided in the surface on the side where the core wire is placed and the groove provided on the opposite surface are located at the same position in the axial direction, the thickness of the bridging portion at the position where both the grooves are provided needs to be reduced or the depth of each of the grooves needs to be reduced, which makes it difficult to ensure stiffness and to improve waterproofness at the same time. However, such constraints can be removed by arranging the groove provided in the surface on the side where the core wire is placed and the groove provided in the opposite surface in a staggered manner in the axial direction, and therefore it is possible to ensure stiffness and to improve waterproofness at the same time.

Further, a resin ring may be fitted onto the end of the insulating coating such that the water blocking coating is in close contact with the outer surface of the resin ring.

Further, the water blocking coating may have an adhesive or pressure-sensitive adhesive layer formed on the inner periphery thereof. This makes it possible to improve adhesion between the water blocking coating and the water blocking wall and adhesion between the water blocking coating and the insulating coating and therefore to ensure higher waterproofness.

Further, the water blocking coating may be a heat-shrinkable tube. In this case, the inner surface of the heat-shrinkable tube can be brought into close contact with the outer surface of the water blocking wall and the outer surface of the end of the insulting coating by providing the heat-shrinkable tube having a relatively large inner diameter before heating at a position where it should be fitted and then thermally shrinking the heat-shrinkable tube, which makes it easy to produce the electric wire with terminal.

Further, the water blocking coating may be an elastic tube having rubber elasticity. In this case, the elastic tube expanded in its radial direction is provided at a position to which it should be fitted, and is then allowed to recover its original shape to bring the inner surface of the elastic tube into close contact with the outer surface of the water blocking wall and the outer surface of the end of the insulating coating, which makes it easy to produce the electric wire with terminal.

Further, a metal constituting the core wire and a metal constituting the terminal may be different from each other. In such a case where a metal constituting the core wire of the electric wire and a metal constituting the terminal are different from each other, it is known that when water is present in a portion where the core wire and the terminal are connected to each other, both the metals are dissolved in water as ions such that electrolytic corrosion caused by electrochemical reaction occurs. Therefore, it is particularly advantageous for such a case to ensure high waterproofness over a long period of time.

Further, the electric wire may be an aluminum electric wire having a core wire made of aluminum or an aluminum alloy. This makes it possible to reduce the weight of the electric wire. For example, when the terminal made of a copper alloy or the like is used in terms of strength, there is a fear that electrolytic corrosion occurs when water is present in a portion where the core wire and the terminal are connected to each other. Therefore, it is particularly advantageous for such a case to ensure high waterproofness over a long period of time.

The technique disclosed in this description relates to a terminal to be connected to an end of an electric wire obtained by covering an outer periphery of a core wire with an insulating coating, the terminal including a connecting portion to be connected to a conductive member, a wire barrel to be crimped onto an end of the core wire exposed beyond an end of the insulating coating, and a bridging portion connecting the wire barrel and the connecting portion to each other. The bridging portion is provided with a water blocking wall obtained by molding a synthetic resin. In a state where the wire barrel is crimped onto the core wire, the core wire can be covered with a tubular water blocking coating extending from the water blocking wall and the end of the insulating coating. The bridging portion has a boundary surface with the water blocking wall and the boundary surface has irregularities provided in at least a surface on a side where the core wire is placed.

Further, the water blocking wall may be configured to surround the entire outer periphery of the bridging portion. In this case, the irregularities may be provided in both surfaces of the boundary surface of the bridging portion with the water blocking wall, that is, in the boundary surface on the side where the core wire is placed and the boundary surface opposite thereto.

Further, the irregularities may be provided by forming a groove extending in a width direction orthogonal to an axial direction from the connecting portion toward the wire barrel.

Further, the irregularities may be provided by forming the two or more grooves such that they are arranged side by side in the axial direction.

Further, the groove may have a length covering the entire width of the bridging portion.

Further, the water blocking wall may be configured to surround the entire outer periphery of the bridging portion. In this case, the irregularities may be provided in both surfaces of the boundary surface of the bridging portion with the water blocking wall, that is, in the boundary surface on the side where the core wire is placed and the boundary surface opposite thereto such that the groove provided in the surface on the side where the core wire is placed and the groove provided in the opposite surface are arranged in a staggered manner in the axial direction.

(Effects)

According to the technique disclosed in this description, it is possible to provide an electric wire with terminal and a terminal excellent in waterproofness.

<Embodiment 6-1>

As a conventional electric wire with terminal to be held in a connector, one disclosed in JP 2000-285983 A is known. This electric wire with terminal includes: an electric wire obtained by covering the outer periphery of a core wire with an insulating coating; and a terminal connected to an exposed portion of the core wire not covered with the insulating coating. The terminal has a flat plate-shaped board portion on which the core wire is placed and a wire barrel that projects from the board portion and is crimped onto the core wire.

A region extending from the board portion to the end of the insulating coating is covered with a heat-shrinkable tube. One of the ends of the heat-shrinkable tube covers the core wire onto which the wire barrel is crimped and the other end is in close contact with the insulating coating.

However, in the case of the above-described structure, the board portion has a flat plate shape, and therefore there is a fear that a gap is left between the one of the ends of the heat-shrinkable tube and the board portion.

This causes a fear that water enters the inside of the heat-shrinkable tube through the gap and then comes into contact with the core wire and the wire barrel. This further causes a fear that a problem such as oxidation of the surface of the core wire or the wire barrel occurs.

Under the above circumstances, the technique disclosed in this description has been completed to prevent the entry of water into the electric wire side.

A connector according to an embodiment 6-1 of the present invention will be described with reference to FIGS. 65 to 72. It is to be noted that in the following description, the term "front-back direction" refers to a direction from a front side (left side in FIG. 71) toward a back side (right side in FIG. 71), and the term "up-down direction" refers to a direction from an up side (near side of the paper of FIG. 71) toward a down side (far side of the paper of FIG. 71).

Figure 71:
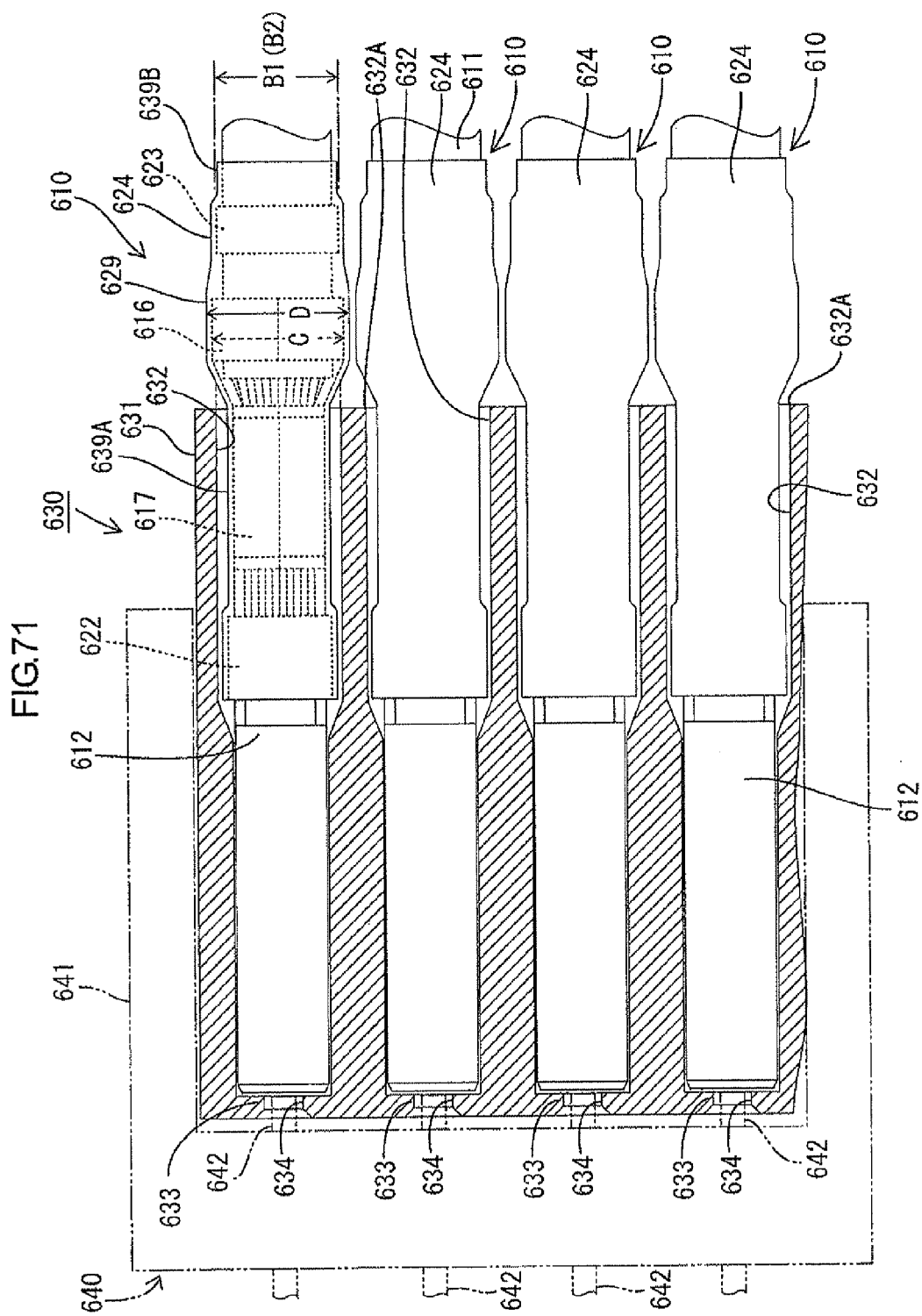
FIG. 71 is a sectional view of a connector.

As shown in FIG. 71, a connector 630 (one example of a "connector") is a female connector configured to be able to fit to a mating male connector 640 (one example of a "mating connector").

The mating male connector 640 (schematically indicated by a chain line in FIG. 71) includes a male connector housing 641 made of a synthetic resin and male terminals 642 held in the male connector housing 641.

The male connector housing 641 includes a hood portion having a tubular opening in a fitting direction and a back wall portion closing the inner end of the hood portion. The L-shaped rod-like male terminals 642 pass through the back wall portion and project into the hood portion.

The connector 630 includes a connector housing 631 made of a synthetic resin and two or more (four) electric wire with terminals 610 housed in the connector housing 631.

The connector housing 631 is a rectangular parallelepiped and has four (two or more) cavities 632 arranged in the width direction thereof. Female terminals 612 can be inserted into the cavities 632 from the back side of the cavities 632.

Each of the cavities 632 has a substantially circular cross-section and extends across substantially the entire length of the connector housing 631 in the front-back direction. The diameter of each of the cavities 632 is slightly larger in its almost back half than in its almost front half, and the diameter of the almost back half is substantially constant.

Each of the cavities 632 has a front stopper wall 633 provided at the front end thereof so as to be opposed to the front surface of the female terminal 612. The front stopper wall 633 has a through hole 634 through which the male terminal 642 passes.

It is to be noted that although not shown, a lance is provided in the ceiling wall of each of the cavities 632 so as to extend forward in a cantilever shape. The lance is configured such that its front end is engaged with the female terminal 612 to prevent backward slip-off of the female terminal 612. Further, although not shown, a lock portion is provided in the connector housing to maintain a state where the connector housing is fitted to the mating connector housing. The lock portion is configured to be able to engage with a lock-receiving portion of the mating connector housing.

Figure 65:
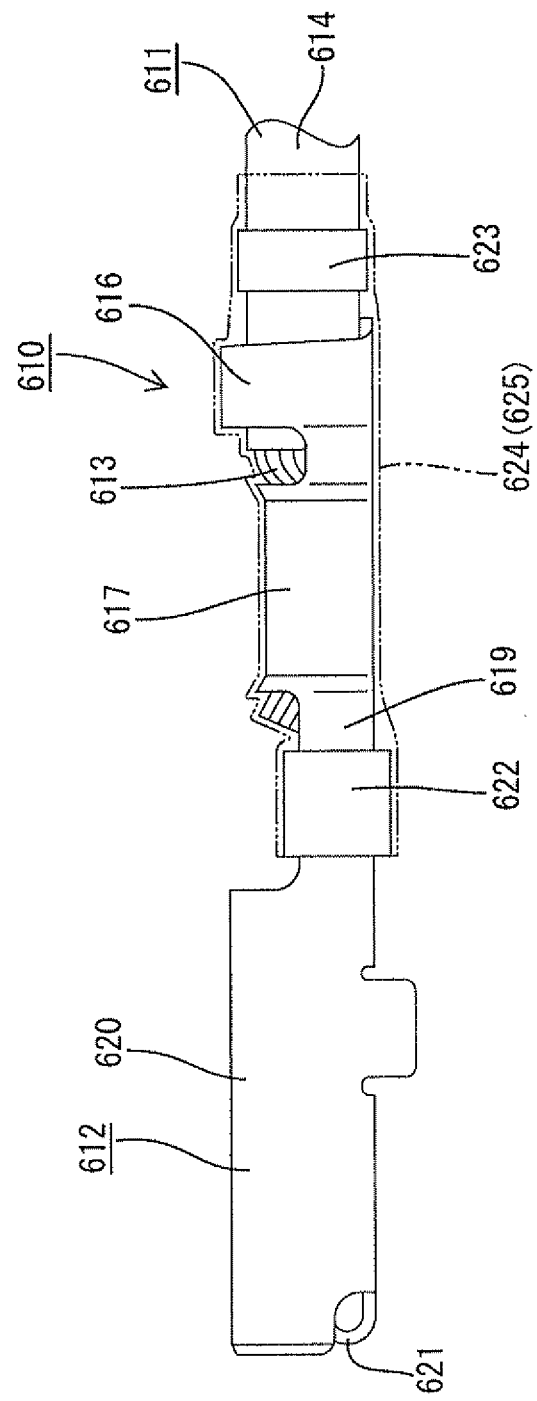
FIG. 65 is a side view of an electric wire with terminal according to an embodiment 6-1 of the present invention.
Figure 66:
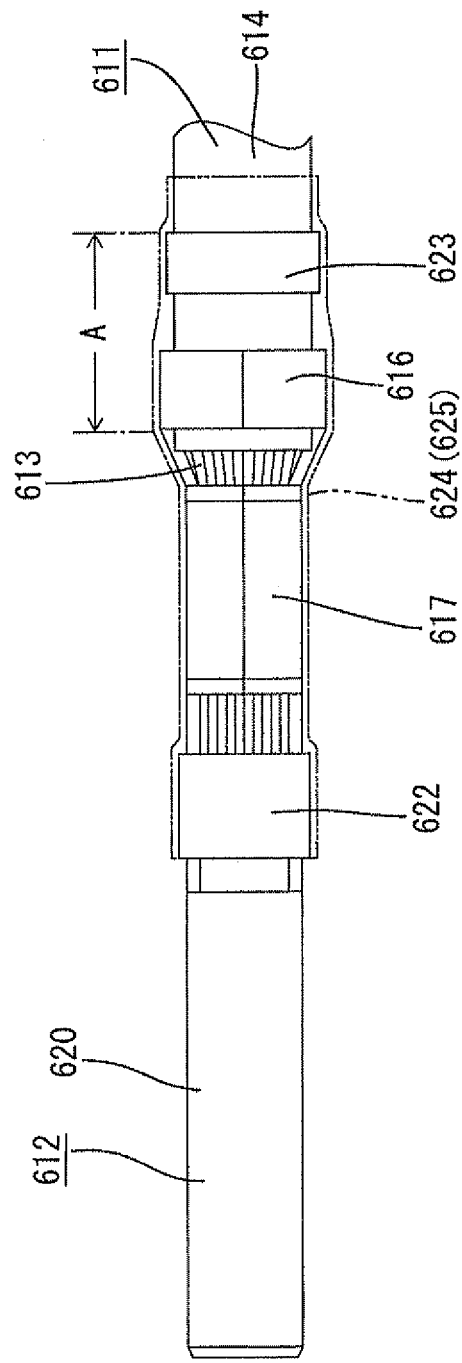
FIG. 66 is a plan view of the electric wire with terminal.

As shown in FIG. 65, the electric wire with terminal 610 includes an electric wire 611 and a female terminal 612 (one example of a "terminal") connected to the end of the electric wire 611.

(Electric Wire 611)

The electric wire 611 includes one core wire 613 obtained by twisting a plurality of thin metallic wires and an insulating coating 614 made of a synthetic resin and covering the outer periphery of the core wire 613. The core wire 613 is made of any metal, such as copper, a copper alloy, aluminum, or an aluminum alloy, as appropriate. In this embodiment, aluminum or an aluminum alloy is used. The insulating coating 614 is stripped off at the end of the electric wire 611 to expose the core wire 613. It is to be noted that the core wire 613 may be a single core wire.

(Female Terminal 612)

The female terminal 612 is formed by pressing a metallic plate material into a predetermined shape. As a metal constituting the female terminal 612, any metal, such as copper or a copper alloy, may be used as appropriate. Further, the metallic plate material has a plated layer (not shown) provided on the surface thereof. As a metal constituting the plated layer, any metal such as tin or nickel may be used as appropriate. In this embodiment, a tin plated layer is provided on the surface made of copper or a copper alloy. It is to be noted that the metallic plate material may have a structure in which a plated layer is not provided on the surface thereof.

Figure 67:
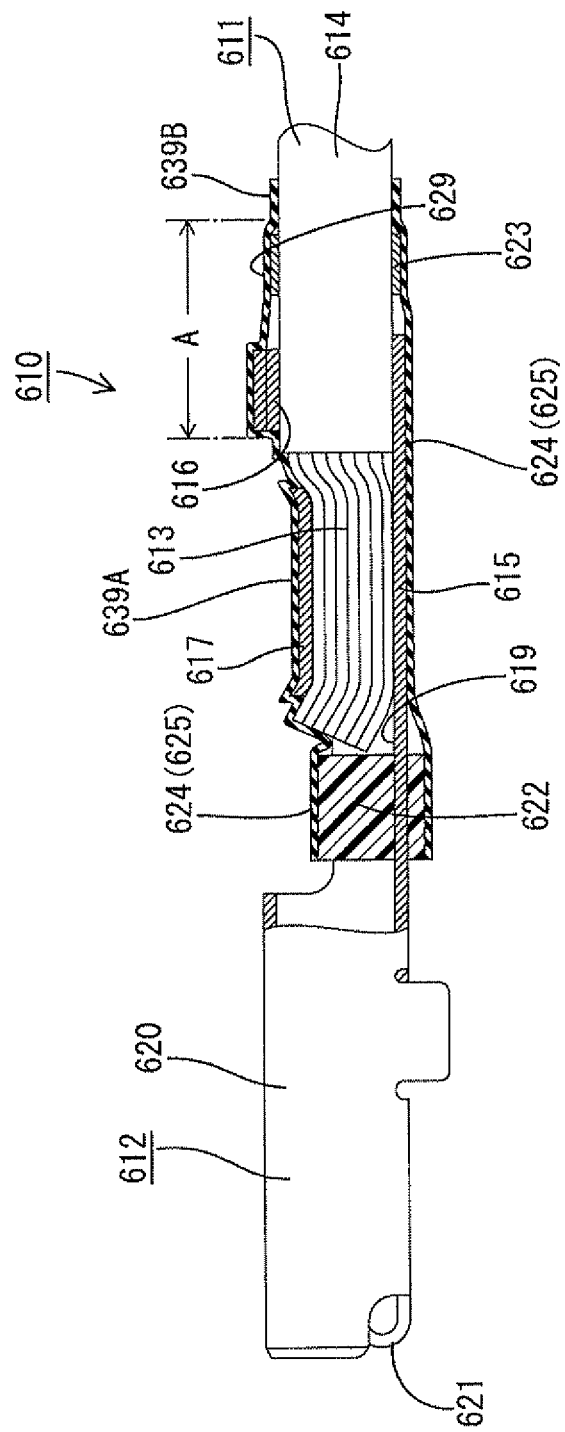
FIG. 67 is a cutaway sectional view of a main part of the electric wire with terminal.
Figure 68:
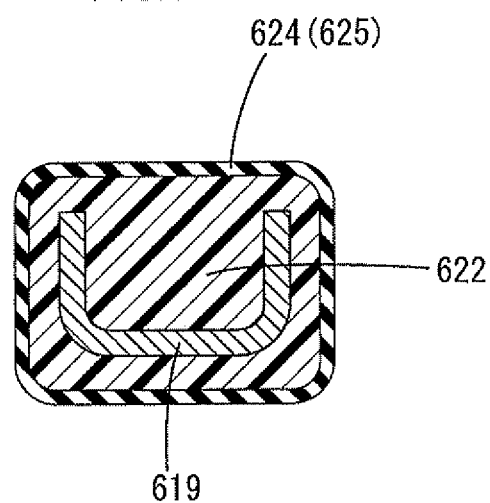
FIG. 68 is an enlarged sectional view of a main part of an extending portion.

As shown in FIG. 67, the female terminal 612 has a bottom plate 615 on which the insulating coating 614 of the electric wire 611 and the core wire 613 are placed.

The bottom plate 615 has a pair of insulation barrels 616 projecting from the side edges thereof. The insulation barrels 616 are crimped onto the insulating coating 614 to externally hold the insulating coating 614 in a state where the insulating coating 614 of the electric wire 611 and the core wire 613 are placed on the bottom plate 615. It is to be noted that in FIG. 67, the pair of insulation barrels 616 is crimped such that the tips of the insulation barrels 616 overlap one another on the upper side. However, the structure of the pair of insulation barrels 616 is not limited thereto. For example, the pair of insulation barrels 616 may be crimped such that the tips thereof abut against one another at the center of the width direction.

The bottom plate 615 has a pair of wire barrels 617 projecting from the side edges thereof at positions closer to the end of the core wire 613 than the insulation barrels 616. The wire barrels 617 are crimped onto the core wire 613 to externally hold the core wire 613 in a state where the insulating coating 614 of the electric wire 611 and the core wire 613 are placed on the bottom plate 615.

Figure 69:
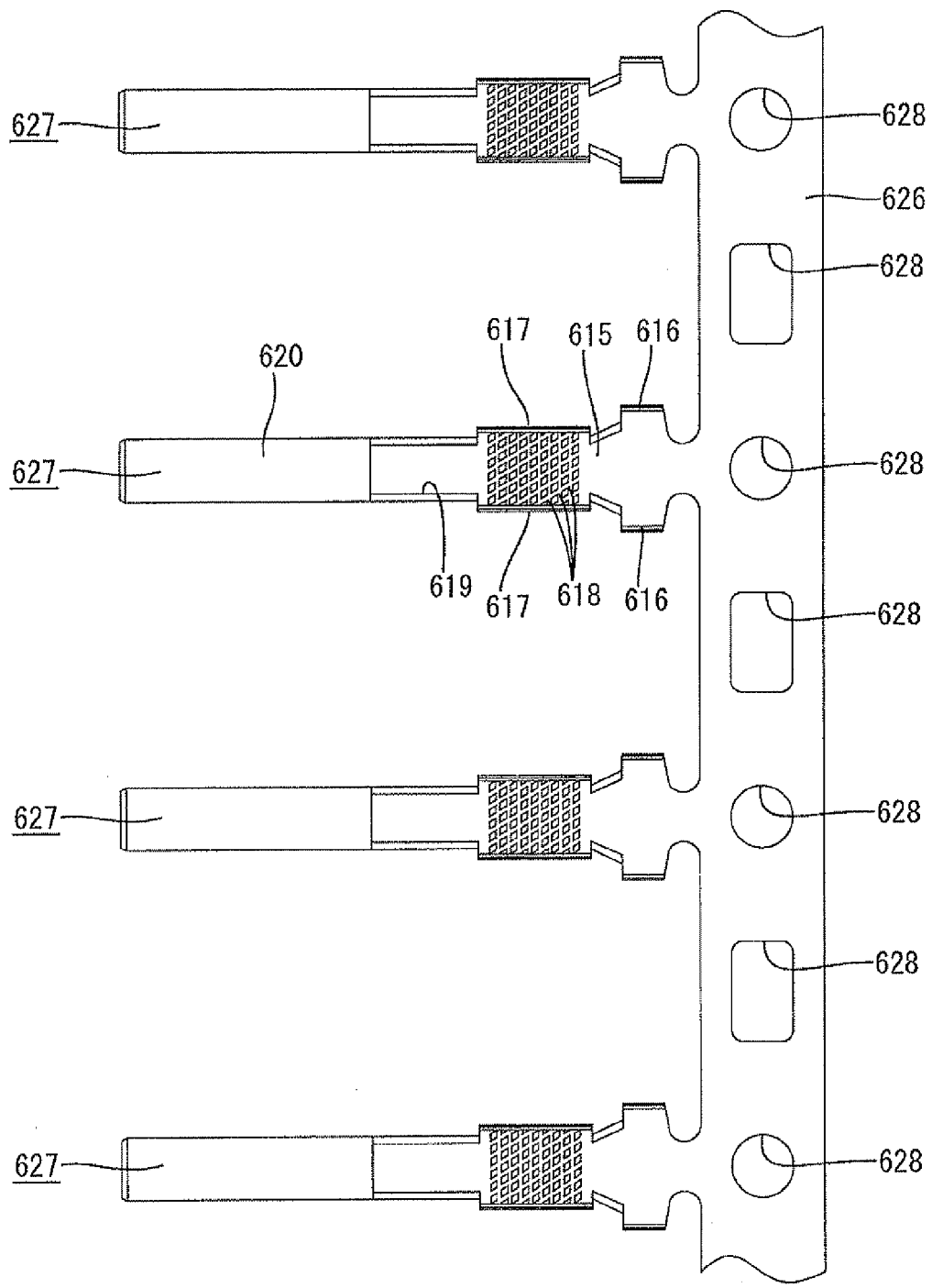
FIG. 69 is a plan view showing a state where a bending step is completed.
Figure 70:
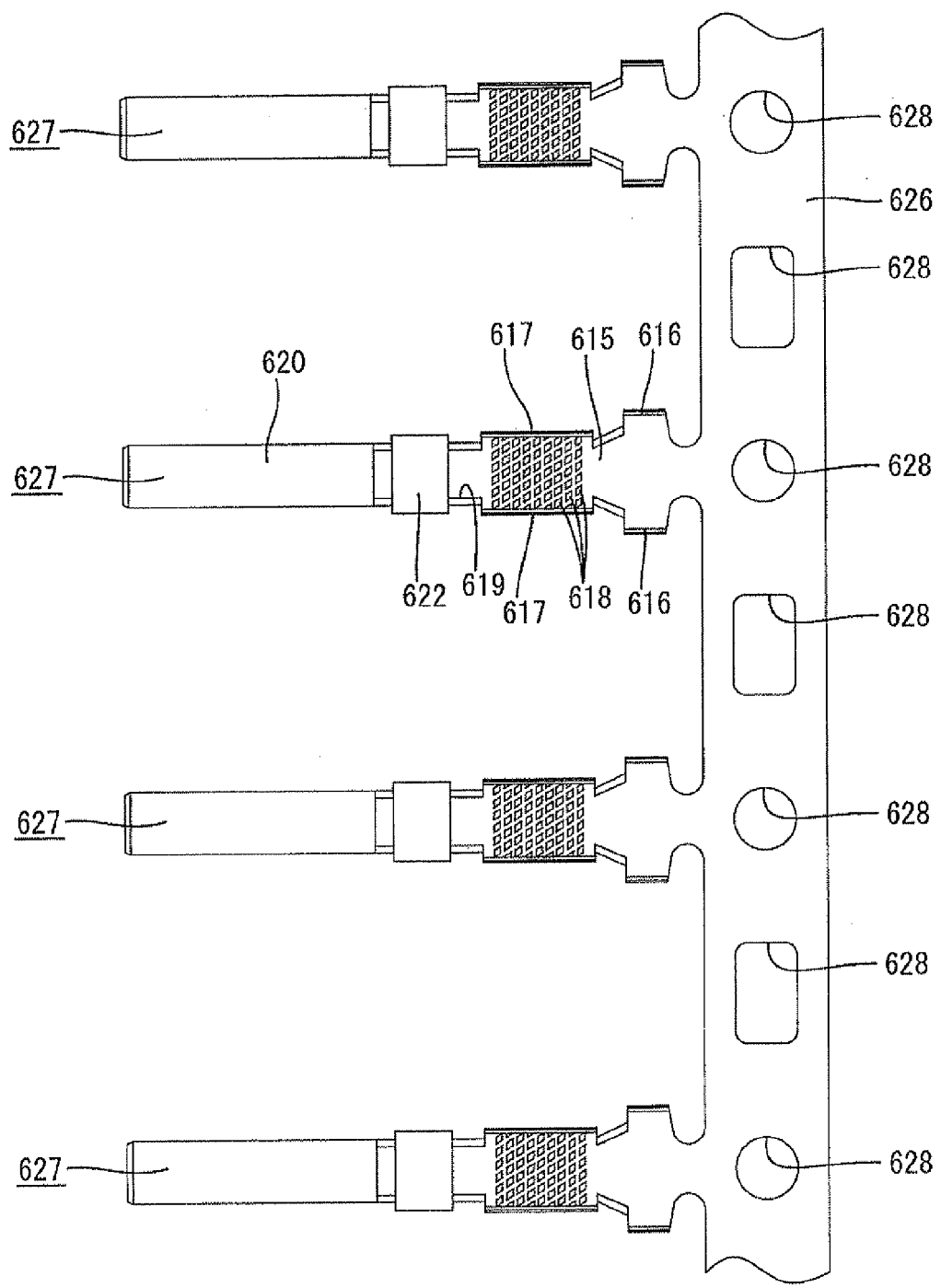
FIG. 70 is a plan view showing a state where a molding step is completed.

As shown in FIG. 69, part of the bottom plate 615 located between the wire barrels 617 and the wire barrels 617 have a plurality of recesses 618 formed in their surfaces on the side where the core wire 613 is placed. Each of the recesses 618 is almost quadrangular and more specifically almost parallelogrammatic. Each of the recesses 618 has a pair of first sides substantially orthogonal to a direction in which the core wire 613 extends (i.e., to a right-left direction in FIG. 69) and a pair of second sides intersecting with the direction in which the core wire 613 extends at an angle smaller than 90°. The recesses 618 are arranged such that the first sides of the adjacent recesses 618 are in alignment with each other and the second sides of the adjacent recesses 618 are also in alignment with each other. Therefore, dies (not shown) for use in forming the recesses 618 by pressing can be produced by forming a plurality of grooves, which makes it possible to reduce production cost.

The first sides of the recesses 618 adjacent to each other in the direction in which the core wire 613 extends overlap one another in the direction in which the core wire 613 extends, which makes it possible to improve the strength of fixation of the wire barrels 617 to the core wire 613. Further, the rims of openings of the recesses 618 are in sliding contact with the surface of the core 613, and therefore the area of contact between the rims of openings of the recesses 618 and the core wire 613 is increased, which as a result makes it possible to reduce the value of electrical resistance between the female terminal 612 and the core wire 613.

An extending portion 619 is provided so as to further extend from the bottom plate 615 in the direction in which the core wire 613 extends. The extending portion 619 is bent such that its surface on the side where the core wire 613 is placed has a concave shape. The extending portion 619 has a substantially U-shaped cross-section, and therefore its upper end is open. It is to be noted that the extending portion 619 may have any cross-sectional shape, such as a semicircular shape, as appropriate.

A tubular connecting portion 620 is provided so as to further extend from the extending portion 619 in the direction in which the core wire 613 extends. The tubular connecting portion 620 has a tubular shape and is configured to connect to a mating terminal not shown. An elastic contact piece 621 is provided in the tubular connecting portion 620. The elastic contact piece 621 is to be brought into elastic contact with a mating terminal.

(Water Blocking Wall 622)

As shown in FIG. 67, the extending portion 619 is provided with a water blocking wall 622 formed by molding a synthetic resin material. As the synthetic resin material constituting the water blocking wall 622, any synthetic resin material, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

Further, the water blocking wall 622 is provided so as to surround the entire outer periphery of the extending portion 619. The inside of the extending portion 619 is filled with the water blocking wall 622. In this embodiment, the water blocking wall 622 has a substantially quadrangular cross-section with rounded corners.

(Resin Ring 623)

A resin ring 623 made of a synthetic resin is fitted onto the end of the electric wire 611. More specifically, the resin ring 623 having a circular cross-section is fitted onto the end of the insulating coating 614 at a position behind a portion where the insulation barrels 616 are crimped (i.e., at a position on the opposite side of the insulation barrels 616 from the exposed core wire 613). The inner diameter of the resin ring 623 is set to be substantially the same as the outer diameter of the insulating coating 614. This makes it possible to easily fit the resin ring 623 onto the end of the electric wire 611. It is to be noted that the term "substantially the same" includes a case where the inner diameter of the resin ring 623 is the same as the outer diameter of the insulating coating 614, a case where the inner diameter of the resin ring 623 is slightly larger than the outer diameter of the insulating coating 614, and a case where the inner diameter of the resin ring 623 is slightly smaller than the outer diameter of the insulating coating 614.

As the synthetic resin constituting the resin ring 623, any synthetic resin, such as a thermoplastic resin (e.g., polyamide, polyester, polypropylene, polyethylene) or a thermosetting resin (e.g., epoxy resin), may be used as appropriate. The above synthetic resins may be used singly or in combination of two or more of them. In this embodiment, a polyamide-based thermoplastic resin is used.

(Water Blocking Coating 625)

A water blocking coating 625 made of a synthetic resin covers a region extending from part of the extending portion 619 where the water blocking wall 622 is provided to the insulating coating 614 beyond the resin ring 623 through the wire barrels 617, the insulation barrels 616, and the resin ring 623 fitted onto the insulating coating 614. In this embodiment, the water blocking coating 625 is composed of a heat-shrinkable tube 624. In this embodiment, the heat-shrinkable tube 624 has an adhesive or pressure-sensitive adhesive layer (not shown) provided on the inner surface thereof. The adhesive or pressure-sensitive adhesive layer is designed to develop adhesiveness or tackiness by thermal softening or melting. It is to be noted that the heat-shrinkable tube 624 may have a structure in which an adhesive or pressure-sensitive adhesive layer is not provided on the inner surface thereof. The length of the heat-shrinkable tube 624 is set longer than that of a region extending from the water blocking wall 622 to the resin ring 623.

In a state where the heat-shrinkable tube 624 is thermally shrunk, the inner surface of the heat-shrinkable tube 624 is in close contact with the entire outer periphery of the water blocking wall 622 without any gap. Further, the inner surface of the heat-shrinkable tube 624 is in close contact with the entire outer periphery of the resin ring 623 without any gap.

The heat-shrinkable tube 624 includes a large-diameter part 629 (i.e., a range A shown in FIG. 67) that covers the insulation barrels 616 embracing the insulating coating 614, the resin ring 623, etc. The large-diameter part 629 is larger in diameter in the up-down direction or a right-left direction (i.e., a direction orthogonal to a direction in which the electric wire with terminal 610 is inserted into the cavity 632) than the other part of the heat-shrinkable tube 624 (which covers the water blocking wall 622, the wire barrels 617, the core wire, the insulating coating 614, etc.). On the other hand, part of the heat-shrinkable tube 624 located in front of the large-diameter part 629 is referred to as a small-diameter part 639A and part of the heat-shrinkable tube 624 located behind the large-diameter part 629 is referred to as a small-diameter part 639B.

The synthetic resin constituting the water blocking wall 622 may be one that develops adhesiveness by thermal softening or melting. In this case, the inner surface of the heat-shrinkable tube 624 can be adhered to the water blocking wall 622 by softening or melting the water blocking wall 622 in the step of heating the heat-shrinkable tube 624.

The synthetic resin constituting the resin ring 623 may be one that develops adhesiveness by thermal softening or melting. In this case, the inner surface of the heat-shrinkable tube 624 can be adhered to the resin ring 623 by softening or melting the resin ring 623 in the step of heating the heat-shrinkable tube 624. Further, by forming the resin ring 623 using such a synthetic resin as described above, it is possible to adhere the resin ring 623 to the outer periphery of the insulating coating 614.

(Positional Relationship Between Connector Housing 631 and Electric Wire with Terminal 610)

When the electric wire with terminal 610 is inserted from the front end side thereof into an opening 632A provided at the back end of the cavity 632 of the connector housing 631 (see FIG. 71), the electric wire with terminal 610 abuts against and elastically deforms the lance and is placed in its correct position (i.e., a position shown in FIG. 71) such that the front end of the female terminal 612 is in close proximity to (is opposed to) the front stopper wall 633. At this time, the lance recovers its original shape and locks the back end of the tubular connecting portion 620 to prevent the electric wire with terminal 610 from slipping off the cavity 632.

In a state where the electric wire with terminal 610 is inserted and placed in its correct position, the large-diameter part 629 of the heat-shrinkable tube 624 of the electric wire with terminal 610 is located outside the cavity 632 (i.e., is not inserted into the cavity 632) and the small-diameter part 639A located in front of the large-diameter part 629 is housed (i.e., inserted) in the cavity 632.

Figure 72:
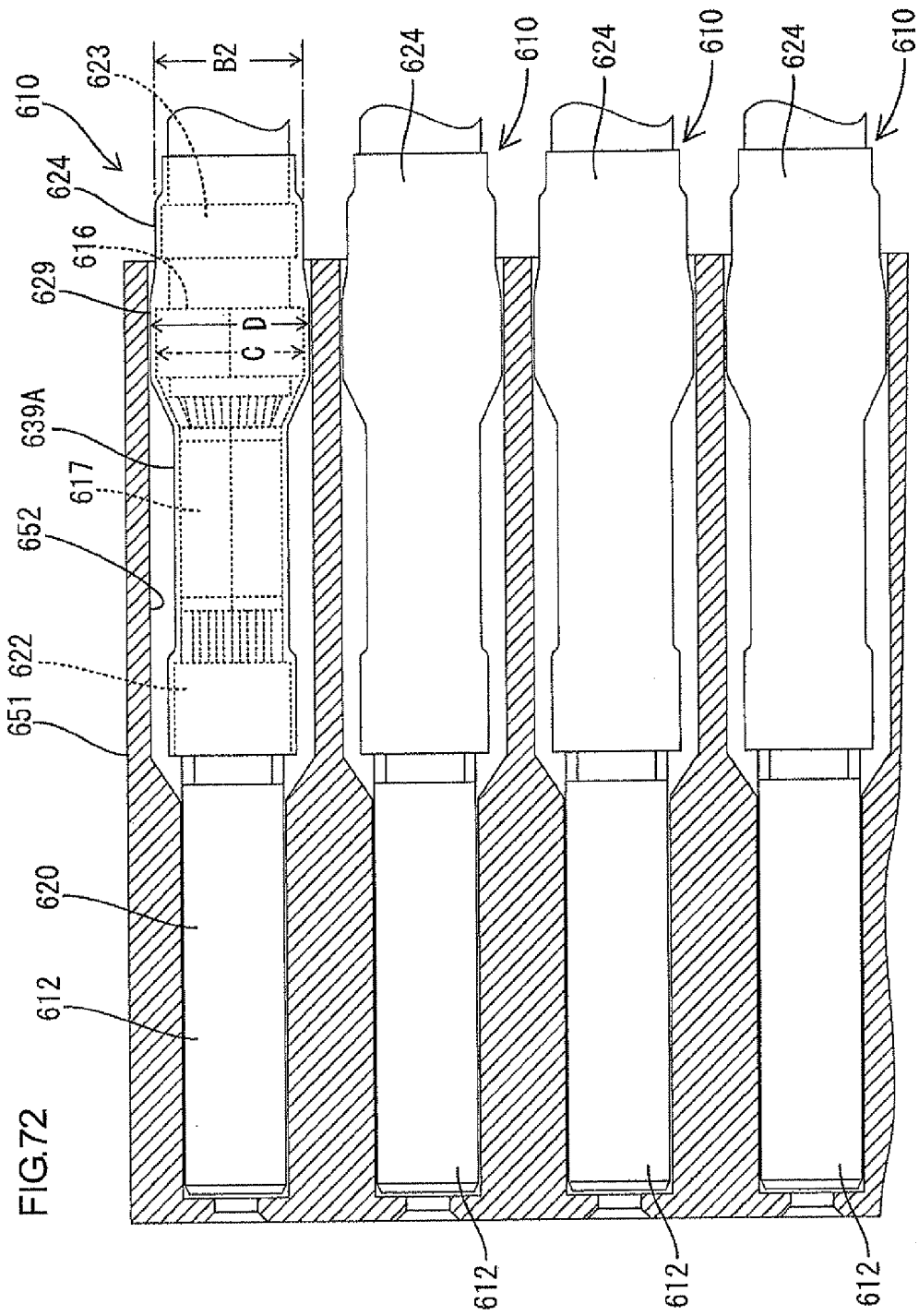
FIG. 72 is a sectional view of a connector as a comparative example in which terminals are fully housed in cavities.

For example, as shown in FIG. 72, when the entire female terminal 612 of the electric wire with terminal 610 is housed (inserted) in a cavity 652 of a connector housing 651, a size B2 of the cavity 652 (i.e., the diameter of the cavity 632 in a right-left direction that is a direction orthogonal to a direction in which the electric wire with terminal 610 is inserted into the cavity 652) needs to be set to a size C of the insulation barrels 616 (the diameter of the insulation barrels 616 in the right-left direction), which causes the problem of an increase in the size of the connector housing 651. Particularly, in the case of this embodiment in which the female terminal 612 is covered with the heat-shrinkable tube 624, when not only the small-diameter part 639A but also the large-diameter part 629 is housed (inserted) in the cavity 652, the size of the cavity 652 needs to be increased to the sum of the size C of the insulation barrels 616 (i.e., the diameter of the insulation barrels 616 in the right-left direction) and the thickness of the heat-shrinkable tube 624 (i.e., to a size D shown in FIG. 72), which makes it impossible to respond to a request for reduction in connector size.

On the other hand, according to this embodiment, as shown in FIG. 71, the large-diameter part 629 is located outside the cavity 632. Therefore, it is only necessary for the cavity 632 to have a size B1 (<B2) such that the small diameter part 639A smaller in diameter than the large-diameter part 629 can pass through the cavity 632. This makes it possible to eliminate the necessity for increasing the diameter of the cavity 632 and therefore to reduce the size of the connector 630. Generally, the insulation barrels 616 cannot be provided outside the cavity 632 because they need to be insulated from outside. However, according to this embodiment, the insulation barrels 616 are covered with the heat-shrinkable tube 624, which makes it possible to ensure insulation of the insulation barrels 616 from outside.

(Production Process)

Hereinbelow, one example of a production process of the electric wire with terminal 610 according to this embodiment will be described. First, a metallic plate material is subjected to a punching step to form a strip-shaped carrier 626 and a plurality of terminal strips 627 connected to the side edge of the carrier 626 (see FIG. 69). The carrier 626 has feed holes 628 arranged at substantially regular intervals along the longitudinal direction thereof. The feed holes 628 are configured to be engaged with feed claws (not shown) of a processing machine.

The terminal strips 627 connected to the carrier 626 are arranged at substantially regular intervals along the longitudinal direction of the carrier 626. Each of the terminal strips 627 includes a bottom plate 615 on which an insulating coating 614 of an electric wire 611 and a core wire 613 are to be placed, insulation barrels 616 that project from the bottom plate 615 and are to be crimped onto the insulating coating 614, and wire barrels 617 that project from the bottom plate 615 and are to be crimped onto the core wire 613.

In the punching step, a plurality of recesses 618 may be formed in the surfaces of the wire barrels 617 on the side where the wire core 613 is to be placed. Alternatively, the recesses 618 may be formed in a step other than the punching step.

The metallic plate material that has been subjected to the punching step is then subjected to a bending step. By performing the bending step, an extending portion 619 and a tubular connecting portion 620 are formed. The extending portion 619 extends in a direction in which the core wire 613 extends in a state where the core wire 613 is placed on the bottom plate 615 and has a concave-shaped surface on the side where the core wire 613 is to be placed. The tubular connecting portion 620 extends from the extending portion 619 in a direction corresponding to the direction in which the core wire 613 extends.

Then, a synthetic resin is molded in the extending portion 619 of each of the terminal strips 627 while the terminal strips 627 are fed one after another by engaging the feed holes 628 formed in the carrier 626 with the feed claws. More specifically, first, part of the extending portion 619 where a water blocking wall 622 should be formed is sandwiched between a pair of dies (not shown). Then, a synthetic resin in a molten state is injected into a cavity formed by the dies. After the synthetic resin is solidified in the dies, the pair of dies is opened to separate the terminal strip 627 provided with the water blocking wall 622 from the dies. The above step is continuously performed on the terminal strips 627 connected to the carrier 626 at substantially regular intervals (see FIG. 70).

On the other hand, the insulating coating 614 of the electric wire 611 is stripped off to expose the core wire 613. Then, a resin ring 623 is fitted onto the end of the insulating coating 614. The resin ring 623 is fitted onto part of the insulating coating 614 different from part of the insulating coating 614 onto which the insulation barrels 615 are to be crimped (i.e., onto part of the insulating coating 614 located on the side opposite to the core wire 613).

Then, a crimping step is performed on each of the terminal strips 627. More specifically, the exposed core wire 613 of the electric wire 611 and the insulating coating 614 are placed on the bottom plate 615 of each of the terminal strips 627. Then, the insulation barrels 616 and the wire barrels 617 are bent by dies (not shown) to externally hold the insulating coating 614 and the core wire 613, respectively. This makes it possible to crimp the insulation barrels 616 onto the insulating coating 614 and to crimp the wire barrels 617 onto the core wire 613.

In this embodiment, a cutting step to cut each of the terminal strips 627 from the carrier 626 is performed at the same time as the above-described crimping step. This makes it possible to cut each of the terminal strips 627 from the carrier 626 as a female terminal 612 and to provide an electric wire with terminal 610 in which the female terminal 612 is connected to the electric wire 611.

Then, a covering step is performed. More specifically, a heat-shrinkable tube 624 is passed through from the electric wire 611 side or the female terminal 612 side such that the heat-shrinkable tube 624 covers a region extending from the water blocking wall 622 to the insulating coating 614 beyond the resin ring 623. The heat-shrinkable tube 624 can be relatively easily passed through from the female terminal 612 side by setting the inner diameter of the heat-shrinkable tube 624 before heating larger than the outer shape of the tubular connecting portion 620. When the heat-shrinkable tube 624 is passed through from the electric wire 611 side, the electric wire 611 may be passed through the heat-shrinkable tube 624 in advance before the crimping step is performed.

After the heat-shrinkable tube 624 is passed through, the heat-shrinkable tube 624 is shrunk by performing a heating step using a heating device not shown. This makes it possible to bring the inner surface of the heat-shrinkable tube 624 into close contact with the water blocking wall 622 and the resin ring 623 without any gap. In such a way as described above, the electric wire with terminal 610 is completed.

It is to be noted that in the above-described heating step, in a state where the tubular connecting portion 620 is placed upward, the synthetic resin constituting the water blocking wall 622 can be prevented from flowing into the tubular connecting portion 620 even when the water blocking wall 622 is melted in the heating step. This makes it possible to improve the reliability of electrical connection with a mating terminal in the tubular connecting portion 620.

Advantageous Effect of the Invention

According to this embodiment, the following effects can be obtained.

(1) According to this embodiment, the water blocking wall 622 is provided so as to fill the inside of the extending portion 619, which makes it possible to inhibit the entry of water through the extending portion 619 to inhibit the adhesion of water to the core wire 613 and the wire barrels 617. Further, the entire outer periphery of the water blocking wall 622 is in close contact with the inner surface of the heat-shrinkable tube 624 (water blocking coating) without any gap, which makes it possible to inhibit the entry of water from between the water blocking wall 622 and the heat-shrinkable tube 624. Therefore, the region extending from part of the extending portion 619 where the water blocking wall 622 is provided to the insulating coating 614 beyond the resin ring 623 through the wire barrels 617, the insulation barrels 616, and the resin ring 623 fitted onto the insulating coating 614 is made waterproof by the heat-shrinkable tube 624, which makes it possible to reliably inhibit the adhesion of water to the core wire 613 and the wire barrels 617.

Here, in such a case where the heat-shrinkable tube 624 (water blocking coating) is used, the diameter of the electric wire with terminal 610 in a direction orthogonal to a direction in which the terminal is inserted into the cavity is larger by the thickness of the heat-shrinkable tube 624 than when the heat-shrinkable tube 624 is omitted. Therefore, when the electric wire with terminal 610 having the heat-shrinkable tube 624 is inserted into the cavity 632 of the connector housing 631, the diameter of the cavity 632 needs to be increased depending on the thickness of the heat-shrinkable tube 624, which may be an obstacle to miniaturization of the connector 630.

On the other hand, according to this embodiment, the large-diameter part 629 of the heat-shrinkable tube 624 (water blocking coating) larger in diameter in a direction orthogonal to a direction in which the female terminal 612 (terminal) is inserted into the cavity 632 is located outside the cavity 632 in a state where the female terminal 612 is inserted into the cavity 632 and placed in its correct position, and therefore it is not necessary to increase the diameter of the cavity 632 depending on the diameter of the large-diameter part 629. Therefore, waterproofness can be more reliably achieved by the heat-shrinkable tube 624 (water blocking coating) and the connector can be miniaturized.

(2) When the female terminal 612 is inserted into the cavity 632 of the connector 630, the insulation barrels 616 holding the insulating coating 614 of the electric wire 611 need to be insulated from outside and therefore generally cannot be provided outside the cavity 632. However, this embodiment is applied to a structure in which the tubular heat-shrinkable tube 624 (water blocking coating 625) extending from the water blocking wall 622 to the end of the insulating coating 614 is provided to cover the core wire 613. Therefore, in the large-diameter part 629 including the insulation barrels 616 covered with the heat-shrinkable tube 624, the insulation barrels 616 are insulated from outside by the heat-shrinkable tube 624. Therefore, when the female terminal 612 (terminal) having the insulation barrels 616 is used, it is possible to reliably insulate the insulation barrels 616 from outside while reducing the size of the connector.

(3) The resin ring 623 is fitted onto the end of the insulating coating 614 and the inner surface of the heat-shrinkable tube 624 is in close contact with the entire periphery of the resin ring 623 without any gap. This makes it possible to reliably inhibit the entry of water from the end side of the insulating coating 614 and therefore to more reliably inhibit the adhesion of water to the core wire 613 and the wire barrels 617. Particularly, even when the heat-shrinkable tube 624 having no adhesive layer is used, it is possible to reliably prevent the entry of water from between the heat-shrinkable tube 624 and the insulating coating 614. Further, the use of the heat-shrinkable tube 624 having no adhesive layer makes it possible to reduce production cost.

(4) When the metal constituting the core wire 613 and the metal constituting the female terminal 612 are different from each other, there is a fear that when water adheres to both the core wire 613 and the wire barrels 617, electrolytic corrosion occurs in the core wire 613 or the wire barrels 617. According to this embodiment, the core wire 613 and the wire barrels 617 are reliably made waterproof by the heat-shrinkable tube 624, which makes it possible to inhibit the core wire 613 or the wire barrels 617 from being dissolved by electrolytic corrosion.

(5) This is effective particularly when the core wire 613 is made of aluminum or an aluminum alloy and the female terminal 612 has a tin plated layer on its surface made of copper or a copper alloy as in the case of this embodiment, because there is a fear that the core wire 613 made of aluminum or an aluminum alloy having a relatively high ionization tendency is dissolved by electrolytic corrosion. It is to be noted that aluminum or an aluminum alloy has a relatively low specific gravity, which makes it possible to reduce the weight of the electric wire 611.

(6) The heat-shrinkable tube 624 has an adhesive or pressure-sensitive adhesive layer provided on the inner periphery thereof, and therefore by performing the heating step to shrink the heat-shrinkable tube 624, the inner surface of the heat-shrinkable tube 624 can be reliably brought into close contact with the water blocking wall 622 without any gap and the heat-shrinkable tube 624 can be reliably brought into close contact with the end of the insulating coating 614 without any gap.

As described above, the use of the heat-shrinkable tube 624 having an adhesive or pressure-sensitive adhesive layer provided on the inner periphery thereof as the water blocking coating 625 makes it possible to improve the work efficiency of the step of externally surrounding the region extending from the water blocking wall 622 to the end of the insulating coating 614 with the heat-shrinkable tube 624 as well as to improve adhesion between the heat-shrinkable tube 624 and the water blocking wall 622 and adhesion between the heat-shrinkable tube 624 and the end of the insulating coating 614.

(7) According to this embodiment, the water blocking coating 625 is composed of the heat-shrinkable tube 624. The inner diameter of the heat-shrinkable tube 624 before heating is relatively large, which makes it easy for the heat-shrinkable tube 624 to externally surround the above-described region. Then, by thermally shrinking the heat-shrinkable tube 624, the inner surface of the heat-shrinkable tube 624 can be brought into close contact with the water blocking wall 622 and the end of the insulating coating 614 without any gap. As described above, the use of the heat-shrinkable tube 624 as the water blocking coating 625 makes it possible to improve the work efficiency of the step of externally surrounding the region extending from the water blocking wall 622 to the end of the insulating coating 614 with the heat-shrinkable tube 624.

<Other Embodiment>

The present invention is not limited to the embodiment described above with reference to the drawings, and for example, the following embodiments are also included in the technical scope of the present invention.

(1) In the embodiment 6-1, the terminal is the female terminal 612. However, the terminal is not limited thereto and may have any shape as appropriate. For example, the terminal may be a male terminal provided with a male tab further extending from the extending portion 619 in a direction in which the core wire 613 extends, a so-called LA terminal provided with a disk-shaped connecting portion connected to the extending portion 619 and having a through hole in the connecting portion, and a splice terminal provided with other wire barrels 617 connected to the extending portion 619 to connect to the two or more electric wires 611.

(2) In the embodiment 6-1, the water blocking wall 622 has a substantially quadrangular cross-section. However, the cross-sectional shape of the water blocking wall 622 is not limited thereto. The water blocking wall 622 may have any cross-sectional shape, such as a circular shape, an elliptical shape, an oval shape, or a polygonal shape (e.g., a triangular shape), as appropriate.

(3) The water blocking coating 625 may be provided by wrapping a sheet-shaped water blocking tape around a region extending from the water blocking wall 622 to the end of the insulating coating 614.

(4) In the embodiment 6-1, the step of forming the water blocking wall 622 is performed before the step of crimping the wire barrels 617 onto the core wire 613 is performed. However, the order in which these steps are performed is not limited thereto. For example, the step of forming the water blocking wall 622 may be performed after the step of crimping the wire barrels 617 onto the core wire 613 is performed.

(5) In the embodiment 6-1, the core wire 613 is made of aluminum or an aluminum alloy. However, the material of the core wire 613 is not limited thereto, and the core wire 613 may be made of any metal as appropriate. For example, the core wire 613 may be made of copper or a copper alloy. Further, in the embodiment 6-1, the female terminal 612 is made of copper or a copper alloy and has a tin plated layer on the surface thereof. However, the material of the terminal is not limited thereto, and the female terminal 612 may be made of any metal as appropriate.

(6) In the embodiment 6-1, the crimping step and the cutting step are performed at the same time. However, the order in which these steps are performed is not limited thereto. For example, the cutting step may be performed after the crimping step is performed.

(7) In the embodiment 6-1, the terminal has the insulation barrels 616. However, the insulation barrels 616 may be omitted.

(8) The water blocking coating 625 may be configured to cover a region extending from part of the extending portion 619 where the water blocking wall 622 is provided to the resin ring 623 fitted onto the insulating coating through the wire barrels 617 and the insulation barrels 616.

(9) In the embodiment 6-1, the resin ring 623 has an annular shape. However, the shape of the resin ring 623 is not limited thereto. For example, the resin ring 623 may have a slit to have a substantially C-shaped cross-section. This makes it easy to expand the resin ring 623 in its radial direction. Therefore, for example, the resin ring 623 can be fitted onto the electric wire 611 by expanding the resin ring 623 in its radial direction after the terminal is crimped onto the electric wire 611.

(10) In the embodiment 6-1, the large-diameter part 629 is the range A of the heat-shrinkable tube 624 extending from the insulation barrels 616 to the resin ring 623. However, the large-diameter part 629 is not limited thereto. For example, the large-diameter part 629 may be provided by either the insulation barrels 616 or the heat-shrinkable tube 624 or may be provided by the other component than the insulation barrels 616 and the heat-shrinkable tube 624.

Further, two or more large-diameter parts 629 may be provided. For example, when the heat-shrinkable tube 624 can be brought into close contact with the insulating coating 614 between the insulation barrels 616 and the resin ring 623, large-diameter parts may be provided by both part of the heat-shrinkable tube 624 covering the insulation barrels 616 and part of the heat-shrinkable tube 624 covering the resin ring 623. It is to be noted that when two or more large-diameter parts are provided, all the large-diameter parts may be provided outside the cavity 632. Alternatively, the large-diameter part(s) having a larger diameter may be provided outside the cavity 632. In this case, the large-diameter part(s) having a diameter smaller than the diameter of the large-diameter part having a larger diameter may be housed (inserted) in the cavity 632.

(11) In the embodiment 6-1, the resin ring 623 is provided between the heat-shrinkable tube 624 and the insulating coating 614 of the electric wire 611. However, the resin ring 623 may be omitted. However, when the resin ring 623 is omitted, an adhesive or pressure-sensitive adhesive layer is preferably provided on the inner surface of the heat-shrinkable tube 624 (water blocking coating) to ensure waterproofness. However, providing the resin ring 623 between the heat-shrinkable tube 624 and the insulating coating 614 of the electric wire 611 as in the case of the embodiment 6-1 is generally preferable to providing the adhesive layer or the like to achieve cost reduction.

Means for Solving the Problem

The technique disclosed in this description relates to a connector capable of fitting to a mating connector, the connector including: an electric wire with terminal obtained by connecting a terminal to an electric wire obtained by covering an outer periphery of a core wire with an insulating coating; and a connector housing having a cavity into which the terminal is inserted. The terminal has a wire barrel crimped onto the core wire exposed beyond an end of the insulating coating and an extending portion extending from a bottom plate of the wire barrel. The extending portion is provided with a water blocking wall obtained by molding a synthetic resin. The core wire is covered with a tubular water blocking coating that is in close contact with an outer surface of the water blocking wall and an outer surface of the end of the insulating coating and that extends from the water blocking wall to the end of the insulating coating. In a state where the terminal is inserted in the cavity and placed in its correct position, a large-diameter part of the water blocking coating whose diameter in a direction orthogonal to a direction in which the terminal is inserted into the cavity is larger is located outside the cavity (first means).

The structure of the first means allows the water blocking wall to inhibit the entry of water into the electric wire side. Further, the outer surface of the water blocking wall is in close contact with the water blocking coating, which makes it possible to inhibit the entry of water from between the water blocking wall and the water blocking coating. Therefore, a region extending from the water blocking wall to the end of the insulating coating is made waterproof by the water blocking coating, which makes it possible to inhibit the adhesion of water to the core wire and the wire barrel.

In such a case where the water blocking coating is used, the diameter of the electric wire with terminal in a direction orthogonal to the direction in which the terminal is inserted into the cavity becomes larger by the thickness of the water blocking coating than when the water blocking coating is omitted. Therefore, when the electric wire with terminal having the water blocking coating is inserted into the cavity of the connector housing, the diameter of the cavity needs to be increased depending on the thickness of the water blocking coating, which may be an obstacle to miniaturization of the connector.

On the other hand, in the case of the structure of the first means, the large-diameter part of the water blocking coating larger in diameter in a direction orthogonal to the direction in which the terminal is inserted into the cavity is located outside the cavity in a state where the terminal is inserted into the cavity and placed in its correct position. Therefore, it is not necessary to increase the diameter of the cavity depending on the diameter of the large-diameter part. Therefore, waterproofness can be more reliably achieved by the water blocking coating and the connector can be miniaturized.

In addition to the structure of the first means, the terminal may include an insulation barrel holding the insulating coating of the electric wire. The diameter-large part may be provided by the insulation barrel covered with the water blocking coating (second means).

When the terminal is inserted into the cavity of the connector, the insulation barrel holding the insulating coating of the electric wire needs to be insulated from outside and therefore generally cannot be provided outside the cavity. However, the technique disclosed in this description is applied to the structure in which the tubular water blocking coating extending from the water blocking wall to the end of the insulating coating is provided to cover the core wire. Therefore, in the large-diameter part covered with the water blocking coating, the insulation barrel is insulated from outside by the water blocking coating. In the case of the structure of the second means, the large-diameter part is provided by the insulation barrel covered with the water blocking coating, which makes it possible, when the terminal having the insulation barrel is used, to reliably insulate the insulation barrel from outside as well as to miniaturize the connector.

In addition to the structure of the first or second means, a resin ring may be fitted onto the end of the insulating coating such that the inner surface of the water blocking coating is in close contact with the resin ring (third means).

The structure of the third means makes it possible, even when the water blocking coating having no adhesive layer is used, to reliably prevent the entry of water from between the water blocking coating and the insulating coating. Further, the use of the water blocking coating having no adhesive layer makes it possible to reduce production cost.

In addition to the structure of any one of the first to third means, a metal constituting the core wire and a metal constituting the terminal may be different from each other (fourth means).

In the case of the structure of the fourth means, when a metal constituting the core wire and a metal constituting the terminal are different from each other, there is a fear that when water adheres to both the core wire and the wire barrel, electrolytic corrosion occurs in the core wire or the wire barrel. However, according to the above embodiments, the core wire and the wire barrel are reliably made waterproof by the water blocking coating, which makes it possible to inhibit the core wire or the wire barrel from being dissolved by electrolytic corrosion. Therefore, the above embodiments are particularly effective when a metal constituting the core wire and a metal constituting the terminal are different from each other.

In addition to the structure of any one of the first to fourth means, the core wire may be made of aluminum or an aluminum alloy (fifth means).

In the case of the structure of the fifth means, the weight of the electric wire can be reduced because aluminum or an aluminum alloy has a relatively low specific gravity. On the other hand, aluminum or an aluminum alloy has a relatively high ionization tendency, and is therefore easily dissolved when electrolytic corrosion occurs. However, according to the above embodiments, the core wire and the wire barrel are reliably made waterproof by the water blocking coating. Therefore, the above embodiments are particularly effective when the core wire is made of aluminum or an aluminum alloy.

In addition to the structure of any one of the first to fifth means, the water blocking coating may have an adhesive or pressure-sensitive adhesive layer provided on the inner periphery thereof (sixth means).

The structure of the sixth means makes it possible to bring the inner periphery of the water blocking coating into close contact with a region extending from the water blocking wall to the end of the insulating coating without any gap.

In addition to the structure of any one of the first to sixth means, the water blocking coating may be a heat-shrinkable tube (seventh means).

In the case of the structure of the seventh means, the inner diameter of the heat-shrinkable tube before heating is relatively large, which makes it possible to easy for the heat-shrinkable tube to externally surround the above-described region. Then, by thermally shrinking the heat-shrinkable tube, the inner surface of the heat-shrinkable tube can be brought into close contact with the water blocking wall and the end of the insulating coating. As described above, the use of the heat-shrinkable tube as the water blocking coating makes it possible to improve the work efficiency of the step of externally surrounding a region extending from the water blocking wall to the end of the insulating coating with the heat-shrinkable tube.

(Effects)

According to the technique disclosed in this description, it is possible to prevent the entry of water into the electric wire side.

<Embodiment 7-1>

As a conventional electric wire with terminal, one disclosed in JP 2000-285983 A is known. This electric wire with terminal includes: an electric wire obtained by covering the outer periphery of a core wire with an insulating layer; and a terminal connected to an exposed portion of the core wire not covered with the insulating layer. The core wire is connected to the terminal by crimping a wire barrel of the terminal onto the core wire.

The electric wire with terminal is used in, for example, the engine room of a car. As described in JP 2000-285983 A, in general, water may enter the engine room of a car, and therefore there is a fear that water comes into contact with a connection portion of the terminal and the electric wire. When water comes into contact with such a connecting portion, the terminal and the core wire are corroded because they are made of a metal material. Particularly, in a case where members connected to each other are made of different metal materials, such as a case where the terminal is made of copper and the core wire is made of aluminum, corrosion is likely to occur. Therefore, in the electric wire with terminal disclosed in Patent Document 1, the connecting portion is covered with a heat-shrinkable tube. The heat-shrinkable tube covering the connecting portion prevents water from entering the connecting portion in the electric wire with terminal.

It is to be noted that the connecting portion of the terminal and the electric wire is first covered with the heat-shrinkable tube before thermal shrinkage (i.e., before heat treatment). At this time, the position of the unheated heat-shrinkable tube is adjusted such that the heat-shrinkable tube can cover and surround the connecting portion. The heat-shrinkable tube is subjected to heat treatment in such a state where its position is adjusted (i.e., positioning is completed). The heat-shrinkable tube is thermally shrunk by the heat treatment and comes into close contact with the connecting portion. As a result, the heat-shrinkable tube is fitted to the electric wire.

Meanwhile, there is a case where the heat-shrinkable tube is displaced after the positioning of the heat-shrinkable tube covering the electric wire with terminal is completed, which has become a problem. The inner diameter of the heat-shrinkable tube before heating is set large to some degree. Therefore, even after the positioning of the heat-shrinkable tube is completed, there is a gap between the heat-shrinkable tube and the connecting portion and therefore the heat-shrinkable tube is likely to be displaced from the connecting portion.

Further, the unheated heat-shrinkable tube has some degree of elasticity in a state where it covers the connecting portion after positioning. Therefore, there is a case where, even when the unheated heat-shrinkable tube is in close contact with the connecting portion, the unheated heat-shrinkable tube spontaneously moves due to its own elasticity (resilience) with time. The heat treatment is sometimes performed just after the connecting portion is covered with the heat-shrinkable tube, but is sometimes performed after a certain amount of time. Therefore, such displacement of the heat-shrinkable tube has become a problem.

Further, there is also a case where, for example, when the electric wire covered with the heat-shrinkable tube is transferred, the heat-shrinkable tube is subjected to external force due to contact with its surroundings and then displaced.

It is desired that once the positioning of the heat-shrinkable tube is completed to cover the connecting portion, the heat-shrinkable tube will not be displaced from the connecting portion. Further, it is also desired that once the positioning of a tubular coating member other than the above-described heat-shrinkable tube for use in this kind of electric wire with terminal is completed to cover the electric wire with terminal, the tubular coating member will not be displaced.

Under the above circumstances, the technique disclosed in this description has been completed to provide an electric wire with terminal that is capable of easily performing the positioning of a tubular water blocking coating for covering it and is excellent in waterproofness and a terminal to be attached to the electric wire.

Figure 73:
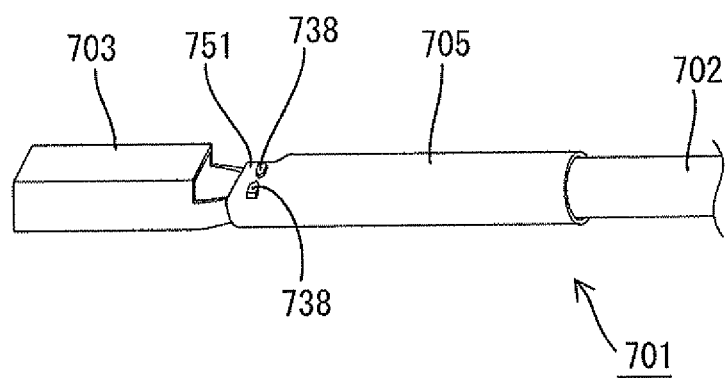
FIG. 73 is a perspective view of an electric wire with terminal according to an embodiment 7-1 of the present invention.

An electric wire with terminal 701 according to an embodiment 7-1 of the present invention will be described with reference to FIGS. 73 to 87. As shown in. FIG. 73 etc., the electric wire with terminal 701 includes an electric wire 702, a terminal 703 attached to the end of the electric wire 702, a water blocking wall 704 attached to the terminal 703, and a tubular water blocking coating 705 that surrounds and covers the water blocking wall 704 and a connecting portion of the electric wire 702 and the terminal 703.

(Electric Wire 702)

Figure 74:
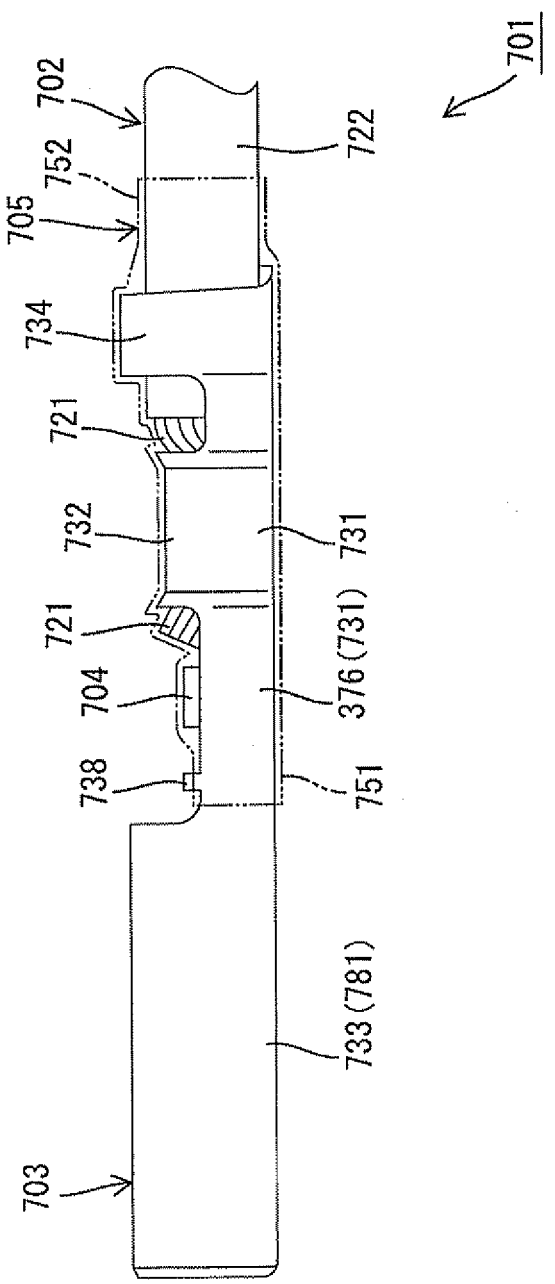
FIG. 74 is a side view of the electric wire with terminal.
Figure 75:
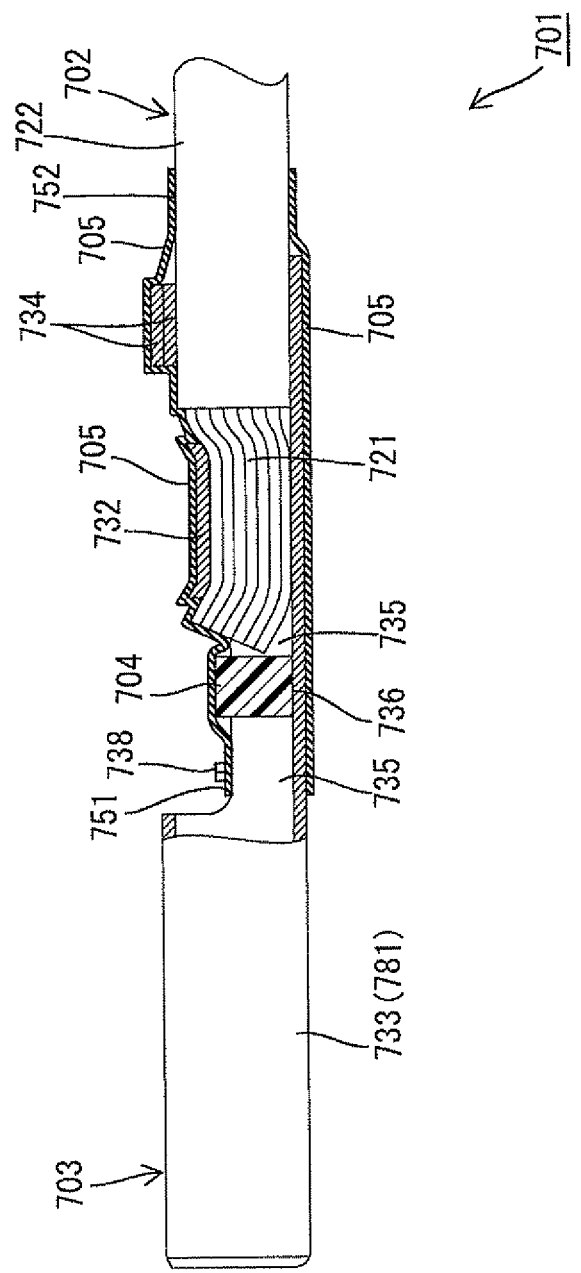
FIG. 75 is a cutaway sectional view of a main part of the electric wire with terminal.

As shown in FIG. 74 etc., the electric wire 702 includes one core wire 721 obtained by twisting a plurality of thin metallic wires and an insulating layer 722 made of a synthetic resin and covering the outer periphery of the core wire 721. As a material constituting the core wire 721, any metal, such as copper, a copper alloy, aluminum, or an aluminum alloy, is appropriately selected. In this embodiment, aluminum or an aluminum alloy is used as the material of the core wire 721. The insulating layer 722 is removed at the end of the electric wire 702. Therefore, the end of the core wire 721 is exposed without being covered with the insulating layer 722. It is to be noted that, in other embodiments, the core wire 721 may be a single core wire.

(Terminal 703)

The terminal 703 is a so-called female terminal, and is to be connected to a mating male terminal (not shown). The terminal 703 is obtained by, for example, pressing a metallic plate material into a predetermined shape. As a metal constituting the terminal 703, any metal, such as copper or a copper alloy, is appropriately selected. It is to be noted that, in this embodiment, the metallic plate material constituting the terminal 703 has a plated layer (not shown) provided on the surface thereof. As a metal constituting the plated layer, any metal such as tin or nickel is appropriately selected. In this embodiment, a tin plated layer is provided on the surface made of the metal (copper or a copper alloy) constituting the terminal 703. In other embodiments, the terminal 703 may be composed of a metallic plate material having no plated layer.

The terminal 703 includes a bottom plate 731, wire barrels 732, a tip portion 733, insulation barrels 734, and projecting portions 738.

The bottom plate 731 has a shape such that its both edges extending along the axial direction of the electric wire 702 stand to form a groove 735 inside. The bottom plate 731 has a curved bottom surface and a substantially U-shaped cross-section. The exposed end of the core wire 721 of the electric wire 702 and the insulating layer 722 at the base of the exposed core wire 721 are placed on the bottom plate 731 so as to be held in the groove 735. It is to be noted that on the tip side of the bottom plate 731, there is a portion (region) 736 on which the core wire 721 is not placed. That is, the exposed end of the core wire 721 is placed on the bottom plate 731 such that a space is left on the tip side of the bottom plate 731. In this specification, this portion 736 is particularly referred to as a blank space. It is to be noted that as will be described later, the water blocking wall 704 is provided in part of the blank space 736.

At both the edges of part of the bottom plate 731 on which the core wire 721 is placed, a pair of wire barrels 732 facing each other is provided. The wire barrels 732 have a plate shape and extend upward from both the edges of the bottom plate 731 before the terminal 703 is attached to the electric wire 702. The wire barrels 732 are crimped onto the core wire 721 so as to hold the core wire 721 placed on the bottom plate 731 to attach the terminal 703 to the electric wire 702.

Further, at both the edges of part of the bottom plate 731 on which the insulating layer 722 at the base of the exposed core wire 721 is placed, a pair of insulation barrels 734 facing each other is provided. The insulation barrels 734 have a strip shape smaller in width than the wire barrel 732. As in the case of the wire barrels 732, the insulation barrels 734 extend upward from both the edges of the bottom plate 731 before the terminal 703 is attached to the electric wire 702. The insulation barrels 734 are crimped onto the insulating layer 722 so as to hold the insulating layer 722 at the base of the core wire 721 placed on the bottom plate 731.

The tip portion 733 includes a tubular connecting portion 781 having a substantially square cross-section. The tubular connecting portion 781 extends from the tip side of the bottom plate 731. An elastic contact piece 782 (see FIG. 81) is provided in the tubular connecting portion 781. The elastic contact piece 782 is to be brought into elastic contact with a mating male terminal (not shown).

The projecting portions 738 have an elongated shape and extend upward from both the edges of the bottom plate 731 in the blank space 736. Both the projecting portions 738 have a sharp tip and substantially the same height. The height of the projecting portions 738 is appropriately set in consideration of the size (inner diameter) of the tubular water blocking coating covering the terminal 703. The projecting portions 738 are provided at the edges of the bottom plate 731 in the blank space 736 at positions closer to the tip side (tip portion 733 side) of the bottom plate 731 than a position where the water blocking wall 704 is provided. The projecting portions 738 are configured to pierce the rim (open end 751) of the water blocking coating 705 from the inside to the outside of the water blocking coating 705. By piercing the water blocking coating 705 with the projecting portions 738, it is possible to achieve the positioning of the water blocking coating 705 with respect to the terminal 703.

The projecting portions 738 are bent (folded down) at their root using a predetermined tool (not shown) in a state where they pierce the water blocking coating 705 to press the water blocking coating 705 from above. As shown in FIG. 73 etc., the projecting portions 738 are folded down toward the inside of the bottom plate 731 so as to come close to each other from both the edges of the bottom plate 731. By folding down the projecting portions 738 in such a way, it is possible to inhibit the water blocking coating 705 from coming (slipping) off the projecting portions 738 to inhibit the displacement of the water blocking coating 705. Further, it is also possible to inhibit the projecting portions 738 from undesirably getting caught on surrounding objects.

(Water Blocking Wall 704)

Figure 76:
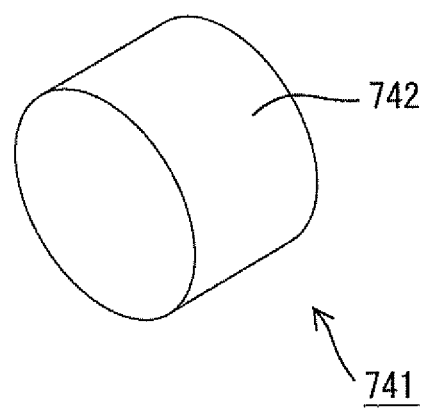
FIG. 76 is a perspective view of a resin processed product used as a water blocking wall.

The water blocking wall 704 is produced using a resin processed product 741 formed into a predetermined shape, such as one shown in FIG. 76. In this embodiment, the resin processed product 741 is formed into a substantially cylindrical shape to fit in the inside of the bottom plate 731 in the blank space 736. The resin processed product 741 is made of a resin material such as a metal-adhesive elastomer (manufactured by TOYOBO Co., Ltd. under the trade name of PELPRENE (trademark)). This resin material has appropriate stiffness (elasticity) and develops adhesiveness to metal by heat treatment. When the resin processed product 741 made of the resin material is subjected to heat treatment at a predetermined temperature, the melted liquid resin material exudes to the surface of the resin processed product 741 while the resin processed product 741 maintains its shape (stiffness) as a whole. The exudate (thermoplastic adhesive) has adhesiveness to metal. For example, the zatrix of the resin material has a melting point of about 170° C., and the exudate (thermoplastic adhesive) has a melting point of about 120° C. It is to be noted that the resin processed product 741 does not have adhesiveness to metal at ordinary temperature (room temperature) and is therefore easy to handle. Such a resin processed product 741 can be obtained by, for example, extruding the resin material into an elongated cylindrical shape using an extruder and cutting a molded product into pieces of a predetermined size.

The resin processed product 741 is fitted in the inside of the bottom plate 731 (i.e., in the groove 735) in the blank space 736. The width of the groove 735 of the bottom plate 731 (blank space 736) is set slightly smaller than the diameter of the resin processed product 741 having a substantially circular cross-section. The resin processed product 741 is attached by fitting (press-fitting) it in the inside (groove 735) of the bottom plate 731 having such a width (groove width). The resin processed product 741 attached in such a way is provided to stand inside the bottom plate 731 to fill the groove 735. The resin processed product 741 has appropriate elasticity and is therefore pressed against the bottom plate 731 from the inside toward the outside of the bottom plate 731 and brought into close contact with an inner surface 791 of the bottom plate 731. It is to be noted that the resin processed product 741 may be attached to the terminal 703 either before or after the terminal 703 is attached to the electric wire 702.

Then, the resin processed product 741 fitted in the inside of the bottom plate 731 in the blank space 736 is subjected to heat treatment (first heat treatment) together with the terminal 703. The heat treatment is performed to bring an outer periphery 742 of the resin processed product 741 into close contact with an inner surface (metal surface) 791 of the bottom plate 731 in the blank space 736 without any gap. As described above, in this embodiment, when the resin processed product 741 is heated at a predetermined temperature (e.g., at 120° C.), a melted liquid resin material (thermoplastic adhesive) exudes to the surface of the resin processed product 741. The resin material exuding from the resin processed product 741 enters a gap between the outer periphery 742 of the resin processed product 741 and the inner surface 791 of the bottom plate 731 and liquid-tightly fills the gap. After the heat treatment, the liquid resin material is cooled and solidified, and as a result, the resin processed product 741 is fixed in a state where it is in close contact with the bottom plate 731 without any gap and functions as the water blocking wall 704. is fixed in a state where it is in close contact with the bottom plate 731 without any gap and functions as the water blocking wall 704.

Figure 77:
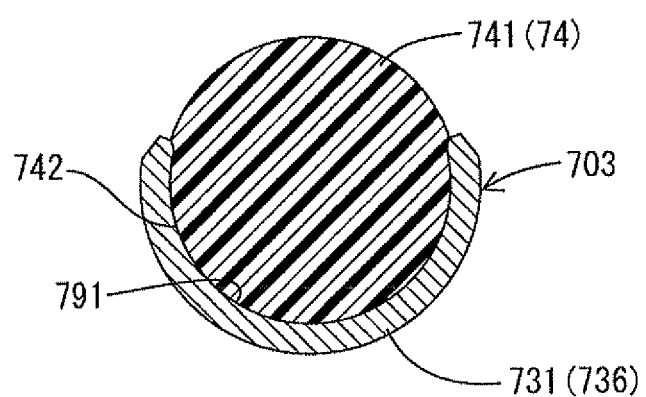
FIG. 77 is a sectional view of a water blocking wall provided so as to stand on a bottom plate of a terminal.

It is to be noted that as shown in FIG. 77, part of the water blocking wall 704 protrudes upward from the groove 735 and is exposed. As will be described later, the exposed part is finally covered with the tubular water blocking coating 705.

(Water Blocking Coating 705) The water blocking coating 705 has a tubular shape and surrounds and covers part of the terminal 703 behind the blank space 736 together with the insulating layer 722 at the base of the exposed core wire 721. That is, a tip-side open end (rim) 751 of the water blocking coating 705 is located closer to the tip of the terminal 703 than the water blocking wall 704. As described above, the projecting portions 738 of the terminal 703 pierce the open end (rim) 751 of the water blocking coating 705 from the inside toward the outside of the water blocking coating 705.

The open end 751 of the water blocking coating 705 is located in such a position as described above, and therefore the water blocking wall 704 is fully held in the water blocking coating 705. The outer surface (outer periphery) of the part of the water blocking wall 704 protruding from the groove 735 is in close contact with the inner surface (inner periphery) of the water blocking coating 705. The outer surface of the bottom plate 731 supporting the water blocking wall 704 is also in close contact with the inner surface of the water blocking coating 705. On the other hand, a back-side open end 752 of the water blocking coating 705 is in close contact with the insulating layer 722 so as to surround the insulating coating 722 at the base of the core wire 721 i.e., (the end of the insulating layer 722).

In this embodiment, the water blocking coating 705 is in close contact with the connecting portion of the terminal 703 and the electric wire 702 to externally tighten the connecting portion. That is, the tubular water blocking coating 705 surrounds and covers the water blocking wall 704, the exposed core wire 721, part of the terminal 703 located behind the water blocking wall 704 (i.e., the wire barrels 732, the insulation barrels 734, and the bottom plate 731), and the end of the insulating layer 722.

In this embodiment, the water blocking coating 705 is composed of a so-called heat-shrinkable tube made of a synthetic resin shrinkable by heat treatment (second heat treatment). It is to be noted that the water blocking coating 705 has an adhesive or pressure-sensitive adhesive layer (not shown) provided on the inner periphery (inner surface) thereof. The adhesive or pressure-sensitive adhesive layer develops adhesiveness or tackiness by thermal softening or melting. As an adhesive or pressure-sensitive adhesive to be used for the adhesive or pressure-sensitive adhesive layer, a well-known one used in this kind of electric wire with terminal 701 can be used. It is to be noted that in other embodiments, the water blocking coating 705 may have a structure in which the adhesive or pressure-sensitive adhesive layer is not provided on the inner periphery thereof.

(Production Process)

Hereinbelow, one example of a production process of the electric wire with terminal 701 according to this embodiment will be described. First, a metallic plate material is subjected to a punching step to form a strip-shaped carrier 770 and a plurality of terminal strips 730 connected to the side edge of the carrier 770. That is, all the terminal strips 730 are connected to the carrier 770. The carrier 770 has feed holes 771 arranged at substantially regular intervals along the longitudinal direction thereof. The feed holes 771 include substantially circular ones and substantially rectangular ones which are alternately arranged. The feed holes 771 are configured to be engaged with feed claws (not shown) of a processing machine (not shown).

The terminal strips 730 connected to the carrier 770 are arranged at substantially regular intervals along the longitudinal direction of the carrier 770. Each of the terminal strips 730 has a flat plate shape just after punching and is configured to have parts corresponding to components constituting the terminal 703 (a bottom plate 731, wire barrels 732, insulation barrels 734, a tip portion 733, and projecting portions 738).

In this punching step, a plurality of recesses 737 may be formed in the surface of part of the bottom plate 731 from which the wire barrels 732 extend. Each of the recesses 737 has a substantially rectangular (substantially parallelogrammatic) shape and a pair of first sides substantially orthogonal to a direction in which the core wire 721 (electric wire 702) extends and a pair of second sides intersecting with the direction in which the core wire 721 (electric wire 702) extends at an angle smaller than 90°. The recesses 737 are arranged such that the first sides of the adjacent recesses 737 are in alignment with each other and the second sides of the adjacent recesses 737 are also in alignment with each other. By providing such recesses 737, it is possible to improve the strength of fixation of the wire barrels 732 to the core wire 721 as well as to inhibit a reduction in the value of electric resistance. It is to be noted that these recesses 737 may be formed in a step other than the punching step.

Figure 78:
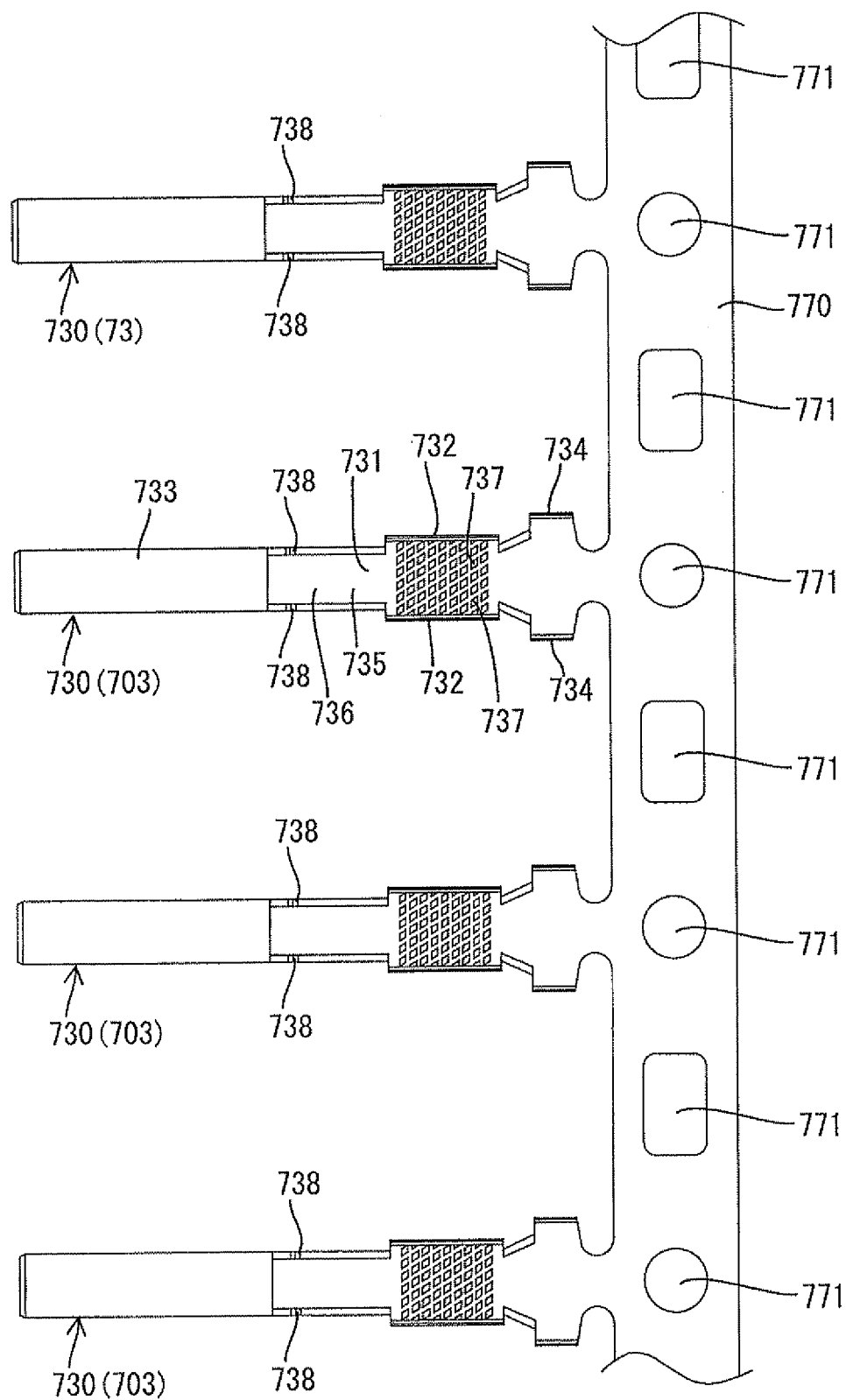
FIG. 78 is a plan view showing a state where a plurality of terminal strips are connected to a carrier so as to be arranged side by side.

The metallic plate material that has been subjected to the punching step is then subjected to a bending step. By performing the bending step, a three-dimensional appearance is given to the terminal strip 730 to provide a terminal 703 as shown in FIG. 78.

Then, a resin processed product 741 (see FIG. 76 etc.) previously formed into a predetermined shape is press-fitted (fitted) in the inside (groove 735) of the bottom plate 731 in a blank space 736 of each of the terminal strips 730 by an assembly machine while the terminal strips 730 (terminals 703) are fed one after another by engaging the feed holes 771 formed in the carrier 770 with feed claws (not shown). The resin processed product 741 is obtained by extruding a predetermined metal-adhesive resin material into an elongated cylindrical shape using an extruder to prepare a molded product and then cutting the molded product into pieces of a predetermined shape (i.e., a shape that fits in the inside of the bottom plate 731 in the blank space 736 to fill the groove 735) (a resin processed product production step). It is to be noted that the movement of the carrier 770 is stopped when the resin processed product 741 is fitted in the inside of the bottom plate 731. After the resin processed product 741 is fitted in the inside of the bottom plate 731, the movement of the carrier 770 is restarted.

Figure 79:
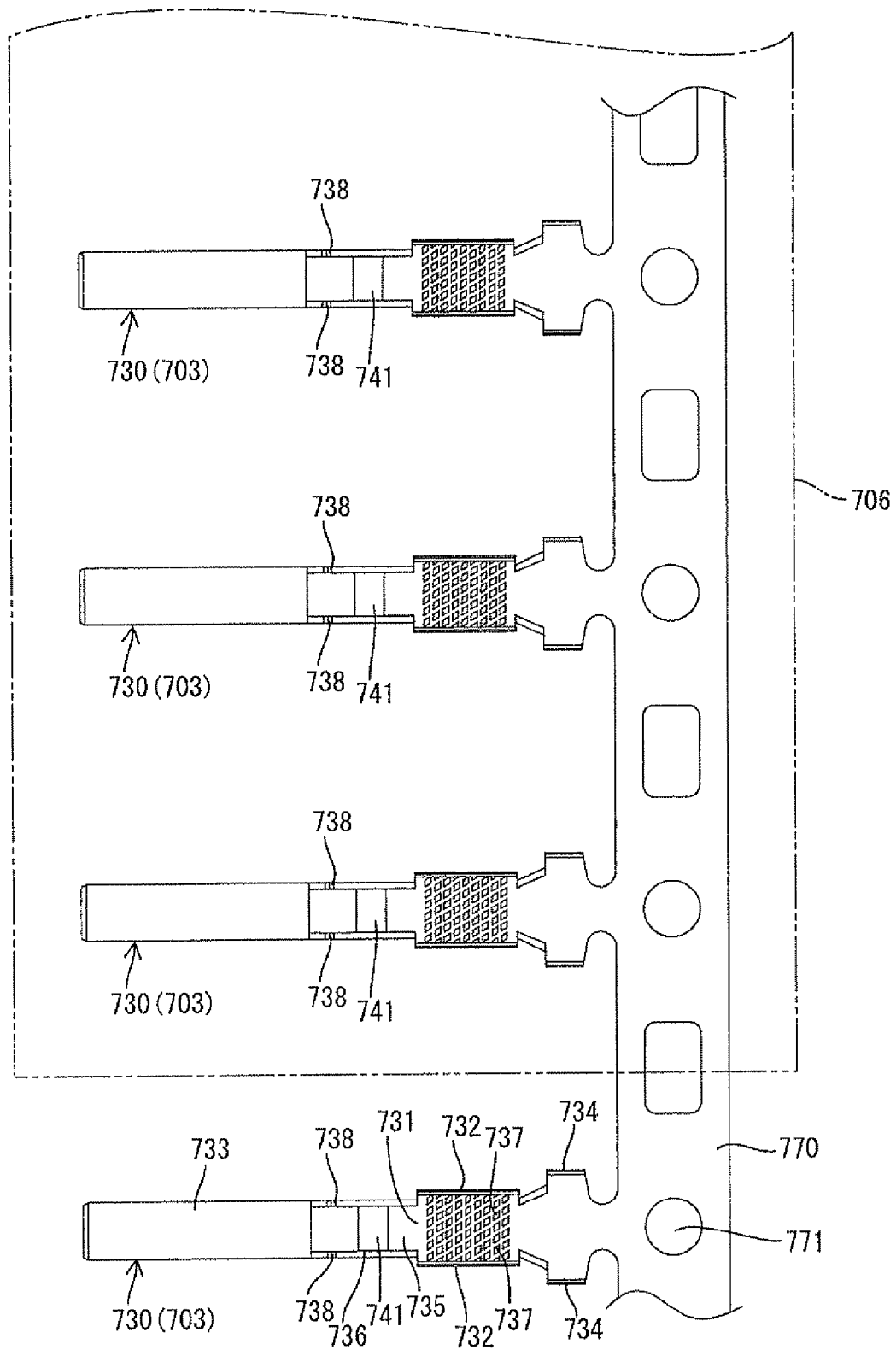
FIG. 79 is an illustration (plan view) showing the step of heating terminal strips provided with a resin processed product.

The terminal strip 730 (terminal 703) having the resin processed product 741 fitted therein is subjected to a heat treatment step (first heat treatment step). In this heat treatment step, a metal-adhesive thermoplastic adhesive exudes from the resin processed product 741 and brings the resin processed product 741 into close contact with the bottom plate 731 without any gap. As shown in FIG. 79, the terminal strips 730 (terminals 703) having the resin processed product 741 fitted therein are fed one after another into a heating apparatus 706. The terminal strips 730 (terminals 703) are subjected to the heat treatment step while passing through the heating apparatus 706. In this way, the heating step is continuously performed on the terminal strips 730 (terminals 703).

Figure 80:
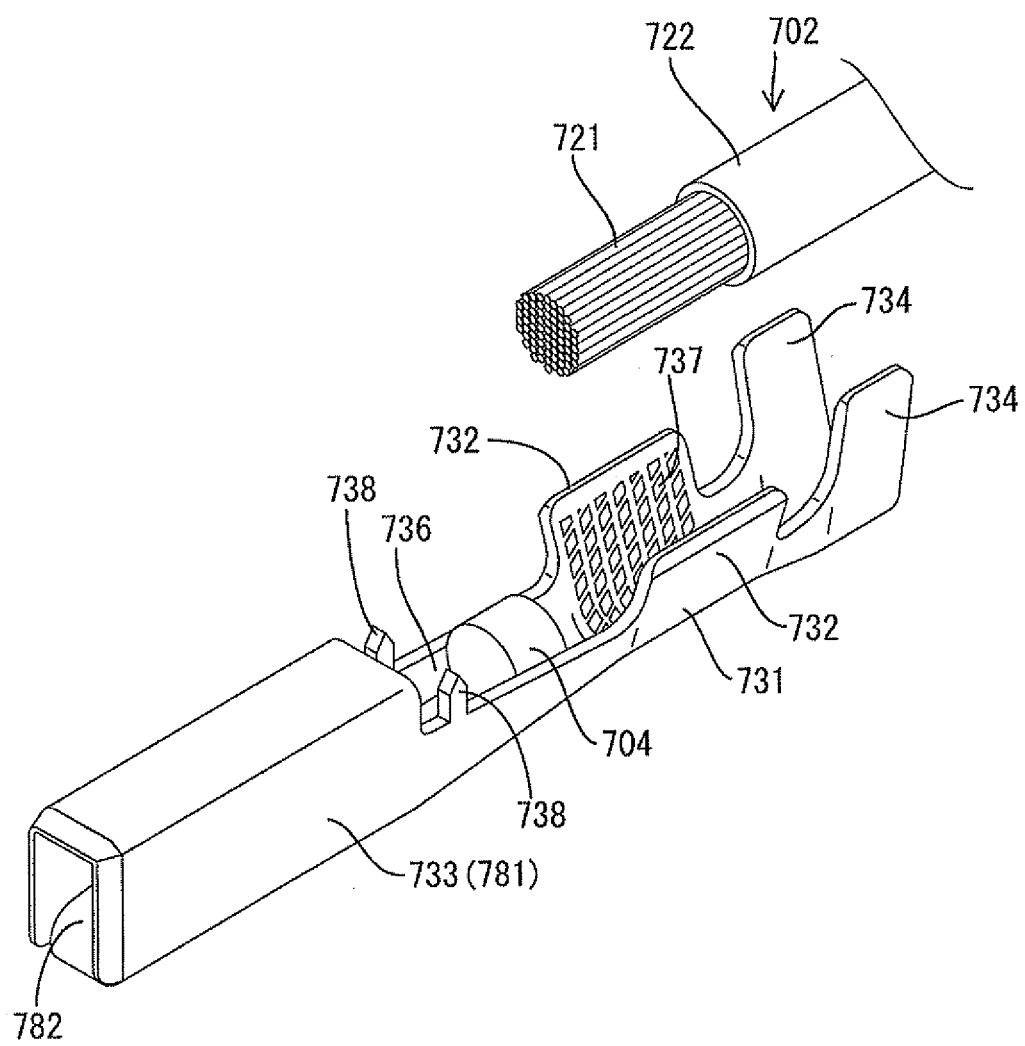
FIG. 80 is an illustration (perspective view) showing the step of placing an electric wire on a bottom plate of a terminal.
Figure 81:
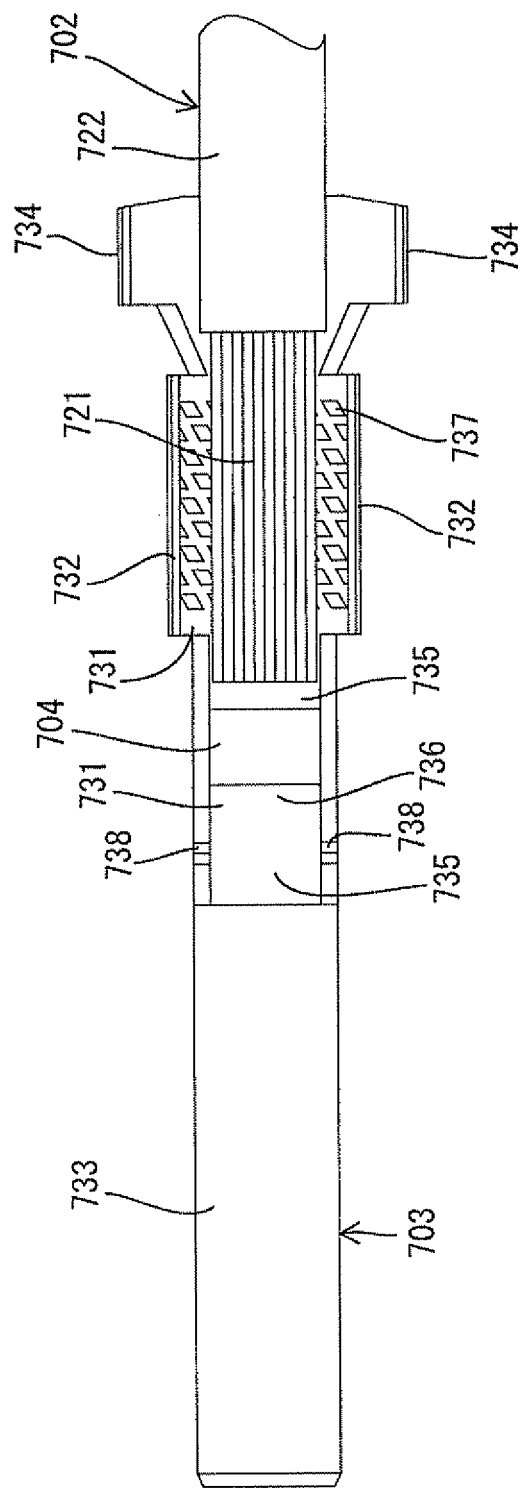
FIG. 81 is a plan view of the terminal in which the electric wire is placed on the bottom plate.
Figure 82:
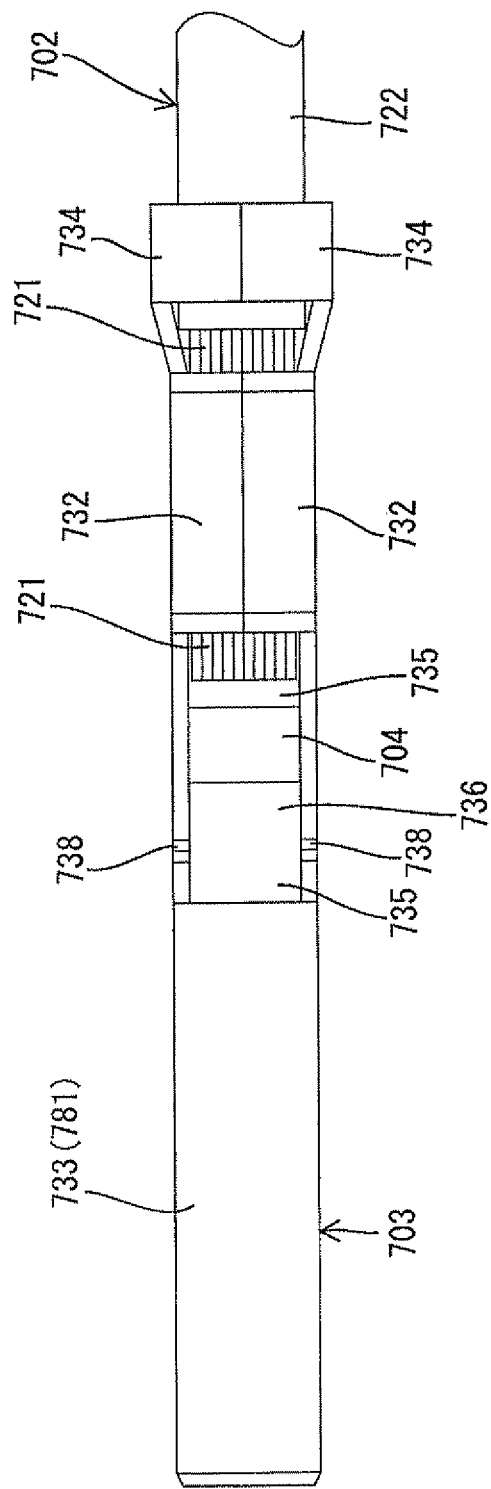
FIG. 82 is a plan view of the electric wire to which the terminal is attached by crimping a wire barrel and an insulation barrel.

After the heat treatment step, the end of the electric wire 702 is placed on the bottom plate 731 of each of the terminal strips 730 (terminals 703) (see FIG. 80). The insulating layer 722 is previously removed in the end of the electric wire 702 to expose the core wire 721. The exposed core wire 721 is placed on part of the bottom plate 731 where the wire barrels 732 are provided. The insulating layer 722 at the base of the core wire 721 (i.e., the end of the insulating layer) is placed on part of the bottom plate 731 where the insulation barrels 734 are provided. It is to be noted that blank space 736 is provided on the tip side of the core wire 721, and the water blocking wall 704 is provided to stand on the bottom plate 731 in the blank space 736 (see FIG. 81). The projecting portions 738 are provided at both the edges of the bottom plate 731 in the blank space 736 provided in front of the water blocking wall 704.

As described above, after the end of the electric wire 702 is placed on the bottom plate 731 of each of the terminals 703, the wire barrels 732 and the insulation barrels 734 of the terminal 703 are crimped using a crimping device (not shown) (crimping step). The wire barrels 732 are crimped onto the core wire 721 and the insulation barrels 734 are crimped onto the end of the insulating layer 722 (see FIG. 82). It is to be noted that the pair of insulation barrels 734 are crimped in a state where the tips thereof overlap one another.

In this embodiment, a cutting step to cut each of the terminal strips 730 from the carrier 770 is performed at the same time as the crimping step. By crimping the terminal 703 onto the electric wire 702 and cutting the terminal 703 (terminal strip 730) from the carrier 770 in such a manner as described above, the electric wire 702 having the terminal 703 attached to the end thereof can be obtained (see FIG. 82).

Figure 83:
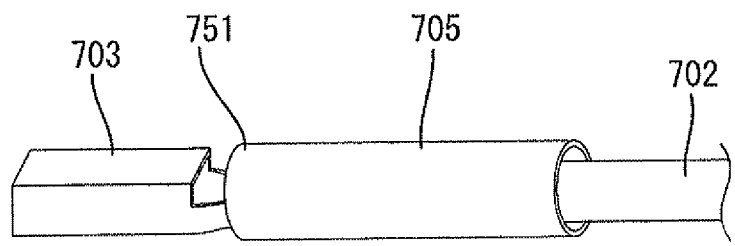
FIG. 83 is an illustration (perspective view) showing a state where the electric wire equipped with the terminal is covered with an unheated heat-shrinkable tube.
Figure 84:
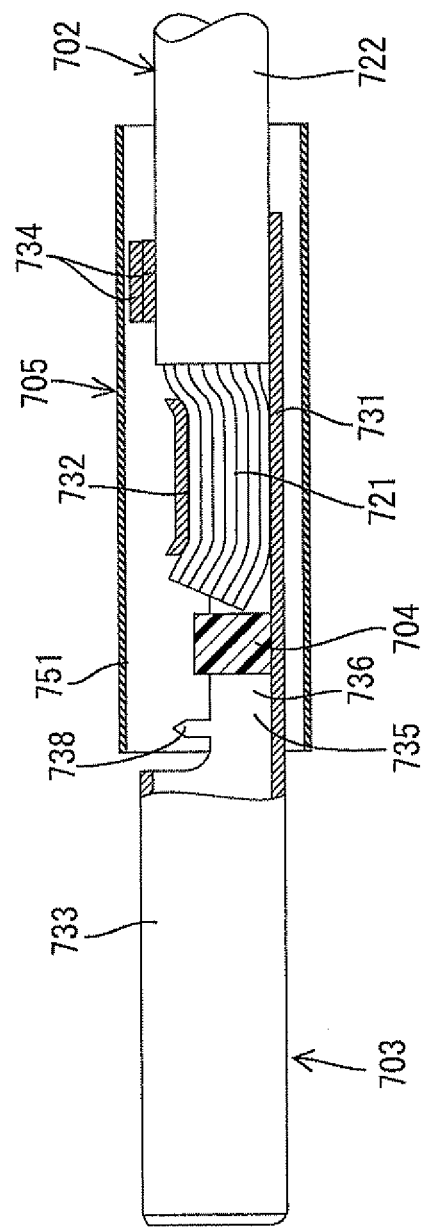
FIG. 84 is a cutaway sectional view showing a state where the electric wire equipped with the terminal is covered with an unheated heat-shrinkable tube.

Then, as shown in FIGS. 83 and 84, a connecting portion of the electric wire 702 and the terminal 703 is surrounded and covered with an unheated tubular water blocking coating 705 composed of a heat-shrinkable tube. At this time, the water blocking coating 705 is provided such that a tip-side open end 751 of the water blocking coating 705 covers the projecting portions 738. The electric wire 702 equipped with the terminal 703 may be passed through the water blocking coating 705 either from the terminal 703 side or from the electric wire 702 side to cover the connecting portion of the electric wire 702 and the terminal 703. It is to be noted that when the electric wire 702 equipped with the terminal 703 is passed through the water blocking coating 705 from the electric wire 702 side, the electric wire 702 is preferably passed through the water blocking coating 705 in advance before the crimping step. The inner diameter of the water blocking coating (heat shrinkable tube) 705 before heating is set larger than of the connecting portion of the electric wire 702 and the terminal 703.

Figure 85:
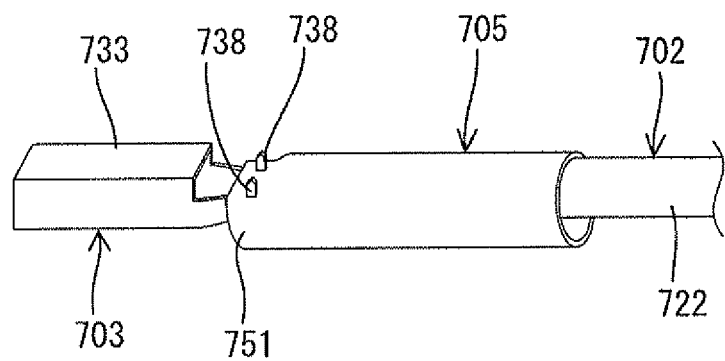
FIG. 85 is an illustration (perspective view) showing a state where projecting portions pierce the rim of the heat-shrinkable tube.
Figure 86:
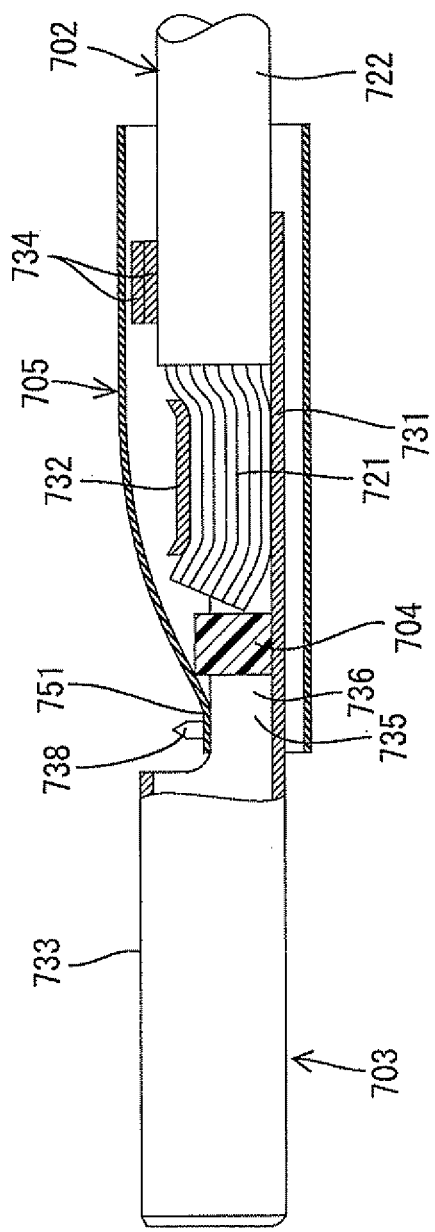
FIG. 86 is a cutaway sectional view showing a state where projecting portions pierce the rim of the heat-shrinkable tube.
Figure 87:
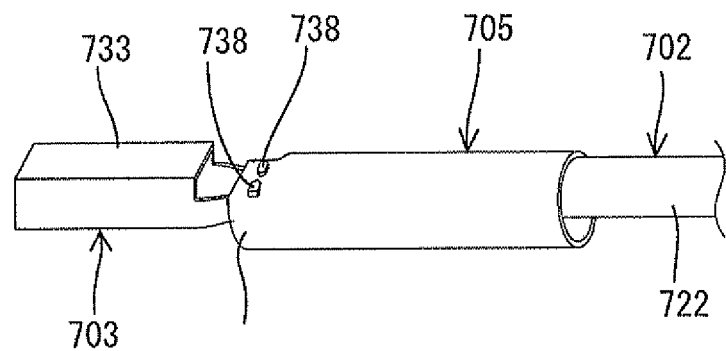
FIG. 87 is an illustration (perspective view) showing a state where the projecting portions piercing the heat-shrinkable tube are folded down.

Then, as shown in FIGS. 85 and 86, the rim (open end 751) of the water blocking coating 705 is pushed down to be pierced with the projecting portions 738. By piercing the water blocking coating 705 with the projecting portions 738, it is possible to position the water blocking coating 705 with respect to the terminal 703 etc. It is to be noted that the position of the water blocking coating 705 is appropriately set in consideration of the amount of heat shrinkage. Then, as shown in FIG. 87, the projecting portions 738 are folded down so as to press the water blocking coating 705 from above. When the projecting portions 738 are folded down, a force is exerted on the projecting portions 738 using a predetermined tool (not shown).

After the positioning of the water blocking coating 705 is achieved and the projecting portions 738 are folded down in such a manner as described above, the electric wire 702 and the terminal 703 covered with the heat-shrinkable tube (water blocking coating) 705 is subjected to a heat treatment step (second heat treatment step) within a heating device (not shown). In this heat treatment step, the water blocking coating 705 composed of a heat-shrinkable tube is thermally shrunk such that the adhesive layer (not shown) provided on the inner periphery of the water blocking coating 705 develops adhesiveness. As a result, the inner surface (inner periphery) of the water blocking coating 705 conforms to the surface profile of the connecting portion of the electric wire 702 and the terminal 703 and therefore comes into close contact with the connecting portion without any gap (see FIG. 75 etc.).

An electric wire with terminal 701 whose connecting portion is covered with the tubular water blocking coating 705 can be obtained by the above production process. The thus obtained electric wire 701 is provided with the water blocking wall 704 and the water blocking coating 705, and is therefore excellent in waterproofness. Particularly, the water blocking wall 704 is provided to stand in the groove 735 in a tip-side portion (blank space 736) of the bottom plate 731 and the water blocking wall 704 and part of the bottom plate 731 supporting the water blocking wall 704 are surrounded with the water blocking coating 705 (open end 751), which makes it possible, even when water enters from the tip side (tip portion733-side) of the terminal 703, to inhibit the entry of water into the back side of the water blocking wall 704.

It is to be noted that the positioning (temporary fixing) of the tubular water blocking coating 705 composed of a heat-shrinkable tube is achieved by the projecting portions 738 before the heat treatment step (second heat treatment step), which makes it possible to inhibit the heat-shrinkable tube from being displaced or detached. Further, as described above, the projecting portions 738 are folded down, which inhibits the projecting portions 738 from undesirably getting caught on surrounding objects etc.

<Embodiment 7-2>

Figure 88:
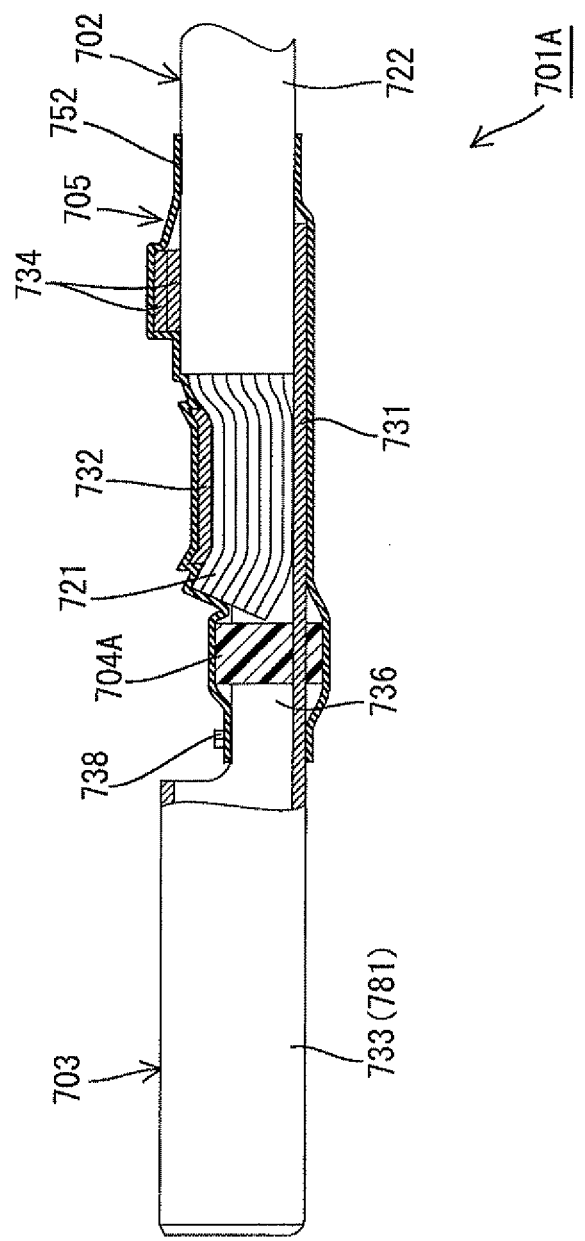
FIG. 88 is a cutaway sectional view of a main part of an electric wire with terminal according to an embodiment 7-2.

An electric wire with terminal 701A according to an embodiment 7-2 will be described with reference to FIG. 88. The basic structure of the electric wire with terminal 701A according to this embodiment is the same as that of the electric wire with terminal 701 according to the embodiment 7-1. Therefore, the same components as the embodiment 7-1 are denoted by the same reference numerals and a description thereof will not be repeated. The electric wire with terminal 701A according to this embodiment is different from the electric wire with terminal according to the embodiment 7-1 in that a water blocking wall 704A provided on the bottom plate 731 of the terminal 703 is formed by molding (resin molding).

The water blocking wall 704A is provided so as to cover the bottom plate 731 in the blank space 736. That is, the water αblocking wall 704A is present not only on the inside but also on the outside of the bottom plate 731. As in the case of the embodiment 7-1, the water blocking wall 704A is fully held in the tubular water blocking coating 705. It is to be noted that when viewed along the axial direction of the electric wire 702, the water blocking wall 704A has a substantially circular shape, and the outer periphery of the water blocking wall 704A is in close contact with the inner periphery of the water blocking coating 705. The electric wire with terminal according to the present invention may be provided with the water blocking wall 704A having such a structure as descried above.

<Embodiment 7-3>

Figure 89:
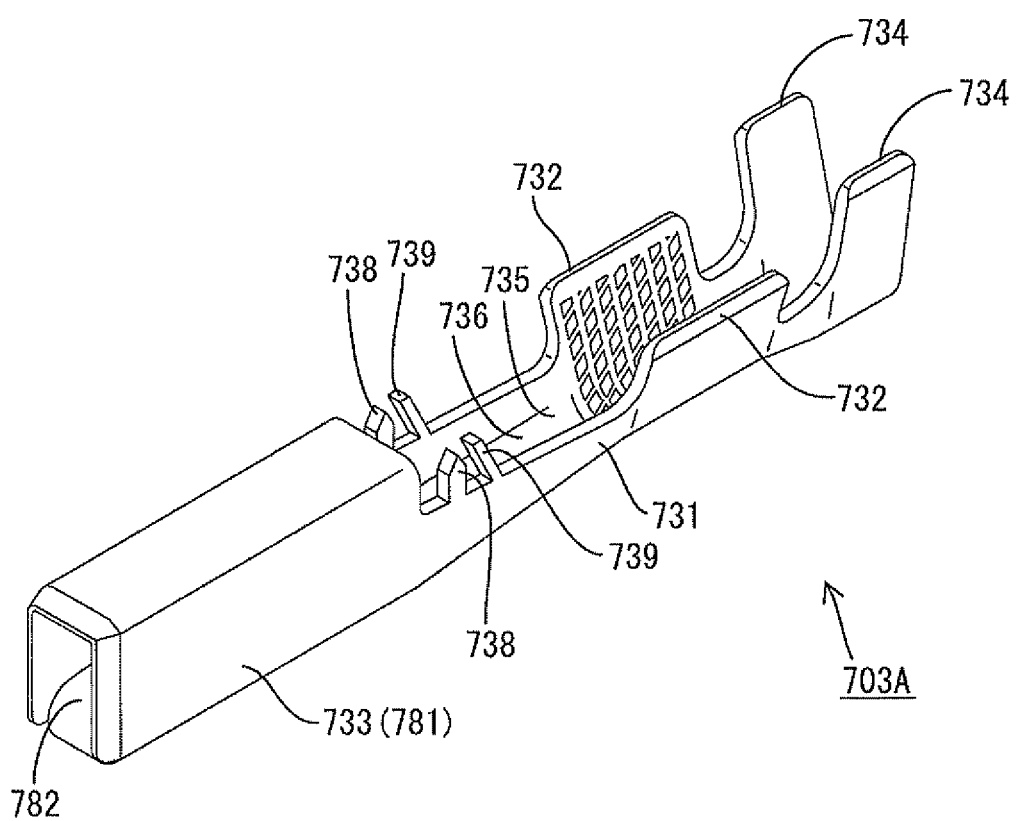
FIG. 89 is a perspective view of a terminal according to an embodiment 7-3.

An electric wire with terminal 701B according to an embodiment 7-3 will be described with reference to FIGS. 89 to 91. FIG. 89 shows a terminal 703A used in this embodiment. The terminal 703A is different from the terminal 703 used in the embodiment 7-1 in that guiding portions 739 are further provided. The guiding portions 739 project from both the edges of the bottom plate 731 in the blank space 736 of the terminal 703A, and are located behind and next to the projecting portions 738. Each of the guiding portions 739 diagonally extends from the above-described edge toward the tip of the projecting portion 738 and has an elongated shape. As shown in FIG. 89 etc., each of the guiding portions 739 and each of the projecting portions 738 are arranged in a manner such that the base of the guiding portion 739 and the base of the projecting portion 738 are separated from each other and the tip of the guiding portion 739 comes close to the tip of the projecting portion 738. In this embodiment, the height of each of the guiding portions 739 is set to be substantially the same as that of each of the projecting portions 738. The guiding portions 739 are formed when, for example, the terminal 703A is formed by punching a metallic plate material.

Figure 90:
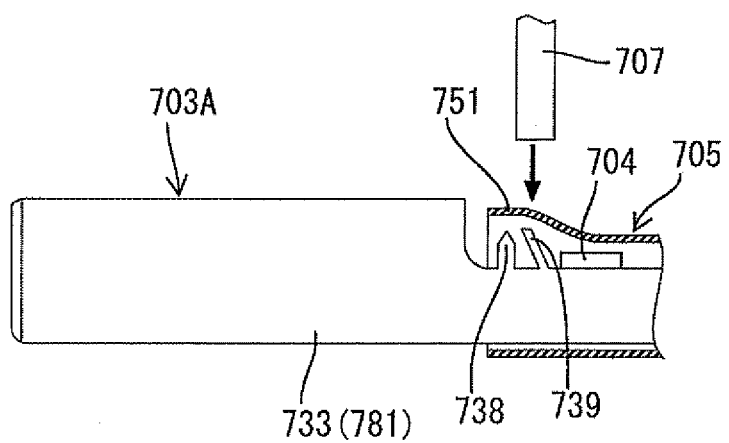
FIG. 90 is a cutaway sectional view of a main part of an electric wire with terminal in which the terminal according to the embodiment 7-3 is covered with a water blocking coating.
Figure 91:
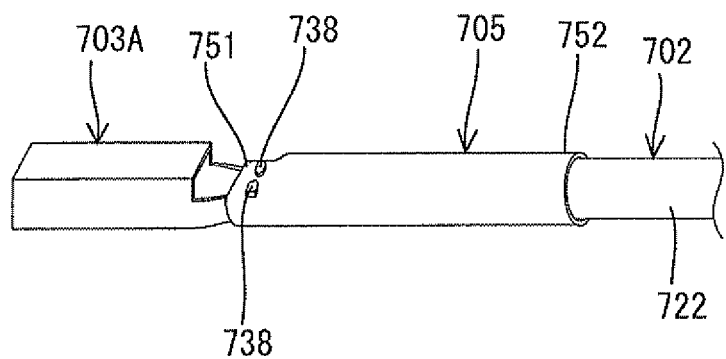
FIG. 91 is a perspective view of an electric wire with terminal including the terminal according to the embodiment 7-3. 7-3.

The guiding portions 739 are used to move the tip-side open end 751 (rim) of the water blocking coating 705 to the tips of the projecting portions 738 (see FIG. 90). For example, there is a case where when the inner diameter of the water blocking coating 705 is set relatively small, it is difficult to pull the rim (open end 751) of the water blocking coating 705 upward to put it over the tips of the projecting portions 738. However, according to this embodiment, the terminal 703A has the guiding portions 739, which makes it possible, even in such a case as described above, to move the water blocking coating 705 along the inclined guiding portions 739 to the tips of the projecting portions 738. Therefore, by providing the guiding portions 739, it is possible to easily put the rim of the water blocking coating 705 over the projecting portions 738.

Further, as shown in FIG. 90, the guiding portions 739 may be folded down inside the water blocking coating 705 by pressing the guiding portions 739 over the water blocking coating 705 using a tool 707 located above the terminal 703A. The tool 707 is composed of a metallic rod having a predetermined width (size) and presses the two guiding portions 739 provided at both the edges of the terminal 703A at the same time. The pressed guiding portions 739 are bent at their base toward the inside of the groove 735 of the terminal 703A. By folding down the guiding portions 739 inside the tubular water blocking coating 705, it is possible to inhibit the guiding portions 739 from pushing up the water blocking coating 705 (in some cases, from breaking through the water blocking coating 705) to inhibit the guiding portions 739 from protruding outside the water blocking coating 705. Further, it is also possible to inhibit an increase in the outer diameter of part of the water blocking coating 705 covering the guiding portions 739. In other embodiments, the guiding portions 739 may not be folded down finally.

It is to be noted that when the guiding portions 739 are folded down, the water blocking coating 705 over the projecting portions 738 is also pushed down by the tool 707. At this time, the sharp tips of the projecting portions 738 pierce the rim (open end 751) of the water blocking coating 705. Also in this embodiment, the positioning of the water blocking coating 705 is achieved by piercing the water blocking coating 705 with the projecting portions 738 as in the case of the embodiment 7-1. Further, as in the case of the embodiment 7-1, the projecting portions 738 piercing the water blocking coating 705 are folded down to press the water blocking coating 705 from above. Then, the water blocking coating 705 composed of a heat-shrinkable tube is subjected to heat treatment to obtain an electric wire with terminal 701A whose connecting portion of the terminal 703A and the electric wire 702 is covered with the water blocking coating 705, such as one shown in FIG. 91.

<Other Embodiment>

The present invention is not limited to the embodiments described above with reference to the drawings, and the following embodiments are also included in the technical scope of the present invention.

(1) In the above embodiments, the projecting portion 738 is provided at each of both the edges of the bottom plate 731 in the blank space 736. However, in other embodiments, the projecting portion 738 may be provided at, for example, only one of the edges.

(2) In the above embodiments, the projecting portions 738 are folded down after piercing the water blocking coating 705. However, in other embodiments, the projecting portions 738 may be left as they are without being folded down or the tips of the exposed projecting portions 738 piercing the water blocking coating 705 may be cut off by a tool such as nippers.

(3) In the above embodiments, the terminal 703 has the insulation barrels 734. However, in other embodiments, the insulation barrels 734 may be omitted.

(4) In the above embodiments, the back-side open end 752 of the water blocking coating 705 surrounds and is in close contact with the insulating layer 722. However, in other embodiments, the open end 752 may be brought into close contact with the insulating layer 722 by, for example, fitting a resin ring onto the electric wire 702.

(5) In the above embodiments, the terminal 703 is a so-called female-type terminal. However, in other embodiments, the terminal 703 may be a male terminal or a round terminal (a so-called LA terminal). That is, the shape of the terminal 703 may be appropriately selected depending on its intended use.

(6) In the above embodiments, the water blocking wall 704 (resin processed product 741) has a cylindrical shape. However, in other embodiments, the water blocking wall 704 may have a columnar shape having an elliptical, oval, or rectangular cross-section. That is, the shape of the water blocking wall 704 may be appropriately selected depending on the inner shape of the bottom plate 731 of the terminal 703.

(7) In the above embodiments, the water blocking coating 705 is one previously formed into a tubular shape. However, in other embodiments, the water blocking coating 705 may be one obtained by, for example, wrapping a sheet-shaped water blocking tape around the connecting portion of the electric wire 702 and the terminal 703 in a tubular shape.

(8) In the above embodiments, the heat treatment (first heat treatment) to bring the water blocking wall 704 (resin processed product 741) into close contact with the bottom plate 731 of the terminal 703 and the heat treatment (second heat treatment) to thermally shrink the water blocking coating 705 composed of a heat-shrinkable tube are performed separately. However, in other embodiments, these heat treatment steps may be performed at the same time.

(9) In the above embodiments, the crimping step to crimp the terminal 703 onto the electric wire 702 and the cutting step to cut each of the terminal strips 730 (terminals 703) from the carrier are performed at the same time. However, in other embodiments, the cutting step may be performed before the crimping step is performed or the crimping step may be performed after the cutting step is performed.

(10) In the above embodiments, the heat-shrinkable tube is used as the water blocking coating 705. However, in other embodiments, the water blocking coating 705 may be, for example, a tubular member having elasticity such as a rubber tube.

(11) In the above embodiments, the resin processed product 741 is produced by extruding a predetermined resin material. However, in other embodiments, the resin processed product having a predetermined shape may be produced by, for example, molding the resin material into a sheet shape (sheet-molding) using a T-die and punching the sheet-shaped molded product.

(12) In the above embodiments, the water blocking wall 704 (resin processed product 741) is made of a metal-adhesive elastomer. However, in other embodiments, the material of the water blocking wall 704 may be appropriately selected from well-known resins such as polybutylene terephthalate, polyethylene terephthalate, polyamide, and polypropylene depending on its intended use (e.g., depending on the desired waterproof performance of the water blocking wall).

Means for Solving the Problem

The technique disclosed in this description relates to an electric wire with terminal including: an electric wire having a core wire and an insulating layer covering an outer periphery of the core wire such that an end of the core wire is exposed; a terminal having a bottom plate whose both edges extending along an axial direction stand to form a groove inside and on which the end of the core wire is placed such that a blank space is left on a tip side thereof, a pair of wire barrels extending from both the edges of the bottom plate, and a tip portion that extends on the tip side of the bottom plate and is to be connected to a mate, the terminal being attached to the electric wire by crimping the wire barrels onto the core wire such that the wire barrels hold the core wire placed on the bottom plate; and a tubular water blocking coating that surrounds and covers part of the terminal behind the blank space together with the insulating layer at a base of the exposed core wire. The bottom plate has elongated projecting portions extending upward from both the edges thereof in the blank space and the projecting portions pierce the water blocking coating.

As described above, the electric wire with terminal has elongated projecting portions extending upward from both the edges of the bottom plate in the blank space and the projecting portions pierce the water blocking coating, and therefore the positioning of the water blocking coating is achieve by using the projecting portions.

It is preferred that, in the electric wire with terminal, the projecting portions are folded down to press the water blocking coating in a state where the projecting portions pierce the water blocking coating. By folding down the projecting portions, it is possible to inhibit the water blocking coating from being coming off the projecting portions to inhibit the displacement of the water blocking coating. Further, by folding down the projecting portions, it is also possible to inhibit the projecting portions from undesirably getting caught on surrounding objects.

It is also preferred that in the electric wire with terminal, the terminal has guiding portions provided at both the edges of the bottom plate in the blank space so as to be located behind and next to the projecting portions and inclined toward the tips of the projecting portions. By providing such guiding portions, it is easy to guide the water blocking coating to the tips of the projecting portions.

It is also preferred that, in the electric wire with terminal, the guiding portions are folded down inside the water blocking coating. By folding down the guiding portions inside the water blocking coating, it is possible to inhibit the guiding portions from protruding outside the water blocking coating as well as to inhibit an increase in the outer diameter of the water blocking coating.

It is also preferred that, in the electric wire with terminal, a water blocking wall is provided in the blank space of the terminal so as to be held in the water blocking coating to block the groove such that its outer surface is in close contact with the inner surface of the water blocking coating. By providing such a water blocking wall, water coming from the tip side of the terminal can be blocked by the water blocking wall. This makes it possible to inhibit the entry of water into the connecting portion of the terminal and the electric wire.

In the electric wire with terminal, the terminal may have an insulation barrel that holds the insulating layer of the electric wire.

Tn the electric wire with terminal, a metal constituting the core wire and a metal constituting the terminal may be different from each other.

It is also preferred that, in the electric wire with terminal, the water blocking coating has an adhesive or pressure-sensitive adhesive layer provided on the inner periphery thereof. By providing the adhesive or pressure-sensitive adhesive layer on the inner periphery of the water blocking coating, it is possible to easily bring the water blocking coating into close contact with the connecting portion of the electric wire and the terminal.

In the electric wire with terminal, the water blocking coating may be composed of a heat-shrinkable tube.

The technique disclosed in this description relates to a terminal that is to be attached to an end of an electric wire having a core wire and an insulating layer covering an outer periphery of the core wire such that an end of the core wire is exposed and that is covered with a tubular water blocking coating in its connecting portion with the electric wire, the terminal including: a bottom plate whose both edges extending along an axial direction stand to form a groove inside and on which the end of the core wire is placed such that a blank space is left on its tip side; a pair of wire barrels that extends from both the edges of the bottom plate and is to be crimped onto the core wire so as to hold the core wire on the bottom plate; and a tip portion that extends on the tip side of the bottom plate and is to be connected to a mate. The bottom plate has elongated projecting portions extending upward from both the edges thereof in the blank space.

As described above, the terminal has the elongated projecting portions extending upward from both the edges of the bottom plate in the blank space, and therefore the positioning of the water blocking coating can be achieve by using the projecting portions.

It is preferred that the terminal has guiding portions provided at both the edges of the bottom plate in the blank space so as to be located behind and next to the projecting portions and inclined toward the projecting portions. By providing such guiding portions, it is easy to guide the water blocking coating to the tips of the projecting portions.

(Effects)

The technique disclosed in this description makes it possible to provide an electric wire with terminal that is covered with a water blocking coating, is capable of easily performing the positioning of the tubular water blocking coating, and is excellent in waterproofness and a terminal to be attached to the electric wire.

The invention claimed is:

1. An electric wire with terminal comprising: an electric wire covering an outer periphery of a core wire with an insulating coating; and a terminal connected to the electric wire, wherein:
   the terminal includes a wire barrel that has a bottom plate on which the core wire exposed beyond an end of the insulating coating is placed and that is crimped onto the core wire and an extending portion extending from the bottom plate;
   the extending portion is provided with a water blocking wall molded by a synthetic resin;
   the core wire is covered with a tubular water blocking coating that is in direct contact with an outer surface of the water blocking wall and with an outer surface of the end of the insulating coating and that extends from the water blocking wall and the end of the insulating coating; and
   a top portion of the water blocking wall is covered by the tubular water blocking coating.

2. The electric wire with terminal according to claim 1, wherein:
   the terminal includes a connecting portion to be connected to a conductive member, a wire barrel crimped onto the core wire exposed beyond an end of the insulating coating, and a bridging portion connecting the connecting portion and the wire barrel to each other;
   the bridging portion is provided with a water blocking wall molded by a synthetic resin;
   the water blocking wall is integrally provided with a continuously-provided portion that is connected to the water blocking wall and that extends along an outer surface of the bridging portion toward the wire barrel side; and
   the continuously-provided portion is configured to be flexurally deformable by setting a resin-occupied area of cross-section of the continuously-provided portion orthogonal to a direction in which the core wire extends smaller than that of cross-section of the water blocking wall.

3. The electric wire with terminal according to claim 1, wherein:
   the terminal includes a connecting portion to be connected to a conductive member, a wire barrel crimped onto an end of the core wire exposed beyond an end of the insulating coating, and a bridging portion connecting the connecting portion and the wire barrel to each other;
   the bridging portion is provided with a water blocking wall molded by a synthetic resin;
   the water blocking wall is integrally provided with an abutment portion against which a tip of the core wire abuts before crimping, and the abutment portion is provided behind the water blocking wall at a position distant from a back surface of the water blocking wall opposed to the tip of the core wire and is displaced or damaged to allow the tip of the core wire to move forward; and
   a distance between the abutment portion and the back surface of the water blocking wall is set such that, when the core wire is stretched in a state where the tip of the core wire abuts against the abutment portion, the tip of the core wire does not apply a pressing force to the back surface of the water blocking wall or the tip of the core wire does not reach the back surface of the water blocking wall.

4. The electric wire with terminal according to claim 1, wherein:
   the terminal includes a wire barrel crimped onto the core wire exposed beyond an end of the insulating coating and an extending portion extending from a bottom plate of the wire barrel;
   the extending portion is provided with a water blocking wall molded by a synthetic resin; and
   at a widthwise edge of the extending portion, at least one of a projection projecting from the edge and a depression formed by depressing the edge is provided.

5. The electric wire with terminal according to claim 1, wherein:
   the terminal includes a connecting portion to be connected to a conductive member, a wire barrel crimped onto an end of the core wire exposed beyond an end of the insulating coating, and a bridging portion connecting the wire barrel and the connecting portion to each other;
   the bridging portion is provided with a water blocking wall molded by a synthetic resin;
   the bridging portion has a boundary surface with the water blocking wall; and
   the boundary surface has irregularities provided in at least a surface on a side where the core wire is placed.

6. A connector fittable to a mating connector,
   the connector comprising:
   the electric wire with terminal according to claim 1; and
   a connector housing having a cavity into which the terminal is inserted, wherein:
   the terminal includes a wire barrel crimped onto the core wire exposed beyond an end of the insulating coating and an extending portion extending from a bottom plate of the wire barrel;
   the extending portion is provided with a water blocking wall molded by a synthetic resin;

and in a state where the terminal is inserted in the cavity and placed in its correct position, a large-diameter part of the water blocking coating whose diameter in a direction orthogonal to a direction in which the terminal is inserted into the cavity is larger is located outside the cavity.

7. The electric wire with terminal according to claim 1, wherein:

an end of the core wire is exposed without the insulating coating;

the terminal includes a bottom plate whose both edges extending along an axial direction stand to form a groove inside and on which the end of the core wire is placed such that a blank space is left on a tip side thereof, a pair of wire barrels extending from both the edges of the bottom plate, and a tip portion that extends on the tip side of the bottom plate and is to be connected to a mate, and is attached to the electric wire by crimping the wire barrels onto the core wire such that the wire barrels hold the core wire placed on the bottom plate;

part of the terminal behind the blank space is surrounded and covered with a tubular water blocking coating together with the insulating layer at a base of the exposed core wire;

the bottom plate has elongated projecting portions extending upward from both the edges thereof in the blank space; and the projecting portions pierce the water blocking coating.

8. The electric wire with terminal according to claim 1, wherein:

a maximum height of the water blocking wall is lower than a maximum height of the wire barrel.

9. The electric wire with terminal according to claim 1, wherein:

the extended portion includes a groove portion, the water blocking portion being disposed at least partially within the groove portion, and the groove portion is at a location lower than a location of the wire barrel.

* * * * *